US008355375B2

(12) United States Patent
Maeda et al.

(10) Patent No.: US 8,355,375 B2
(45) Date of Patent: *Jan. 15, 2013

(54) MOBILE COMMUNICATIONS SYSTEM, HANDOVER CONTROLLING METHOD, RADIO NETWORK CONTROLLER, AND MOBILE TERMINAL

(75) Inventors: Miho Maeda, Tokyo (JP); Hideji Wakabayashi, Tokyo (JP); Koutarou Sugisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,309

(22) Filed: Jun. 29, 2011

(65) Prior Publication Data
US 2011/0255515 A1 Oct. 20, 2011

Related U.S. Application Data

(63) Continuation of application No. 11/666,301, filed as application No. PCT/JP2006/301353 on Jan. 27, 2006, now Pat. No. 8,050,222.

(30) Foreign Application Priority Data

Mar. 28, 2005 (WO) .................. PCT/JP2005/005762
Mar. 29, 2005 (WO) .................. PCT/JP2005/005821

(51) Int. Cl.
*H04W 4/00* (2009.01)
(52) U.S. Cl. ........ 370/329; 370/331; 370/342; 455/423; 455/525
(58) Field of Classification Search .................. 455/423, 455/525; 370/331, 342
See application file for complete search history.

(56) References Cited

U.S. PATENT DOCUMENTS

| 6,535,738 | B1 | 3/2003 | Bomar et al. | |
|---|---|---|---|---|
| 6,567,666 | B2 | 5/2003 | Czaja et al. | |
| 6,804,519 | B1 | 10/2004 | Czaja et al. | |
| 2001/0041572 | A1* | 11/2001 | Lundqvist et al. | 455/450 |
| 2003/0002460 | A1 | 1/2003 | English | |
| 2003/0190915 | A1* | 10/2003 | Rinne et al. | 455/436 |
| 2005/0030964 | A1* | 2/2005 | Tiedemann et al. | 370/431 |
| 2005/0053035 | A1 | 3/2005 | Kwak et al. | |
| 2007/0079207 | A1 | 4/2007 | Seidel et al. | |
| 2007/0178932 | A1* | 8/2007 | Miklos et al. | 455/525 |
| 2009/0054071 | A1 | 2/2009 | Mustapha | |

FOREIGN PATENT DOCUMENTS

| EP | 1 377 101 A1 | 1/2004 |
|---|---|---|
| EP | 1 507 352 A1 | 2/2005 |
| EP | 1 507 422 A1 | 2/2005 |

(Continued)

OTHER PUBLICATIONS

Extended European Search Report issued Oct. 18, 2010, in Patent Application No. 10172838.4.

(Continued)

*Primary Examiner* — Rafael Pérez-Gutiérrez
*Assistant Examiner* — German Viana Di Prisco
(74) *Attorney, Agent, or Firm* — Oblon, Spivak, McClelland, Maier & Neustadt, L.L.P.

(57) ABSTRACT

A radio network controller constructed to divide a plurality of base stations into a group of base stations included in an E-DCH active set and a group of base stations included in an active set for soft handovers according to a status of reception of data in each of the plurality of base stations.

8 Claims, 48 Drawing Sheets

FOREIGN PATENT DOCUMENTS

| | | |
|---|---|---|
| JP | 2000 201369 | 7/2000 |
| JP | 2001 16633 | 1/2001 |
| JP | 2001 197536 | 7/2001 |
| JP | 2002 77982 | 3/2002 |
| JP | 2002 95031 | 3/2002 |
| JP | 2005526410 | 9/2005 |
| JP | 2007-502558 | 2/2007 |
| JP | 2008-523646 | 7/2008 |
| KR | 10-2007-0053823 | 5/2007 |
| KR | 10-2007-0067178 | 6/2007 |
| WO | WO 02/37733 A2 | 5/2002 |
| WO | WO 2004/057887 A1 | 7/2004 |

OTHER PUBLICATIONS

Japanese Office Action issued Sep. 14, 2010, in Patent Application No. JP2007-510326.

Sophia Antipolis., "Measurement event for evaluation of best HS-DSCH cell" XP050122335 SIEMENS, vol. RAN WG2, Nov. 12-15, 2002, pp. 1-11.

"Measurement Reporting for E-DCH Active Set", http://www.3gpp.org/ftp/tsg_ran/WG2_RL2/TSGR2_49/Documents/, Nov. 2005, pp. 1-7.

"HSUPA scheduling and signaling", Motorola, 3GPP TSG-RAN WG2 meeting #45, Tdock# R2-042357, 2004.

FDD enhanced Uplink; Overall description; stage 2; (Release 6) 3GPP TS 25.309 V6.1.0, pp. 1-26, 2004.

Office Action issued Apr. 26, 2011 in Japanese Patent Application No. 2010254645.

Office Action issued Sep. 20, 2011 in Japan Application No. 2010-254645.

"Measurement Reporting for E-DCH Active Set", TSG-RAN Working Group2 #49, R2-052874, Nov. 7-11, 2005, 2 pages.

Japanese Office Action issued Feb. 7, 2012, in Patent Application No. 2010-254645 (with English-language translation).

* cited by examiner

FIG.34
(a)
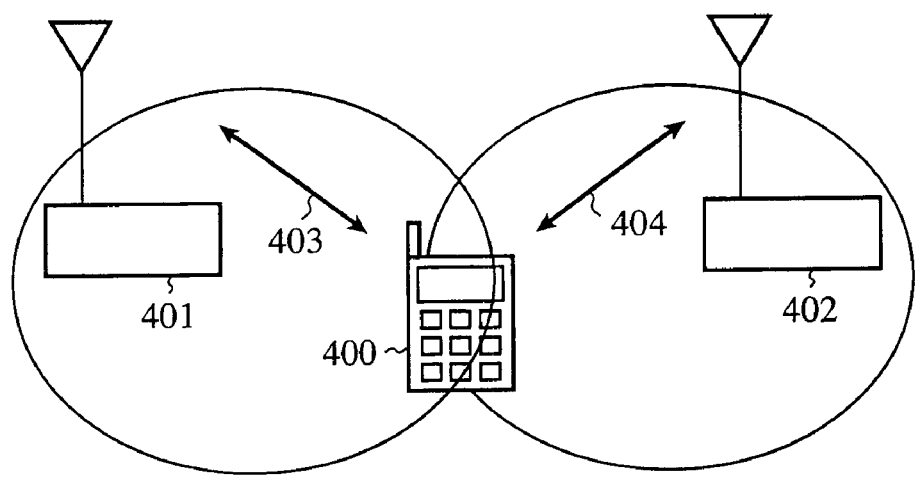
Add E-DCH
(b)
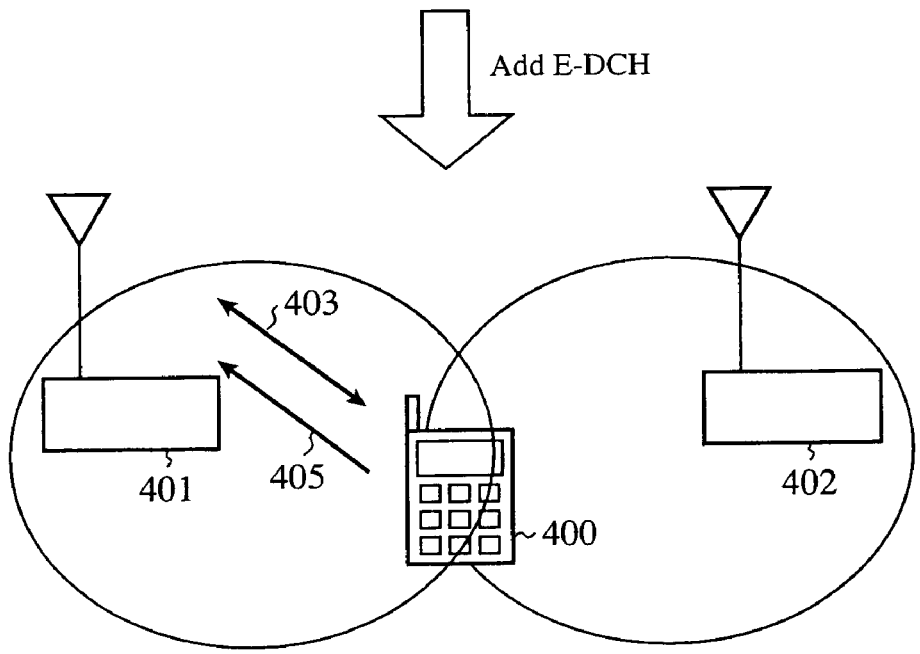

| Scrambling Code | Base Station Version |
|---|---|
| SCR#1 | R99 |
| SCR#2 | Re15 |
| SCR#3 | Re16 |

MOBILE COMMUNICATIONS SYSTEM, HANDOVER CONTROLLING METHOD, RADIO NETWORK CONTROLLER, AND MOBILE TERMINAL

CROSS-REFERENCE TO RELATED APPLICATIONS

This application is a continuation of U.S. Ser. No. 11/666,301 filed Apr. 26, 2007, the entire content of which is incorporated herein by reference. U.S. Ser. No. 11/666,301 is a National Stage Application of PCT/JP2006/301353 filed on Jan. 27, 2006 and claims priority under 35 U.S.C. 119 to International Application Nos. PCT/JP2005/005762 filed Mar. 28, 2005 and PCT/JP2005/005821 filed Mar. 29, 2005.

FIELD OF THE INVENTION

The present invention relates to a technology for selecting a base station included in an active set for uplink packet communications from base stations included in an active set for soft handovers via a dedicated channel (the technology is used to carry out macro diversity reception). More particularly, it relates to a mobile communications system which selects a non-serving base station (non-serving NodeB) having a control function of controlling the power of transmission of data in mobile terminal from among two or more base stations which carry out macro diversity reception of the data transmitted from the mobile terminal, and the mobile terminal.

BACKGROUND OF THE INVENTION

A mobile terminal in a prior art mobile communications system is so constructed as to transmit data to a base station as soon as it receives the data, but as not to transmit the data after carrying out scheduling of the transmission timing of the data.

However, the power of transmission of data in the mobile terminal increases and the interference level of a base station increases with increase in the rate of transmission of data. Therefore, the scheduler of a base station is requested to prevent the increase in the interference level so that the interference level does not exceed a certain level by controlling the transmission timing or the like of each mobile terminal, thereby increasing the throughput.

The scheduler of a base station can also shift the time when the amount of transmission data reaches its peak by controlling the transmission timing or the like of each mobile terminal in consideration of the interference level.

Conventionally, the interference level of a base station cannot be controlled, and the transmission rate is limited while there is provided a certain level of margin for the interference level in advance. Therefore, if the interference level of a base station can be controlled, the margin is reduced so that the peak rate of transmission of data can be increased.

In uplink transmission of data, data transmitted from mobile terminal can reach two or more base stations, and another base station other than a base station which takes charge of the scheduling is able to receive the data.

A process of receiving data transmitted from mobile terminal by means of two or more base stations so as to improve the reception quality is called macro diversity, and, in a case in which two or more base stations which receive data transmitted from one mobile terminal exist, a base station which takes charge of the scheduling process for the mobile terminal is called a primary (Primary) base station or a serving (Serving) base station.

A base station which did not take charge of the scheduling process and which simply receives data transmitted from mobile terminal is called a non-serving base station, and a set of two or more base stations which communicate with one certain mobile terminal is called an active set.

Even a non-serving base station mounts a scheduler therein because it needs to carry out the scheduling process for other mobile terminal, and serving base stations (serving NodeBs) and non-serving base stations are distinguished from each other according to whether they take charge of scheduling for each mobile terminal.

Conventionally, also in uplink transmission of data, while macro diversity is used during a soft handover, all base stations which are included in the active set are allowed to receive data via a radio link during the soft handover.

However, in high-speed packet communications in which a scheduler is introduced, while the aim is to cover a high error rate with control of retransmission of data to base stations by lowering the power of transmission of data, mobile terminal increases its power of transmission of data excessively to transmit data so that all base stations can receive the data.

In contrast, in a case in which only a serving base station which serves as the scheduler is made to receive data from mobile terminal, if the quality of a transmission line via which the data is transmitted is changed and the transmission line quality degrades, many processes of retransmitting data will occur and the throughput will degrade.

Therefore, in high-speed packet communications in which a scheduler is introduced, it is desirable that neither all base stations included in the active set nor only the serving base station receives data from the mobile terminal, but two or more base stations receive the data from the mobile terminal in order to ensure the link quality during a soft handover.

A soft handover technology without using a scheduler has been known conventionally. For example, a method of optimizing the number of base stations included in the active set is disclosed by patent references 1, 3, and 4, and an improvement in the channel status is disclosed by patent reference 2.

Patent reference 1 discloses a method of mobile terminal carrying out wireless communications with base stations, measuring the intensities of signals from them, RF performance, or the like, and adjusting the number of base stations in the active set with two thresholds (if there exists one or two base stations having a signal intensity or the like greater than the first threshold, the mobile terminal selects a base station to be included in the active set, and, if there exists one or two base stations having a signal intensity or the like greater than the second threshold, it selects two base stations from the active set).

However, patent reference 1 only discloses a technique for only measuring signal intensities, RF performance, or the like for the purpose of economization of radio resources, and for limiting the number of base stations in the active set.

Patent reference 2 discloses a method of carrying out an intra cell handover when the number of times that data is retransmitted becomes equal to or larger than a fixed number of times, thereby improving the channel status and continuously carrying out data communications.

However, in accordance with this method disclosed by patent reference 2, an intra cell handover is carried out only for the purpose of an improvement in forced disconnection.

Patent reference 3 discloses a method of using macro diversity when the reception state of a radio unit is bad, and not using macro diversity when the reception state of the radio unit is good.

However, the method in accordance with patent reference 3 cannot adjust the interference level of uplink, and therefore cannot provide the advantage of the macro diversity.

Patent reference 4 discloses a method of removing a base station in an overloaded state from an active set by lowering the input/output reference of the base station in the overloaded state, to reduce the size of the active set.

However, the method in accordance with patent reference 4 is a technique applicable only to downlink data transmission, and cannot be applied to uplink data transmission.

In nonpatent reference 1, there is a reference to an E-DCH (Enhanced Dedicated CHannel) active set (E-DCH active set) via which high-speed packet communications are carried out using a scheduler, and a method of selecting a base station is disclosed as a reference for addition of a base station to the E-DCH active set. More specifically, by means of the method, a base station is selected on the basis of DPCCH SIR (Signal to Interference Ratio) or E-DPCCH BLER (BLock Error Rate) measured by a base station, which indicates the quality of the uplink transmission line.

Although the quality of the uplink transmission line is important when selecting a base station to be included in the E-DCH active set, the interference level of each base station, rather than the quality of the uplink transmission line, needs to be taken into consideration.

However, the method of selecting a base station in accordance with nonpatent reference 1 does not take into consideration a margin for the interference level of a non-serving base station.

Furthermore, in accordance with the prior art method, a base station is selected without taking the load caused by signaling into consideration. Although when actually selecting a base station, it can be assumed that an apparatus other than base stations can carry out the selection, nonpatent reference 1 discloses neither any technique for making a mobile terminal select a base station, nor any technique for making a radio network controller select abase station. Furthermore, nonpatent reference 1 does not make a study of concrete processes.

[Patent reference 1] JP,2002-95031,A
[Patent reference 2] JP,2002-77982,A
[Patent reference 3] JP,2001-16633,A
[Patent reference 4] JP,2001-197536,A
[Nonpatent reference 1] 3GPP RAN1 document R2-042357

A problem with prior art mobile communications systems which are constructed as mentioned above is that while a base station which takes charge of scheduling can limit the power of transmission of data from mobile terminal in consideration of the interference level of the base station, a base station which does not take charge of the scheduling cannot limit the power of transmission of data transmitted from the mobile terminal even if the interference level of the base station exceeds a maximum allowable level and therefore the transmission quality degrades.

The present invention is made in order to solve the above-mentioned problem, and it is therefore an object of the present invention to provide a mobile communications system which can suppress degradation in the transmission quality by enabling a base station whose interference level exceeds a maximum allowable level to control the power of transmission of data transmitted from mobile terminal, and the mobile terminal.

DISCLOSURE OF THE INVENTION

A mobile communications system in accordance with the present invention includes a radio network controller which is so constructed as to divide a plurality of base stations into a group of base stations included in an active set for uplink packet communications and a group of base stations included in an active set for soft handovers according to a status of reception of data in each of the plurality of base stations.

As a result, the present invention offers an advantage of being able to enable a base station whose interference level exceeds a maximum allowable level to control the transmission power of data transmitted from mobile terminal, thereby improving the transmission quality.

BRIEF DESCRIPTION OF THE FIGURES

FIG. 34 is a conceptual diagram showing a process of setting up E-DCH during a soft handover between base stations of different versions;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
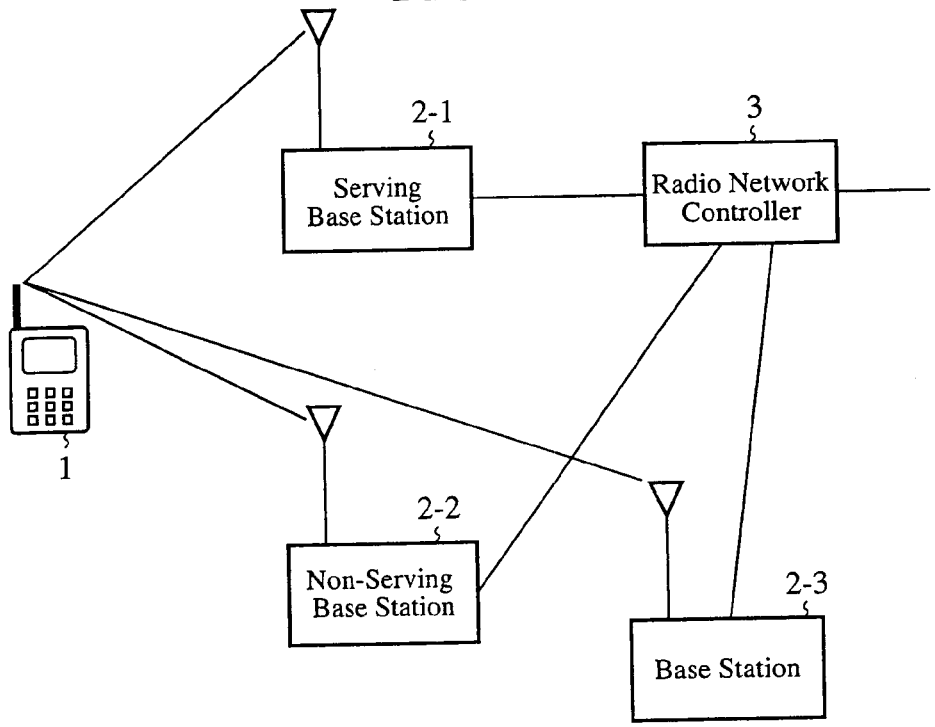
FIG. 1 is a block diagram showing a mobile communications system in accordance with embodiment 1 of the present invention.

FIG. 1 is a block diagram showing a mobile communications system in accordance with embodiment 1 of the present invention. In the figure, mobile terminal (user equipment) 1 is a terminal which the user uses, such as a mobile phone or a mobile PC.

A serving base station 2-1 has a scheduling function of controlling the data transmission timing and transmission power of the mobile terminal 1, and receives data transmitted from the mobile terminal 1. Hereafter, controlling transmission power does not mean power control with a high-speed closed loop, but is referred to as control of the allowable transmission power of the mobile terminal for the purpose of specifying a maximum transmission rate.

A non-serving base station 2-2 has a control function of controlling the transmission power for transmission of data of the mobile terminal 1, and receives data transmitted from the mobile terminal 1. However, when the data receiving conditions of the non-serving base station 2-2 change, there is a possibility that it is changed to a base station which does not have the above-mentioned control function by a Radio Network Controller (RNC, base station control apparatus) 3.

A base station 2-3 is a base station included in an active set for soft handovers (DCH active set), and receives data transmitted from the mobile terminal 1 without holding the above-mentioned control function. However, when the data receiving conditions of the base station 2-3 change, there is a possibility that it is changed to a non-serving base station by the radio network controller 3.

The radio network controller 3 carries out a process of grouping the base stations 2-1, 2-2, and 2-3 into a serving base station, a non-serving base station, and a base station (i.e., a base station included in the active set for soft handovers) which does not have the above-mentioned control function according to the data receiving conditions of the base stations 2-1, 2-2, and 2-3.

The radio network controller 3 carries out macro diversity processing in high-speed uplink packet communications.

Figure 2:
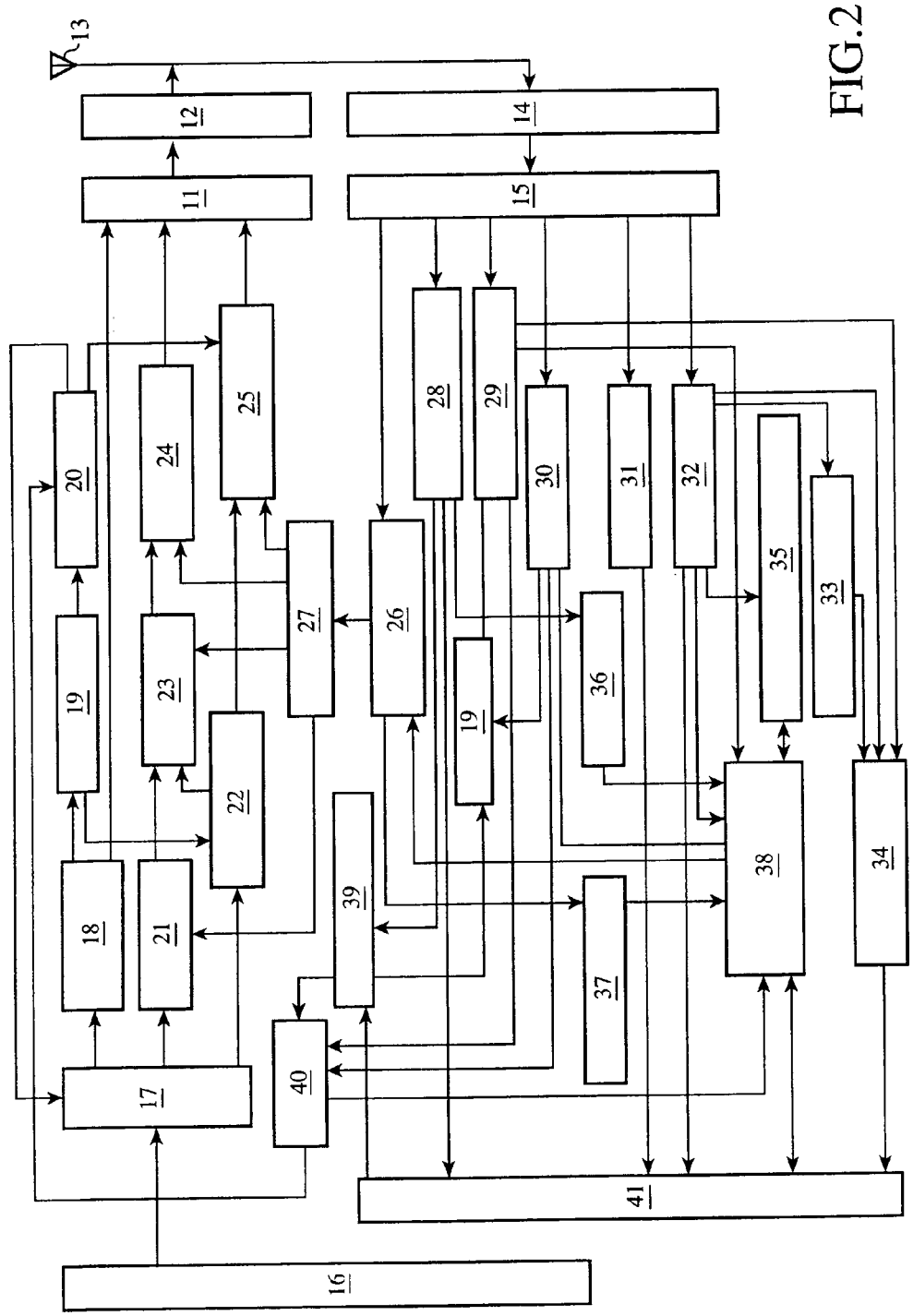
FIG. 2 is a block diagram showing mobile terminal of the mobile communications system in accordance with embodiment 1 of the present invention.

FIG. 2 is a block diagram showing the mobile terminal 1 of the mobile communications system in accordance with embodiment 1 of the present invention, and in the figure, a modulating unit 11 multiplexes and spreads signals for each channel, and modulates these signals into desired carrier waves.

A power amplifying unit 12 carries out a process of amplifying the carrier waves outputted from the modulating unit 11 so that it has desired power.

While an antenna 13 transmits a modulation signal which is the carrier waves amplified by the power amplifying unit 12 to the serving base station 2-1, non-serving base station 2-2, and base station 2-3, the antenna 13 receives a modulation signal which are carrier waves transmitted from the serving base station 2-1, a modulation signal which are carrier waves transmitted from the non-serving base station 2-2, and a modulation signal which are carrier waves transmitted from the base station 2-3.

A low noise amplifying unit 14 carries out a process of amplifying a weak modulation signal received from the antenna 13 so that it has a level required for demodulation.

A demodulating unit 15 carries out a process of despreading the modulation signal amplified by the low noise amplifying unit 14 (i.e., despreading the modulation signal with the same code as that used when spread by the transmission source), and then demultiplexing the despread modulation signal into signals associated with the original channels.

A control unit 16 controls each component of the mobile terminal 1 and also carries out transmission of data and parameters among the components.

When receiving data inputted by the user from the control unit 16, a transmit buffer 17 carries out a process of holding the data temporarily.

A DPCH transmitting unit 18 carries out a process of carrying the data held by the transmit buffer 17, an event produced by a protocol processing unit 41, etc. onto DCH (Dedicated Channel), and then transmitting the DCH signal (data). DPCH (Dedicated Physical CHannel) is the name of a physical layer onto which DCH is carried, and is a channel containing, as well as the DCH signal (data), other information containing a pilot signal, a power control command, etc. which are transmitted actually.

DCH is a channel via which data is exchanged individually, and, when high-speed packet communications are used, it is a channel which mainly handles data transmitted at a relatively-low rate, such as a sound data.

A power control unit 19 carries out a process of calculating the power which can be used for E-DCH (Enhanced DCH) from the power of DCH outputted from the DPCH transmitting unit 18, AG (Absolute Grant) received from an E-AGCH receiving unit 29, and RG (Relative Grant) received from an E-RGCH receiving unit 30. E-AGCH is an abbreviation for E-DCH Absolute Grant Channel. E-RGCH is an abbreviation for E-DCH Relative Grant Channel.

A transmission rate control unit 20 carries out a process of controlling the output of the data of the transmit buffer 17 according to an instruction from the scheduler. In addition, the transmission rate control unit 20 calculates E-TFCI (E-DCH Transport Format Combination Indicator) from the remaining power of the mobile terminal 1 calculated by the power control unit 19 and SG (Serving Grant; a value used for controlling the allowable power of E-DCH provided by the scheduler) outputted from an SG management unit 40.

An HARQ processing unit 21 carries out a process of determining a ratio of a system bit systematic bit which is transmission-data information, and a parity bit which is a redundant bit.

A scheduling request information generating unit 22 carries out a process of generating scheduling request information on the basis of the data outputted from the transmit buffer 17 and the power applicable to E-DCH which is calculated by the power control unit 19.

An encoder unit 23 carries out a process of generating and coding an output in which the system bit systematic bit (or an information bit) and the parity bit (or a bit for error correction) are mixed on the basis of information on RV (Redundancy Version) outputted from a retransmission control unit 27.

An E-DCH transmitting unit 24 carries out a process of carrying E-DCH onto a physical channel so that E-DCH enters a state in which data can be transmitted in consideration of the information on RV outputted from the retransmission control unit 27.

An E-DPCCH transmitting unit 25 carries out a process of coding the E-TFCI calculated by the transmission rate control unit 20, the scheduling request information generated by the scheduling request information generating unit 22, and RSN (Retransmission Sequence Number) outputted from a retransmission control unit 27 into data in a form which can be transmitted.

An E-HICH receiving unit 26 carries out a process of receiving ACK/NACK information indicating whether a base station 2 has received E-DCH signals (data) correctly. E-HICH is an abbreviation for E-DCH HARQ Acknowledgement Indicator Channel.

A plurality of E-RICH receiving units 26 corresponding to a maximum number of base stations included in an E-DCH active set are provided. This number is decided by the performance of the mobile terminal 1.

The retransmission control unit 27 carries out a process of calculating RV and RSN from the ACK/NACK information received by the E-HICH receiving unit 26.

RV shows a combination of the system bit systematic bit and the parity bit, and RSN is information indicating a number of times that retransmission can be performed.

A CPICH receiving unit 28 carries out a receiving process of receiving data via a common pilot channel, and outputs the reception level of the common pilot channel to the protocol processing unit 41.

An E-AGCH receiving unit 29 carries out a process of receiving AG from the serving base station 2-1.

An E-RGCH receiving unit 30 carries out a process of receiving RG from the serving base station 2-1 or non-serving base station 2-2.

A plurality of E-RGCH receiving units 30 corresponding to the maximum number of base stations included in the E-DCH active set are provided.

A DPCH receiving unit 31 carries out a process of receiving DCH signals (data).

A P-CCPCH receiving unit 32 carries out a process of receiving report information.

An active set management unit 33 carries out a process of checking the state of the current active set (a prior art active set different from the E-DCH active set) from the report information received by the P-CCPCH receiving unit 32.

An active set control unit 34 acquires the interference level of each base station from the P-CCPCH receiving unit 32, E-AGCH receiving unit 29, and so on, determines how to control the current active set from the interference level of each base station and the current state of the active set checked by the active set management unit 33, and carries out a process of outputting information indicating how to control the current active set to the protocol processing unit 41. When receiving information on an addition of a non-serving base station or an exclusion of a non-serving base station from the protocol processing unit 41, an active set control unit 34 updates the active set management unit 33, and controls the E-AGCH receiving unit 29 and E-RGCH receiving unit 30 in order to add or exclude the target base station.

An E-DCH active set management unit 35 acquires information on the state of the current E-DCH active set from the P-CCPCH receiving unit 32 or an E-DCH active set control unit 38, and updates the base station (s) included in the current active set according to an instruction from the E-DCH active set control unit 38.

A correlation calculating unit 36 calculates a correlation of the power of CPICH (Common Pilot Channel) which is a common pilot channel and which is received by the CPICH receiving unit 28, and outputs the correlation of the power of CPICH to the E-DCH active set control unit 38.

A response signal counting unit 37 carries out a process of, when the E-HIGH receiving unit 26 receives NACK information, counting the number of times that NACK has been received, and outputting the number of times that NACK has been received to the E-DCH active set control unit 38.

The E-DCH active set control unit 38 which constructs a comparing means acquires the interference level of each base station from the P-CCPCH receiving unit 32, E-AGCH receiving unit 29 (an interference level acquiring means), and so on, acquires information about the current state of the E-DCH active set from the E-DCH active set management unit 35, acquires SG from the SG management unit 40, determines how to control the E-DCH active set, and outputs information indicating how to control the E-DCH active set to the protocol processing unit 41.

A step size management unit 39 carries out a process of calculating a width (step size) which changes SG in a step on the basis of either the power of CPICH which is a common pilot channel and which is received by the CPICH receiving unit 28 or a path loss outputted from the protocol processing unit 41.

An SG management unit 40 carries out a process of updating SG on the basis of AG received by the E-AGCH receiving unit 29, RG received by the E-RGCH receiving unit 30, and the step size calculated by the step size management unit 39.

The protocol processing unit 41 which constructs a request transmitting means carries out communication protocol processing.

Figure 3:
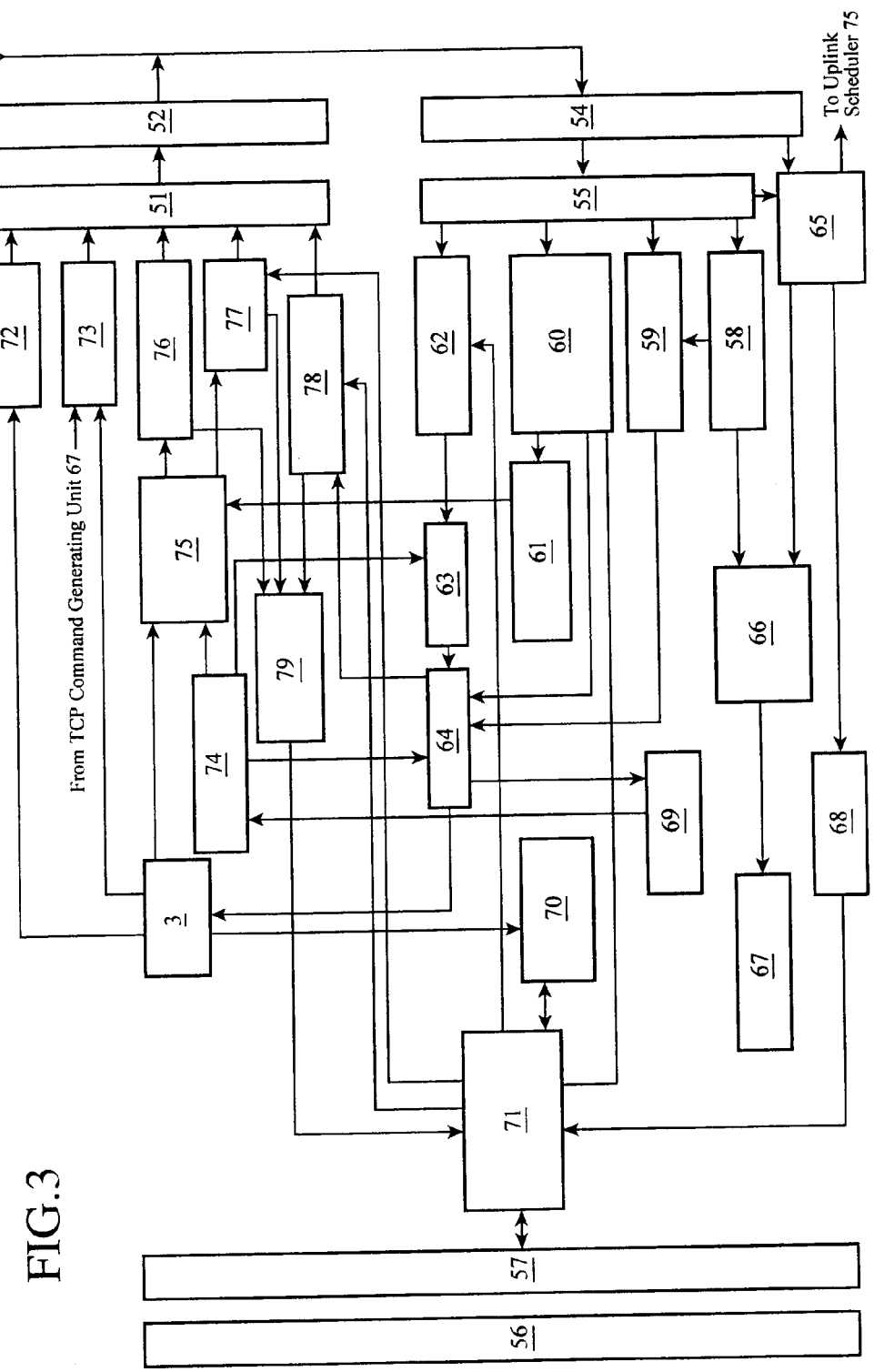
FIG. 3 is a block diagram showing a base station of the mobile communications system in accordance with embodiment 1 of the present invention.

FIG. 3 is a block diagram showing a base station 2 in the mobile communications system in accordance with embodiment 1 of the present invention, and in the figure, a modulating unit 51 multiplexes and spreads signals for each channel, and modulates these signals into desired carrier waves A power amplifying unit 52 carries out a process of amplifying the carrier waves outputted from the modulating unit 51 so that it has desired power.

An antenna 53 transmits a modulation signal which are the carrier waves amplified by the power amplifying unit 52 to the mobile terminal 1, and also receives a modulation signal which are carrier waves transmitted from mobile terminal 1.

A low noise amplifying unit 54 carries out a process of amplifying a weak modulation signal received from the antenna 53 so that it has a level required for demodulation.

A demodulating unit 55 carries out a process of despreading the modulation signal amplified by the low noise amplifying unit 54 (i.e., despreading the modulation signal with the same code as that used when spread by the mobile terminal 1), and then demultiplexing the despread modulation signal into signals associated with the original channels.

A control unit 56 controls each component of the base station 2 and also carries out transmission of data among the components and control of timing.

A protocol processing unit 57 carries out communication protocol processing, and carries out a process of communicating data between the radio network controller 3 and the base station 2.

A DPCCH receiving unit 58 carries out a process of decoding DPCCH signals (data) outputted from the demodulating unit 55.

A DPDCH receiving unit 59 carries out a process of forming DPDCH signals (data) outputted from the demodulating unit 55 into data in a form which can be decoded.

In the example of FIG. 3, although one DPCCH receiving unit 58 and one DPDCH receiving unit 59 are mounted, they are actually provided for each mobile terminal 1.

An E-DPCCH receiving unit 60 carries out a process of receiving E-DPCCH (Enhanced Dedicated Physical Control Channel) signals (data) transmitted from mobile terminal 1.

A scheduling request information decoding unit 61 carries out a process of decoding scheduling request information on E-DPCCH received by the E-DPCCH receiving unit 60.

An E-DPDCH receiving unit 62 carries out a process of receiving E-DCH signals (data), and carries out a process of dividing it into a system bit systematic bit which is an information source and a parity bit which is a redundant bit.

In the example of FIG. 3, although one E-DPCCH receiving unit 60 and one E-DPDCH receiving unit 62 are mounted, they are actually provided for each mobile terminal 1.

A buffer 63 carries out a process of temporarily holding bits outputted from the E-DPDCH receiving unit 62.

A decoding unit 64 carries out a process of decoding the DPDCH signals (data) received by the DPDCH receiving unit 59 and also carries out a process of decoding the E-DCH signals (data) held by the buffer 63 with E-TFCI received by the E-DPCCH receiving unit 60. The decoding unit 64 is used commonly for DCH.

An interference level measuring unit 65 carries out a process of measuring the interference level of the base station 2.

More specifically, the interference level measuring unit measures the interference level of the base station by removing the signal component from the received signal on the basis of a receiving intensity outputted from the low noise amplifying unit 54 and a pilot wave in the received signal outputted from the demodulating unit 55.

An SIR calculating unit 66 carries out a process of calculating SIR which is a ratio of the DPCCH signal (data) decoded by the DPCCH receiving unit 58 and the interference level measured by the interference level measuring unit 65.

A TPC command generating unit 67 compares a target SIR specified by the radio network controller 3 with the current SIR calculated by the SIR calculating unit 66. When the current SIR is smaller than the target SIR, the TPC command generating unit generates a TPC command for increasing the power, whereas when the current SIR is larger than the target SIR, it generates a command for lowering the power.

An interference level informing unit 68 carries out a process of notifying the SIR measured by the interference level measuring unit 65 to the radio network controller 3.

An RSN extraction unit 69 carries out a process of extracting a bit corresponding to RSN from the signal decoded by the decoding unit 64.

An E-DCH active set management unit 70 carries out a process of acquiring the state of the current E-DCH active set from the radio network controller 3 or an E-DCH active set control unit 71 according to an instruction from the E-DCH active set control unit 71.

The E-DCH active set control unit 71 acquires the state of the E-DCH active set acquired by the E-DCH active set management unit 70, acquires the number of signalings measured by a signaling measuring unit 79 (i.e., the number of signalings which are used by an E-AGCH transmitting unit 76, an E-RGCH transmitting unit 77, and an E-HICH transmitting unit 78), also acquires the interference level and E-DCH code power (or the transmission rate) from the interference level informing unit 68, and outputs request information indicating which mobile terminal 1 is requested to remove the E-DCH active set to the protocol processing unit 57 according to the acquired information. Furthermore, when receiving information on an addition of a non-serving base station or an exclusion of a non-serving base station from the protocol processing unit 57, the E-DCH active set control unit updates the E-DCH active set management unit 70, and controls the E-RGCH transmitting unit 77, E-HICH transmitting unit 78, E-DPCCH receiving unit 60, and E-DPDCH receiving unit 62 so as to add or exclude a non-serving base station for the target mobile terminal 1.

A P-CCPCH transmitting unit 72 carries out a process of transmitting report information, like information about the interference level notified from the radio network controller 3, to the mobile terminal 1.

A DPCH transmitting unit 73 carries out a process of transmitting DPCCH signals (data) to the mobile terminal 1.

An HARQ control unit 74 carries out a process of judging whether the transmission is retransmission of data from the RSN extracted by the RSN extraction unit 69, and, when it is retransmission of data, changing a turbo encoding ratio of the decoding unit 64 and making the decoding unit 64 carry out a decoding process, whereas when it is not retransmission of data, erasing the data currently held by the buffer 63. The HARQ control unit further carries out a process of notifying whether the data transmission has been completed to an uplink scheduler 75.

The uplink scheduler 75 adjusts the amount of data for each mobile terminal 1 on the basis of the interference level measured by the interference level measuring unit 65, the priority notified from the radio network controller 3, the scheduling request information decoded by the scheduling request information decoding unit 61, and a scheduling release request outputted from the HARQ control unit 74.

An E-AGCH transmitting unit 76 carries out a process of transmitting the AG outputted from the uplink scheduler 75 to the mobile terminal 1 when the base station is a serving base station.

An E-RGCH transmitting unit 77 carries out a process of transmitting the RG outputted from the uplink scheduler 75 to the mobile terminal 1 when the base station is a non-serving base station. However, in a case of RG mode, even when the base station is a serving base station, the E-RGCH transmitting unit carries out the process of transmitting RG to the mobile terminal 1.

An E-HICH transmitting unit 78 carries out a process of transmitting ACK to the mobile terminal 1 when the result of a CRC check of the E-DCH signal (data) by the decoding unit 64 indicates O.K., whereas when the result of the CRC check indicates NG, transmitting NACK to the mobile terminal 1.

In the example of FIG. 3, although one E-AGCH transmitting unit 76, one E-RGCH transmitting unit 77, and one E-HICH transmitting unit 78 are mounted, they are actually provided for each mobile terminal.

The signaling measuring unit 79 carries out a process of measuring the number of signalings which are used by the E-AGCH transmitting unit 76, E-RGCH transmitting unit 77, and E-HICH transmitting unit 78.

Figure 4:
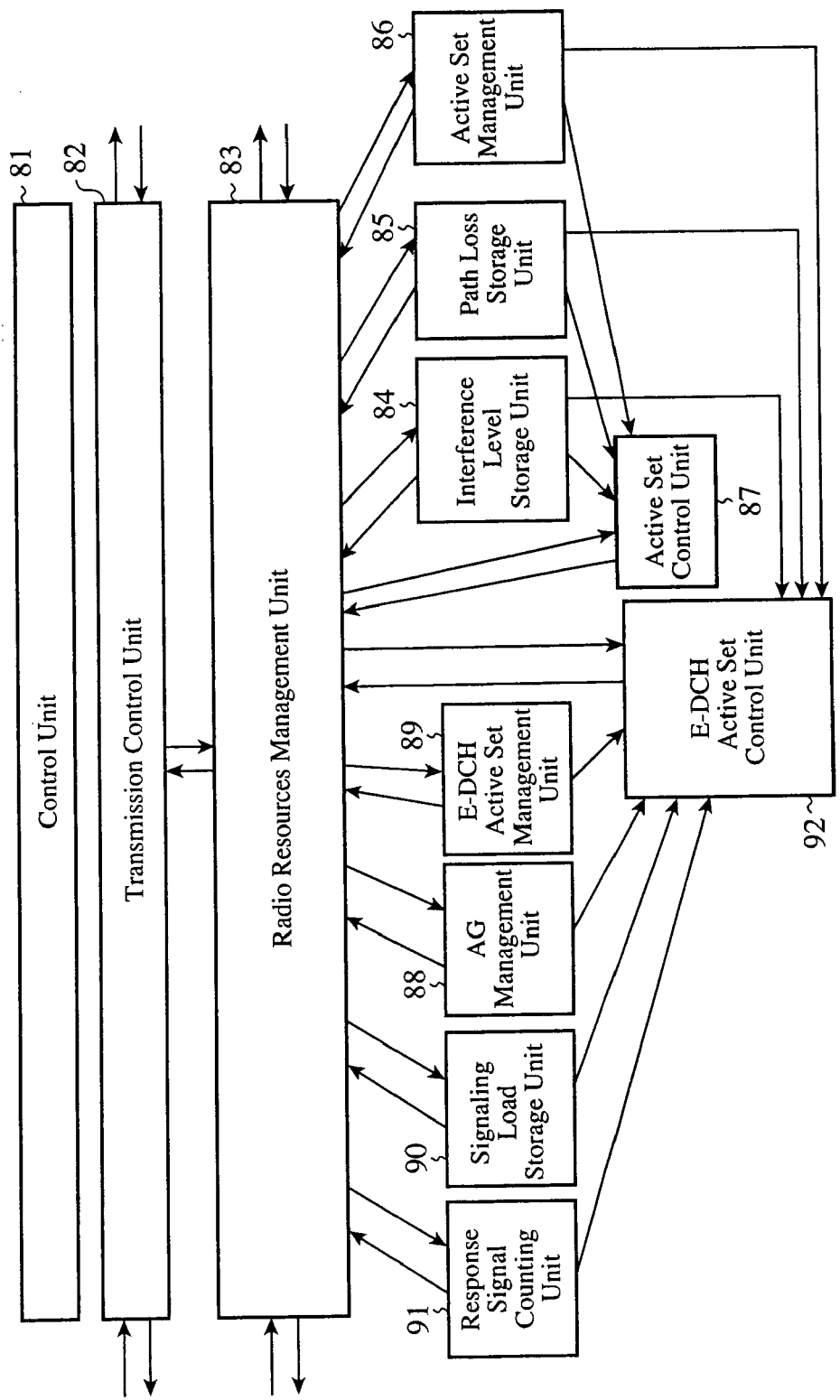
FIG. 4 is a block diagram showing a radio network controller of the mobile communications system in accordance with embodiment 1 of the present invention.

FIG. 4 is a block diagram showing the radio network controller 3 of the mobile communications system in accordance with embodiment 1 of the present invention. In the figure, a control unit 81 carries out a process of controlling each component of the radio network controller 3.

A transmission control unit 82 carries out a transmission control process of establishing a data link without errors.

A radio resources management unit 83 manages radio resources, such as frequencies and codes, and also manages the interference level, the load, etc.

An interference level storage unit 84 carries out a process of storing the interference level of each base station 2 which is placed under the control of the radio network controller.

A path loss storage unit 85 carries out a process of storing a path loss between each mobile terminal 1 which each base station 2 which is placed under the control of the radio network controller acknowledges, and each base station 2.

An active set management unit 86 carries out a process of managing which base station 2 is included in the prior art active set for a target mobile terminal 1.

An active set control unit 87 carries out a control process of judging which base station 2 should be included in the prior art active set, and including some base stations 2 in the prior art active set.

An AG management unit 88 carries out a process of storing the AG of the target mobile terminal 1.

An E-DCH active set management unit 89 carries out a process of managing which base station 2 is included in the E-DCH active set for the target mobile terminal 1.

A signaling load storage unit 90 carries out a process of storing the number of signalings measured by each base station 2.

From the radio resources management unit 83, the response signal counting unit 91 acquires the E-DCH signal (data) received by each base station 2 of the E-DCH active set. The response signal counting unit then counts the number of data showing CRC=OK and the number of data showing CRC=NG (or the number of times that no data has been received), and outputs the counted result to the E-DCH active set control unit 92.

The E-DCH active set control unit 92 judges which base station 2 should be included in the E-DCH active set, and controls the process of including these base stations 2 in the E-DCH active set.

Next, the operation of the communications system in accordance with this embodiment of the present invention will be explained.

[Explanation of Scheduling Implementation]

The implementation of the scheduler is provided as a feature of the uplink high-speed packet communications different from prior art uplink packet communications.

The implementation of the scheduler enables each base station 2 to acknowledge the status of each mobile terminal 1 (e.g., a request for data transmission) and carry out the scheduling, and also enables each mobile terminal 1 to transmit data according to an instruction from a base station 2.

More specifically, a mobile terminal 1 notifies the status thereof to a base station 2 in advance; the base station 2 carries out the scheduling on the basis of the transmission line quality, the margin for the transmission power required for the mobile terminal 1's data transmission, etc., and then notifies the scheduling result to the mobile terminal 1; and the mobile terminal 1 transmits uplink high-speed packets according to the scheduling result.

As a result, because the communications system can appropriately control the interference level in each base station 2 which causes a problem in the uplink packet communications, the communications system can economize on the radio resources while implementing high-speed communications.

Hereafter, a channel used for the uplink high-speed packet communications is referred to as E-DCH, as compared with the prior art uplink packet communications.

Hereafter, a case in which a base station having an inadequate margin for the interference level is changed to a non-serving base station (included in base stations of the E-DCH active set) will be explained.

In the case in which a base station having an inadequate margin for the interference level is changed to a non-serving base station, the unit which takes charge of judging whether to change the base station to a non-serving base station can be either the mobile terminal 1 or the radio network controller 3.

[Explanation of the Active Set]

Figure 5:
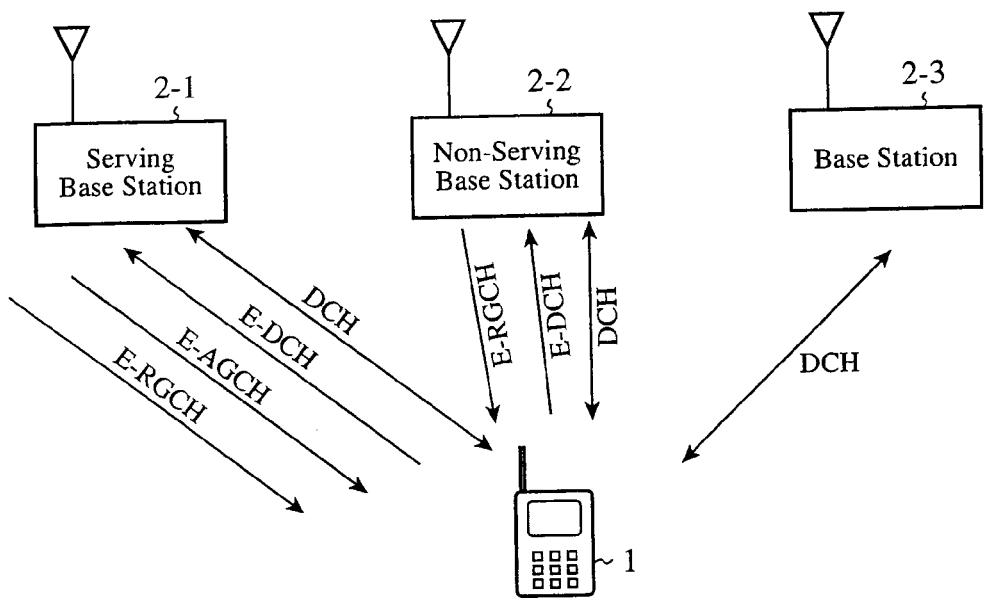
FIG. 5 is an explanatory diagram showing a difference between a prior art active set (active set for soft handovers, DCH active set), and an E-DCH active set.

FIG. 5 is an explanatory diagram showing a difference between the prior art active set (i.e., an active set for soft handovers) and the E-DCH active set.

When the prior art dedicated channel is DCH and the channel used for transmission of packets using the new scheduler is E-DCH, a new E-DCH active set is generated for this E-DCH.

A base station 2-3 included in the prior art active set exchanges DCH signals (data) with the mobile terminal 1. The base station 2-3 considers E-DCH signals as interferences, and does not receive any E-DCH signals (data).

As base stations included in the E-DCH active set, a serving base station and a non-serving base station exist.

The serving base station 2-1 and the non-serving base station 2-2 receive E-DCH signals (data), as well as DCH signals (data), from the mobile terminal 1.

Base stations included in the E-DCH active set are selected from base stations included in the prior art active set.

This is because synchronization is achieved by a pilot included in DPCCH signals (data) in an uplink channel, and a phase reference for signals is decided by using the pilot, and therefore only the base stations included in the prior art active set are able to receive the E-DCH signals (data).

[Reference for Adding a Base Station into the E-DCH Active Set]

When adding a base station into the E-DCH active set, it is possible to judge whether the addition is proper or improper on the basis of the path loss.

More specifically, a calculation is made to obtain the difference (i.e., the path loss) between the reception level of CPICH signals (data) measured on the mobile terminal 1 and the transmission level of CPICH signals (data) actually transmitted by each base station 2.

The path loss decreases in approximately proportion to the distance from the mobile terminal 1 to each base station 2.

Although this path-loss-based method is adequate for judging whether to add a base station into the prior art active set, it is inadequate for judging whether to add a base station into the E-DCH active set.

Although the reception level of CPICH signals (data) shows an average loss of the transmission line between the mobile terminal 1 and each base station 2, the reason why the above-mentioned method is inadequate for judging whether to add a base station into the E-DCH active set is because it is impossible to judge how much margin is provided for the state of each base station 2's interference level.

When selecting a base station to be included in the E-DCH active set, a condition which should be considered is the margin for the interference level in each base station 2.

Regarding a base station 2 with a small margin for its interference level, it is desirable that this base station 2 has a function that prevents increase in its interference level by lowering the transmission rate (transmission power) of data transmitted from the mobile terminal 1. Therefore, it is desirable to change such a base station 2 with a small interference level margin into a non-serving base station.

[Difference Between a Serving Base Station and a Non-Serving Base Station of the E-DCH Active Set]

The serving base station 2-1 carries out the scheduling for the mobile terminal 1.

More specifically, the serving base station 2-1 instructs the mobile terminal 1 to set the transmission rate via E-AGCH (E-DCH Absolute Grant Channel), E-RGCH (E-DCH Relative Grant Channel), or the like. A value AG indicating the absolute value of the transmission rate is carried on E-AGCH, and a value RG indicating fine adjustment of the transmission rate is carried on E-RGCH.

The non-serving base station 2-2 does not carry out the scheduling for the mobile terminal 1, but transmits to the mobile terminal 1 via E-RGCH, a command (i.e., a Down command) that requests the lowering of the transmission rate.

Each of the serving base station 2-1 and non-serving base station 2-2 carries out a macro diversity process. A serving base station and a non-serving base station may not have any difference between them in hardware as long as they are positioned at different locations, and how to call each base station is decided by what kind of work it is carrying out for a certain mobile terminal. That is, even if a base station works as a serving base station for a certain mobile terminal, it can work as a non-serving base station for another mobile terminal.

[The Reason why a Non-Serving Base Station Needs to Transmit the Down Command]

When the communications method is based on CDMA, the capacity of each base station 2 is decided by the interference level in each base station 2. As the mobile terminal increases the E-DCH transmission power in proportion to the mobile terminal's transmission rate, the power (code power) of the E-DCH channel in the receiving end of each base station also increases. This can be assumed to be an interference component when seen from the base station, and power (i.e., an interference margin) assigned to other mobile terminals decreases.

When a mobile terminal's transmission rate is high, this mobile terminal's transmission affects base stations other than the serving base stations, and the resulting interference levels cause the interference margins to become smaller.

In this case, because it is necessary to reduce the transmission rate of the mobile terminal to a low rate, each non-serving base station needs to transmit the Down command to the mobile terminal 1 so as to reduce the interference level.

[An Example of an Addition of a Base Station into the E-DCH Active Set on the Basis of the Interference Level]

A base station 2 which is to be added to the E-DCH active set is selected on the basis of the margin for the interference level measured by the base station 2 and of how interference related to the mobile terminal 1's data transmission power affects the base station 2.

When the margin for the interference level is small, any small increase in the interference level cannot be permitted. The larger the mobile terminal's transmission power of the mobile terminal 1, the larger the interference is provided to becomes toward the base station 2.

Therefore, a base station 2 with a small margin for the interference level is affirmatively changed to a non-serving base station.

Figure 6:
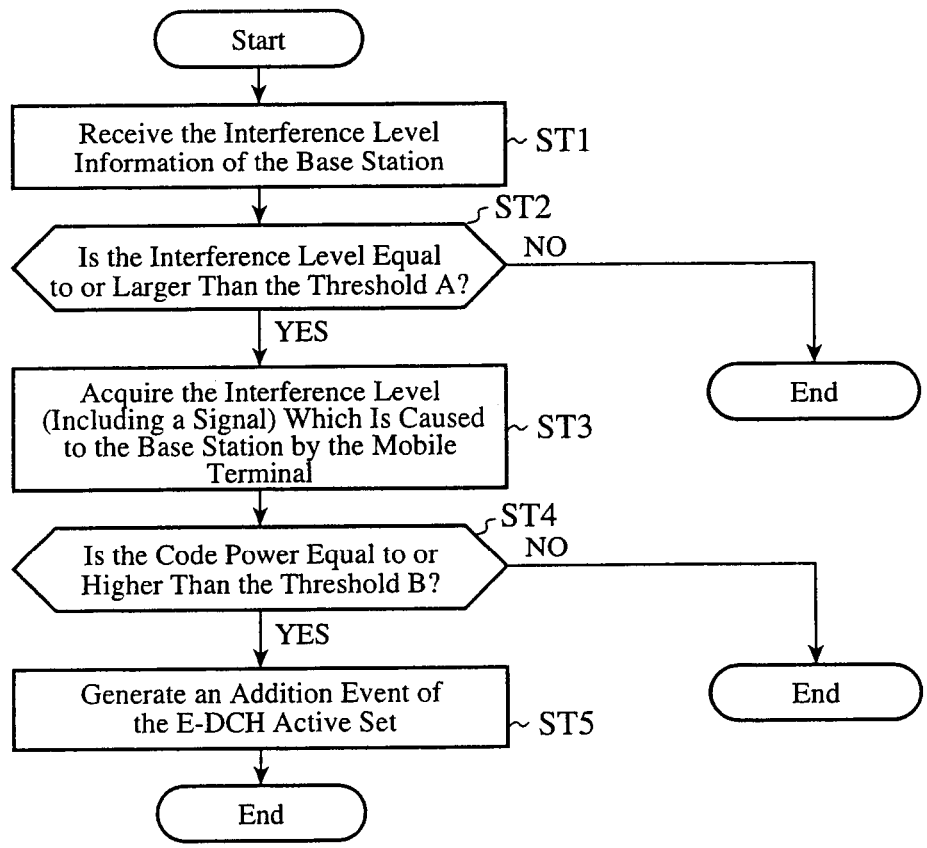
FIG. 6 is a flow chart showing a process carried out by the mobile terminal when judging whether to include a base station in the E-DCH active set.

FIG. 6 is a flow chart showing a process carried out by the mobile terminal 1 when judging whether to include a base station into the E-DCH active set.

Hereafter, the process carried out by the mobile terminal 1 and a process carried out by each base station 2 will be explained with reference to FIG. 6, but a concrete description of a processing unit in the mobile terminal 1 and a processing unit in each base station 2 will be explained later.

The mobile terminal 1 carries out a soft handover with the serving base station 2-1, non-serving base station 2-2, and base station 2-3.

The mobile terminal 1 receives from the base station 2-3, the interference level information indicating the base station 2-3's interference level (step ST1).

The interference level information is information indicating how much power the base station 2-3 receives in total. For example, it indicates the power (i.e., the interference margin) which is obtained by subtracting from the allowable transmission power (i.e., the maximum power) of the base station 2-3, the total reception power which is the sum of the power of interference from other base stations, thermal noises, and the power of reception from all mobile terminals 1 within the self-base station.

In this example, the total reception power is used in order to calculate the interference margin. However, instead of the total reception power, the uplink interference power can be used as an alternative. The uplink interference power is obtained by subtracting from the total reception power, the reception power from all mobile terminals 1 within the self-base station.

Figure 7:
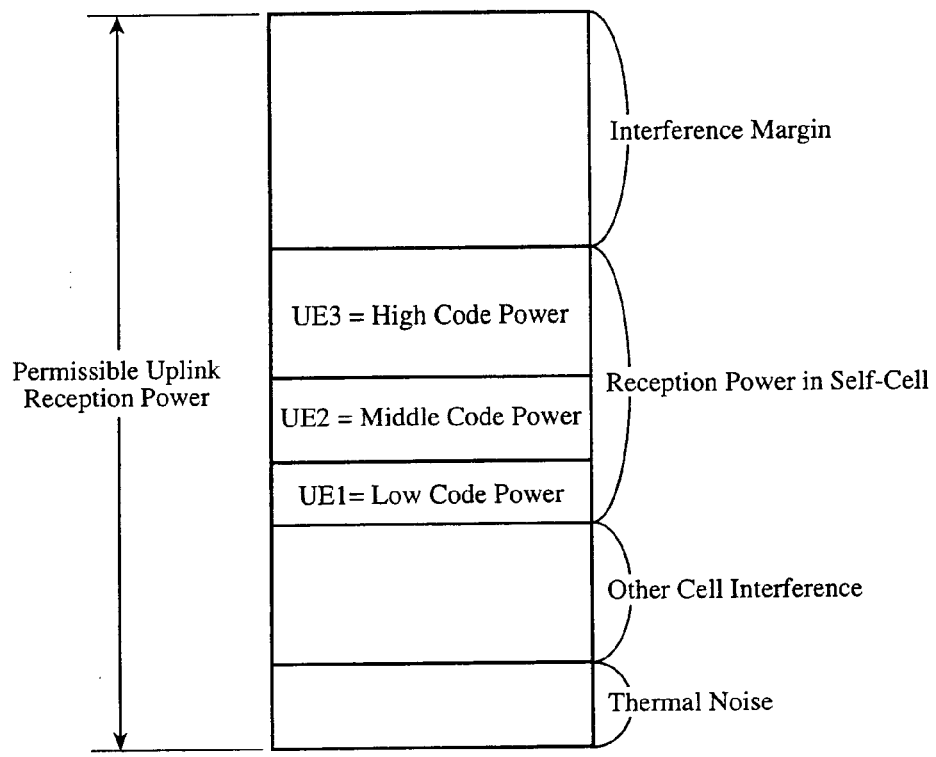
FIG. 7 is a conceptual diagram showing the interference level of a base station and an interference margin.

FIG. 7 is a conceptual diagram showing the interference level and the interference margin in each base station.

In FIG. 7, thermal noises indicate noises, such as a thermal noise of the antenna, and interferences from other cells indicate the interference levels from other base stations. However, each base station cannot distinguish between the thermal noises and the interferences from other cells.

The interference margin is the result of subtraction of the total reception power from the allowable uplink reception power.

Portions denoted as UE1, UE2, and UE3 (UE is an abbreviation for User Equipment) are reception powers (code powers) which are obtained by demodulation using spread codes, of signals transmitted from all mobile terminals 1 within the cell of the main base station.

E-DCH signal (data) reception power is subject to power control, because an effective closed-loop power control enables the adjustment of DPCCH pilot power to its target value at the base station end, therefore enabling E-DCH signal (data) reception power to be set (designated) by the offset for DPCCH. Because the power control compensates for attenuation caused by the path loss, the fact that the E-DCH signal (data) reception power at a base station's end is high signifies that the transmission rate of the mobile terminal 1 is high. For UE1, the other code powers UE2 and UE3 within the cell of the base station serve as interferences.

After receiving the interference level information from the base station 2-3, the mobile terminal 1 compares the base station 2-3's interference level indicated by this interference level information with a threshold A which is a judgment criterion of whether to add the base station to the E-DCH active set (step ST2).

This judgment criterion, threshold A can be calculated by using signaling from each base station 2, or can be alternatively calculated by either the mobile terminal 1 or the E-DCH active set control unit of each base station 2.

When the base station 2-3's interference level is less than the threshold A, the base station 2-3's interference level is small and the necessity for that base station 2-3 to transmit the Down command is low. In such a case, the mobile terminal 1 maintains the current E-DCH active set without adding the base station 2-3 to the E-DCH active set.

When the base station 2-3's interference level is equal to or larger than the threshold A, surrounding base stations 2 are affected by the mobile terminal 1, and therefore, the mobile terminal 1 acquires the interference level (including a signal) which it is causing to the base station 2-3 (step ST3).

Actually, the signal intensity is obtainable if the code power measured at the base station's end is obtained. Furthermore, the signal intensity can also be calculated by the mobile terminal 1 from the transmission rate.

A mobile terminal 1 with a higher power (code power) of affecting the base station 2-3 more greatly affects the base station 2-3's interference level. For this reason, in order to reduce the base station 2-3's interference level, it is desirable to lower the transmission power of a mobile terminal 1 which more greatly affects the base station 2-3, i.e., of a mobile terminal 1 with a higher code power.

A mobile terminal 1's transmission power is controlled by the serving base station 2-1 which carries out the scheduling.

For this reason, the E-DCH active set control unit 38 of the mobile terminal 1 can calculate the code power from SG, which is the value for controlling the allowable power of E-DCH provided by the serving base station 2-1, and from the path loss.

When AG does not change much in non-RG mode, or when the mobile terminal 1's transmission rate is kept constant, the code power can be calculated by using AG instead of SG.

This AG is signaled from the serving base station 2-1 to the mobile terminal via the radio network controller 3.

The mobile terminal 1, after acquiring the code power as the level of interference it causes to the base station 2-3, compares the code power with a threshold B which is a judgment criterion of whether to add the base station to the E-DCH active set (step ST4).

This judgment criterion, threshold B, can be calculated by using signaling from each base station 2, or can be alternatively calculated by either the mobile terminal 1 or the E-DCH active set control unit of each base station 2.

Because surrounding base stations 2 are not much affected when the code power is less than the threshold B, the mobile terminal 1 maintains the current E-DCH active set without adding the base station 2-3 to the E-DCH active set.

In contrast, when the code power is equal to or higher than the threshold B, surrounding base stations 2 are greatly affected by the mobile terminal 1, and therefore, the mobile terminal 1 needs to add the base station 2-3 to the E-DCH active set and to change the base station 2-3 to a non-serving base station, so that the base station 2-3 can lower the mobile terminal 1's transmission power.

Consequently, when the code power is equal to or higher than the threshold B, the mobile terminal 1 generates an addition event, which is an event that requests for the addition of base station 2-3 to the E-DCH active set (step ST5).

The mobile terminal 1, after generating the addition event as mentioned above, carries that addition event onto DCH and transmits it to the radio network controller 3 via the base station 2-3.

The radio network controller 3, after receiving from the mobile terminal 1 the addition event that requests for the addition of base station 2-3 to the E-DCH active set, adds the base station 2-3 to the E-DCH active set, and then changes the base station 2-3 to a non-serving base station.

After that, the base station 2-3 can carry out a process of transmitting the Down command to the mobile terminal 1, and if the base station 2-3 transmits the Down command to the mobile terminal 1, the mobile terminal 1 will be able to reduce its interference level by reducing its reception power to the allowable power or lower.

In the above description, the comparison of the code power with the threshold B is shown as an example. As an alternative, mobile terminal 1's transmission rate (transmission power) can be compared with a regulatory reference C (i.e., a reference value calculated from the difference between E-DCH's allowable power and base station 2-3's interference level), and when the transmission rate is equal to or higher than the regulatory reference C, the mobile terminal 1 can be enabled to generate the addition event which requests for the addition of base station 2-3 to the E-DCH active set.

[The Flow of the Scheduling Process, and the Roles of Channels]

Figure 8:
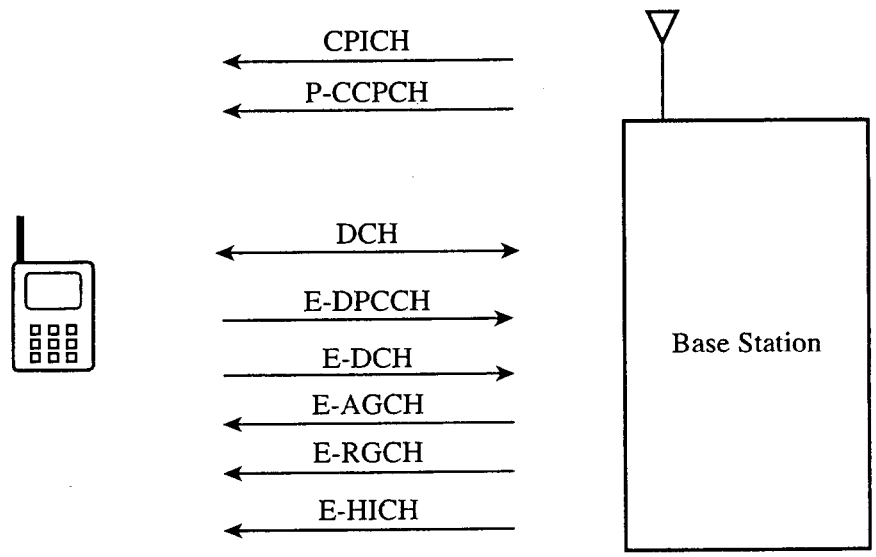
FIG. 8 is a diagram showing the configuration of channels of the mobile communications system in accordance with embodiment 1 of the present invention.

FIG. 8 is a diagram showing the configuration of channels of the mobile communications system in accordance with embodiment 1 of the present invention.

Hereafter, an explanation will be given based on the example of a channel configuration in a wireless section between a base station and a mobile terminal in a W-CDMA system.

In FIG. 8, CPICH is a channel used for broadcasting a timing reference to a mobile terminal, and P-CCPCH (Primary-Common Control Physical Channel) is a channel used for informing other broadcast information to a mobile terminal.

DCH is a channel used for exchanging data individually, and mainly handles data with a relatively low rate, such as sound data.

E-DPCCH is a channel used for uplink high-speed packet control, and E-DCH is a data channel used for uplink high-speed packet communications.

E-AGCH is a downlink channel used for determining the transmission rate of uplink high-speed packets, and E-AGCH signals (data) are transmitted from a serving base station to a mobile terminal.

E-RGCH is a downlink channel used for transmitting a request for lowering the transmission rate for uplink high-speed packets, and E-RGCH signals (data) are transmitted from a non-serving base station to a mobile terminal. When in RG mode, the E-RGCH signals (data) are transmitted from a serving base station also.

E-HICH (E-DCH Hybrid ARQ Indicator Channel) is a channel used for transmitting ACK/NACK which notifies if the base station succeeds or fails in receiving the packets.

Hereafter, a concrete description of a processing unit in each of a mobile terminal 1, a base station 2, and a radio network controller 3 will be given in detail.

Figure 9:
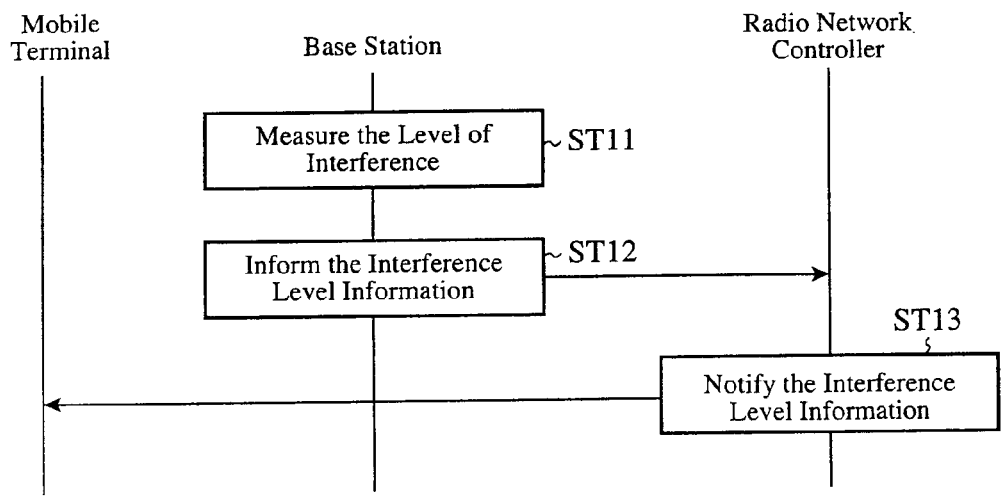
FIG. 9 is a sequence diagram showing a sequence of notifying the interference level from the base station to the mobile terminal.
Figure 10:
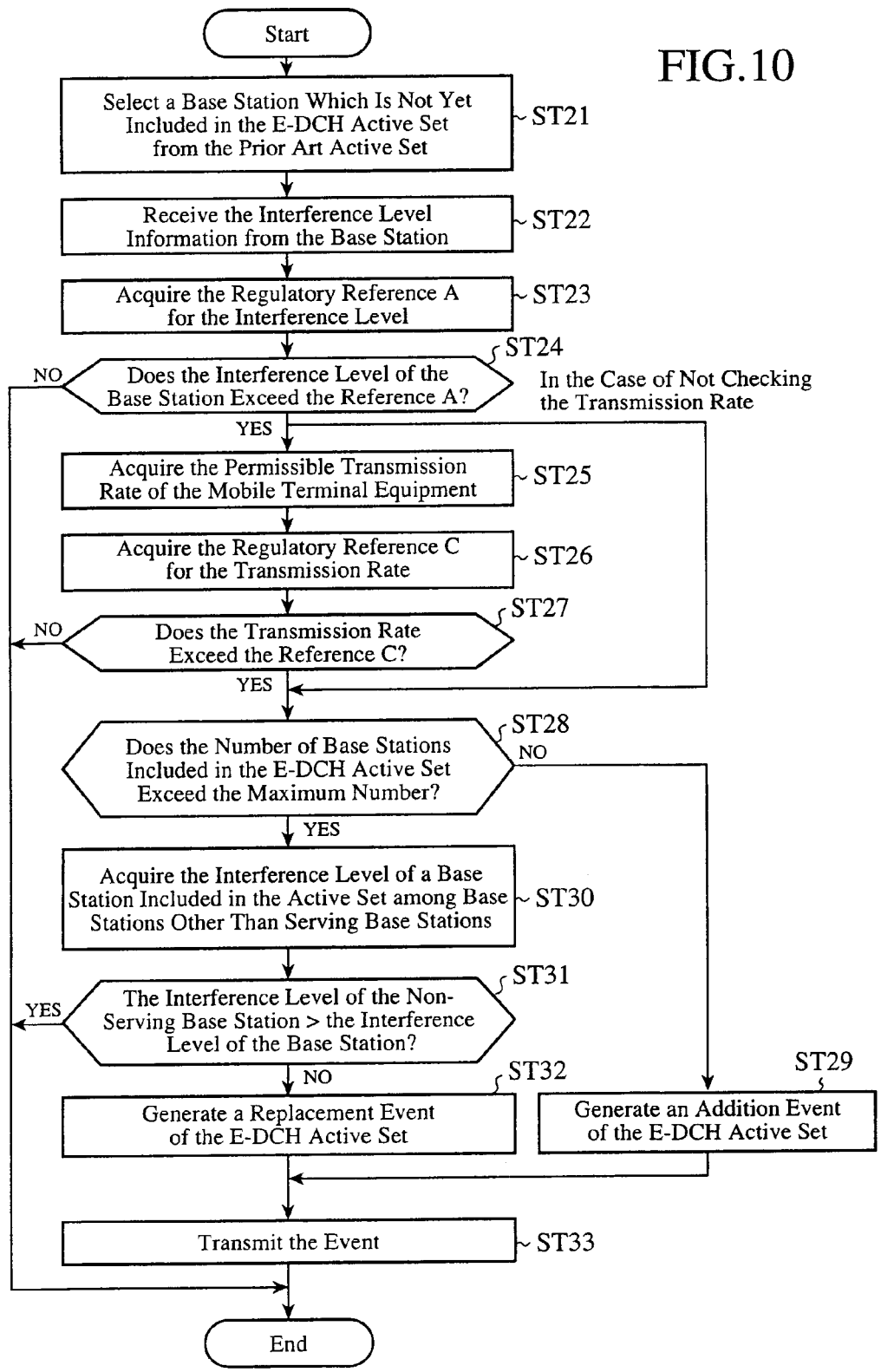
FIG. 10 is a flow chart showing a process of determining whether to add a base station to the E-DCH active set which is carried out by the mobile terminal.
Figure 11:
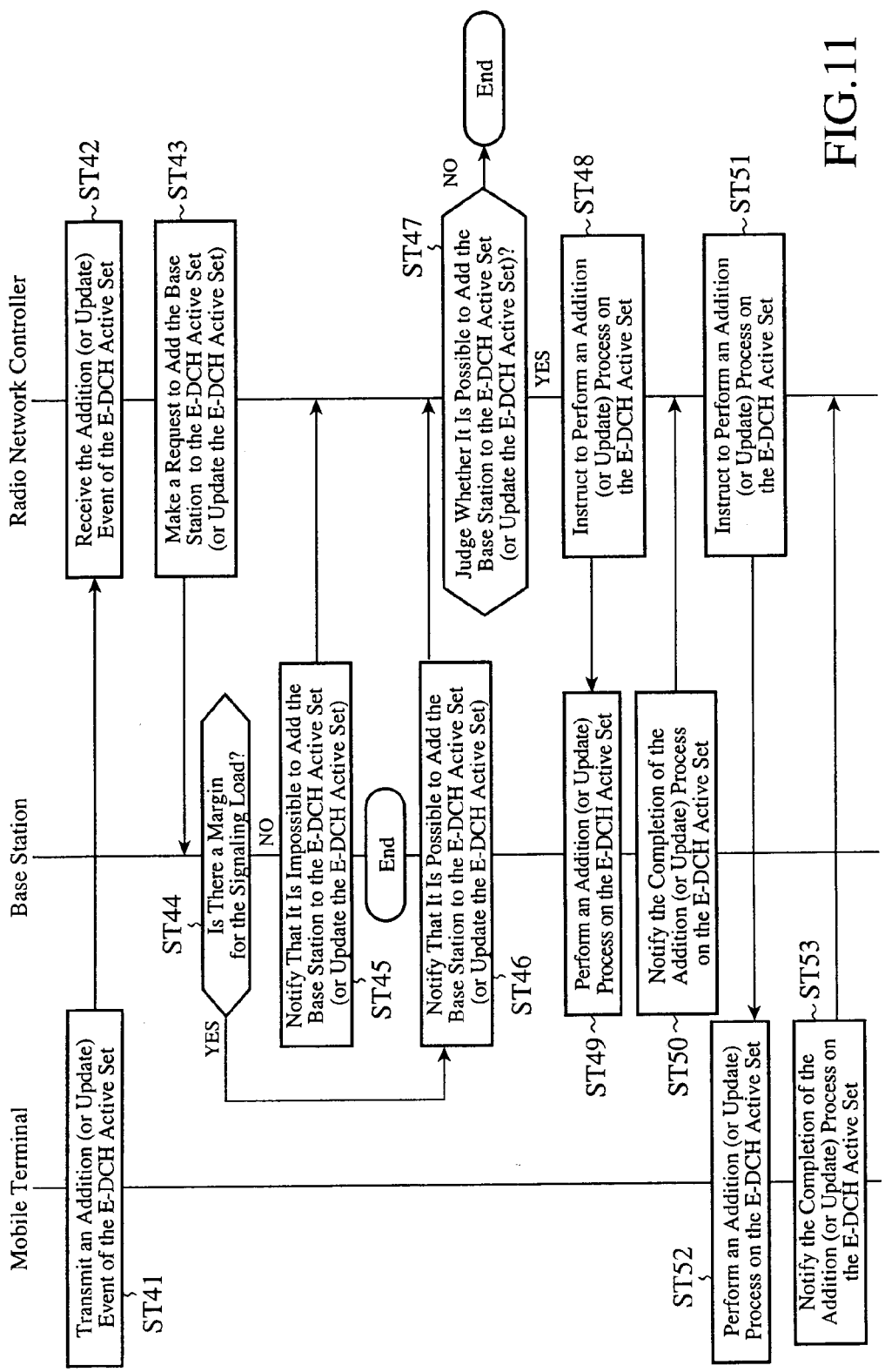
FIG. 11 is a sequence diagram showing a sequence of the mobile communications system.

FIG. 9 is a sequence diagram showing a sequence of notifying the interference level from the base station to the mobile terminal, FIG. 10 is a flow chart showing a process of determining whether to add the base station to the E-DCH active set which is carried out by the mobile terminal, and FIG. 11 is a sequence diagram showing a sequence of the mobile communications system.

When the mobile terminal 1 judges whether to add the base station 2-3 to the E-DCH active set, the mobile terminal 1 needs to be notified of the interference level by the base station 2-3.

The interference level measuring unit 65 of the base station 2-3 measures all the levels of interference in the base station 2-3 and then calculates the sum total of the levels of interference (step ST11).

More specifically, the interference level measuring unit measures all the levels of interference by removing the signal component from the received signal on the basis of the receiving intensity outputted from the low noise amplifying unit 54 and the pilot in the received signal outputted from the demodulating unit 55.

When the interference level measuring unit 65 measures all the levels of interference, the interference level informing unit 68 of the base station 2-3 informs interference level information indicating all the levels of interference to the radio network controller 3 (step ST12).

When receiving the interference level information from the base station 2-3, the transmission control unit 82 of the radio network controller 3 notifies the interference level information to the mobile terminal 1 via the P-CCPCH transmitting unit 72 of the base station 2-3 (step ST13).

Thus, when the interference level information is notified to the mobile terminal via the radio network controller 3, there is no necessity to add new equipment to the mobile terminal 1 because a prior art informing method (for example, a method based on the 3GPP release R99) can be used. As an alternative, the base station 2-3 can be so constructed as to notify the interference level information directly to the mobile terminal 1.

In the case in which the base station 2-3 notifies the interference level information directly to the mobile terminal 1, there is an advantage of the interference level information being able to be notified to the mobile terminal quickly because it is not transmitted via the radio network controller 3.

In the above description, the base station 2-3 notifies the interference level information to the mobile terminal 1. As an alternative, the interference level measuring unit 65 of the base station 2-3 calculates the interference margin by subtracting the sum total of all the levels of interference from the maximum allowable power, and can notify the interference margin to the mobile terminal 1.

The E-DCH active set management unit 35 of the mobile terminal 1 selects a base station which is not yet included in the E-DCH active set from among base stations included in the prior art active set (i.e., an active set for soft handovers) (step ST21).

Hereafter, assume that the E-DCH active set management unit selects the base station 2-3.

When the E-DCH active set management unit 35 selects the base station 2-3, the P-CCPCH receiving unit 32 of the mobile terminal 1 receives the interference level information transmitted from the base station 2-3 (step ST22).

When the P-CCPCH receiving unit 32 receives the interference level information about the base station 2-3, the E-DCH active set control unit 38 of the mobile terminal 1 calculates a regulatory reference A for the interference level (which corresponds to the above-mentioned threshold A which is a judgment criterion) (step ST23).

The E-DCH active set control unit 38 of the mobile terminal 1 then compares the interference level of the base station 2-3, which is indicated by the interference level information, with the regulatory reference A (step ST24).

When the interference level of the base station 2-3 does not exceed the regulatory reference A, the E-DCH active set control unit 38 ends the processing because it does not need to add the base station 2-3 to the E-DCH active set.

In contrast, when the interference level of the base station 2-3 exceeds the regulatory reference A, the E-DCH active set control unit acquires the allowable power of E-DCH from the SG management unit 40 (step ST25).

Instead of comparing the interference level with the regulatory reference A of the base station 2-3, the E-DCH active set control unit 38 can compare the interference margin of the base station 2-3 with a regulatory reference (i.e., a regulatory reference of the interference margin) when the interference margin is transmitted from the base station 2-3.

When acquiring the allowable power of E-DCH, the E-DCH active set control unit 38 calculates a regulatory reference C of the transmission rate from the allowable power and the interference level of the base station 2-3 (step ST26).

This regulatory reference C of the transmission rate has a large value in proportion to the interference margin which is the difference between the allowable power of E-DCH and the interference level of the base station 2-3.

The E-DCH active set control unit 38 of the mobile terminal 1 compares the transmission rate of the mobile terminal 1 with the regulatory reference C (step ST27).

When the transmission rate of the mobile terminal 1 does not exceed the regulatory reference C, the E-DCH active set control unit 38 ends the processing because it does not need to add the base station 2-3 to the E-DCH active set.

When the transmission rate of the mobile terminal 1 exceeds the regulatory reference C, the E-DCH active set control unit 38 judges whether the number of base stations 2 included in the E-DCH active set exceeds a maximum number (for example, three) (step ST28).

The check of the transmission rate in steps ST25 to ST27 is an optional process, and the mobile terminal can shift from step ST24 directly to step ST28.

When the judgment result of the E-DCH active set control unit 38 indicates that the number of base stations included in the E-DCH active set does not exceed the maximum number, the protocol processing unit 41 of the mobile terminal 1 generates an addition event of making a request to add the base station 2-3 to the E-DCH active set (step ST29).

When the number of base stations included in the E-DCH active set exceeds the maximum number, the E-DCH active set control unit 38 of the mobile terminal 1 acquires the interference level of the non-serving base station 2-2 included in the current E-DCH active set from the P-CCPCH receiving unit 32 (step ST30).

In the example of FIG. 1, although only the non-serving base station 2-2 is included in the E-DCH active set, two or more non-serving base stations can be included in the E-DCH active set. In this case, the E-DCH active set control unit acquires the interference level of each of the two or more non-serving base stations.

The E-DCH active set control unit 38 compares the interference level of the non-serving base station 2-2 with the interference level of the base station 2-3 (step ST31). In a case in which two or more non-serving base stations are included in the E-DCH active set, the E-DCH active set control unit compares a minimum interference level of the two or more non-serving base stations with the interference level of the base station 2-3.

When the judgment result of the E-DCH active set control unit 38 indicates that the interference level of the non-serving base station 2-2 is larger than the interference level of the base station 2-3, the protocol processing unit 41 of the mobile terminal 1 maintains the current E-DCH active set.

In contrast, when the judgment result of the E-DCH active set control unit 38 indicates that the interference level of the non-serving base station 2-2 is smaller than the interference level of the base station 2-3, the protocol processing unit excludes the non-serving base station 2-2 from the current E-DCH active set, and generates a replacement event (or an update event) of making a request to add the base station 2-3 to the E-DCH active set (step ST32).

The DPCH transmitting unit 18 of the mobile terminal 1 transmits the addition event or replacement event generated by the E-DCH active set control unit 38 to the radio network controller 3 (step ST33).

The mobile terminal 1 judges the addition of the base station 2-3 to the E-DCH active set, or the like, on the basis of the interference level of the base station 2-3, as mentioned above. As an alternative, the mobile terminal can judge the addition of the base station 2-3 to the E-DCH active set, or the like, on the basis of the interference level and pseudo SIR of the base station 2-3.

The pseudo SIR corresponds to a signal-to-interference ratio at the base station 2-3's end, and is a ratio between the interference level in base station 2-3, notified from base station 2-3 to mobile terminal 1 in advance, and the uplink reception power of base station 2-3 estimatable by mobile terminal 1 from the path loss measured at mobile terminal 1.

In a soft handover state, if an SIR can be guaranteed from any one of the base stations 2, the signal intensity does not necessarily become the same level in each base station 2, since power is not increased any further. That is, even if the interference from a base station is weak, the signal from the mobile terminal may be weak. Therefore, even if such a base station 2 is added to the E-DCH active set just because the interference level of the base station is low, there is a high possibility that receiving errors occur when the signal from the base station is weak.

Therefore, by judging whether to add a base station 2 to the E-DCH active set on the basis of not only the interference level of the base station 2 but also the pseudo SIR, the mobile terminal can include the base station 2 which it has judged in consideration of not only the interference level but also the reception quality in the E-DCH active set. As a result, both the control of the interference level and the macro diversity effect can be actualized.

In the case in which whether to add a base station 2 to the E-DCH active set on the basis of the pseudo SIR is judged, the "interference level" in FIG. 10 is replaced by the "pseudo SIR."

However, because the pseudo SIR is a value which is obtained by dividing a pseudo uplink received signal by the interference level, the interference level decreases with increase in the pseudo SIR and therefore the direction of the inequality sign in each of steps ST24 and ST31 is reversed.

As described above, when the mobile terminal 1 transmits to the radio network controller 3 an addition event or replacement event for the E-DCH active set (step ST41 of FIG. 11), the radio network controller 3's radio resources management unit 83 receives the addition event or replacement event for the E-DCH active set (step ST42).

After receiving the addition event or replacement event for the E-DCH active set, the radio network controller 3's radio resources management unit 83 transmits an addition request or a replacement request to the base station 2 (step ST43).

For example, when adding the base station 2-3 to the E-DCH active set, the radio resources management unit transmits a request to add the base station to the E-DCH active set to the base station 2-3. When excluding the non-serving base station 2-2 from the E-DCH active set and then adding the base station 2-3 to the E-DCH active set, the radio resources management unit transmits a request to replace the non-serving base station 2-2 with the base station 2-3 in the E-DCH active set to both the base station 2-3 and non-serving base station 2-2.

Hereafter, for the sake of simplicity, assume that the base station 2-3 is added to the E-DCH active set.

When receiving the request to add the base station 2-3 to the E-DCH active set from the radio network controller 3, the signaling measuring unit 79 of the base station 2-3 measures a signaling load in the base station (the number of signalings which the E-AGCH transmitting unit 76, E-RGCH transmitting unit 77, and E-HICH transmitting unit 78 use).

After the signaling measuring unit 79 measures the signaling load, the protocol processing unit 57 of the base station 2-3 judges whether there is a margin for the signaling load (step ST44). For example, the signaling measuring unit judges whether there is a margin for the signaling load by judging whether the number of signalings currently being used reaches a predetermined (given) number.

When there is no margin for the signaling load, the protocol processing unit 57 of the base station 2-3 determines that signalings are insufficient currently, and then notifies the radio network controller 3 that it cannot add the base station to the E-DCH active set (step ST45), and ends the processing.

In contrast, when there is a margin for the signaling load, the protocol processing unit notifies the radio network controller 3 that it can add the base station to the E-DCH active set (step ST46).

The E-DCH active set control unit 92 of the radio network controller 3 judges whether to add the base station to the E-DCH active set on the basis of the notification from the base station 2-3 (step ST47).

The transmission control unit 82 of the radio network controller 3 transmits an addition instruction for adding the base station to the E-DCH active set to the base station 2-3 when the E-DCH active set control unit 92 determines that the base station can be added to the E-DCH active set (step ST48).

When receiving the addition instruction for adding the base station to the E-DCH active set from the radio network controller 3, the protocol processing unit 57 of the base station 2-3 carries out a process of adding the base station to the E-DCH active set, which will be mentioned later (step ST49).

After carrying out the process of adding the base station to the E-DCH active set, the protocol processing unit 57 of the base station 2-3 notifies the completion of the addition process to the radio network controller 3 (step ST50).

When receiving the notification of the completion of the addition process from the base station 2-3, the transmission control unit 82 of the radio network controller 3 transmits the addition instruction for adding the base station to the E-DCH active set to the mobile terminal 1 via the base station 2-3 (step ST51).

When the P-CCPCH receiving unit 32 receives the addition instruction from the radio network controller 3 for adding the base station to the E-DCH active set, the mobile terminal 1's protocol processing unit 41 carries out an after-mentioned process of adding the base station to the E-DCH active set (step ST52), and notifies the completion of the addition process to the radio network controller 3 (step ST53).

Hereafter, the addition process of mobile terminal 1's adding the base station to the E-DCH active set will be explained in detail.

Figure 12:
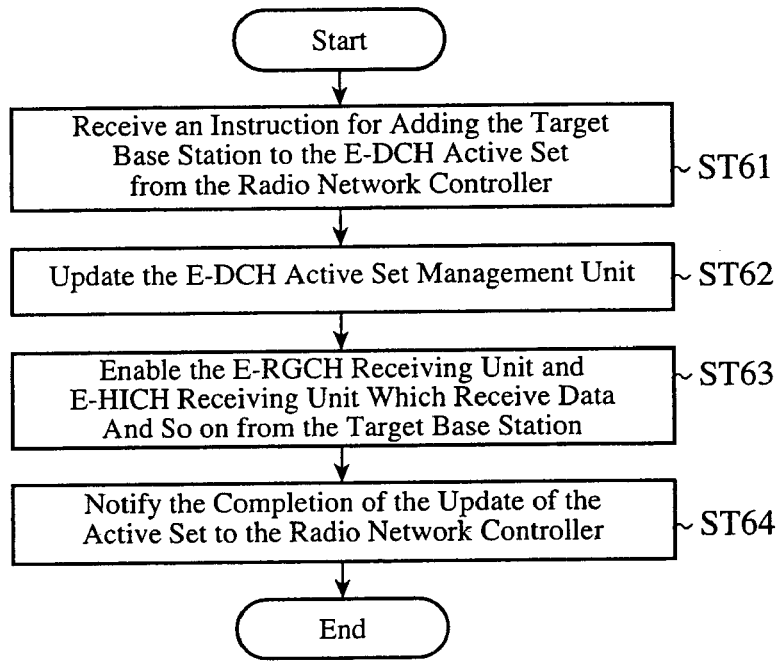
FIG. 12 is a flow chart showing an addition process of adding a base station to the E-DCH active set by the mobile terminal.

FIG. 12 is a flow chart showing the addition process of mobile terminal 1's adding the base station to the E-DCH active set.

When the P-CCPCH receiving unit 32 receives from the radio network controller 3 the addition instruction for adding the base station to the E-DCH active set, the mobile terminal 1's protocol processing unit 41 outputs an addition request to the E-DCH active set control unit 38 for the addition of the base station to the E-DCH active set (step ST61).

The mobile terminal 1's E-DCH active set control unit 38, after receiving from the protocol processing unit 41 the addition request for adding the base station to the E-DCH active set, updates the base station(s) included in the current E-DCH active set managed by the E-DCH active set management unit 35 (step ST62).

For example, if the request is an addition request which requires the base station 2-3 to be changed to a non-serving base station, the E-DCH active set control unit 38 carries out a process of writing the base station 2-3 into the E-DCH active set managed by the E-DCH active set management unit 35.

After updating the base station(s) included in the current E-DCH active set managed by the E-DCH active set management unit 35, the mobile terminal 1's E-DCH active set control unit 38 enables (i.e., sets to operable states) the E-RGCH receiving unit 30 and the E-HICH receiving unit 26, which will receive data and other information from the newly-added base station 2-3 (step ST63).

After that, the mobile terminal 1's protocol processing unit 41 notifies the radio network controller 3 the completion of the addition process of adding the base station to the E-DCH active set (step ST64).

Figure 13:
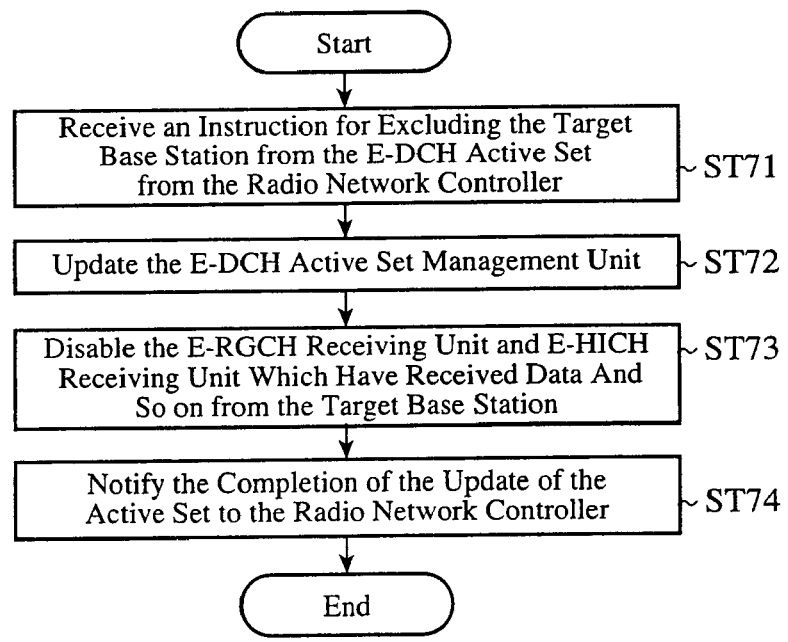
FIG. 13 is a flow chart showing an exclusion process of excluding a base station from the E-DCH active set by the mobile terminal.

The mobile terminal 1's E-DCH active set control unit 38 receives from the radio network controller 3, the replacement instruction for replacing a base station with another base station in the E-DCH active set, as shown in FIG. 13, or receives the exclusion instruction for excluding a base station from the E-DCH active set (step ST71), and, for example, when the non-serving base station 2-2 needs to be excluded from the E-DCH active set, the E-DCH active set control unit 38 updates the base station(s) included in the current E-DCH active set managed by the E-DCH active set management unit 35 (step ST72).

For example, when the received instruction is an exclusion instruction for excluding the non-serving base station 2-2 from the group of non-serving base stations, the E-DCH active set control unit 38 carries out a process of excluding the non-serving base station 2-2 from the E-DCH active set managed by the E-DCH active set management unit 35.

The E-DCH active set control unit 38 then disables (i.e., sets to inoperable states) the E-RGCH receiving unit 30 and the E-HIGH receiving unit 26 which have been receiving data and other information from the non-serving base station 2-2 (step ST73).

When the received instruction is a replacement instruction which requires the non-serving base station 2-2 to be excluded from the group of non-serving base stations and the base station 2-3 to be changed to a non-serving base station, the E-DCH active set control unit 38 excludes the non-serving base station 2-2 from the E-DCH active set managed by the E-DCH active set management unit 35, and carries out a process of writing the base station 2-3 into the E-DCH active set.

The E-DCH active set control unit 38 then disables (i.e., sets to inoperable states) the E-RGCH receiving unit 30 and the E-HICH receiving unit 26 which have been receiving data and other information from the non-serving base station 2-2, and enables (i.e., sets to operable states) the E-RGCH receiving unit 30 and the E-HICH receiving unit 26 which will receive data and other information from the newly-added base station 2-3 (step ST73).

After that, the mobile terminal 1's protocol processing unit 41 notifies the radio network controller 3 the completion of the replacement process or the exclusion process for the E-DCH active set (step ST74).

Next, the addition process of base station 2's adding a base station 2 to the E-DCH active set will be explained in detail.

Figure 14:
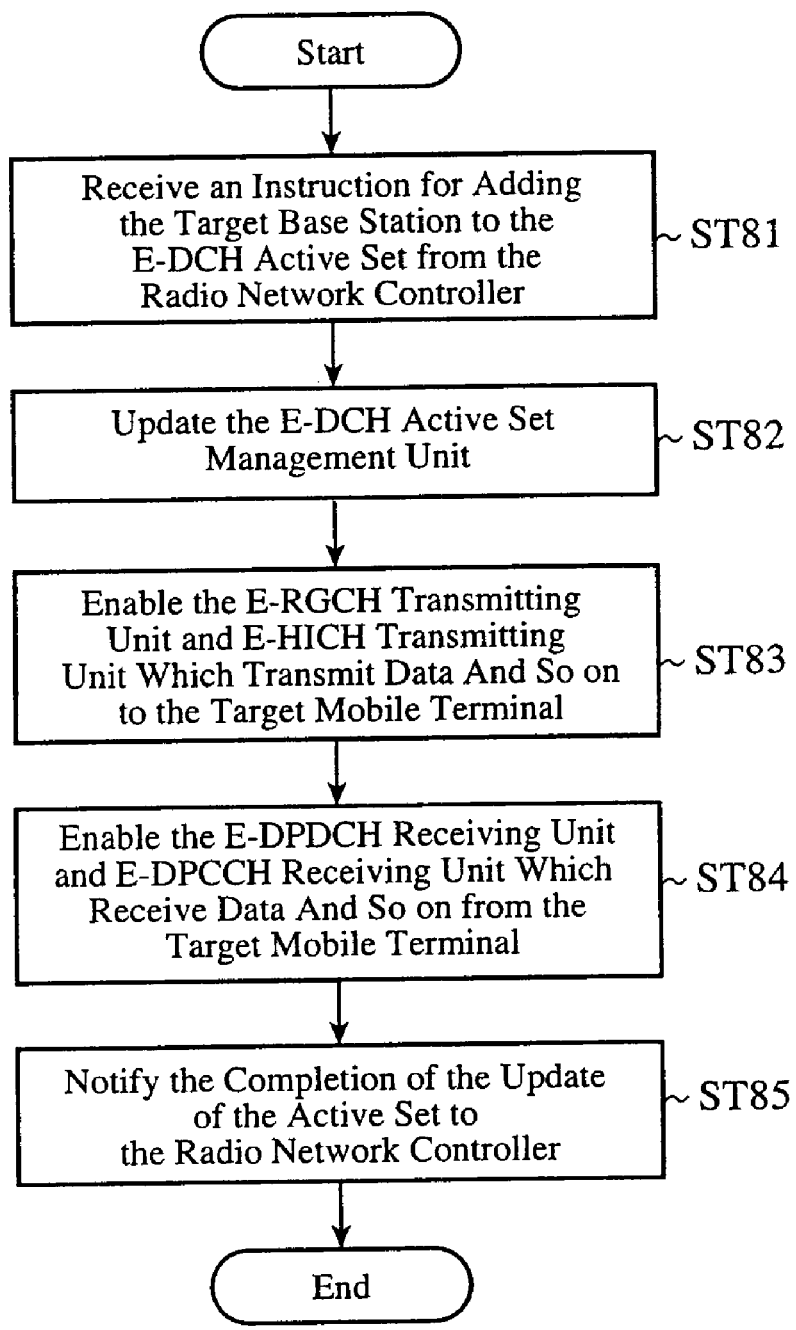
FIG. 14 is a flow chart showing an addition process of adding a base station to the E-DCH active set by the base station.

FIG. 14 is a flow chart showing the addition process of base station 2's adding a base station to the E-DCH active set.

The base station 2-3's protocol processing unit 57, after receiving from the radio network controller 3 an addition instruction for adding the base station to the E-DCH active set, outputs an addition request to the E-DCH active set control unit 71 for the addition of the base station to the E-DCH active set (step ST81).

The base station 2-3's E-DCH active set control unit 71, after receiving from the protocol processing unit 57 the request for adding the base station to the E-DCH active set, updates the base station (s) included in the current E-DCH active set managed by the E-DCH active set management unit 70 (step ST82).

For example, if the request is an addition request which requires the base station 2-3 to be changed to a non-serving base station, the E-DCH active set control unit carries out a process of writing the base station 2-3 into the E-DCH active set managed by the E-DCH active set management unit 70.

After updating the base station(s) included in the current E-DCH active set managed by the E-DCH active set management unit 70, the base station 2-3's E-DCH active set control unit 71 enables (i.e., sets to operable states) the E-RGCH transmitting unit 77 and the E-HICH transmitting unit 78, which will transmit data and other information to the target mobile terminal 1 (step ST83).

The E-DCH active set control unit 71 also enables (i.e., sets to operable states) the E-DPDCH receiving unit 62 and the E-DPCCH receiving unit 60, which will receive data and other information from the target mobile terminal 1 (step ST84).

After that, the base station 2-3's protocol processing unit 57 notifies the radio network controller 3 the completion of the addition process of adding the base station to the E-DCH active set (step ST85).

Next, the exclusion process of base station 2's excluding a base station 2 from the E-DCH active set will be explained in detail.

Figure 15:
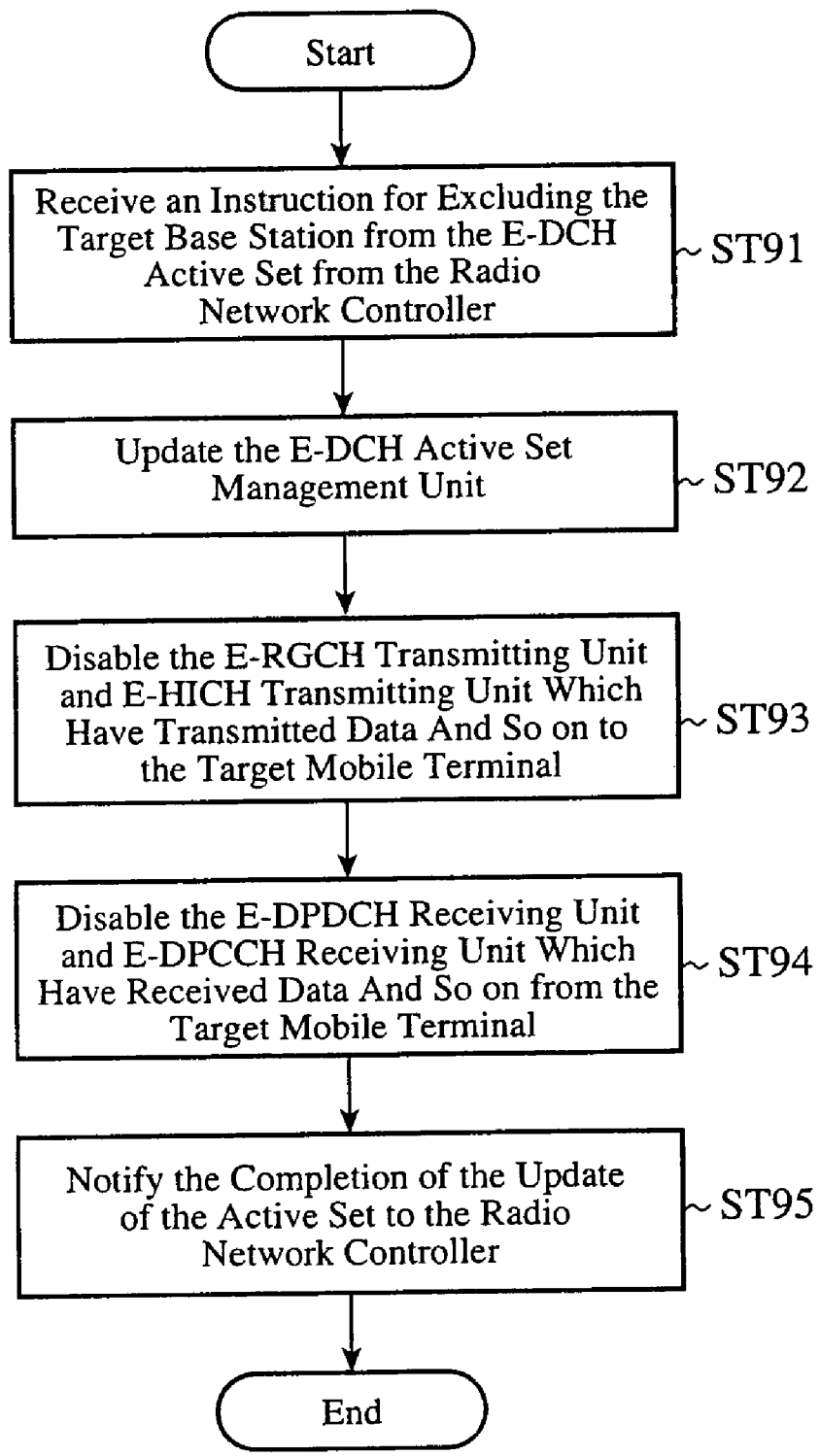
FIG. 15 is a flow chart showing an exclusion process of excluding a base station from the E-DCH active set by the base station.

FIG. 15 is a flow chart showing the exclusion process of base station 2's excluding a base station from the E-DCH active set.

The non-serving base station 2-2's protocol processing unit 57, after receiving from the radio network controller 3 an exclusion instruction for excluding a base station from the E-DCH active set (the exclusion instruction can be either an exclusion instruction related to requesting a non-serving base station 2-2's exclusion or an exclusion instruction related to requesting a non-serving base station's replacement with another base station), requests the E-DCH active set control unit 71 to exclude the non-serving base station from the E-DCH active set (step ST91).

The non-serving base station 2-2's E-DCH active set control unit 71, after receiving from the protocol processing unit 57 the exclusion request to exclude the non-serving base station from the E-DCH active set, updates the base station(s) included in the current E-DCH active set which is managed by the E-DCH active set management unit 70 (step ST92).

More specifically, the E-DCH active set control unit carries out a process of excluding the non-serving base station 2-2 from the E-DCH active set which is managed by the E-DCH active set management unit 70.

The non-serving base station 2-2's E-DCH active set control unit 71, after updating the base station(s) included in the current E-DCH active set managed by the E-DCH active set management unit 70, disables (i.e., sets to operable states) the E-RGCH transmitting unit 77 and the E-HICH transmitting unit 78 which have been transmitting data and other information to the target mobile terminal 1 (step ST93).

The E-DCH active set control unit 71 also disables (i.e., sets to inoperable states) the E-DPDCH receiving unit 62 and E-DPCCH receiving unit 60 which have been receiving data and other information from the target mobile terminal 1 (step ST94).

After that, the non-serving base station 2-2's protocol processing unit 57 notifies the radio network controller 3 the completion of the exclusion process of excluding the non-serving base station from the E-DCH active set (step ST95).

As can be seen from the above description, the radio network controller 3 according to this embodiment 1 is so constructed that a plurality of base stations 2 are sorted into a group of non-serving base stations or a group of base stations included in the active set for soft handovers (i.e., the prior art active set) depending on the data reception conditions of the plurality of base stations 2. Therefore, a base station 2-3 (a base station included in the active set for soft handovers) whose interference level exceeds a maximum allowable value is changed to a non-serving base station, and the data transmission power of a mobile terminal 1 can be controlled. As a result, an interference level in a base station can be prevented from exceeding its threshold, and advantages such as the improvement of the transmission quality are achieved.

Embodiment 2

In above-mentioned embodiment 1, the unit which takes charge of judgment of whether to change a base station 2-3 having a margin for the interference level which is not adequately provided to a non-serving base station is a mobile terminal 1, as previously explained. As an alternative, the unit which takes charge of the judgment can be a radio network controller 3.

Hereafter, a case in which the unit which takes charge of the judgment is the radio network controller 3 will be explained.

In the case in which the unit which takes charge of the judgment is the radio network controller 3, there is provided an advantage of being able to enable a base station 2 to measure the interference level therein.

Although there is a possibility that when a base station 2 signals mobile terminal 1, an error occurs because a wireless line is used, there is provided an advantage of being able to prevent an notification error from occurring in the interference level information if the base station 2 measures the interference level by itself.

However, each base station 2 cannot know that interference from which mobile terminal 1 has a large influence upon the radio communications.

If all base stations 2 included in a prior art active set are changed to non-serving base stations for all mobile terminals 1 which can cause interference, there arises no problem of which mobile terminal 1 has a large influence upon the radio communications, while because the number of non-serving base stations increases too much, the load in the hardware including the mobile terminal 1 and base stations 2 becomes heavy.

As a method of selecting a base station 2 which is to be included in an E-DCH active set from among base stations 2 included in the prior art active set, there can be a method of receiving E-DCH signals (data) temporarily to measure the code power, and then judging whether to keep a base station as a non-serving base station, as well as a simple method based on the path loss.

First, the method of judging whether to add a base station 2 to the E-DCH active set on the basis of the path loss will be explained.

Figure 16:
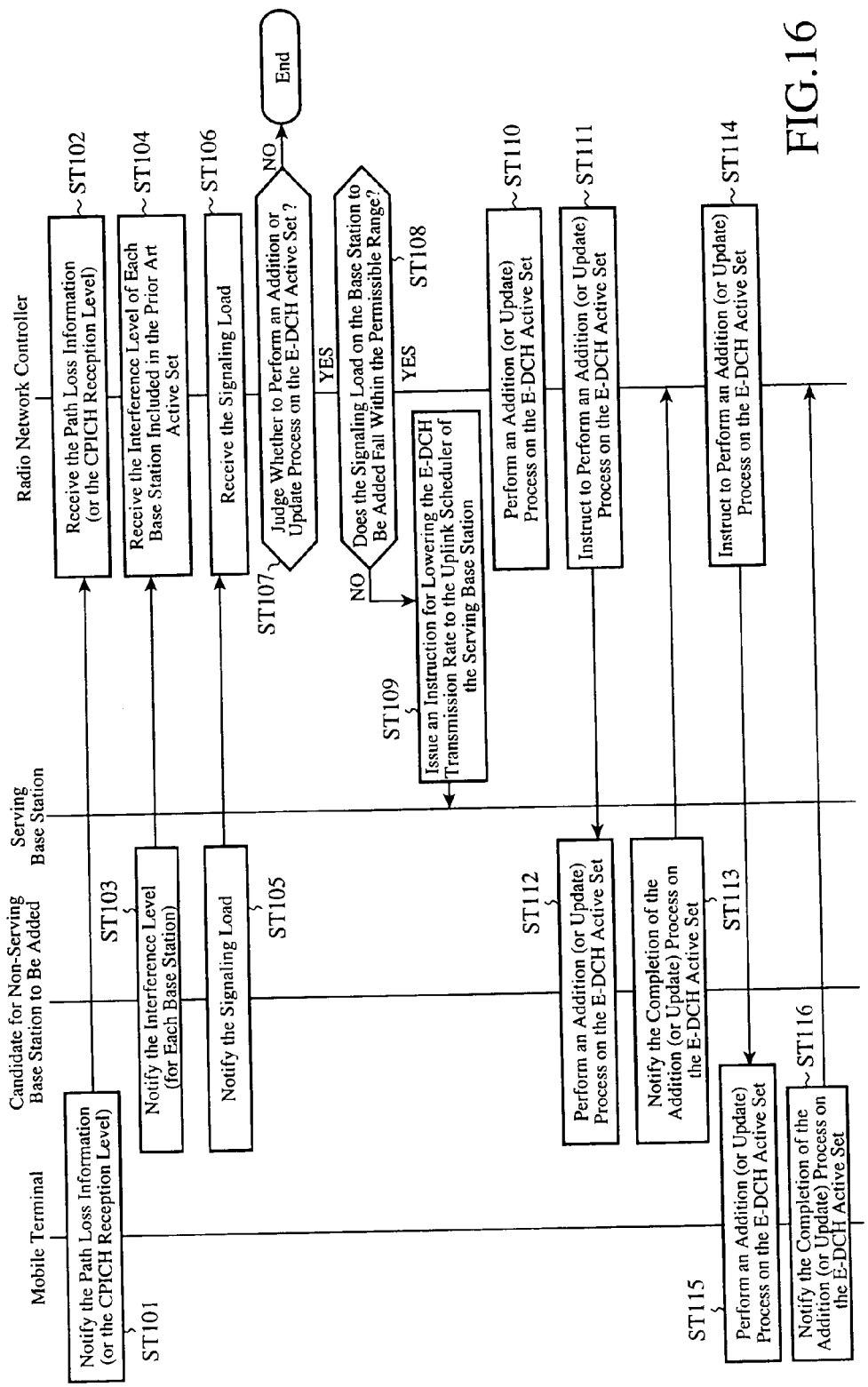
FIG. 16 is a sequence diagram showing a sequence of a mobile communications system at the time when the radio network controller judges whether to add a base station to the E-DCH active set.
Figure 17:
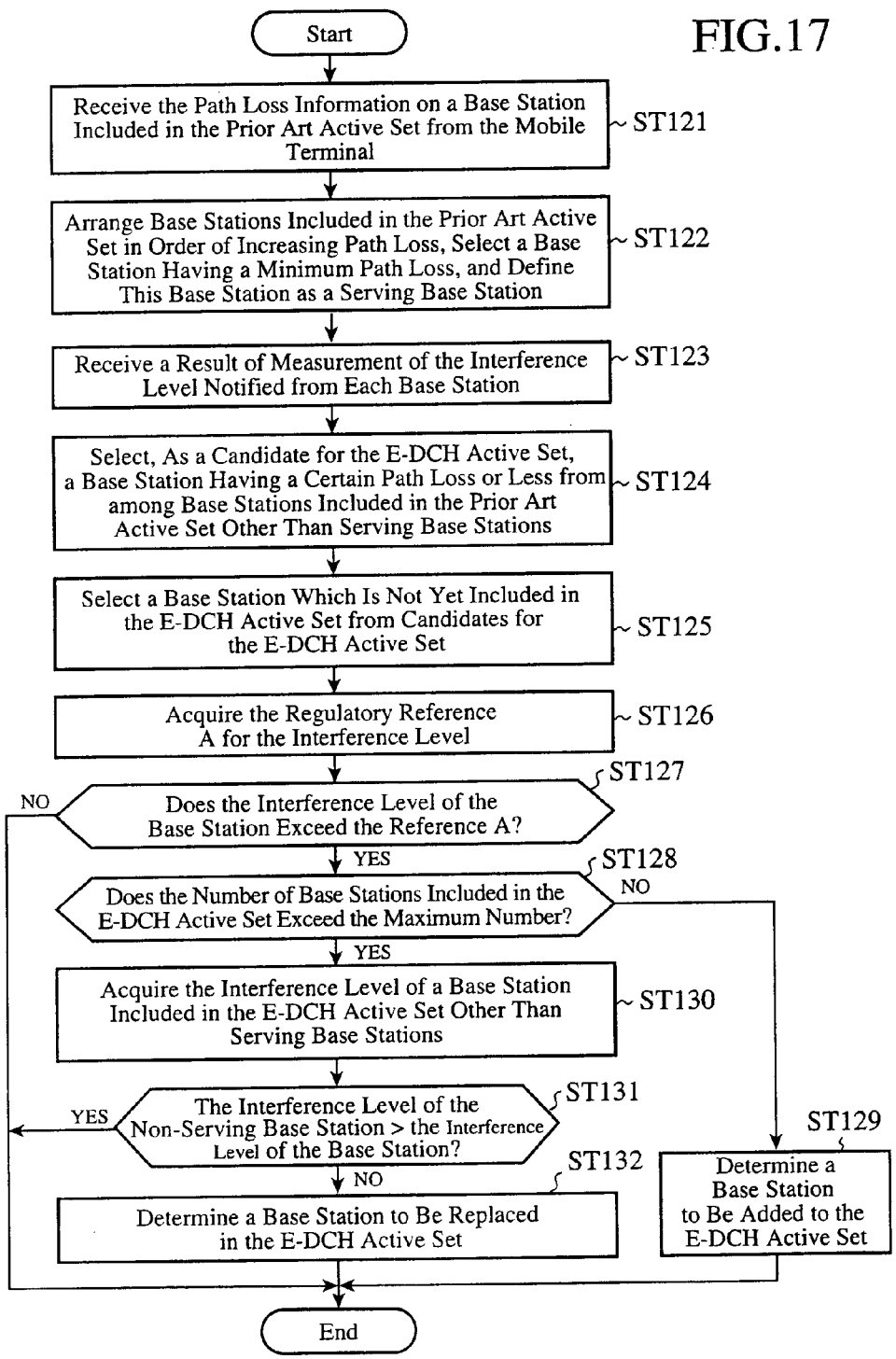
FIG. 17 is a flow chart showing the process of judging whether to add a base station to the E-DCH active set, which is carried out by the radio network controller.

FIG. 16 is a sequence diagram showing a sequence of a mobile communications system at the time when the radio network controller 3 judges whether to add a base station 2-3 to the E-DCH active set, and FIG. 17 is a flow chart showing the process of judging whether to add the base station 2-3 to the E-DCH active set, which is carried out by the radio network controller 3.

When a CPICH receiving unit 28 acquires the reception level of CPICH as path loss information, a DPCH transmitting unit 18 of the mobile terminal 1 notifies the path loss information to the radio network controller 3 via a base station 2 (step ST101).

A transmission control unit 82 of the radio network controller 3 receives the path loss information from the mobile terminal 1 (step ST102).

An interference level informing unit 68 of each of all base stations 2 included in the prior art active set notifies the interference level measured by an interference level measuring unit 65 to the radio network controller 3 (step ST103).

A transmission control unit 82 of the radio network controller 3 receives the interference level from each of all the base stations 2 included in the prior art active set (step ST104).

The interference level informing unit 68 of each of all the base stations 2 included in the prior art active set notifies a signaling load measured by a signaling measuring unit 79 to the radio network controller 3 (step ST105).

The transmission control unit 82 of the radio network controller 3 receives the signaling load from each of all the base stations 2 included in the prior art active set (step ST106).

When receiving the path loss information, interference level, and signaling load, an E-DCH active set control unit 92 of the radio network controller 3 judges whether to perform an addition/update of a base station 2 to or in the E-DCH active set on the basis of the path loss information and interference level (step ST107). The details of the process of judging whether to perform an addition/update of a base station to or in the E-DCH active set will be explained later.

The E-DCH active set control unit 92 ends the processing when not carrying out an addition/update of a base station 2 to or in the E-DCH active set, whereas when carrying out an addition/update of a base station 2 to or in the E-DCH active set, it judges whether the signaling load of the base station 2-3 which is the target for addition falls within a allowable range (step ST108).

When the E-DCH active set control unit 92 determines that the signaling load of the base station 2-3 which is the target for addition does not fall within the allowable range, the transmission control unit 82 of the radio network controller 3 instructs an uplink scheduler 75 of a serving base station 2-1 to lower the E-DCH transmission rate (step ST109).

When determining that the signaling load of the base station 2-3 which is the target for addition falls within the allowable range, the E-DCH active set control unit 92 of the radio network controller 3 updates the base station (s) included in the current E-DCH active set managed by an E-DCH active set management unit 89 (step ST110).

For example, when changing the base station 2-3 to a non-serving base station, the E-DCH active set control unit carries out a process of writing the base station 2-3 in the E-DCH active set managed by the E-DCH active set management unit 89.

When the E-DCH active set control unit 92 updates the base station (s) included in the current E-DCH active set, the transmission control unit 82 of the radio network controller 3 transmits an addition instruction for adding the base station 2-3 to the E-DCH active set to the base station 2-3 (or a replacement instruction) (step ST111).

When receiving the addition instruction for adding the base station to the E-DCH active set or the like from the radio network controller 3, a protocol processing unit 57 of the base station 2-3 carries out a process of adding the base station to the E-DCH active set or the like, as shown in FIG. 14 or 15 (step ST112).

After carrying out the process of adding the base station to the E-DCH active set or the like, the protocol processing unit 57 of the base station 2-3 notifies the completion of the addition process or the like to the radio network controller 3 (step ST113).

When receiving the notification of the completion of the addition process or the like from the base station 2-3, the transmission control unit 82 of the radio network controller 3 transmits an addition instruction for adding the base station to the E-DCH active set (or a replacement instruction) to the mobile terminal 1 via the base station 2-3 (step ST114).

When a P-CCPCH receiving unit 32 receives the addition instruction for adding the base station to the E-DCH active set or the like from the radio network controller 3, a protocol processing unit 41 of the mobile terminal 1 carries out a process of adding the base station to the E-DCH active set or the like (step ST115), and notifies the completion of the addition process or the like to the radio network controller 3 (step ST116), as shown in FIG. 12 or 13.

Next, the process of judging whether to add the base station 2-3 to the E-DCH active set which is carried out by the radio network controller 3 (the processes shown in step ST107 to ST109 of FIG. 16) will be explained with reference to FIG. 17.

The transmission control unit 82 of the radio network controller 3 receives the path loss information about each of all the base stations 2 included in the prior art active set from the mobile terminal 1 (step ST121).

When the transmission control unit 82 of the radio network controller 3 receives the path loss information on each of all the base stations 2, the transmission control unit arranges all the base stations 2 included in the active set in order of increasing path loss, and selects, as a serving base station 2-1, a base station 2 having a minimum path loss from among all the base stations 2 included in the active set (step ST122).

The transmission control unit 82 of the radio network controller 3 receives the interference level from each of all the base stations 2 included in the prior art active set (step ST123).

The E-DCH active set control unit 92 of the radio network controller 3 selects, as one of candidates for non-serving base stations, a base station having a certain path loss or smaller other than the serving base station 2-1 from among all the base stations 2 included in the prior art active set (step ST124).

The E-DCH active set management unit 89 of the radio network controller 3 then selects a base station (e.g., a base station 2-3) which is not yet included in the E-DCH active set from among the candidates for non-serving base stations selected by the E-DCH active set control unit 92 (step ST125).

When the E-DCH active set management unit 89 selects the base station 2-3, the E-DCH active set control unit 92 of the radio network controller 3 acquires a regulatory reference A which is used at the time of adding the base station to the E-DCH active set (which is equivalent to a threshold A which is used as the above-mentioned judgment criterion) (step ST126), and compares the interference level of the base station 2-3 with the regulatory reference A (step ST127).

When the interference level of the base station 2-3 does not exceed the regulatory reference A, the E-DCH active set control unit 92 ends the processing because it is not necessary to add the base station 2-3 to the E-DCH active set.

When the interference level of the base station 2-3 exceeds the regulatory reference A, the E-DCH active set control unit 92 judges whether the number of base stations 2 included in the E-DCH active set exceeds a maximum number (e.g., three) (step ST128).

When the number of base stations 2 included in the E-DCH active set does not exceed the maximum number, the E-DCH active set control unit 92 determines that the base station 2-3 selected by the E-DCH active set management unit 89 is to be added to the E-DCH active set (step ST129). More specifically, the E-DCH active set control unit determines to change the base station 2-3 selected by the E-DCH active set management unit 89 to a non-serving base station.

When the number of base stations 2 included in the E-DCH active set exceeds the maximum number, the E-DCH active set control unit 92 acquires the interference level of the non-serving base station 2-2 included in the current E-DCH active set (step ST130).

In the example of FIG. 1, although only the non-serving base station 2-2 is included in the E-DCH active set, two or more non-serving base stations can be included in the E-DCH active set and the interference level of each of the two or more non-serving base stations can be acquired in this case.

The E-DCH active set control unit 92 compares the interference level of the non-serving base station 2-2 with the interference level of the base station 2-3 (step ST131). In the case in which two or more non-serving base stations are included in the E-DCH active set, the E-DCH active set control unit compares a minimum interference level of the two or more non-serving base stations with the interference level of the base station 2-3.

When the interference level of the non-serving base station 2-2 is larger than the interference level of the base station 2-3, the E-DCH active set control unit 92 maintains the current E-DCH active set.

In contrast, when the interference level of the non-serving base station 2-2 is smaller than the interference level of the base station 2-3, the E-DCH active set control unit determines to exclude the non-serving base station 2-2 included in the current E-DCH active set, and to add the base station 2-3 to the E-DCH active set (step ST132).

In this example, the radio network controller 3 selects a base station 2 having a constant path loss or smaller as a candidate for non-serving base stations, as previously explained. Because the transmission power of the mobile terminal 1 has a large influence upon a base station 2 having a small path loss, the radio network controller can include base stations 2 in the E-DCH active set in order of increasing path loss without taking the transmission rate into consideration.

The radio network controller 3 judges the addition of the base station 2-3 to the E-DCH active set or the like on the basis of the interference level of the base station 2-3, as mentioned above. As an alternative, the radio network controller can judge the addition of the base station 2-3 to the E-DCH active set or the like on the basis of the interference level of the base station 2-3 and pseudo SIR.

In a state of soft handover, when the SIR of any one base station 2 can be guaranteed, the signal intensity does not necessarily become the same value in each base station 2 in order not to further increase the power. That is, even if the interference from a base station is weak, the signal from the base station may be weak. Therefore, even if such a base station 2 is added to the E-DCH active set, there is a high possibility that receiving errors occur.

Therefore, by judging whether to add the base station 2 to the E-DCH active set on the basis of not only the interference level of the base station 2 but also the pseudo SIR, the radio network controller can include a base station 2 which it has judged in consideration of not only the interference level but also the reception quality in the E-DCH active set. As a result, both the control of the interference level and the macro diversity effect can be actualized.

In the case in which whether to add a base station 2 to the E-DCH active set on the basis of the pseudo SIR is judged, the "interference level" in FIG. 17 is replaced by the "pseudo SIR."

However, because the pseudo SIR is a value which is obtained by dividing a pseudo uplink received signal by the interference level, the interference level decreases with increase in the pseudo SIR and therefore the direction of the inequality sign in each of steps ST127 and ST131 is reversed.

Next, the method of judging whether to add a base station 2 to the E-DCH active set on the basis of the E-DCH code power will be explained.

Figure 18:
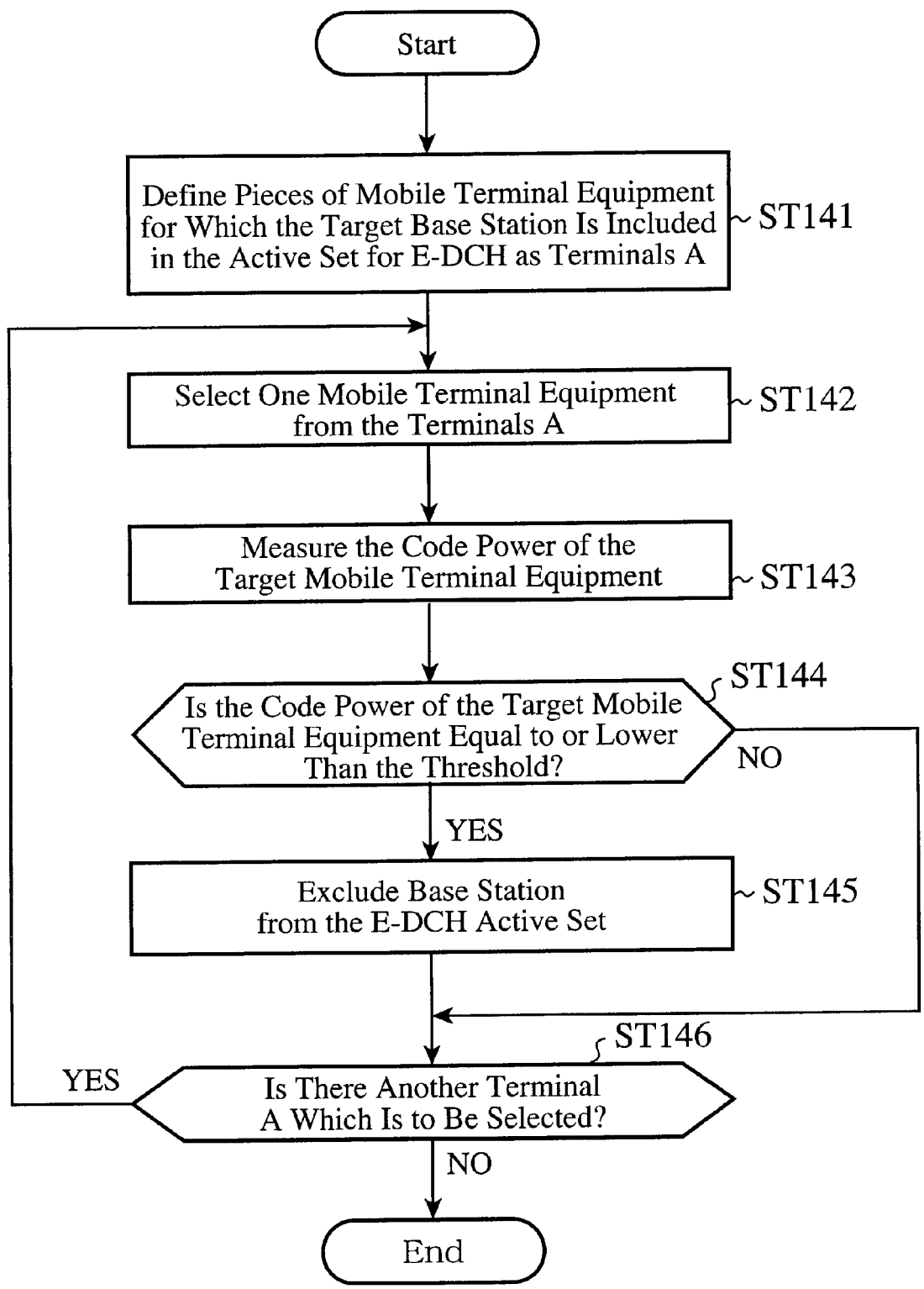
FIG. 18 is a flow chart showing the process of judging whether to add a base station to the E-DCH active set, which is carried out by the radio network controller.

FIG. 18 is a flow chart showing the process of judging whether to add the base station 2-3 to the E-DCH active set, which is carried out by the radio network controller 3.

What interference level is caused in a base station 2 by data transmitted from the mobile terminal 1 can be determined most exactly using an actually-received result. Although interference is provided to other base stations 2 when E-DCH is used during a soft handover, the power can be known exactly by setting a code and carrying out a despreading process.

Because E-DCH is not received at the time of addition of a base station to the E-DCH active set, the code power of E-DCH cannot be used. There can be provided a method of temporarily adding a base station 2 to the E-DCH active set, causing the base station 2 to measure the E-DCH code power, and, when the E-DCH code power is small, excluding the base station 2 from the E-DCH active set in order to enable the use of the code power of E-DCH also at the time of addition of a base station to the E-DCH active set. Because the number of base stations in the E-DCH active set which can be used simultaneously (i.e., the number of base stations which can be included in the E-DCH active set) is limited, base stations can be added one by one to the E-DCH active set and can be excluded one by one from the E-DCH active set.

The E-DCH active set control unit 92 of the radio network controller 3 adds, for example, the base station 2-3 to the E-DCH active set for the time being, and defines one or more pieces of mobile terminal 1 to or from which the base station 2-3 transmits or receives data as terminals A (step ST141).

The E-DCH active set control unit 92 then selects one arbitrary mobile terminal 1 from the terminals A (step ST142).

The E-DCH active set control unit 92 acquires the code power of the target mobile terminal 1 from the interference level measuring unit 65 of the base station 2-3 (step ST143), and compares the code power with a predetermined (given) threshold (step ST144).

When the code power of the target mobile terminal 1 is smaller than the predetermined (given) threshold, the E-DCH active set control unit 92 excludes the mobile terminal 1 from the E-DCH active set (step ST145).

When the terminals A include one or more pieces of mobile terminal 1 which are not yet selected, the E-DCH active set control unit 92 carries out the processes of steps ST142 to ST145 repeatedly (step ST146).

The radio network controller 3 measures the interference level of a base station 2 when selecting a base station to be included in the E-DCH active set. Because the E-DCH code power cannot be measured unless an E-DCH code is actually set up, the code power of the base station 2 cannot be acquire if the base station 2 is not included in the E-DCH active set which is already placed in a reception state.

For this reason, a base station 2 is selected only using the interference level of the base station 2 from the E-DCH active set. When there is not-so-large change in AG in non-RG mode or when the transmission rate of the mobile terminal 1 is kept constant, it is possible to use AG as the transmission rate of the mobile terminal 1.

There are two types of communications via E-DCH: RG-based communications and non-RG-based communications.

In the case of RG-based communications, the serving base station 2-1 carries out the scheduling for each mobile terminal 1 in a one-to-one relationship, and the transmission rate varies at a high speed because a specification of the transmission rate is outputted from the serving base station 2-1 to each mobile terminal 1 for each scheduling. Therefore, it is difficult to provide any notification via the radio network controller 3.

In the case of non-RG-based communications, it is possible to carry out the scheduling for two or more pieces of mobile terminal 1, and it is expected that there is a small change in the transmission rate compared with the case of RG-based communications.

As mentioned above, when the radio network controller 3 carries out addition of a base station 2 to the E-DCH active set, and selection of a base station 2 to be replaced by another base station, there is provided an advantage of eliminating the necessity to carry out signaling of the interference level to the mobile terminal 1. Therefore, it is easy to ensure the compatibility with prior art systems, and the communications system of this embodiment is insensitive to signaling errors in the interference level due to degradation in the quality of the downlink transmission line.

Embodiment 3

In above-mentioned embodiment 1, the mobile terminal 1 judges whether to add a base station 2 to the E-DCH active set, as previously explained. In this embodiment 3, an example in which mobile terminal 1 judges whether to exclude abase station from an E-DCH active set will be explained. For a prior art active set for a dedicated channel, the same reference is used for both addition of a base station to the active set and an exclusion of a base station from the active set. For the active set in uplink packet communications (i.e., the E-DCH active set), because a base station which is the target for the exclusion is already placed in a state of reception via E-DCH, something related to E-DCH can be used as a judgment criterion, and more-exact judgment of an exclusion of a base station from the E-DCH active set can be carried out.

Hereafter, a method of selecting a base station 2 which is to be excluded from the E-DCH active set on the basis of the interference level of the base station 2 and the power of influence of transmission of data from mobile terminal 1 upon the base station 2 by means of the mobile terminal 1 will be explained. A base station 2 having a margin for the interference level for the mobile terminal 1 having low code power is excluded from the E-DCH active set.

Figure 19:
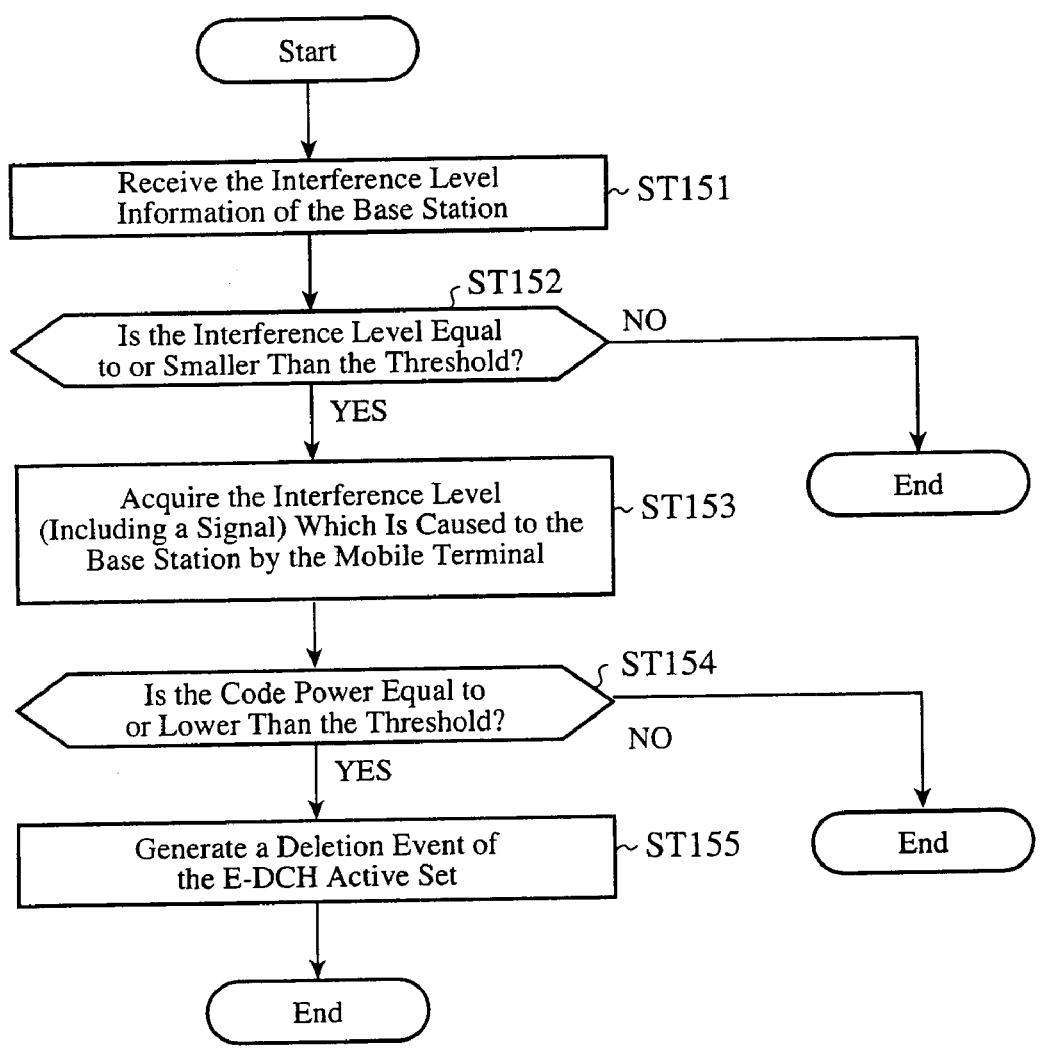
FIG. 19 is a flow chart showing a process carried out by the mobile terminal when judging whether to exclude a base station from the E-DCH active set.

FIG. 19 is a flow chart showing a process carried out by the mobile terminal 1 when judging whether to exclude a non-serving base station 2-2 from the E-DCH active set.

The mobile terminal 1 is carrying out a soft handover with a serving base station 2-1, the non-serving base station 2-2, and a base station 2-3.

The mobile terminal 1 receives interference level information indicating the interference level of the non-serving base station 2-2 from the non-serving base station 2-2 (step ST151).

When the mobile terminal 1 receives the interference level information from the non-serving base station 2-2, the mobile terminal compares the interference level of the non-serving base station 2-2 indicated by the interference level information with a threshold D which is used as a judgment criterion at the time of excluding a base station from the E-DCH active set (step ST152).

The threshold D used as the judgment criterion can be calculated through signaling from a base station 2. As an alternative, the threshold D can be calculated by an E-DCH active set control unit of the mobile terminal 1 or a base station 2.

When the interference level of the non-serving base station 2-2 exceeds the threshold D, the mobile terminal 1 maintains the current E-DCH active set without excluding the non-serving base station 2-2 from the E-DCH active set because the non-serving base station 2-2 has an influence upon surrounding base stations 2.

In contrast, when the interference level of the non-serving base station 2-2 is less than the threshold D, the mobile terminal 1 acquires the interference level (including a signal) which is caused to the non-serving base station 2-2 by the mobile terminal 1 because the interference level of the non-serving base station 2-2 is small and the necessity for the non-serving base station 2-2 to transmit a Down command is low (step ST153).

Actually, the signal intensity is known if the code power measured at the base station's end is known. Furthermore, the mobile terminal 1 can calculate the signal intensity from the transmission rate.

When the mobile terminal 1 acquires the code power as the interference level which is caused to the non-serving base station 2-2 by the mobile terminal 1, the mobile terminal compares the code power with a threshold E which is used as a judgment criterion at the time of excluding a base station from the E-DCH active set (step ST154).

The threshold E used as the judgment criterion can be calculated through signaling from a base station. As an alternative, the threshold E can be calculated by the E-DCH active set control unit of the mobile terminal 1 or a base station 2.

When the code power is equal to or higher than the threshold E, the mobile terminal 1 maintains the current E-DCH active set without excluding the non-serving base station 2-2 from the E-DCH active set because the non-serving base station 2-2 has an influence upon surrounding base stations 2.

In contrast, when the code power is lower than the threshold E, because there is almost no influence upon surrounding base stations 2, the mobile terminal excludes the non-serving base station 2-2 from the E-DCH active set so as to reduce the signaling load.

Therefore, the mobile terminal 1 generates an exclusion event of making a request to exclude the non-serving base station 2-2 from the E-DCH active set when the code power is lower than the threshold E (step ST155).

When the mobile terminal 1 generates the exclusion event in the above-mentioned way, the mobile terminal carries the exclusion event onto DCH so as to transmit it to the radio network controller 3 via the non-serving base station 2-2.

When receiving the exclusion event of making a request to exclude the non-serving base station 2-2 from the E-DCH active set from the mobile terminal 1, the radio network controller 3 excludes the non-serving base station 2-2 from the E-DCH active set.

After that, the signaling load is reduced although the non-serving base station 2-2 cannot carry out the process of transmitting the Down command to the mobile terminal 1.

In the above description, the comparison between the code power and the threshold E is shown. As an alternative, the mobile terminal 1 can compare the transmission rate (or the transmission power) of the mobile terminal 1 with a regulatory reference F (i.e., a reference value calculated from the difference between the allowable power of E-DCH, and the interference level of the non-serving base station 2-2), and, when the transmission rate is lower than the regulatory reference F, can generate an exclusion event of making a request to exclude the non-serving base station 2-2 from the E-DCH active set.

Hereafter, a concrete description of a processing unit of the mobile terminal 1, that of a base station 2, and that of the radio network controller 3 will be explained in detail.

Figure 20:
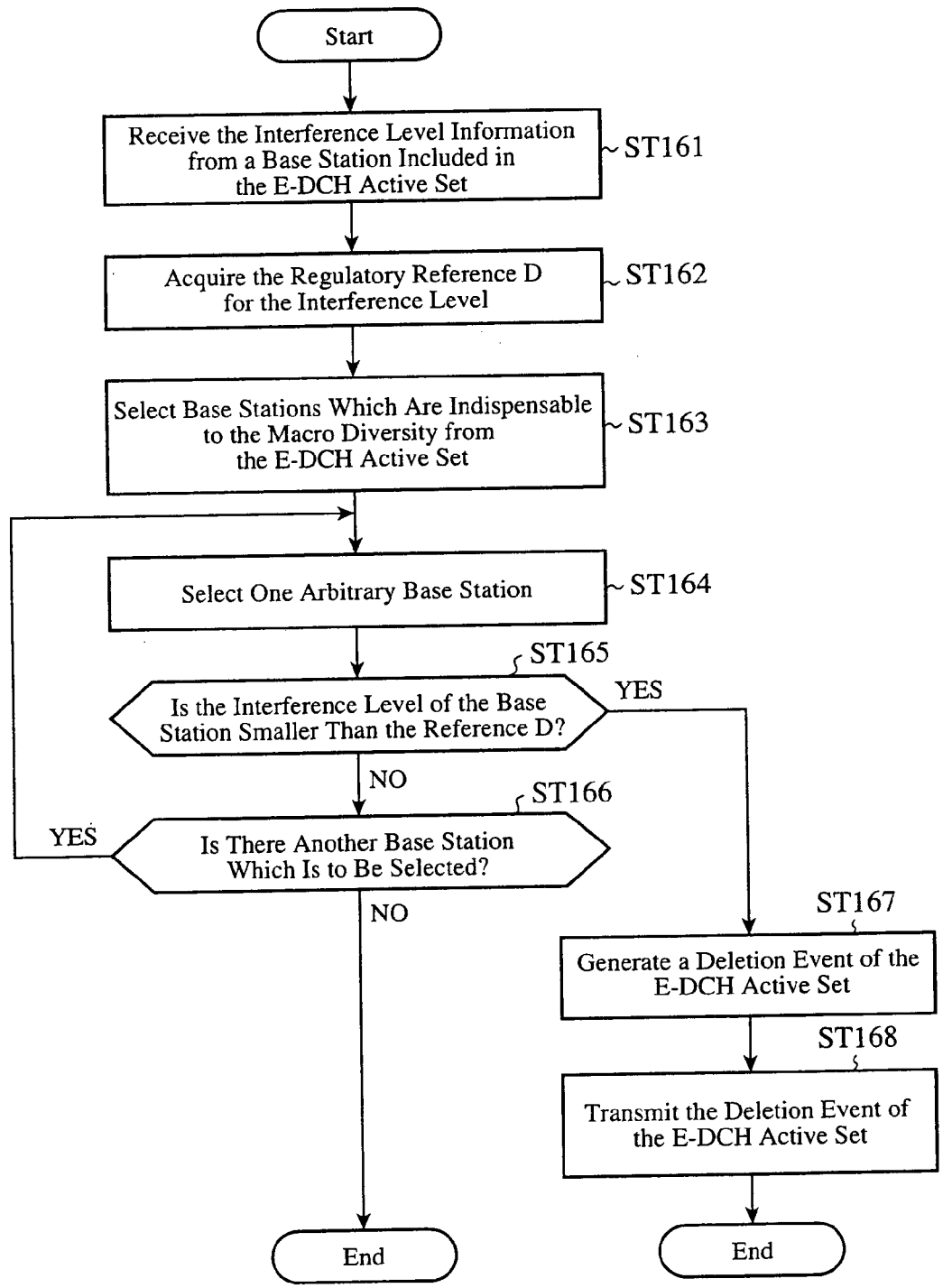
FIG. 20 is a flow chart showing a process of determining whether to exclude a base station from the E-DCH active set, which is carried out by the mobile terminal.
Figure 21:
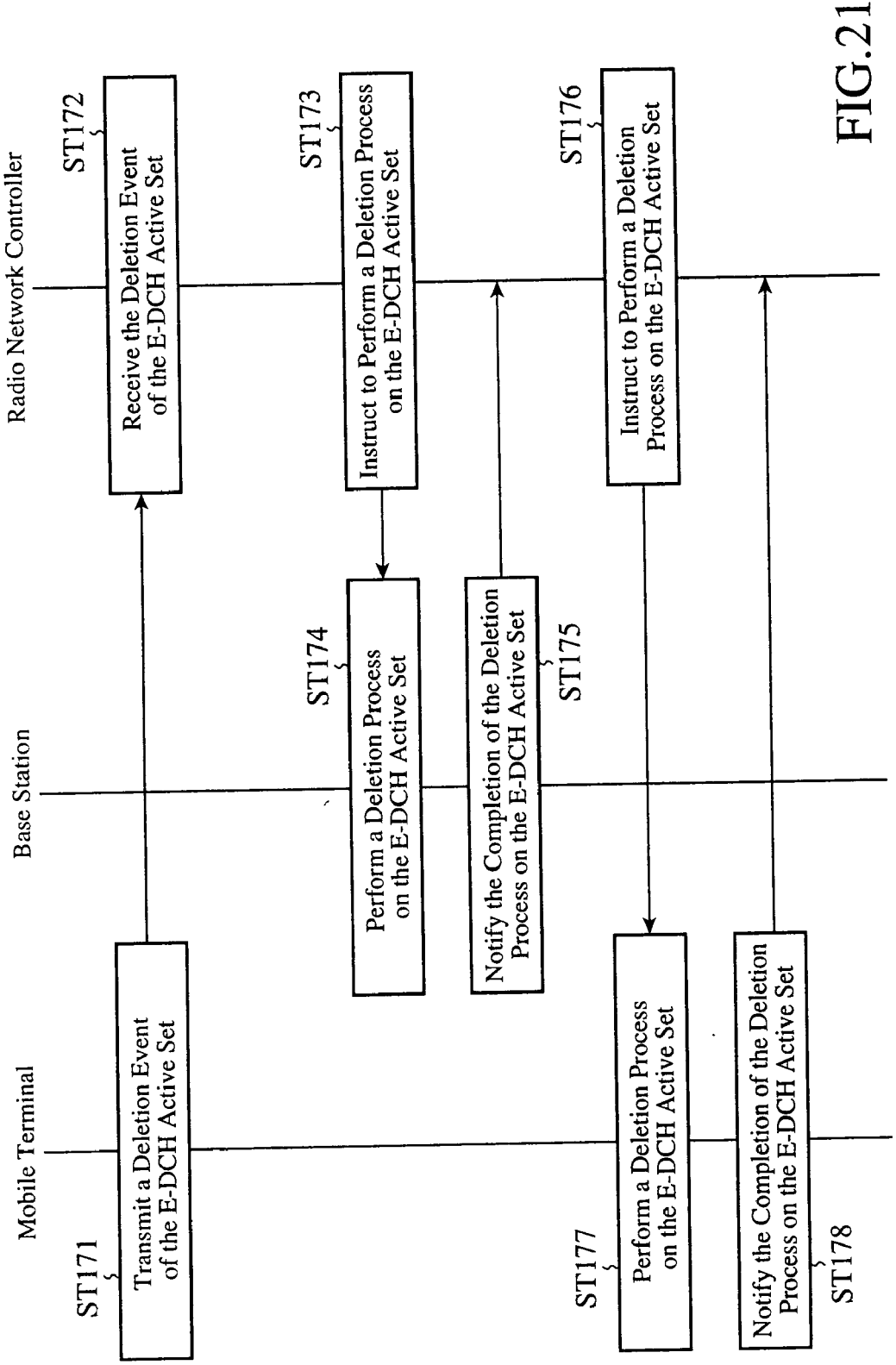
FIG. 21 is a sequence diagram showing a sequence of the mobile communications system.

FIG. 20 is a flow chart showing a process of determining whether to exclude a base station from the E-DCH active set, which is carried out by the mobile terminal, and FIG. 21 is a sequence diagram showing a sequence of the mobile communications system.

When the mobile terminal 1 judges whether to exclude, for example, the non-serving base station 2-2 from the E-DCH active set, the interference level of the non-serving base station 2-2 needs to be notified from the non-serving base station 2-2 to the mobile terminal 1.

The interference level measuring unit 65 of the non-serving base station 2-2 calculates the sum total of all the levels of interference in the non-serving base station 2-2 by measuring all the levels of interference, as shown in FIG. 9 (step ST11).

More specifically, the interference level measuring unit measures all the levels of interference by removing a signal component from the received signal on the basis of the receiving intensity outputted from the low noise amplifying unit 54 and the pilot in the received signal outputted from the demodulating unit 55.

When the interference level measuring unit 65 measures all the levels of interference, the interference level informing unit 68 of the non-serving base station 2-2 informs interference level information indicating all the levels of interference to the radio network controller 3 (step ST12).

When receiving the interference level information from the non-serving base station 2-2, the transmission control unit 82 of the radio network controller 3 notifies the interference level information to the mobile terminal 1 via the P-CCPCH transmitting unit 72 of the non-serving base station 2-2 (step ST13).

Thus, because the prior art R99 notification method can be used when notifying the interference level information to the mobile terminal via the radio network controller 3, there is provided an advantage of eliminating the necessity to add new equipment to the mobile terminal 1. As an alternative, the non-serving base station 2-2 can be so constructed as to notify the interference level information directly to the mobile terminal 1.

In the case in which the non-serving base station 2-2 notifies the interference level information directly to the mobile terminal 1, the interference level information can be notified to the mobile terminal quickly because it is not transmitted via the radio network controller 3.

In the above description, the non-serving base station 2-2 notifies the interference level information to the mobile terminal 1. As an alternative, the interference level measuring unit 65 of the non-serving base station 2-2 calculates an interference margin by subtracting the sum total of all the levels of interference from the maximum allowable power, and can notify the interference margin to the mobile terminal 1.

The P-CCPCH receiving unit 32 of the mobile terminal 1 receives the interference level information from each of all the base stations 2 included in the E-DCH active set (step ST161). In the example of FIG. 1, the P-CCPCH receiving unit receives the interference level information about the non-serving base station 2-2.

When the P-CCPCH receiving unit 32 receives the interference level information from the non-serving base station 2-2, the E-DCH active set control unit 38 of the mobile terminal 1 calculates a regulatory reference D for the interference level (which corresponds to the above-mentioned threshold D used as a judgment criterion) (step ST162).

In order to prevent the addition process and the exclusion process from being carried out frequently, the E-DCH active set control unit calculates the regulatory reference D different from the regulatory reference A for the interference level, which is shown in above-mentioned embodiment 1. More specifically, hysteresis can be introduced between the regulatory reference A and the regulatory reference D, while the regulatory reference D can be made to be equal to the regulatory reference A.

After calculating the regulatory reference D for the interference level, the E-DCH active set control unit 38 of the mobile terminal 1 selects one or more base stations which are not indispensable to the macro diversity from among base stations 2 included in the E-DCH active set (step ST163). This method of selecting one or more base stations will be mentioned later. Hereafter, for the sake of simplicity, assume that the non-serving base station 2-2 is selected.

The E-DCH active set control unit 38 selects one base station 2 arbitrarily from one or more base stations 2 which are not indispensable (step ST164). In this case, for the sake of simplicity, assume that the E-DCH active set control unit selects the non-serving base station 2-2.

When selecting the non-serving base station 2-2, the E-DCH active set control unit 38 compares the interference level of the non-serving base station 2-2 with the regulatory reference D (step ST165).

When the interference level of the non-serving base station 2-2 is equal to or larger than the regulatory reference D, the E-DCH active set control unit 38 determines that it should not exclude the non-serving base station 2-2 from the E-DCH active set, and judges whether a yet-to-be-selected base station 2 exists in the one or more base stations 2 which are not indispensable (step ST166).

When no yet-to-be-selected base station 2 exists in the one or more base stations 2 which are not indispensable, the E-DCH active set control unit ends the processing, whereas when a yet-to-be-selected base station 2 exists in the one or more base stations 2 which are not indispensable, it carries out the processes of steps ST164 to ST165 repeatedly.

When the interference level of the non-serving base station 2-2 is less than the regulatory reference D, the E-DCH active set control unit 38 generates an exclusion event of making a request to exclude the non-serving base station 2-2 from the E-DCH active set (step ST167).

The DPCH transmitting unit 18 of the mobile terminal 1 transmits the exclusion event generated by the E-DCH active set control unit 38 to the radio network controller 3 (step ST168).

The mobile terminal 1 judges whether to exclude the non-serving base station 2-2 from the E-DCH active set on the basis of the interference level of the non-serving base station 2-2, as mentioned above. As an alternative, the mobile terminal can judge whether to exclude the non-serving base station 2-2 from the E-DCH active set on the basis of the interference level of the non-serving base station 2-2 and pseudo SIR.

Therefore, by judging whether to exclude the non-serving base station 2-2 from the E-DCH active set on the basis of not only the interference level of the non-serving base station 2-2 but also the pseudo SIR, the mobile terminal can exclude the non-serving base station 2-2 which it has judged in consideration of not only the interference level but also the reception quality from the E-DCH active set. As a result, both the control of the interference level and the macro diversity effect can be actualized.

In the case in which whether to exclude a non-serving base station from the E-DCH active set on the basis of the pseudo SIR is judged, the "interference level" in FIG. 20 is replaced by the "pseudo SIR."

However, because the pseudo SIR is a value which is obtained by dividing a pseudo uplink received signal by the interference level, the interference level decreases with increase in the pseudo SIR and therefore the direction of the inequality sign in step ST165 is reversed.

When the mobile terminal 1 transmits the exclusion event of excluding a non-serving base station from the E-DCH active set to the radio network controller 3 in the above-mentioned way (step ST171 of FIG. 21), the radio resources management unit 83 of the radio network controller 3 receives the exclusion event of excluding the non-serving base station from the E-DCH active set (step ST172).

When the radio resources management unit 83 receives the exclusion event of excluding the non-serving base station from the E-DCH active set, the transmission control unit 82 of the radio network controller 3 transmits an exclusion request to exclude the non-serving base station from the E-DCH active set to the non-serving base station 2-2 according to an instruction from the radio resources management unit 83 (step ST173).

When receiving the exclusion request to exclude the non-serving base station from the E-DCH active set from the radio network controller 3, the protocol processing unit 57 of the non-serving base station 2-2 carries out a process of excluding the non-serving base station from the E-DCH active set (step ST174).

Because the process of excluding the non-serving base station from the E-DCH active set is the same as the exclusion process caused by a replacement instruction, as explained in above-mentioned embodiment 1, the explanation of the exclusion process will be omitted hereafter.

After carrying out the process of excluding the non-serving base station from the E-DCH active set, the protocol processing unit 57 of the non-serving base station 2-2 notifies the completion of the exclusion process to the radio network controller 3 (step ST175).

When receiving the notification of the completion of the exclusion process from the non-serving base station 2-2, the transmission control unit 82 of the radio network controller 3 transmits an exclusion instruction for excluding the non-serving base station from the E-DCH active set to the mobile terminal 1 via the non-serving base station 2-2 (step ST176).

When the P-CCPCH receiving unit 32 receives the exclusion instruction for excluding the non-serving base station from the E-DCH active set from the radio network controller 3, the protocol processing unit 41 of the mobile terminal 1 carries out a process of excluding the non-serving base station from the E-DCH active set (step ST177).

Because the process of excluding the non-serving base station from the E-DCH active set is the same as the exclusion process caused by a replacement instruction, as explained in above-mentioned embodiment 1, the explanation of the exclusion process will be omitted hereafter.

After carrying out the process of excluding the non-serving base station from the E-DCH active set, the protocol processing unit 41 of the mobile terminal 1 notifies the completion of the exclusion process to the radio network controller 3 (step ST178).

As can be seen from the above description, in accordance with this embodiment 3, the mobile terminal 1 acquires the interference level of the non-serving base station 2-2 included in the E-DCH active set, and, when the interference level is smaller than the regulatory reference D, transmits a request to exclude the non-serving base station 2-2 from the E-DCH active set to the radio network controller 3 so that the radio network controller 3 excludes the non-serving base station 2-2 included in the E-DCH active set according to the request transmitted from the mobile terminal 1. Therefore, the present embodiment offers an advantage of being able to reduce the signaling load in the non-serving base station 2-2.

Embodiment 4

In above-mentioned embodiment 3, the unit which takes charge of judgment of whether to exclude a non-serving base station 2-2 having a margin for the interference level from the E-DCH active set is mobile terminal 1, as previously explained. As an alternative, the unit which takes charge of the judgment of whether to exclude a non-serving base station having a margin for the interference level from the E-DCH active set can be a base station 2.

Hereafter, a case in which the unit which takes charge of the judgment of whether to exclude a non-serving base station having a margin for the interference level from the E-DCH active set can be a base station 2 will be explained.

In the case in which the unit which takes charge of the judgment of whether to exclude a non-serving base station having a margin for the interference level from the E-DCH active set is a base station 2, because the base station 2 is already placed in a state in which it can receive E-DCH signals (data), the base station 2 can acquire the reception code power of E-DCH signals (data) transmitted from mobile terminal 1. Therefore, the base station 2 can acquire how much the interference level caused by the mobile terminal occupies the interference level exerted upon the whole base station.

Therefore, because the base station 2 can know mobile terminal 1 which has a large influence on the interference exerted upon the whole base station, it can remove the mobile terminal 1 from the E-DCH active set on a priority basis.

The base station 2 judges whether to exclude the base station itself from the E-DCH active set on the basis of the interference level exerted upon the local station and the code power of the mobile terminal 1.

In the case in which the unit which takes charge of the judgment of whether to exclude a non-serving base station having a margin for the interference level from the E-DCH active set is the base station 2, the base station does not need to signal the interference level to the mobile terminal 1, and there is provided an advantage of being able to correctly know how much the transmission power of the mobile terminal 1 has an influence upon the base station's end.

Figure 22:
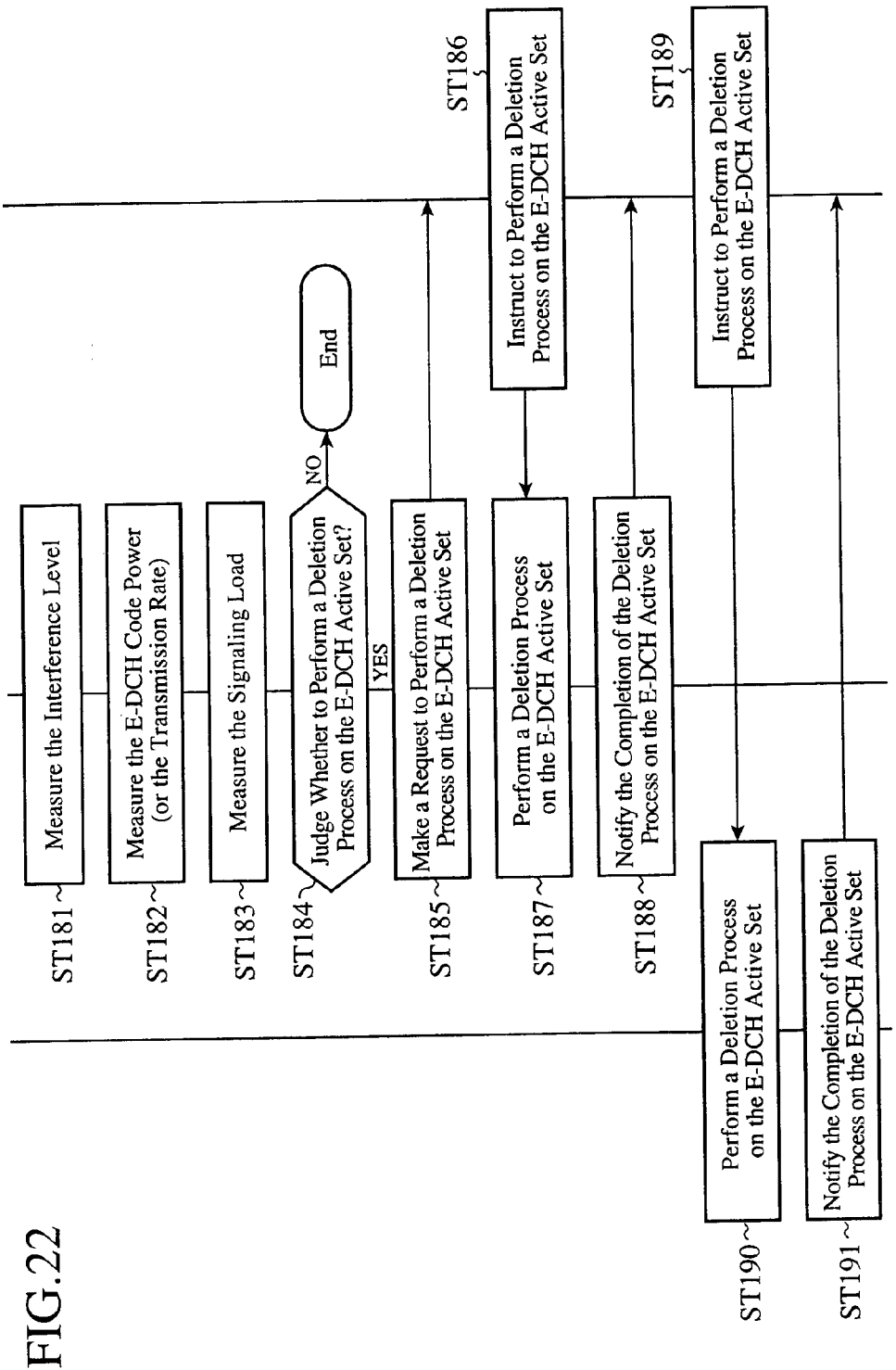
FIG. 22 is a sequence diagram showing a sequence of the mobile communications system at the time when the radio network controller provides an instruction for excluding a base station from the E-DCH active set.
Figure 23:
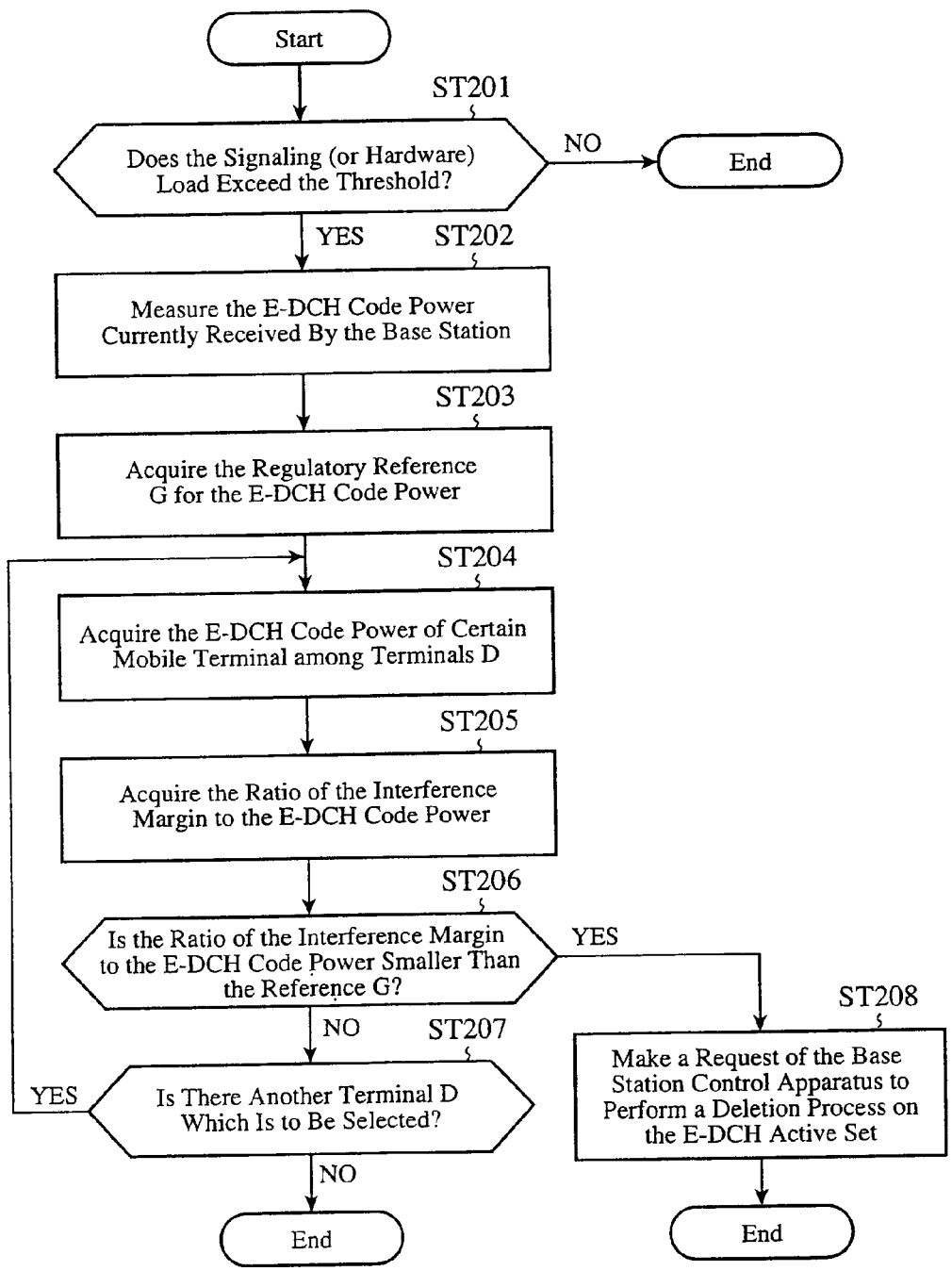
FIG. 23 is a flow chart showing a process of judging whether to exclude a local station from the E-DCH active set, which is carried out by the base station.

FIG. 22 is a sequence diagram showing a sequence of the mobile communications system at the time when the radio network controller 3 provides an instruction for excluding a base station from the E-DCH active set, and FIG. 23 is a flow chart showing a process of judging whether to exclude the local station from the E-DCH active set, which is carried out by the base station 2.

An interference level measuring unit 65 of a non-serving base station 2-2 included in the E-DCH active set measures the interference level (step ST181).

The interference level measuring unit 65 of the non-serving base station 2-2 measures the E-DCH code power (or the transmission rate) (step ST182).

A signaling measuring unit 79 of the non-serving base station 2-2 measures the signaling load (step ST183).

An E-DCH active set control unit 71 of the non-serving base station 2-2 judges whether to exclude the local station from the E-DCH active set on the basis of the interference level, E-DCH code power, and signaling load (step ST184). The details of the judgment process of judging whether to exclude the local station from the E-DCH active set will be explained later.

A protocol processing unit 57 of the non-serving base station 2-2 ends the processing when the judgment result of the E-DCH active set control unit 71 indicates that the local station should not be excluded from the E-DCH active set, whereas when the judgment result indicates that the local station should be excluded from the E-DCH active set, the protocol processing unit transmits a request to exclude the local station from the E-DCH active set to the radio network controller 3 (step ST185).

When receiving the exclusion request from the non-serving base station 2-2, a transmission control unit 82 of the radio network controller 3 transmits an exclusion instruction for excluding the non-serving base station 2-2 from the E-DCH active set to the non-serving base station 2-2 according to an instruction from a radio resources management unit 83 (step ST186).

When receiving the exclusion instruction for excluding the non-serving base station 2-2 from the E-DCH active set from the radio network controller 3, the protocol processing unit 57 of the non-serving base station 2-2 carries out a process of excluding the local station from the E-DCH active set (step ST187).

Because the process of excluding the local station from the E-DCH active set is the same as the exclusion process caused by a replacement instruction, as explained in above-mentioned embodiment 1, the explanation of the exclusion process will be omitted hereafter.

After carrying out the process of excluding the local station from the E-DCH active set, the protocol processing unit 57 of the non-serving base station 2-2 notifies the completion of the exclusion process to the radio network controller 3 (step ST188).

When receiving the notification of the completion of the exclusion process from the non-serving base station 2-2, the transmission control unit 82 of the radio network controller 3 transmits an exclusion instruction for excluding the non-serving base station 2-2 from the E-DCH active set to the mobile terminal 1 via the non-serving base station 2-2 (step ST189).

When a P-CCPCH receiving unit 32 receives the exclusion instructions for excluding the non-serving base station 2-2 from the E-DCH active set from the radio network controller 3, a protocol processing unit 41 of the mobile terminal 1 carries out an exclusion process of excluding the non-serving base station 2-2 from the E-DCH active set (step ST190).

Because the process of excluding the non-serving base station from the E-DCH active set is the same as the exclusion process caused by a replacement instruction, as explained in above-mentioned embodiment 1, the explanation of the exclusion process will be omitted hereafter.

After carrying out the exclusion process of excluding the non-serving base station from the E-DCH active set, the protocol processing unit 41 of the mobile terminal 1 notifies the completion of the exclusion process to the radio network controller 3 (step ST191).

Next, the process of judging whether to exclude the local station from the E-DCH active set which is carried out by the non-serving base station 2-2 (the process of step ST184 of FIG. 22) will be explained with reference to FIG. 23.

The signaling measuring unit 79 of the non-serving base station 2-2 included in the E-DCH active set measures the load of signaling AG, RG, and ACK/NACK, and then judges whether the signaling load exceeds an allowable maximum load (step ST201).

When the signaling load does not exceed the allowable maximum load, the non-serving base station 2-2 maintains the current active set.

When the signaling load exceeds the allowable maximum load, the interference level measuring unit 65 of the non-serving base station 2-2 measures the code power of E-DCH signals (data) which the local station is currently receiving (step ST202). One or more pieces of mobile terminal 1 which are transmitting packets to the non-serving base station via E-DCH are referred to as terminals D.

The E-DCH active set control unit 71 of the non-serving base station 2-2 calculates a regulatory reference G for the E-DCH code power (step ST203). As an alternative, it can be notified through signaling.

After calculating the regulatory reference G for the E-DCH code power, the E-DCH active set control unit 71 of the non-serving base station 2-2 selects one mobile terminal 1 arbitrarily from the terminals D, and acquires the E-DCH code power of the relevant mobile terminal 1 from the interference level measuring unit 65 (step ST204).

The E-DCH active set control unit 71 also acquires the interference level of the relevant mobile terminal 1 from the interference level measuring unit 65. For example, the E-DCH active set control unit subtracts the interference level or the like from the allowable transmission power (maximum power) of the non-serving base station 2-2 so as to calculate an interference margin, and then calculates the ratio of the interference margin to the E-DCH code power (step ST205).

After calculating the ratio of the interference margin to the E-DCH code power, the E-DCH active set control unit 71 compares the ratio with the regulatory reference G (step ST206).

When the ratio exceeds the regulatory reference G, the E-DCH active set control unit 71 maintains the current E-DCH active set, and judges whether yet-to-be-selected mobile terminal 1 exists in the terminals D (step ST207).

When no yet-to-be-selected mobile terminal 1 exists in the terminals D, the E-DCH active set control unit ends the processing, whereas when yet-to-be-selected mobile terminal 1 exists in the terminals D, it carries out the processes of steps ST204 to ST206 repeatedly.

When the ratio is smaller than the regulatory reference G, the E-DCH active set control unit 71 transmits a request to exclude the local station from the E-DCH active set to the radio network controller 3 (step ST208).

As can be seen from the above description, in accordance with this embodiment 4, when the interference level is smaller than a predetermined (given) threshold, the non-serving base station 2-2 transmits a request to exclude the local station from the E-DCH active set to the radio network controller 3, and the radio network controller 3 excludes the non-serving base station 2-2 from the E-DCH active set according to the request transmitted from the non-serving base station 2-2. Therefore, the present embodiment offers an advantage of being able to reduce the signaling load in the non-serving base station 2-2.

Embodiment 5

In above-mentioned embodiments 1 to 4, a base station 2 which becomes a non-serving base station is selected on the basis of the interference level in the base station 2, as previously explained. As an alternative, a base station having a great macro diversity effect can be changed to a non-serving base station.

This embodiment 5 thus focuses attention on a macro diversity effect which is another role of a non-serving base station.

Even if substantially the same path loss occurs, the received signal can vary under the influence of geographical features and buildings. Such a variation is called shadowing, and is also called logarithmic regular fading because the received signal has a probability density function having a log normal distribution (Log-Normal).

In order to deal with such fading, there is a necessity to select a base station having a small space correlation with other base stations as a non-serving base station.

[Explanation of Macroscopic Selective Combining]

In macro diversity, data transmitted from mobile terminal 1 is received by two or more base stations 2, and a radio network controller 3 selects received data whose decoded result shows "CRC OK".

In macro selective combining, even if a reception result from a serving base station 2-1 indicates NACK, data can be received if a reception result from a non-serving base station 2-2 indicates ACK. Therefore, in the case of selecting a non-serving base station, it is desirable to select a non-serving base station which has transmitted a reception result indicating ACK when a reception result from a serving base station indicates NACK.

In this embodiment 5, the important matter is how to get to know a correlation among base stations.

Because it takes much time to reflect such a space correlation for a path loss which is averaged for a long time, the judgment is carried out using a space correlation in which a quicker variation in the transmission line is reflected.

In order to know such a space correlation among base stations in which a quicker variation in the transmission line is reflected, it is possible to use the instantaneous reception level of CPICH and a response signal (ACK/NACK) transmitted from each base station.

Figure 24:
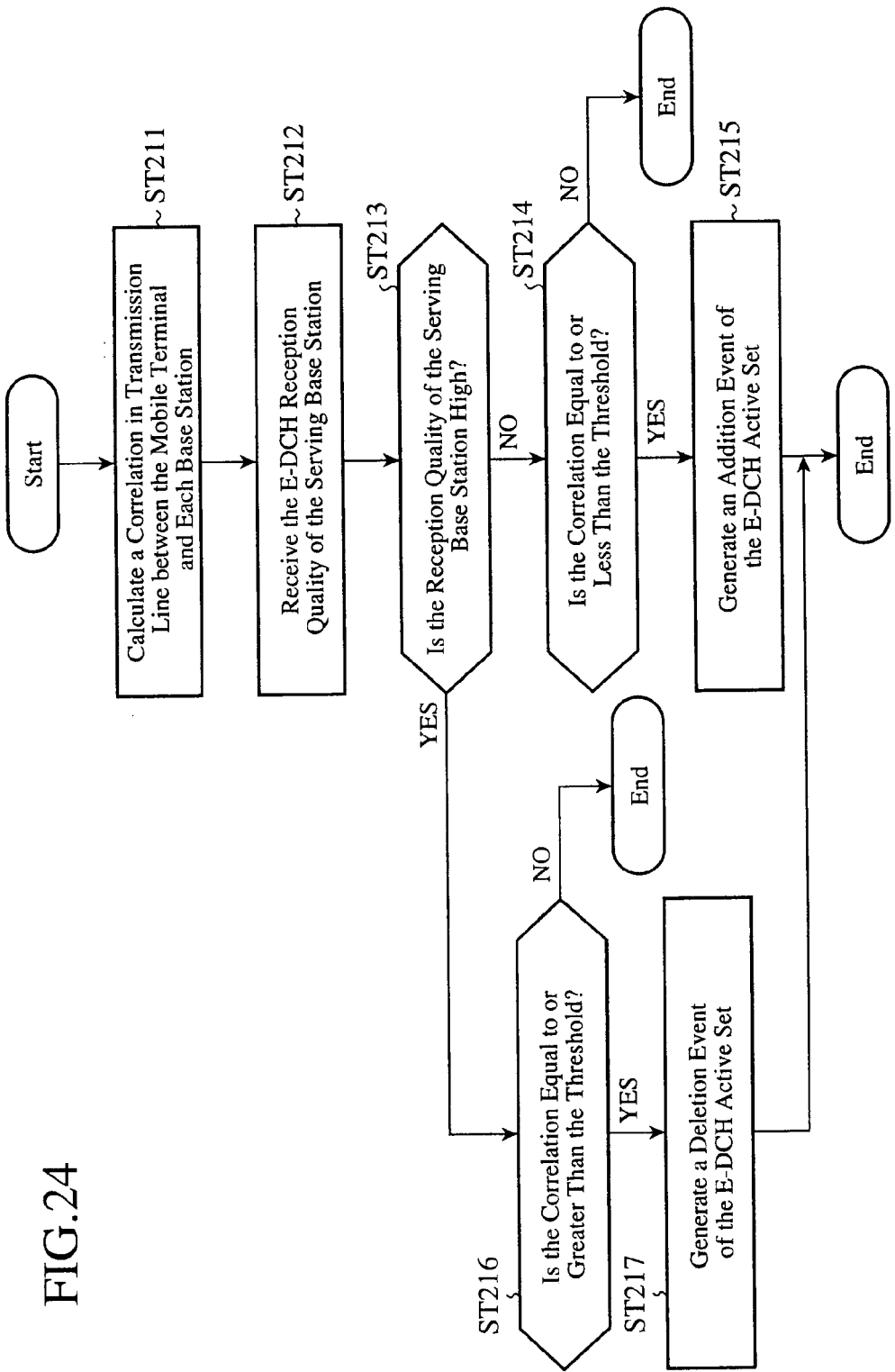
FIG. 24 is a flow chart showing a process of changing the E-DCH active set in consideration of a macro diversity effect.

FIG. 24 is a flow chart showing a process of changing an E-DCH active set in consideration of the macro diversity effect. FIG. 24 is common to a case in which the unit which takes charge of the judgment is mobile terminal 1, and a case where in which the unit which takes charge of the judgment is the radio network controller 3.

The unit which takes charge of the judgment (i.e., mobile terminal 1 or the radio network controller 3) calculates a correlation in the transmission line between the mobile terminal 1 and each base station 2 (step ST211). For example, a correlation calculating unit 36 (or a response signal counting unit 37) of the mobile terminal 1, which is a correlation calculating means, calculates the correlation in the transmission line between the mobile terminal 1 and each base station 2.

The unit which takes charge of the judgment (i.e., the mobile terminal 1 or radio network controller 3) receives the E-DCH reception quality of the serving base station 2-1 (step ST212).

An E-DCH active set control unit 38 or the like of the unit which takes charge of the judgment judges whether the reception quality of the serving base station 2-1 is higher than a predetermined (given) threshold (step ST213).

When the reception quality of the serving base station 2-1 is higher than the predetermined (given) threshold, because the E-DCH active set control unit 38 or the like of the unit which takes charge of the judgment does not need to use the macro diversity, the E-DCH active set control unit does not need to add the non-serving base station, and judges the necessity to exclude an existing non-serving base station.

In contrast, when the reception quality of the serving base station 2-1 is lower than the predetermined (given) threshold, because the E-DCH active set control unit needs to use the macro diversity, it does not exclude any existing non-serving base station, but judges the necessity to add the non-serving base station.

When no serving base station exists, the E-DCH active set control unit does not carry out the processes of steps ST212 and ST213, but shifts from the process of step ST211 to a process of ST214.

When the reception quality of the serving base station 2-1 is lower than the predetermined (given) threshold, the E-DCH active set control unit 38 or the like of the unit which takes charge of the judgment judges whether or not the correlation in the transmission line is less than a predetermined (given) threshold (or whether or not the correlation in the transmission line is an opposite correlation) (step ST214).

The threshold can be notified through calculation or signaling.

When the correlation in the transmission line exceeds the predetermined (given) threshold, the E-DCH active set control unit 38 or the like of the unit which takes charge of the judgment does not add the non-serving base station, but maintains the current E-DCH active set and ends the processing because the correlation in the transmission line is high and the macro diversity effect cannot be expected.

When the judgment result of the E-DCH active set control unit 38 or the like indicates that the correlation in the transmission line is equal to or less than the predetermined (given) threshold, because the correlation in the transmission line is low and the macro diversity effect can be expected, the protocol processing unit 41 of the mobile terminal 1 generates an addition event of adding the non-serving base station to the E-DCH active set (step ST215).

When the reception quality of the serving base station 2-1 is higher than the predetermined (given) threshold, the E-DCH active set control unit 38 or the like of the unit which takes charge of the judgment judges whether or not the correlation in the transmission line is equal to or greater than the predetermined (given) threshold (step ST216).

The threshold can be notified through calculation or signaling.

When the correlation in the transmission line is less than the predetermined (given) threshold, because the correlation in the transmission line is low and the macro diversity effect can be expected, the E-DCH active set control unit 38 or the like of the unit which takes charge of the judgment does not exclude the non-serving base station, but maintains the current E-DCH active set and ends the processing.

When the judgment result of the E-DCH active set control unit 38 or the like indicates that the correlation in the transmission line is equal to or greater than the predetermined (given) threshold, because the correlation in the transmission line is high and the macro diversity effect cannot be expected, the protocol processing unit 41 of the mobile terminal 1 generates an exclusion event of excluding the non-serving base station from the E-DCH active set (step ST217).

Next, an example in which the mobile terminal 1 takes charge of the judgment to add a base station to the E-DCH active set will be explained in detail.

Hereafter, assume that the mobile terminal selects abase station 2 which is to be added to the E-DCH active set from the reception quality of the serving base station 2-1 and a correlation between the mobile terminal and the serving base station 2-1. For the serving base station 2-1 having a bad reception quality, a base station 2 having a low correlation among base stations 2 included in the prior art active set becomes a non-serving base station.

When a base station is added to the E-DCH active set, because E-DCH has not yet been placed in a reception state, a correlation between base stations is acquired using the reception level of CPICH and the macro diversity effect is judged. In this method of judging whether or not there is a correlation between base stations using the reception level of CPICH, although either the mobile terminal 1 or a base station 2 can take charge of the judgment, it is desirable that the mobile terminal 1 takes charge of the judgment because the measurement of the CPCH reception level is carried out by the mobile terminal 1.

Even a base station 2 can take charge of the judgment by notifying the CPICH reception level from the mobile terminal 1 to the base station 2, though a detailed explanation will be omitted hereafter. However, the case in which a base station 2 judges the correlation is not suitable because a delay occurs when the transmission line is changed at a high speed.

In the case in which a base station 2 judges the correlation, an average of the CPICH level measured by a terminal must be notified to the base station, and therefore the judgment by the base station cannot respond to a high-speed variation in the CPICH level.

In contrast, in the case in which a mobile terminal judges the correlation, it can use an instantaneous variation in the CPICH level for the judgment. For example, CPICH EC/NO or the like can be used as the CPICH signal (data)'s instantaneous level (EC/NO is an abbreviation for "Received energy per chip divided by the power density in the band", and is the ratio of energy per chip to the noise component in the band, and shows the instantaneous intensity of CPICH).

Figure 25:
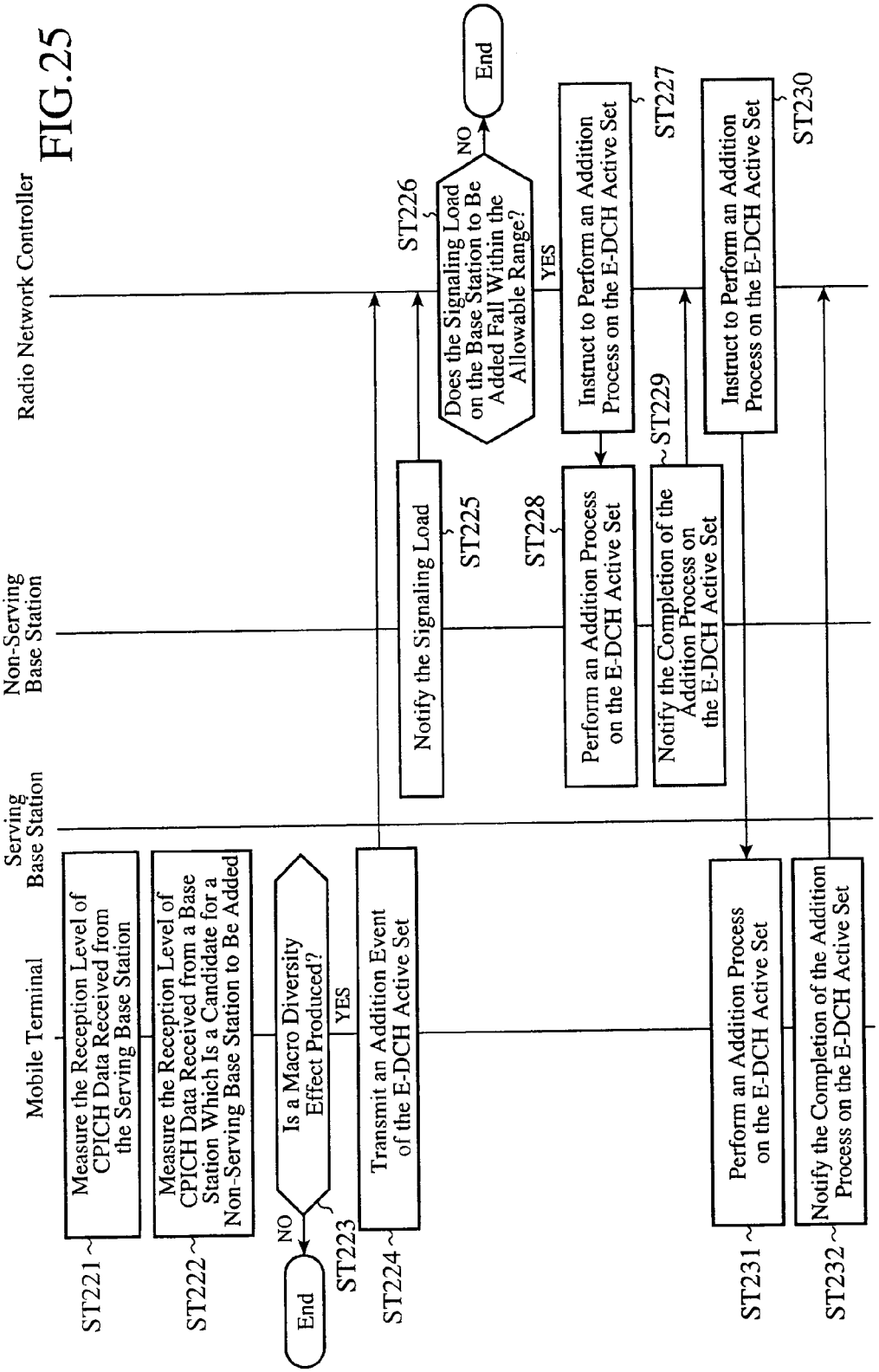
FIG. 25 is a sequence diagram showing a sequence of the mobile communications system at the time of adding a base station to the E-DCH active set.
Figure 26:
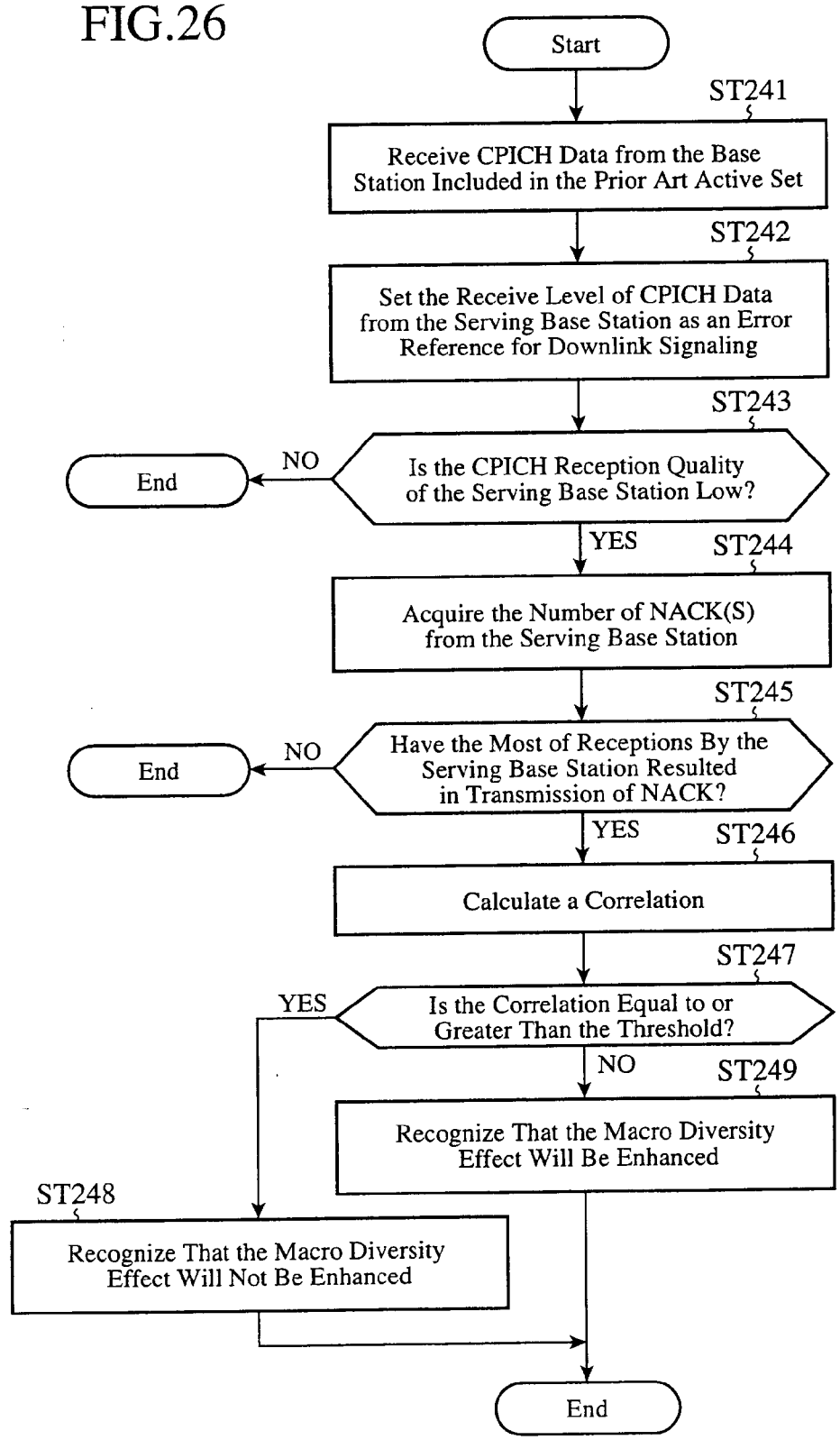
FIG. 26 is a flow chart showing a process of judging whether to enhance the macro diversity effect, which is carried out by the mobile terminal.

FIG. 25 is a sequence diagram showing a sequence of the mobile communications system at the time of adding a base station to the E-DCH active set, and FIG. 26 is a flow chart showing a process of judging whether to enhance the macro diversity effect, which is carried out by the mobile terminal 1.

A CPICH receiving unit 28 of the mobile terminal 1 measures the reception level of CPICH transmitted from the serving base station 2-1 (step ST221).

The CPICH receiving unit 28 of the mobile terminal 1 measures the reception level of CPICH transmitted from a base station 2-3 which is a candidate for a non-serving base station to be added (step ST222).

The E-DCH active set control unit 38 of the mobile terminal 1 judges whether the base station 2-3 which is a candidate for a non-serving base station to be added enhances the macro diversity effect on the basis of the reception level of CPICH measured by the CPICH receiving unit 28 (step ST223). The process of judging whether a base station enhances the macro diversity effect will be mentioned later.

When the judgment result of the E-DCH active set control unit 38 indicates that the macro diversity effect will not be enhanced, a DPCH transmitting unit 18 of mobile terminal 1 maintains the current E-DCH active set, and ends the processing. When the judgment result of the E-DCH active set control unit 38 indicates that the macro diversity effect will be enhanced, the DPCH transmitting unit transmits an addition event of making a request to add the base station 2-3 which is a candidate for a non-serving base station to be added to the E-DCH active set to the radio network controller 3 (step ST224).

A protocol processing unit 57 of the base station 2-3 which is a candidate for a non-serving base station to be added transmits a signaling load measured by a signaling measuring unit 79 to the radio network controller 3 (step ST225).

When receiving the signaling load from the base station 2-3, an E-DCH active set control unit 92 of the radio network controller 3 judges whether the signaling load falls within an allowable range (step ST226).

When the signaling load of the base station 2-3 does not fall within the allowable range, the E-DCH active set control unit 92 of the radio network controller 3 maintains the current E-DCH active set and ends the processing because it cannot add the base station 2-3 to the E-DCH active set.

When the judgment result of the E-DCH active set control unit 92 indicates that the signaling load of the base station 2-3 falls within the allowable range, a transmission control unit 82 of the radio network controller 3 transmits an addition instruction for adding the base station 2-3 to the E-DCH active set to the base station 2-3 (step ST227).

When receiving the addition instruction for adding the base station 2-3 to the E-DCH active set from the radio network controller 3, the protocol processing unit 57 of the base station 2-3 carries out a process of adding the base station 2-3 to the E-DCH active set, like that of above-mentioned embodiment 1 (step ST228).

After carrying out the process of adding the base station 2-3 to the E-DCH active set, the protocol processing unit 57 of the base station 2-3 notifies the completion of the addition process to the radio network controller 3 (step ST229).

When receiving the notification of the completion of the addition process from the base station 2-3, the transmission control unit 82 of the radio network controller 3 transmits an addition instruction for adding the base station to the E-DCH active set to the mobile terminal 1 via the base station 2-3 (step ST230).

When a P-CCPCH receiving unit 32 receives the addition instruction for adding the base station to the E-DCH active set from the radio network controller 3, the protocol processing unit 41 of the mobile terminal 1 carries out a process of adding the base station to the E-DCH active set (step ST231), and notifies the completion of the addition process to the radio network controller 3 (step ST232), like that of above-mentioned embodiment 1.

Next, the process of judging whether the macro diversity effect is enhanced (the process of step ST223 shown in FIG. 25) which is carried out by the mobile terminal 1 will be explained with reference to FIG. 26.

The CPICH receiving unit 28 of the mobile terminal 1 measures the reception level of CPICH signals (data) transmitted from a base station included in a prior art active set (step ST241).

The CPICH receiving unit 28 of the mobile terminal 1 also measures the reception level of CPICH signals (data) transmitted from the serving base station 2-1.

When the CPICH receiving unit 28 measures the reception level of CPICH signals (data) from the serving base station 2-1, the E-DCH active set control unit 38 of the mobile terminal 1 defines the reception level of CPICH as an error reference for downlink signaling (step ST242).

The E-DCH active set control unit 38 of the mobile terminal 1 compares the reception level of CPICH from the serving base station 2-1 with a predetermined (given) threshold (step ST243).

When the reception level of CPICH is higher than the predetermined (given) threshold, the E-DCH active set control unit 38 determines that the mobile terminal can receive E-DCH signals (data) only from the serving base station 2-1 and ends the processing without adding any non-serving base station.

When the comparison result of the E-DCH active set control unit 38 indicates that the reception level of CPICH is lower than the predetermined (given) threshold, a response signal counting unit 37 of the mobile terminal 1 acquires ACK/NACK which is a response signal of the serving base station 2-1 from an E-HICH receiving unit 26, and counts the number of NACK(s) within a fixed time period (step ST244).

After the response signal counting unit 37 counts the number of NACK(s) within a fixed time period, the E-DCH active set control unit 38 of the mobile terminal 1 compares the number of NACK(s) with a predetermined (given) threshold (step ST245).

The threshold is calculated through signaling or calculated by the E-DCH active set control unit 38.

When the number of NACK(s) is smaller than the predetermined (given) threshold, the E-DCH active set control unit 38 determines that the mobile terminal can receive E-DCH signals (data) only from the serving base station 2-1 and ends the processing without adding any non-serving base station.

Steps ST244 and ST245 are applied only when the serving base station 2-1 is already set up.

A correlation calculating unit 36 of the mobile terminal calculates a correlation from covariance between the reception level of CPICH from the serving base station 2-1 and the reception level of CPICH from the base station 2-3 which is a candidate for a non-serving base station (step ST246).

After the correlation calculating unit 36 calculates the correlation, the E-DCH active set control unit 38 of the mobile terminal 1 compares the correlation with a predetermined (given) threshold (step ST247).

The threshold can be calculated through signaling or calculated by the E-DCH active set control unit 38.

When the correlation is equal to or greater than the predetermined (given) threshold, the E-DCH active set control unit 38 of the mobile terminal 1 recognizes that the macro diversity effect will not be enhanced even if it adds the base station 2-3 which is a candidate for a non-serving base station to the E-DCH active set (step ST248). In contrast, when the correlation is smaller than the predetermined (given) threshold, the E-DCH active set control unit recognizes that the macro diversity effect will be enhanced if the base station 2-3 which is a non-serving candidate is added to the E-DCH active set (step ST249).

As can be seen from the above description, in accordance with this embodiment 5, when the correlation between the serving base station 2-1 and the base station 2-3 is low, the base station 2-3 is changed to a non-serving base station. Therefore, the present embodiment offers an advantage of being able to enhance the macro diversity effect.

Embodiment 6

In above-mentioned embodiment 5, when the correlation between the serving base station 2-1 and the base station 2-3 is low, the base station 2-3 is changed to a non-serving base station, as previously explained. As an alternative, when the correlation between the serving base station 2-1 and the non-serving base station 2-2 is high, the non-serving base station 2-2 can be excluded from the E-DCH active set.

Hereafter, on the basis of the reception quality of the serving base station 2-1, and the correlation with the serving base station 2-1, a non-serving base station which is to be excluded from the E-DCH active set is selected. More specifically, for the serving base station 2-1 having a good reception quality, a non-serving base station having a high correlation is excluded from the E-DCH active set.

[The Reason why ACK/NACK is Used for the Judgment of the Correlation]

When checking to see a correlation between base stations, the reception level of CPICH can be used, though the number of ACK(s)/NACK(s) transmitted from a base station 2 can be alternatively used.

Although whether there is any correlation in the quality of the downlink transmission line can be checked with the reception level of CPICH, it is unknown whether there is any correlation in the quality of the uplink transmission line with the reception level of CPICH.

In contrast, because ACK/NACK is a response signal which is generated by a base station 2 in response to a result of reception of data transmitted from mobile terminal 1, and the result reflects not only the quality of the downlink transmission line but also the quality of the uplink transmission line, a correlation in E-DCH between base stations can be checked with ACK/NACK.

When a base station is added to the E-DCH active set, the judgment of the correlation is carried out using the reception level of CPICH because results of ACK/NACK cannot be obtained. When a base station is excluded from the E-DCH active set, the judgment of the correlation is carried out more ideally on the basis of ACK/NACK.

Next, an example in which the mobile terminal 1 takes charge of the judgment to exclude a base station from the E-DCH active set will be explained in detail.

Figure 27:
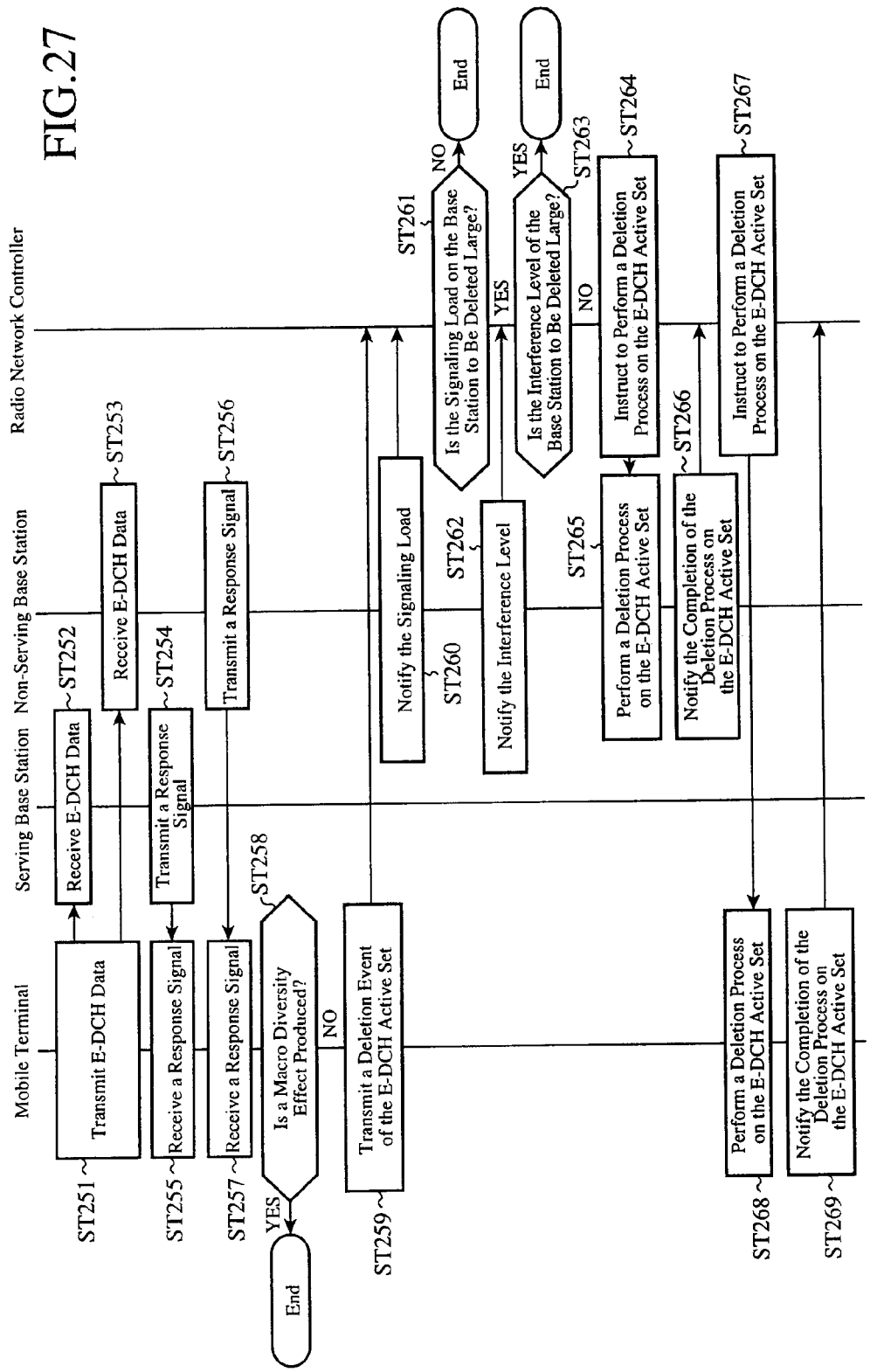
FIG. 27 is a sequence diagram showing a sequence of the mobile communications system at the time of excluding a base station from the E-DCH active set.
Figure 28:
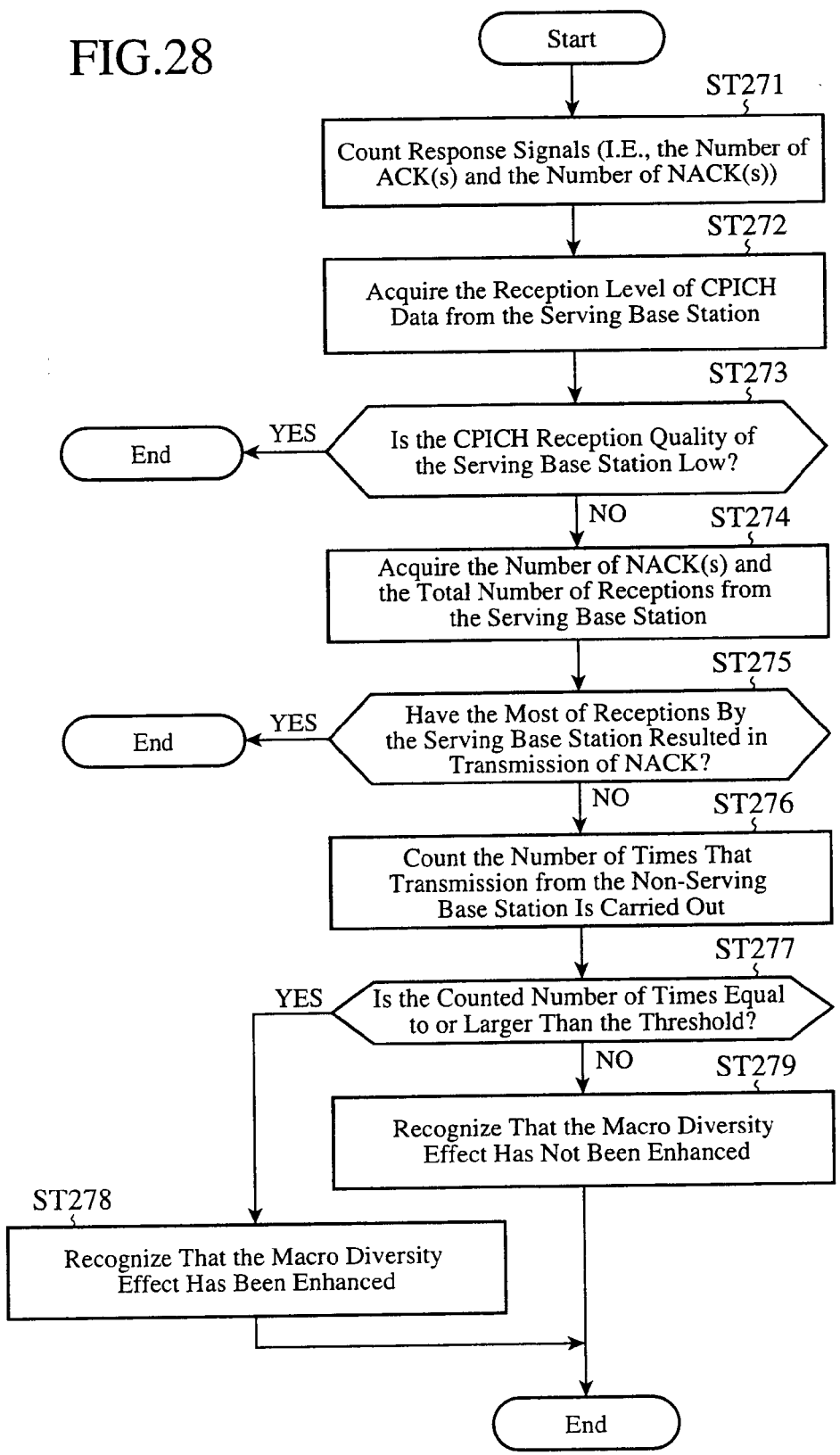
FIG. 28 is a flow chart showing a process of judging whether the macro diversity effect is enhanced, which is carried out by the mobile terminal.

FIG. 27 is a sequence diagram showing a sequence of the mobile communications system at the time of excluding a base station from the E-DCH active set, and FIG. 28 is a flow chart showing a process of judging whether the macro diversity effect is enhanced, which is carried out by the mobile terminal 1.

An E-DCH transmitting unit 24 of the mobile terminal 1 transmits E-DCH signals (data) to each base station 2 included in the E-DCH active set (step ST251).

An E-DPDCH receiving unit 62 of the serving base station 2-1 included in the E-DCH active set receives the E-DCH signals (data) transmitted from the mobile terminal 1 (step ST252).

An E-DPDCH receiving unit 62 of the non-serving base station 2-2 included in the E-DCH active set also receives the E-DCH signals (data) transmitted from the mobile terminal 1 (step ST253).

When the E-DPDCH receiving unit 62 receives the E-DCH signals (data) from the mobile terminal 1, an E-HICH transmitting unit 78 of the serving base station 2-1 transmits ACK/NACK to the mobile terminal 1 as a response signal based on a result of the reception of the E-DCH signals (data) (step ST254).

When the E-DPDCH receiving unit 62 receives the E-DCH signals (data) from the mobile terminal 1, an E-HICH transmitting unit 78 of the non-serving base station 2-2 also transmits ACK/NACK to the mobile terminal 1 as a response signal based on a result of the reception of the E-DCH signals (data) (step ST256).

An E-HICH receiving unit 26 of the mobile terminal 1 receives both ACK/NACK transmitted from the serving base station 2-1 and ACK/NACK transmitted from the non-serving base station 2-2 (steps ST255 and ST257).

An E-DCH active set control unit 38 of the mobile terminal 1 judges whether the non-serving base station 2-2 has enhanced the macro diversity effect on the basis of ACK/NACK measured by the E-HICH receiving unit 26 (step ST258). The process of judging whether the non-serving base station has enhanced the macro diversity effect will be mentioned later.

When the judgment result of the E-DCH active set control unit 38 indicates that the non-serving base station has enhanced the macro diversity effect, a DPCH transmitting unit 18 of the mobile terminal 1 maintains the current E-DCH active set and ends the processing. In contrast, when the judgment result of the E-DCH active set control unit 38 does not indicate that the non-serving base station has enhanced the macro diversity effect, the DPCH transmitting unit transmits an exclusion event of making a request to exclude the non-serving base station 2-2 from the E-DCH active set to the radio network controller 3 (step ST259).

A protocol processing unit 57 of the non-serving base station 2-2 transmits a signaling load measured by a signaling measuring unit 79 to the radio network controller 3 (step ST260).

When receiving the signaling load from the non-serving base station 2-2, an E-DCH active set control unit 92 of the radio network controller 3 compares the signaling load with a predetermined (given) threshold (step ST262).

When the signaling load of the base station 2-3 is smaller than the predetermined (given) threshold, the E-DCH active set control unit 92 of the radio network controller 3 maintains the current E-DCH active set and ends the processing because there is a margin for the signaling load and it is not necessary to exclude the non-serving base station 2-2 from the E-DCH active set.

An interference level informing unit 68 of the non-serving base station 2-2 transmits the interference level measured by an interference level measuring unit 65 to the radio network controller 3 (step ST262).

As an alternative, the interference level informing unit can notify the interference level to the mobile terminal 1 other than to the radio network controller 3.

When receiving the interference level from the non-serving base station 2-2, the E-DCH active set control unit 92 of the radio network controller 3 compares the interference level with a predetermined (given) threshold (step ST263). The threshold is the same as the regulatory reference D shown in above-mentioned embodiment 3.

When the interference level of the non-serving base station 2-2 is larger than the predetermined (given) threshold, the E-DCH active set control unit 92 of the radio network controller 3 maintains the current E-DCH active set and ends the processing because there is no margin for the interference level and the non-serving base station is required to carry out power control.

When the interference level of the non-serving base station 2-2 is smaller than the predetermined (given) threshold, a transmission control unit 82 of the radio network controller transmits an exclusion instruction for excluding the non-serving base station 2-2 from the E-DCH active set to the non-serving base station 2-2 because there is a margin for the interference level and the non-serving base station is required to carry out power control (step ST264).

When receiving the exclusion instruction for excluding the non-serving base station 2-2 from the E-DCH active set from the radio network controller 3, the protocol processing unit 57 of the non-serving base station 2-2 carries out a process of excluding the non-serving base station 2-2 from the E-DCH active set, like that of above-mentioned embodiment 3 (step ST265).

After carrying out the exclusion process of excluding the non-serving base station 2-2 from the E-DCH active set, the protocol processing unit 57 of the non-serving base station 2-2 notifies the completion of the exclusion process to the radio network controller 3 (step ST266).

When receiving the notification of the completion of the exclusion process from the non-serving base station 2-2, the transmission control unit 82 of the radio network controller transmits an exclusion instruction for excluding the non-serving base station 2-2 from the E-DCH active set to the mobile terminal 1 via the non-serving base station 2-2 (step ST267).

When a P-CCPCH receiving unit 32 receives the exclusion instruction for excluding the non-serving base station 2-2 from the E-DCH active set from the radio network controller 3, a protocol processing unit 41 of the mobile terminal 1 carries out a process of excluding the non-serving base station 2-2 from the E-DCH active set, like that of above-mentioned embodiment 3 (step ST268).

After carrying out the exclusion process of excluding the non-serving base station 2-2 from the E-DCH active set, the protocol processing unit 41 of the mobile terminal 1 notifies the completion of the exclusion process to the radio network controller 3 (step ST269).

Next, the process of judging whether the macro diversity effect is enhanced (the process of step ST258 shown in FIG.

27), which is carried out by the mobile terminal 1, will be explained with reference to FIG. 28.

A response signal counting unit 37 of the mobile terminal 1 counts ACK/NACK (s) transmitted from the serving base station 2-1 and also counts ACK/NACK (s) transmitted from the non-serving base station 2-2 (step ST271).

A CPICH receiving unit 28 of the mobile terminal 1 measures the reception level of CPICH signals (data) transmitted from the serving base station 2-1 (step ST272). This reception level of CPICH means the quality of the downlink transmission line, and is used to check to see the extent of errors which occur in downlink signaling.

The E-DCH active set control unit 38 of the mobile terminal 1 compares the reception level of CPICH from the serving base station 2-1 with a predetermined (given) threshold (step ST273).

When the reception level of CPICH is lower than the predetermined (given) threshold, the E-DCH active set control unit 38 ends the processing without excluding the non-serving base station 2-2 from the E-DCH active set because the reliability of the response signal of the serving base station 2-1 can be low. That is, it is desirable for the mobile terminal 1 to receive data correctly in response to ACK from the non-serving base station 2-2 even when the mobile terminal 1 assumes that the reception judgment result from the serving base station 2-1 shows NACK due to degradation in the transmission line even though the serving base station 2-1 has actually transmitted ACK. Therefore, the mobile terminal does not exclude the non-serving base station 2-2 from the E-DCH active set.

When the comparison result of the E-DCH active set control unit 38 indicates that the reception level of CPICH is higher than the predetermined (given) threshold, the response signal counting unit 37 of the mobile terminal 1 calculates the number of NACK(s) and the total number of receptions by acquiring ACK/NACK which is a response signal from the serving base station 2-1 from the E-HICH receiving unit 26 (step ST274).

The number of NACK(s) and the total number of receptions mean the extent of errors which occur in the uplink quality under the condition that the downlink quality is good.

When the response signal counting unit 37 calculates the number of NACK(s) and the total number of receptions, the E-DCH active set control unit 38 of the mobile terminal 1 compares the number of NACK(s) or the total number of receptions with a predetermined (given) threshold (step ST275).

The threshold can be calculated through signaling or calculated by the E-DCH active set control unit 38.

When the number of NACK(s) or the total number of receptions is larger than the predetermined (given) threshold, the E-DCH active set control unit 38 ends the processing without excluding the non-serving base station from the E-DCH active set because the quality of the serving base station 2-1 is low. In this case, although it is desirable to replace the serving base station 2-1 with another base station having a good uplink quality, the E-DCH active set control unit dose not exclude the non-serving base station 2-2 because it takes much time to carry out the replacement process.

In the case in which the number of NACK(s) or the total number of receptions is smaller than the predetermined (given) threshold, the response signal counting unit 37 of the mobile terminal 1 counts the number of ACK(s) which have been transmitted from the non-serving base station 2-2 when NACK is transmitted from the serving base station 2-1 (step ST276).

When the response signal counting unit 37 counts the number of ACK(s), the E-DCH active set control unit 38 of the mobile terminal 1 compares the number of ACK(s) with a predetermined (given) threshold (step ST277).

The threshold can be calculated through signaling or calculated by the E-DCH active set control unit 38.

When the number of ACK(s) is equal to or larger than the predetermined (given) threshold, the E-DCH active set control unit 38 of the mobile terminal 1 recognizes that the non-serving base station 2-2 has enhanced the macro diversity effect (step ST278), whereas when the number of ACK(s) is smaller than the predetermined (given) threshold, it recognizes that the non-serving base station 2-2 has not enhanced the macro diversity effect (step ST279).

As can be seen from the above description, in accordance with this embodiment 6, when the correlation between the serving base station 2-1 and the non-serving base station 2-2 is high, the non-serving base station 2-2 is excluded from the E-DCH active set. Therefore, the present embodiment offers an advantage of being able to use only the non-serving base station 2-2 which has enhanced the macro diversity effect.

Embodiment 7

In above-mentioned embodiment 6, the unit which takes charge of judgment of whether to exclude a non-serving base station 2-2 from the E-DCH active set is mobile terminal 1, as previously explained. As an alternative, the unit which takes charge of the judgment of whether to exclude a non-serving base station from the E-DCH active set can be a radio network controller 3.

Hereafter, a case in which the unit which takes charge of the judgment of whether to exclude a non-serving base station from the E-DCH active set is the radio network controller 3 will be explained.

Figure 29:
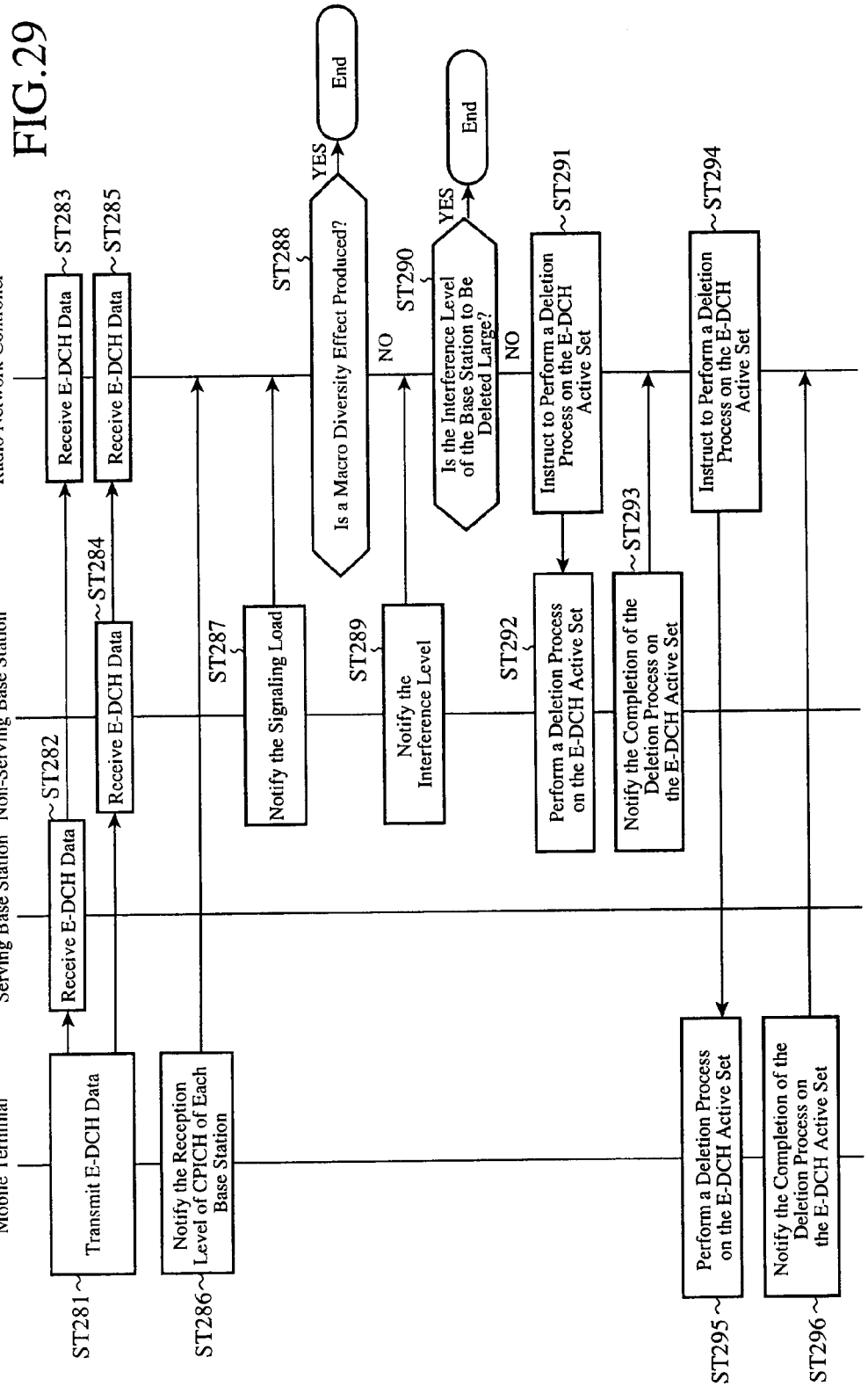
FIG. 29 is a sequence diagram showing a sequence of a mobile communications system at the time of excluding a base station from the E-DCH active set.
Figure 30:
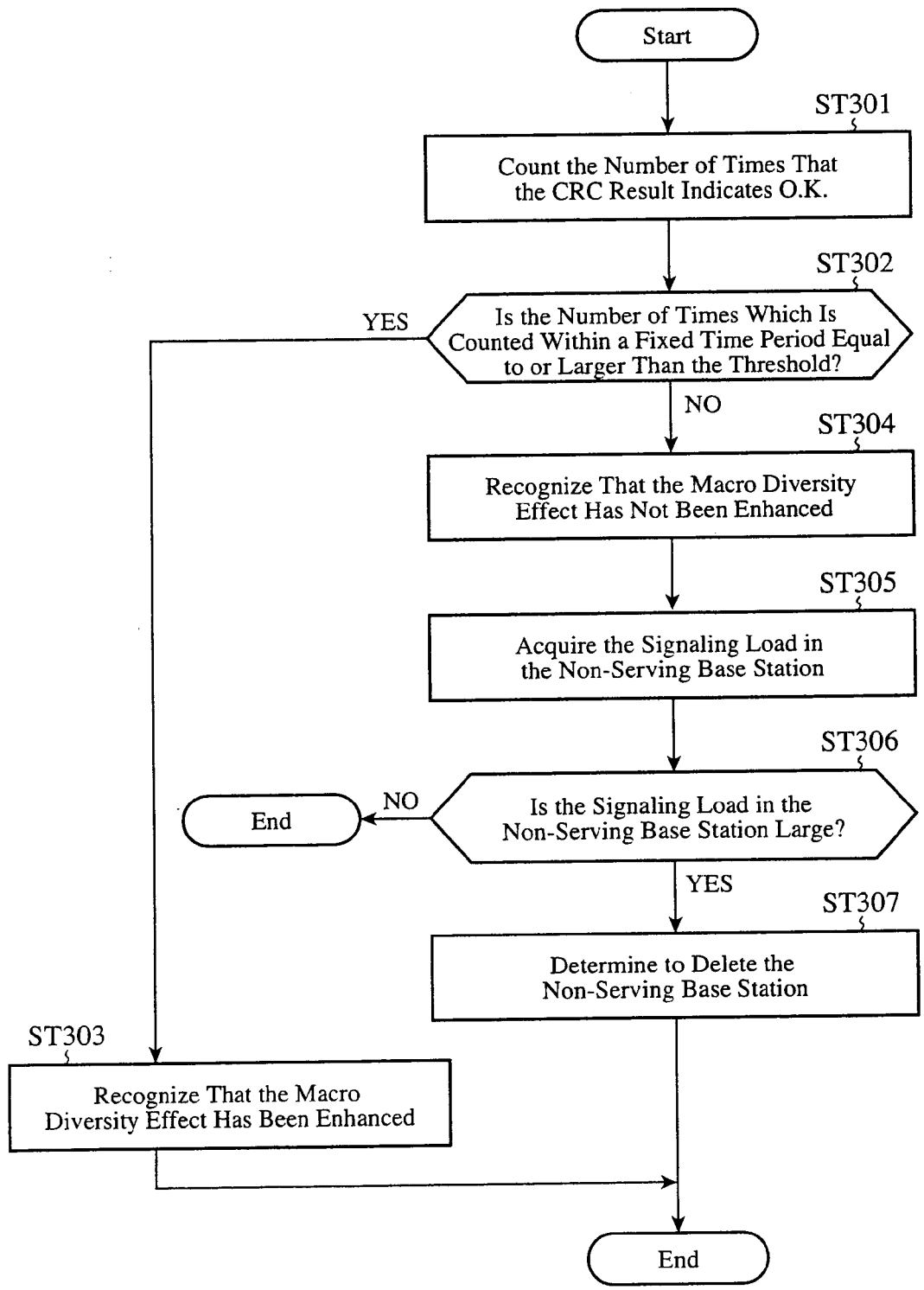
FIG. 30 is a flow chart showing a process of judging whether the advantage of macro diversity is enhanced, which is carried out by the radio network controller.

FIG. 29 is a sequence diagram showing a sequence of a mobile communications system at the time of excluding a base station from the E-DCH active set, and FIG. 30 is a flow chart showing a process of judging whether the macro diversity effect is enhanced, which is carried out by the radio network controller 3.

An E-DCH transmitting unit 24 of mobile terminal 1 transmits E-DCH signal (data) to each base station 2 included in the E-DCH active set (step ST281).

An E-DPDCH receiving unit 62 of a serving base station 2-1 included in the E-DCH active set receives the E-DCH signal (data) transmitted from the mobile terminal 1 (step ST282).

A radio resources management unit 83 of the base station control unit 3 receives E-DCH signals (data) transmitted from the serving base station 2-1 (step ST283).

An E-DPDCH receiving unit 62 of a non-serving base station 2-2 included in the E-DCH active set receives the E-DCH signals (data) transmitted from the mobile terminal 1 (step ST284).

The radio resources management unit 83 of the base station control unit 3 receives E-DCH signals (data) transmitted from the non-serving base station 2-2 (step ST285).

The E-DCH transmitting unit 24 of the mobile terminal 1 notifies the reception level of CPICH from the serving base station 2-1 and the reception level of CPICH from the non-serving base station 2-2 which are measured by a CPICH receiving unit 28 to the radio network controller 3 (step ST286).

A protocol processing unit 57 of the non-serving base station 2-2 transmits a signaling load measured by a signaling measuring unit 79 to the radio network controller 3 (step ST287).

When receiving the signaling load from the non-serving base station 2-2, an E-DCH active set control unit 92 of the radio network controller 3 judges whether the non-serving base station 2-2 has enhanced the macro diversity effect on the basis of the signaling load and so on (step ST288). The process of judging whether the macro diversity effect has been enhanced will be mentioned later.

When judging that the macro diversity effect has been enhanced, the E-DCH active set control unit 92 maintains the current E-DCH active set and ends the processing.

An interference level informing unit 68 of the non-serving base station 2-2 transmits the interference level measured by an interference level measuring unit 65 to the radio network controller 3 (step ST289).

When receiving the interference level from the non-serving base station 2-2, the E-DCH active set control unit 92 of the radio network controller 3 compares the interference level with a predetermined (given) threshold (step ST290). The threshold is the same as the regulatory reference D shown in above-mentioned embodiment 3.

When the interference level of the non-serving base station 2-2 is larger than the predetermined (given) threshold, the E-DCH active set control unit 92 of the radio network controller 3 maintains the current E-DCH active set and ends the processing because there is no margin for the interference level and the non-serving base station is required to carry out power control.

When the interference level of the non-serving base station 2-2 is smaller than the predetermined (given) threshold, a transmission control unit 82 of the radio network controller 3 transmits an exclusion instruction for excluding the non-serving base station 2-2 from the E-DCH active set to the non-serving base station 2-2 because there is a margin for the interference level and the non-serving base station is required to carry out power control (step ST291).

When receiving the exclusion instruction for excluding the non-serving base station 2-2 from the E-DCH active set from the radio network controller 3, the protocol processing unit 57 of the non-serving base station 2-2 carries out a process of excluding the non-serving base station 2-2 from the E-DCH active set, like that of above-mentioned embodiment 3 (step ST292).

After carrying out the process of excluding the non-serving base station 2-2 from the E-DCH active set, the protocol processing unit 57 of the non-serving base station 2-2 notifies the completion of the exclusion process to the radio network controller 3 (step ST293).

When receiving the notification of the completion of the exclusion process from the non-serving base station 2-2, the transmission control unit 82 of the radio network controller 3 transmits an exclusion instruction for excluding the non-serving base station 2-2 from the E-DCH active set to the mobile terminal 1 via the non-serving base station 2-2 (step ST294).

When a P-CCPCH receiving unit 32 receives the exclusion instruction for excluding the non-serving base station 2-2 from the E-DCH active set from the radio network controller 3, a protocol processing unit 41 of the mobile terminal 1 carries out a process of excluding the non-serving base station 2-2 from the E-DCH active set, like that of above-mentioned embodiment 3 (step ST295).

After carrying out the process of excluding the non-serving base station 2-2 from the E-DCH active set, the protocol processing unit 41 of the mobile terminal 1 notifies the completion of the exclusion process to the radio network controller 3 (step ST296).

Next, the process of judging whether the macro diversity effect is enhanced (the process of step ST288 shown in FIG. 29), which is carried out by the radio network controller 3, will be explained with reference to FIG. 30.

A response signal counting unit 91 of the radio network controller 3 counts the number of times that the CRC result of data transmitted from the non-serving base station 2-2 indicates "OK" when the CRC result of data transmitted from the serving base station 2-1 shows "NG" (or when no data is received from the serving base station 2-1) (step ST301).

The E-DCH active set control unit 92 of the radio network controller 3 compares the number of times which is counted within a fixed time period by the response signal counting unit 91 with a predetermined (given) threshold (step ST302).

When the number of times which is counted within a fixed time period is equal to or greater than the predetermined (given) threshold, i.e., in a case in which a difference has occurred frequently between the CRC result of the serving base station 2-1 and the CRC result of the non-serving base station 2-2, the E-DCH active set control unit 92 recognizes that the macro diversity effect is enhanced because a macro selective combining is functioning effectively (step ST303).

In contrast, when the number of times which is counted within a fixed time period is less than the predetermined (given) threshold, the E-DCH active set control unit 92 recognizes that the macro diversity effect is not enhanced because the macro selective combining is not functioning effectively (step ST304).

In the judging process of step ST302, the SIR of DPCH can be used instead of the number of times which is counted within a fixed time period.

When the E-DCH active set control unit 92 recognizes that the macro diversity effect is not enhanced, a signaling load storage unit 90 of the radio network controller 3 measures a signaling load in the non-serving base station 2-2 (step ST305).

When the signaling load storage unit 90 measures the signaling load in the non-serving base station 2-2, the E-DCH active set control unit 92 of the radio network controller 3 compares the signaling load with a predetermined (given) threshold (step ST306).

When the signaling load is smaller than the predetermined (given) threshold, the E-DCH active set control unit 92 does not exclude the non-serving base station 2-2 from the E-DCH active set because other mobile terminal 1 is able to use the non-serving base station 2-2 as a non-serving base station, and there presents no problem even if the E-DCH active set control unit maintains the current E-DCH active set.

When the signaling load is larger than the predetermined (given) threshold, the E-DCH active set control unit 92 determines to exclude the non-serving base station 2-2 from the E-DCH active set (step ST307).

As a result, other mobile terminal 1 is enabled to use the non-serving base station 2-2 as a non-serving base station.

As can be seen from the above description, in accordance with this embodiment 7, in a case in which there is a high correlation between the serving base station 2-1 and the non-serving base station 2-2, the non-serving base station 2-2 is excluded from the E-DCH active set. Therefore, the present embodiment offers an advantage of being able to use only the non-serving base station 2-2 which enhances the macro diversity effect.

Embodiment 8

In above-mentioned embodiments 1 to 7, the radio network controller 3 groups two or more base stations 2 into a group of non-serving base stations and a group of base stations in an active set for soft handovers (i.e., a prior art active set) according to the conditions of reception of data in the two or more base stations 2, as previously explained. In contrast, in accordance with this embodiment, such grouping is carried out as follows.

More specifically, in this embodiment 8, whether a base station included in an active set is either a first type of base station which can set up a high-speed packet data channel via which high-speed large-volume packet data can be transmitted in an uplink direction, or a second type of base station which cannot set up such a high-speed packet data channel is determined, and, when it is determined that the base station is of the second type, it is evaluated whether it is possible to maintain the quality of communications between a base station of the first type and mobile terminal at a good level even if the base station is excluded from the active set, and the base station is excluded from the active set when it is possible to maintain the quality of communications between a base station of the first type and mobile terminal at a good level.

Concretely, this processing is carried out as follows.

Figure 45:
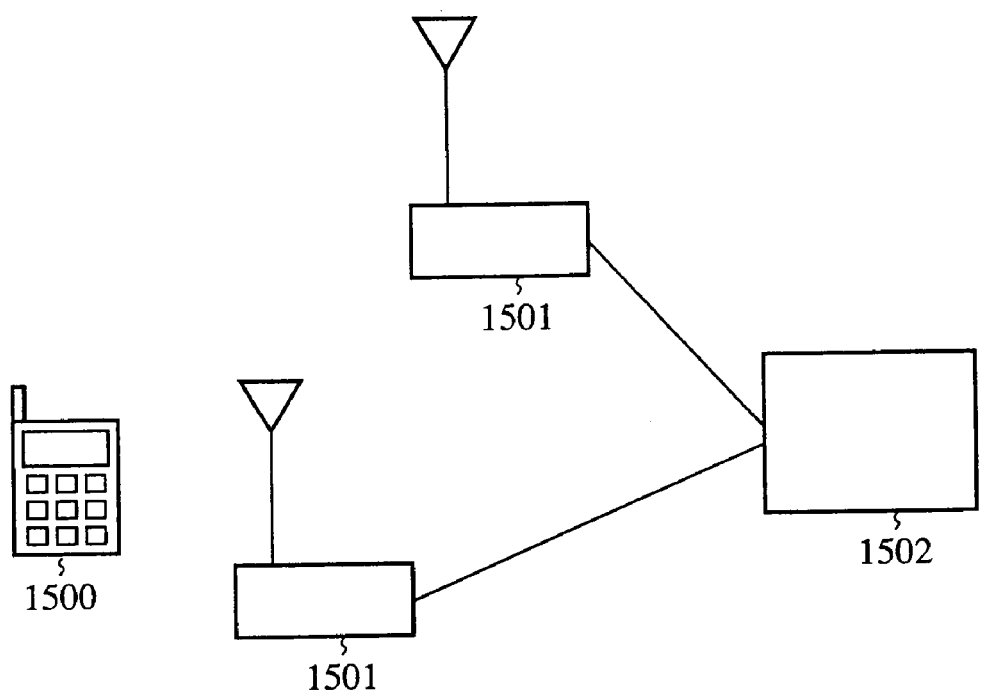
FIG. 45 is an explanatory diagram explaining the structure of a mobile communications system which uses a W-CDMA method.

FIG. 45 is an explanatory diagram explaining the structure of a mobile communications system which uses a W-CDMA method. In FIG. 45, mobile terminal 1500 (UE: User Equipment) is a device which the user uses, such as a mobile phone or a Personal Digital Assistant. The mobile terminal 1500 communicates with a base station 1501 (Node B) by radio. The base station 1501 carries out transmission and reception of user data and control signals with the mobile terminal 1500 located in a region (cell) of a predetermined (given) width, and also controls the transmission power and transmission timing of the mobile terminal 1500.

A radio link in an "upward direction" via which data are transmitted from the mobile terminal 1500 to the base station 1501 is called an "uplink", and a radio link in a "downward direction" via which data are transmitted from the base station 1501 to the mobile terminal 1500 is called a "downlink."

A radio network controller 1502 (RNC: Radio Network Controller) relays data between the base station 1501 and a core network, and also carries out line connection control of a wireless line, handover control, etc. The base station 1501 and radio network controller 1502 construct a radio access network (RAN: Radio Access Network), and, in a communication system defined by the 3GPP (3 rd Generation Partnership Project) standard, RAN is called UTRAN (Universal Terrestrial RAN).

Figure 46:
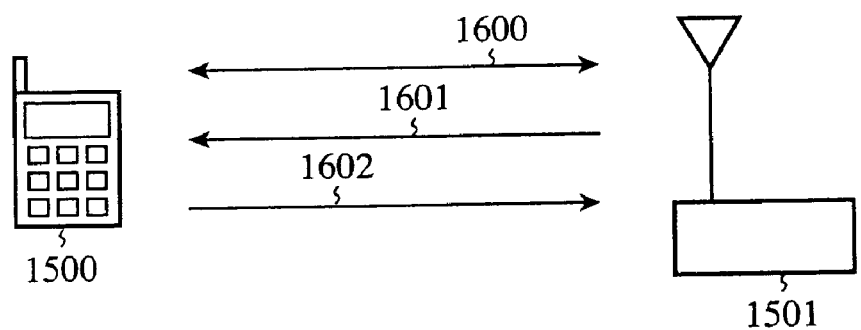
FIG. 46 is an explanatory diagram explaining a channel via which wireless communications are carried out between mobile terminal and a base station.

FIG. 46 is an explanatory diagram explaining a channel via which radio communications are carried out between the mobile terminal 1500 and the base station 1501. A DCH 1600 (Dedicated CHannel) is a channel via which data are transmitted, and is set up for both a direction of uplink and a direction of downlink. The DCH 1600 is a channel defined by R99 (Release 1999) of the 3GPP standard.

An HS-DSCH 1601 (High Speed Downlink Shared CHannel) is a channel which is set up when HSDPA (High Speed Downlink Packet Access) communications used for transmission of large-volume data in the downlink direction are started. The HS-DSCH 1601 is defined by Rel5 (Release 5) of the 3GPP standard. An E-DCH 1602 (Enhanced Dedicated CHannel) is a channel which is set up for the uplink direction for transmission of large-volume data. The E-DCH 1602 is defined by Rel6 (Release 6) of the 3GPP standard.

Currently, mobile communications systems are employed according to specifications defined by R99 of the 3GPP standard, and, in the future, specifications defined by Rel5 and Rel6 are likely to be introduced in turn.

In a W-CDMA system, the composition of signals from two or more base stations, an improvement in the reception quality in the vicinity of the cell, and non-discontinuous communications can be implemented by carrying out a soft handover of making mobile terminal establish a connection with two or more cells via radio links simultaneously to communicate with the two or more base stations.

Two or more base stations which are communicating simultaneously with certain mobile terminal are called members of an "active set" of the mobile terminal. That is, the active set is information about two or more base stations with which certain mobile terminal is communicating simultaneously. By carrying out a soft handover, mobile terminal can combine signals received from two or more base stations and can improve its communication quality.

A radio network controller can improve the communication quality by combining signals transmitted thereto via two or more base stations. Because the radio network controller combines received data transmitted thereto via two or more base stations, it can judge whether a transmission signal from certain mobile terminal is transmitted appropriately.

Therefore, a retransmission control process of judging whether to make mobile terminal retransmit data is carried out by the radio network controller. When there is a necessity for mobile terminal to retransmit data, the radio network controller transmits a retransmission indication signal to which the same SN (Sequence Number) is added to the mobile terminal via two or more base stations. A method of and a mobile communications system for carrying out a soft handover and a hard handover using a threshold which varies adaptively are disclosed by the following patent reference 5.
[Patent reference 5] Patent application publication No. 2003-525533

In order for mobile terminal to transmit large-volume data about a moving image or the like, it is necessary to set up a large-volume channel via which high-speed packet communications are carried out in the uplink direction. However, the transmission power increases and the interference level in each base station also increases inevitably with increase in the amount of data which the mobile terminal transmits to each base station. Therefore, Rel6 discloses that a scheduler disposed in each base station carries out a scheduling process of assigning radio resources to the mobile terminal.

Each base station carries out the scheduling process in consideration of the interference level in the cell thereof, and controls the transmission of each mobile terminal in the cell, so that the increase in the interference level is suppressed and the throughput is improved. However, a base station which can assign E-DCH to mobile terminal needs to support Rel6, and a base station which complies with Rel5 and R99 specifications cannot receive data from mobile terminal using E-DCH.

In a transition period during which systems defined by Rel5 and Rel6 become widespread, there is a possibility that base stations which comply with the specifications of the different standards, such as R99, Rel5, and Rel6, respectively, coexist in a system. It is possible that channels which are used are limited when mobile terminal moves between the cells respectively managed by base stations which respectively comply with different versions of a standard. A handover between base stations which respectively comply with different versions of a standard is disclosed by the following nonpatent reference 2.

According to nonpatent reference 2, when mobile terminal which transmits data to a base station which complies with Rel6 using EUL (Enhanced Up Link) moves to the cell of another base station which cannot use EUL and which complies with Rel5, the transmission of E-DCH signals (data) is stopped and is switched to transmission via DCH.

[Nonpatent reference 2] R1-040962 "Proposal on RR/SI time multiplexing with HS-DPCCH"

By the way, the following problems arise because of limitation of channels which mobile terminal can use depending upon the version of the base station.

In the system disclosed by above-mentioned nonpatent reference 2, because mobile terminal must transmit large-volume data not using E-DCH but using DCH, the interference level in the cell increases and a problem of reducing the throughput arises in the system.

Furthermore, because mobile terminal has to stop the use of E-DCH via which high-speed transmission of data can be carried out and therefore has to use DCH, a problem of requiring much time to send the same amount of data arises. As mentioned above, because it is more desirable for the system and mobile terminal to use not DCH but E-DCH when transmitting large-volume data, it is preferable to distinguish between a base station which can use E-DCH and a base station which cannot use E-DCH, and to exclude a base station which complies with Rel5 and R99 and which cannot use E-DCH from the active set.

In the case of DCH, because the radio network controller carries out control of retransmission of data for each base station using the same sequential number (SN: Sequential Number), it is possible for the mobile terminal to combine signals from base stations. However, in the case of E-DCH, data retransmission control is carried out by each base station.

When the mobile terminal communicates with two or more base stations using E-DCH, because retransmission control is carried out using a different sequential number by each base station, synchronization between base stations cannot be achieved and composition of signals cannot be performed by the mobile terminal. Therefore, the mobile terminal cannot carry out a soft handover process of communicating with two or more base stations using E-DCH.

As a result of changing a format defined by Rel5 or R99 to a format (e.g., a slot format) defined by Rel6, there arises a problem that a base station which complies with Rel5 or R99 cannot recognize a slot format transmitted from mobile terminal which complies with Rel6. For example, in the case of R99, a slot format for uplink DPCCH (Dedicated Physical Control Channel) defines that one slot has a total of 10 bits including six pilot (Pilot) bits, two TPC (Transmission Power Command) bits, and two TFCI (Transport Format Combination Indicator) bits.

In contrast, in the case of Rel6, a slot format for uplink DPCCH defines that one slot has a total of 10 bits including four pilot bits, three new control bits which are newly defined by Rel6, one TPC bit, and two TFCI bits. In this case, a base station which complies with R99 may recognize erroneously, as pilot bits defined by R99, the four pilot bits and the two uppermost bits of the new control bits of a slot format transmitted from mobile terminal which complies with Rel6, and may also recognize erroneously, as TCP bits defined by R99, the lowmost bit of the new control bits and the two TPC bits of the slot format.

In this way, there is a possibility that a base station which complies with old specifications like R99 cannot recognize a slot format according to new specifications like Rel6, and may malfunction. Therefore, even in a case in which base stations which respectively comply with different standard specifications coexist, "backward compatibility" (Backward Compatibility) needs to be ensured between communications systems which comply with new specifications and communications systems which comply with old specifications.

This embodiment 8 is made in order to solve the above-mentioned problem, and it is therefore an object of the present embodiment to provide a mobile communications terminal and a radio network controller which restrict a soft handover with a base station which cannot use E-DCH in a mobile communications system in which base stations which comply with different versions, such as Rel6 and Rel5, coexist.

Figure 31:
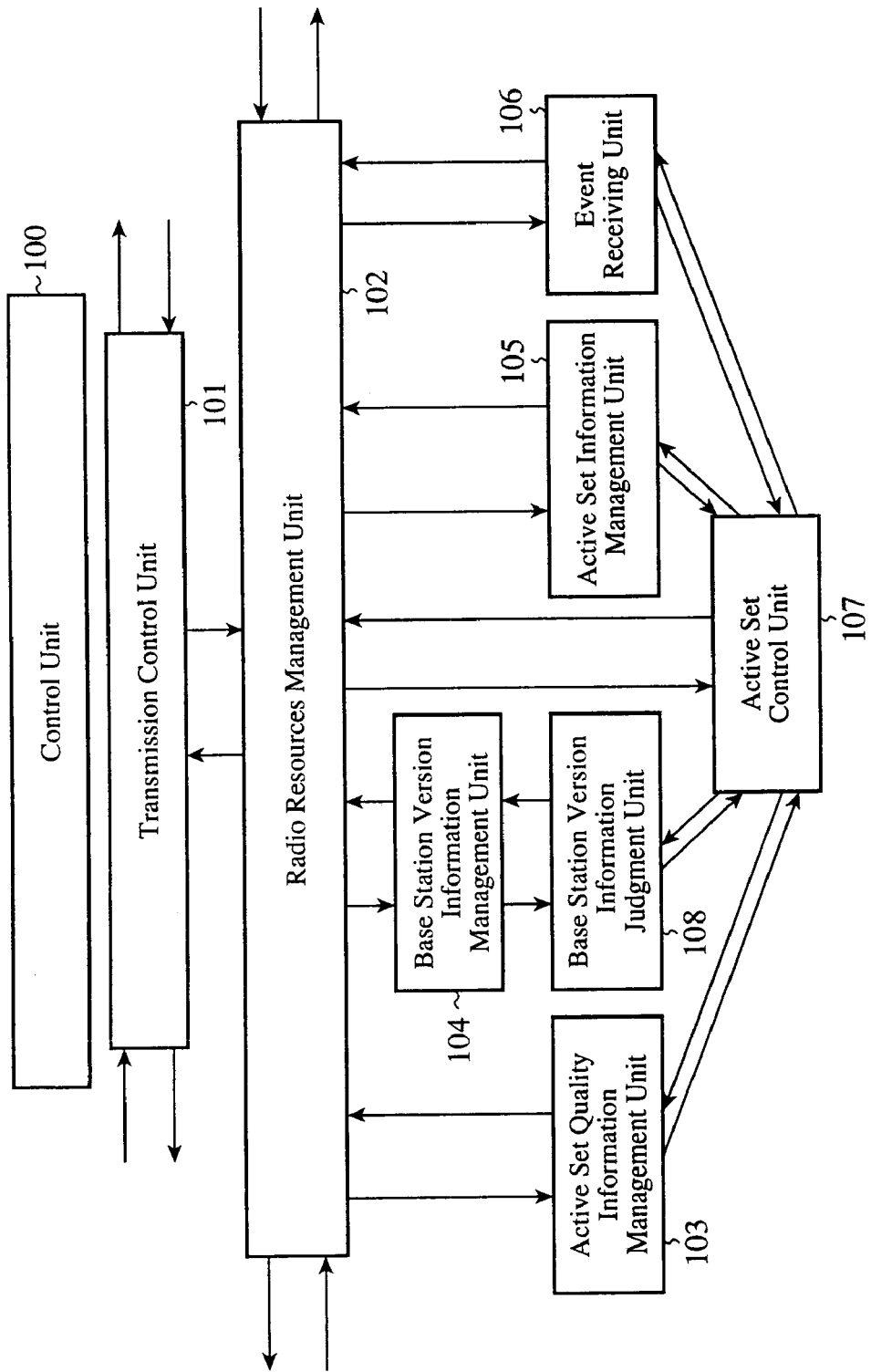
FIG. 31 is a block diagram of a radio network controller which constructs a communications system in accordance with embodiment 8 of the present invention.

FIG. 31 is a block diagram showing the structure of a radio network controller which constructs the communications system in accordance with the embodiment 8 of the present invention. A control unit 100 controls the hardware and each function of each base station. A transmission control unit 101 is the one which takes charge of retransmission control and so on, and guarantees the reliability of links. A radio resources management unit 102 manages radio resources, such as power associated with CDMA, codes, and frequency bands. An active set quality information management unit 103 stores quality information about radio links in each active set.

A base station version information management unit 104 stores version information about base stations which are placed under the control of the radio network controller. An active set information management unit 105 stores the status of a current active set. An event receiving unit 106 receives notification (an event) of a request to add or exclude a certain base station to or from the active set. An active set control unit 107 controls the addition or exclusion of a certain base station to or from the active set.

A base station version information judgment unit 108 judges the version of a base station on the basis of base station version information stored in the base station version information management unit 104. The base station version information management unit 104 and base station version information judgment unit 108 are disposed newly, and the other components are the ones which exist in a prior art system.

Figure 32:
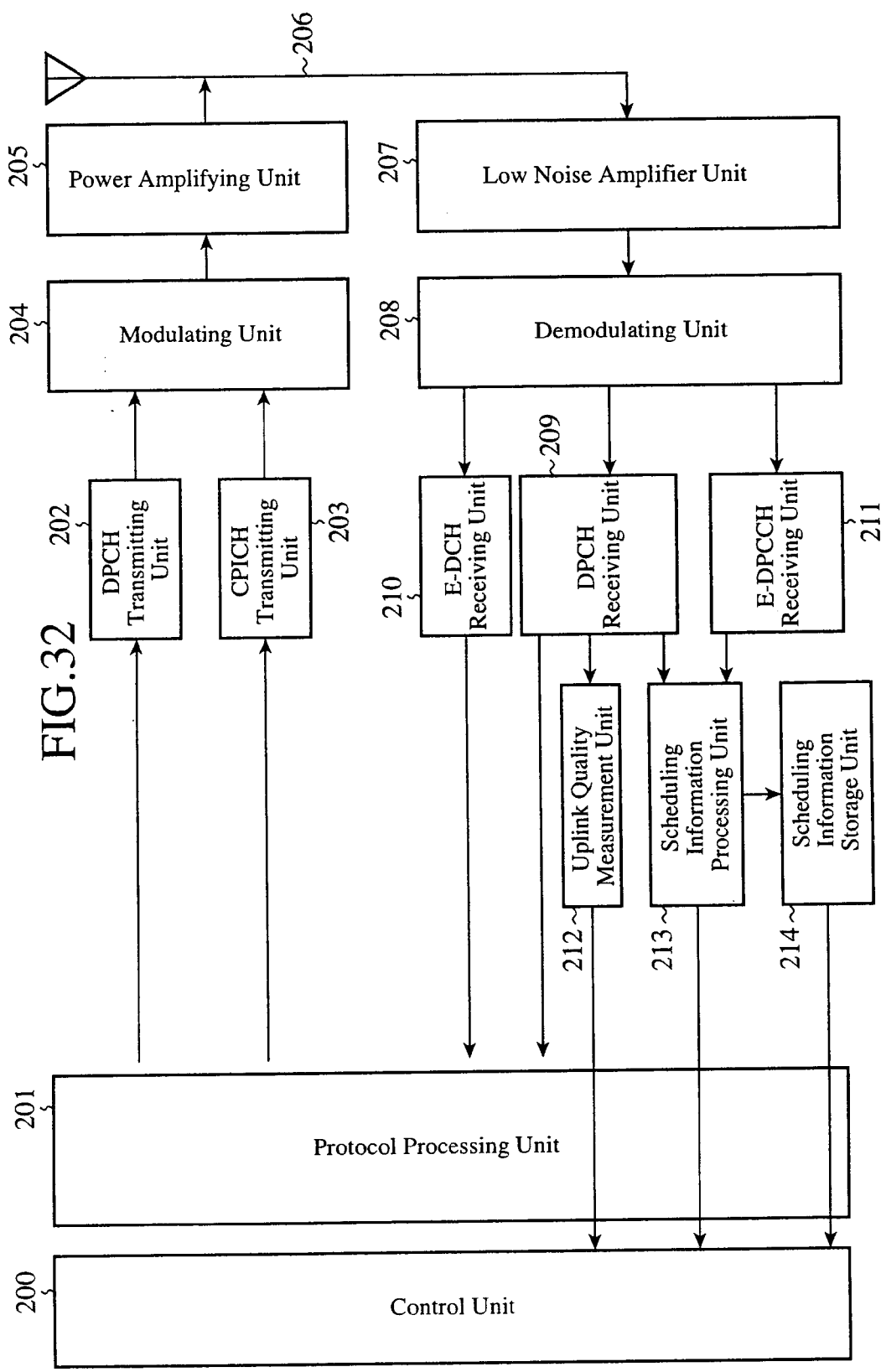
FIG. 32 is a block diagram showing the structure of a base station which complies with Rel6.

FIG. 32 is a block diagram showing the structure of a base station which complies with Rel6. In FIG. 32, a control unit 200 sets up a channel. A protocol processing unit 201 carries out a protocol process of, for example, setting up or releasing a channel. A DPCH transmitting unit 202 carries out a process of transmitting data associated with an individual physical channel (DPCH: Dedicated Physical Channel). A common pilot channel (CPICH: Common Pilot Channel) transmitting unit 203 transmits a common pilot signal. A modulating unit 204 modulates signals outputted from the DPCH transmitting unit 202 and CPICH transmitting unit 203. A power amplifying unit 205 amplifies an output signal from the modulating unit 204 so that it has predetermined (given) transmission power. The signal which is amplified so as to have the transmission power by the power amplifying unit 205 is transmitted from an antenna 206.

On the other hand, a low noise amplifying unit 207 amplifies a signal received by the antenna 206. A demodulating unit 208 demodulates the received signal amplified by the low noise amplifying unit 207, and demultiplexes the demodulated signal into signals associated with channels, such as DPCH, E-DCH, and E-DPCCH (Enhanced-Dedicated Physical Control CHannel), and outputs them. A DPCH receiving unit 209 processes a DPCH signal (data) outputted from the demodulating unit 208 so as to acquire data transmitted via DPCH. An E-DCH receiving unit 210 processes an E-DCH signal (data) outputted from the demodulating unit 208 so as to acquire large-volume high-speed packet data transmitted via E-DCH. An E-DPCCH receiving unit 211 processes an E-DPCCH signal (data) outputted from the demodulating unit 208.

An uplink quality measurement unit 212 measures the communication quality of an uplink DPCCH. A scheduling information processing unit 213 processes scheduling information. A scheduling information storage unit 214 manages the scheduling information.

The scheduling information is the one which is required for a base station to carry out a scheduling process of assigning radio resources to each terminal, and includes a transmission power margin of each mobile terminal, the amount of data to be transmitted by each mobile terminal, and so on.

Figure 33:
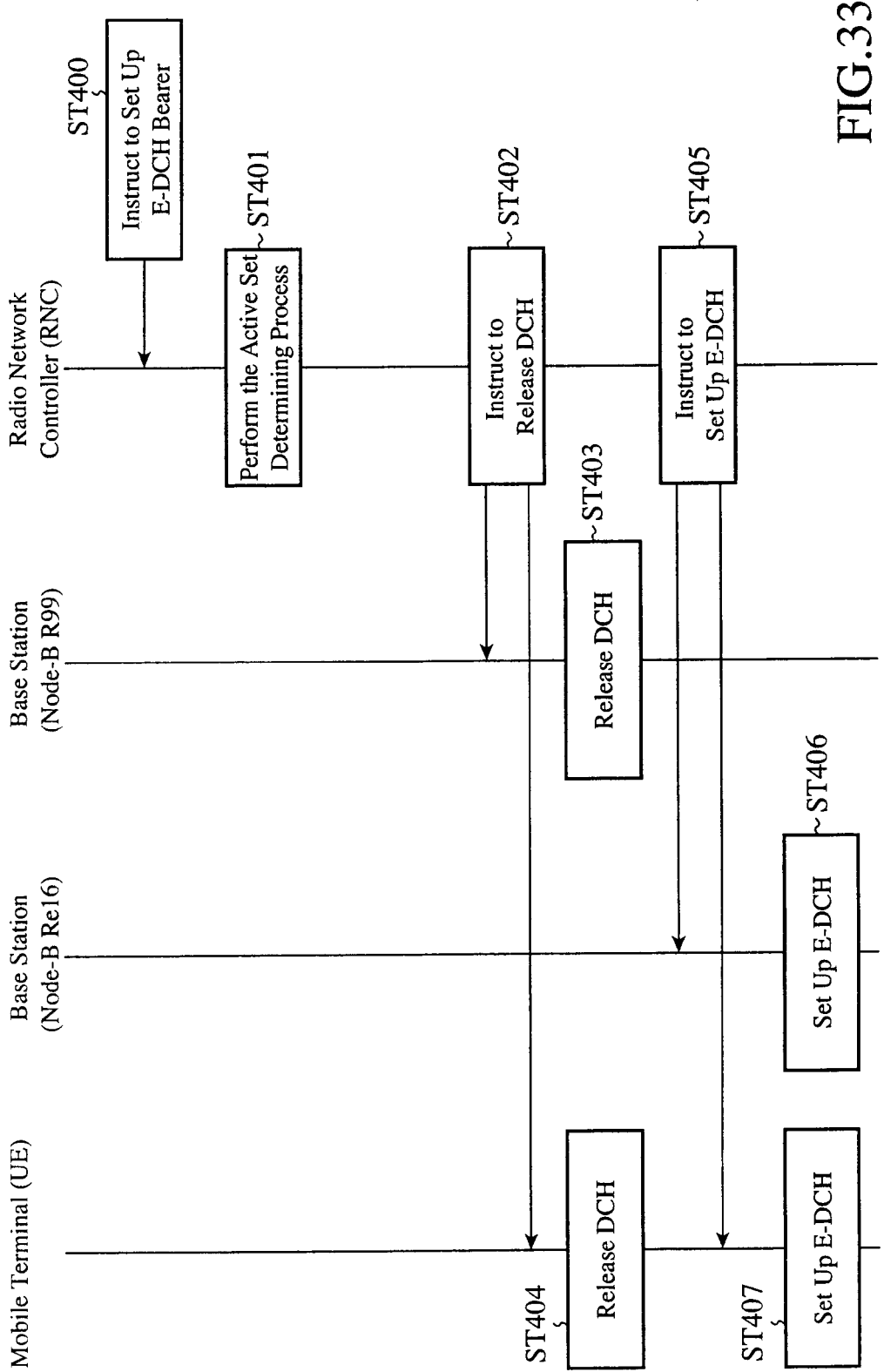
FIG. 33 is a flow chart explaining a soft handover control process in the communications system in accordance with embodiment 8 of the present invention.

FIG. 33 is a flow chart explaining a soft handover control process in the communications system in accordance with embodiment 8 of the present invention. FIG. 34 is a conceptual diagram showing a process of setting up E-DCH during a soft handover between base stations of different versions. FIG. 34(*a*) shows that mobile terminal 400 is communicating with a base station 401 which complies with Rel6 via DCH 403, and is placed in a soft handover state in which it communicates with a base station 402 which complies with R99 via DCH 404. FIG. 34(*b*) is a diagram showing a state in which the mobile terminal 400 disconnects the DCH 404 with the base station 402 as the mobile terminal 400 starts large-volume data communications with the base station 401 using E-DCH 405. Assume that the mobile terminal 400 shown in FIG. 34 complies with Rel6.

Hereafter, the operation shown in FIG. 33 will be explained.

When receiving an instruction for assigning E-DCH to a predetermined (given) mobile terminal placed in the soft handover state from the core network (Core Network) (step ST400), the radio network controller reads the active set associated with the mobile terminal (e.g., the mobile terminal 400 shown in FIG. 34). The radio network controller then carries out an active set judging process of judging whether to exclude a base station (e.g., a base station 402 which complies with specifications other than Rel6) which does not comply with E-DCH, which is included in base stations currently recorded in the read active set (e.g., the base stations 401 and 402 of FIG. 34), from the active set (step ST401).

This active set judging process includes a process of evaluating the communication quality at the time when DCH with a base station which does not comply with E-DCH is disconnected.

As a result of the active set judging process of step ST401, the base station excluded from the active set is excluded from the active set and is recorded in, for example, an active set exclusion list. The base station recorded in the active set exclusion list cannot use E-DCH, and does not cause degradation in the communication quality of each mobile terminal even if DCH is disconnected.

The radio network controller refers to this active set exclusion list, and instructs the base station registered into the active set exclusion list (e.g., the base station 402 which complies with R99) to release DCH with the mobile terminal 400 using the NBAP (Node B Application Part) protocol. The radio network controller simultaneously instructs the mobile terminal 400 to release DCH with the base station 402 using the RRC (Radio Resource Control) protocol (step ST402).

In response to the instruction from the radio network controller, each of the mobile terminal 400 and base station 402 releases DCH (steps ST403 and 404).

On the other hand, the radio network controller instructs a base station currently recorded in the active set (for example, the base station 401 which complies with Rel6 and which can use E-DCH) to set up E-DCH with the mobile terminal 400 using the NEAP protocol. The radio network controller simultaneously instructs the mobile terminal 400 to set up E-DCH with the base station 401 using the RRC protocol (step ST405).

In response to the instruction from the radio network controller, a process of setting up E-DCH between the mobile terminal 400 and the base station 402 is carried out (steps ST406 and 407).

Figure 35:
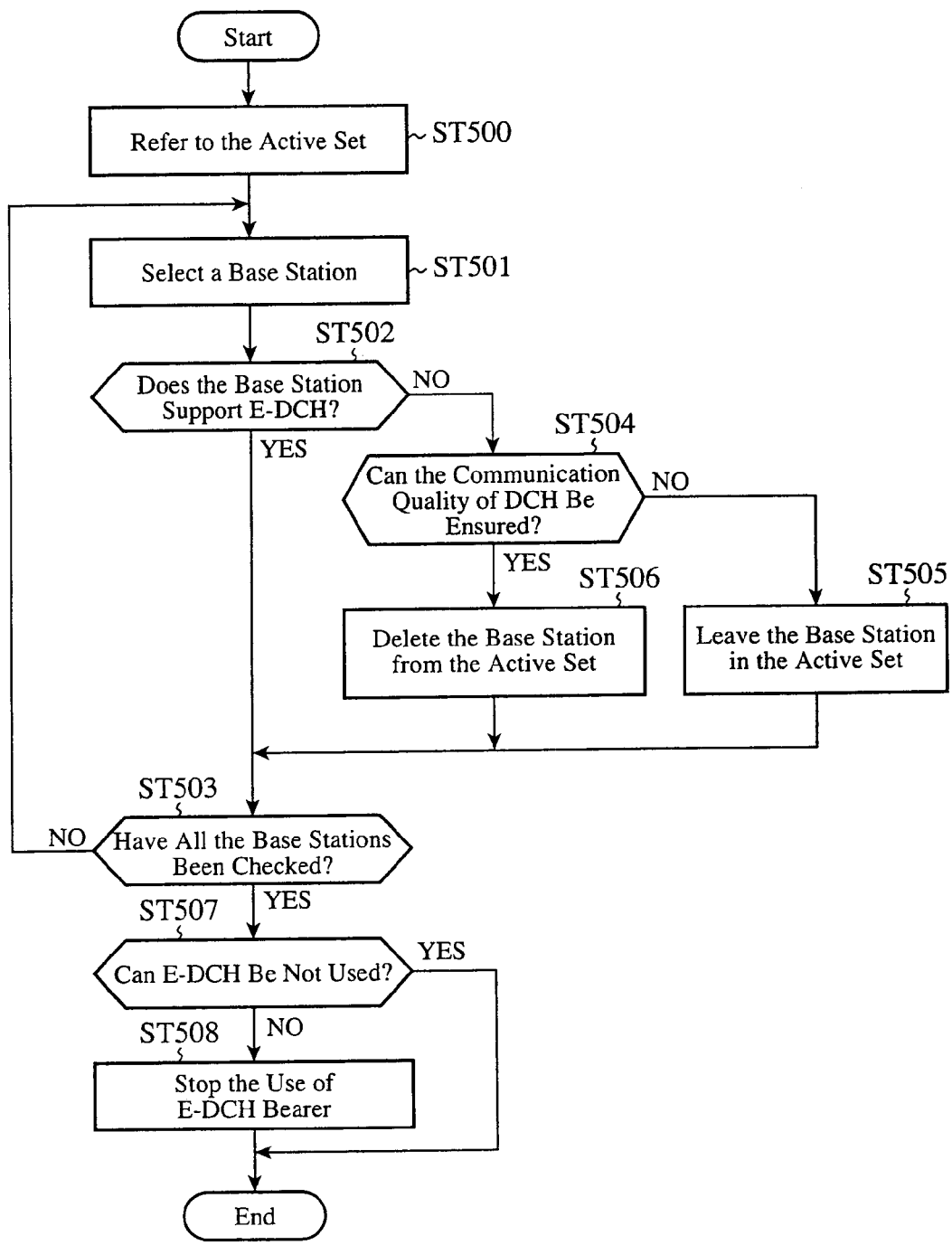
FIG. 35 is a flow chart explaining the details of an active set judging process.

FIG. 35 is a flow chart explaining the active set judging process which is carried out by the radio network controller. FIG. 35 is a flow chart showing the details of the active set judging process of step ST401 shown in FIG. 33.

When the radio network controller receives an instruction for assigning E-DCH to certain mobile terminal from the core network (step ST401 of FIG. 33), the active set information management unit 105 refers to the active set associated with the mobile terminal for which E-DCH is set up (step ST500). Two or more base stations with which the mobile terminal is communicating via DPCH are recorded in this active set.

The active set control unit 107 selects one of the two or more base stations currently recorded in the active set (step ST501), and carries out a process of judging whether the selected base station can use E-DCH (step ST502). The base station version information management unit 104 and base station version information judgment unit 108 judge whether the selected base station can use E-DCH on the basis of the base station version information. For example, when the selected base station complies with Rel6, they judges that this base station can use E-DCH.

In this case, step ST503 is carried out, and whether a yet-to-be-checked base station remains is judged. In contrast, when the selected base station complies with Rel5 or R99, the base station version information management unit and base station version information judgment unit judges that this base station cannot use E-DCH. In this case, the process of step ST504 is carried out.

In order for the mobile terminal which is currently carrying out a soft handover to carry out data transmission via E-DCH, it needs to stop transmission via DCH with a base station which does not comply with E-DCH, and to set up E-DCH with a base station which complies with E-DCH. However, if the mobile terminal disconnects a radio link with a base station which does not comply with E-DCH, the quality of the radio uplink may degrade and communications may not be carried out.

Therefore, before the radio network controller in accordance with the present invention excludes the base station which does not comply with E-DCH from the active set, the radio network controller carries out the process in step ST504 of judging whether the quality of the radio link with the base station which complies with E-DCH can be maintained when excluding the base station which does not comply with E-DCH from the active set.

If the communication quality of DCH cannot be maintained when excluding the base station which does not comply with E-DCH from the active set (i.e., if No in step ST504), the radio network controller does not exclude the base station which does not comply with E-DCH from the active set, but maintains DCH with the base station which does not comply with E-DCH (step ST505).

In contrast, when the communication quality of DCH can be maintained even if the radio network controller excludes the base station which does not comply with E-DCH from the active set (i.e., if Yes in step ST504), the radio network controller excludes the base station which does not comply with E-DCH from the active set (step ST506).

After the process in step ST505 or ST506 is carried out, the radio network controller judges whether it has checked all the base stations included in the active set (step ST503), and, if a yet-to-be-checked base station remains in the active set (i.e., if No in step ST503), the radio network controller repeats the processes in step ST501 and subsequent steps. If no yet-to-be-checked base station remains (if Yes in step ST503), the radio network controller judges whether the mobile terminal can use E-DCH (step ST507).

The reason why the mobile terminal cannot use E-DCH is because, for example, all the base stations recorded in the active set do not comply with E-DCH or the communication quality of DCH cannot be maintained if the base station which does not comply with E-DCH is excluded from the active set. Because a setup of E-DCH bearer is instructed by the core network, the radio network controller notifies the core network that the setup of E-DCH cannot be made if the mobile terminal cannot use E-DCH (i.e., if No in step ST507). If the mobile terminal can use E-DCH (i.e., if Yes in step ST507), the radio network controller carries out the processes in step ST402 and subsequent steps of FIG. 33.

Figure 36:
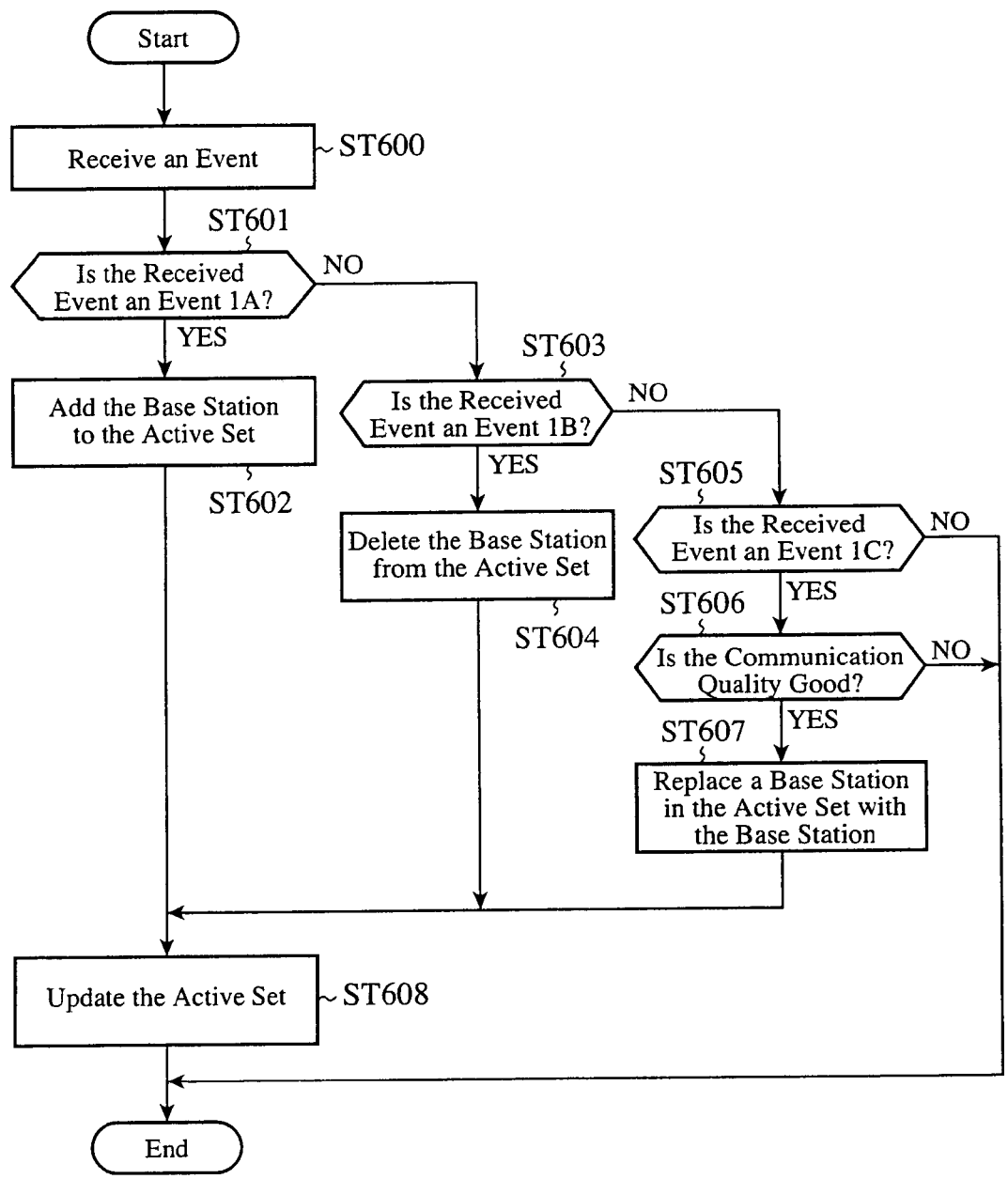
FIG. 36 is a flow chart explaining the details of an active set updating process.

An updating process, such as addition or exclusion of a base station, is always performed on the active set which the radio network controller acquires in step ST500 of FIG. 35 according to a change in the communication environment of the mobile terminal. FIG. 36 is a flow chart for explaining the details of the updating process of updating the base station (s) included in the active set. In FIG. 36, the event receiving unit 106 receives an event transmitted from the mobile terminal (step ST600). The active set control unit 107 judges whether or not the event transmitted from the mobile terminal is an event of making a request to add a certain base station to the active set (i.e., an event 1A) (step ST601). When the event transmitted from the mobile terminal is an event 1A (i.e., if Yes in step ST601), the active set control unit 107 adds the base station specified by the event 1A to the active set (step ST602).

When the event transmitted from the mobile terminal is not an event 1A (i.e., in No in step ST60), the active set control unit 107 judges whether or not the event transmitted from the mobile terminal is an event of making a request to exclude a base station from the active set (i.e., an event 1B) (step ST603).

When the event transmitted from the mobile terminal is an event 1B (i.e., if Yes in step ST603), the active set control unit 107 excludes the base station specified by the event 1B from the active set (step ST604).

When the event transmitted from the mobile terminal is neither an event 1A nor an event 1B (i.e., if No in step ST603), the active set control unit 107 judges whether or not the event transmitted from the mobile terminal is an event of making a request to replace an arbitrary base station in the active set with a predetermined (given) base station (i.e., an event 1C) (step ST605).

When the event transmitted from the mobile terminal is an event 1C (i.e., if Yes in step ST605), the active set control unit 107, in step ST606, carries out a process of checking the communication quality of the base station specified by the event 1C.

The radio network controller judges whether the communication quality of the base station specified by the event 1C is better than that of a predetermined (given) base station included in all the base stations registered into the active set. When determining that the communication quality of the base station specified by the event 10 is better than the communication quality of the predetermined (given) base station recorded in the active set (i.e., if Yes in step ST606), the radio network controller adds the base station specified by the event 10 to the active set, and carries out a replacing process of excluding an arbitrary base station whose communication quality is worse than that of the base station specified by the event 10 from the active set (step ST607).

The radio network controller then updates the base station (s) included in the active set on the basis of the result of processing the above-mentioned steps (step ST608). When the event transmitted from the mobile terminal is not any of the events 1A to event 10 (i.e., if No in step ST605), the radio network controller ends the processing without carrying out the updating process of updating the base station (s) included in the active set. In contrast, when the communication quality of the base station specified by the event 10 is worse than the communication quality of any of all the base stations registered in the active set (i.e., if No in step ST606), the radio network controller ends the processing without carrying out the updating process of updating the base station(s) included in the active set because it is not necessary to replace the base station specified by the event 10 with another base station of good communication quality in the active set.

In step ST504 of FIG. 35, the radio network controller carries out the communication quality evaluation process of judging whether the communication quality of DCH can be maintained in a state in which it excludes the base station which does not comply with E-DCH from the active set.

Figure 37:
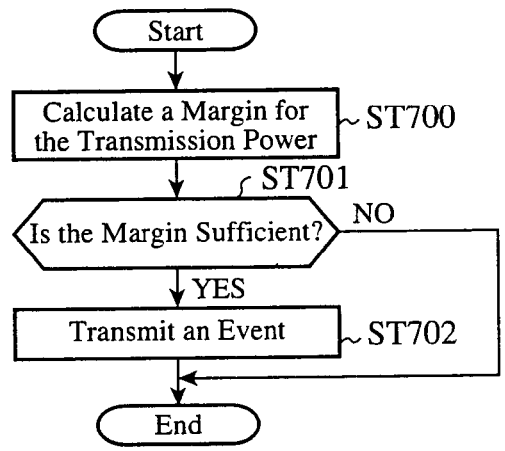
FIG. 37 is a flow chart in which details of a communication quality (connection quality) evaluation process.

FIG. 37 is a flow chart showing a first method for use in the communication quality evaluation process carried out in step ST504 of FIG. 35.

This first method for use in the communication quality evaluation process is the one which the mobile terminal uses to carry out the process and notifies the result of carrying out the process to the radio network controller.

In FIG. 37, the mobile terminal calculates a remaining available transmission power value (or a transmission power margin) by subtracting a transmission power value which it uses for the current transmission from a maximum transmission power value assigned thereto by a base station (step ST700). The mobile terminal then judges whether a condition which enables the quality of the radio link to be maintained is satisfied by using the available transmission power value calculated in step ST700 (step ST701). The details of the process in step ST701 will be mentioned later.

When the condition is satisfied, the mobile terminal determines that the communication quality can be maintained and ends the processing even if it releases DCH with a base station which does not comply with E-DCH. In the case in which the condition is not satisfied (i.e., if No in step ST701), the mobile terminal determines that the communication quality cannot be maintained when it releases DCH with a base station which does not comply with E-DCH. The mobile terminal then notifies the radio network controller that it cannot exclude the base station from the active set. The mobile terminal can transmit a signal for notifying the evaluation result via a physical layer. The mobile terminal can alternatively multiplex it to a control channel, such as DPCCH or E-DPCCH, to transmit it.

In performing the processes in steps ST700 and ST701, it is possible for the mobile terminal to refer to a "state" (state) which is defined for the transmission format (TFC: Transport Format Combination) of data via a channel (DCH) for uplink data. For example, user data to be transmitted via a physical channel like DPDCH is transmitted from an upper layer, like a MAC (Media Access Control) layer, to a physical layer via a transport channel, and many transport channels are multiplexed into the physical channel like DPDCH.

When data is transmitted using DPDCH, information about a method of multiplexing data and a data size per unit time (or the transmission rate) which are transmitted from a higher-level protocol layer is carried on DPCCH and is transmitted and notified to a receive side. In this case, TFC is notification information containing "the method of multiplexing data" and "the data size", and TFCI (TFC Index) which is an index of TFC is transmitted to the receive side. A transition among states (Support, Excess Power, and Block) is defined for each TFC, and one "state" is selected from the states according to the transmission power margin of the mobile terminal.

Among the states, "the excess-of-power state (Excess-Power)" is a state in which an electric power shortage has been detected throughout a fixed time period, and "the not-available state (Block)" is a state in which the transmission is limited due to an electric power shortage. "The available state (Support)" shows a state in which no electric power shortage has occurred.

A transition among these three states is made to occur when the transmission power of data reaches the maximum transmission power (Pmax). When the state in which the transmission power of data reaches the maximum transmission power continues, the maximum transmission rate is lowered by, for example, making a transition from "the available state (Support)" to "the excess-of-power state (Excess-Power)", or a transition from "the excess-of-power state (Excess-Power)" to "the not-available state (Block)."

In performing the processes in steps ST700 and ST701, the mobile terminal evaluates that there is a margin for the remaining transmission power of the mobile terminal when detecting "the available state (Support)" (i.e., Yes in step ST701), whereas it evaluates that the remaining transmission power of the mobile terminal is insufficient when detecting "the excess-of-power state (Excess-Power)" or "the not-available state (Block)" (i.e., No in step ST701).

Thus, in order to judge whether or not DCH with a base station which complies with Rel6 can be maintained even if it releases DCH with a base station which complies with Rel5 or R99, the mobile terminal refers to the transmission power margin and the state of TFC so as to evaluate whether the communication quality of DCH with the base station which complies with Rel6 can be ensured, and notifies the evaluation result to the radio network controller. The radio network controller then updates the base station (s) included in the active set according to the evaluation result transmitted from the mobile terminal.

Figure 38:
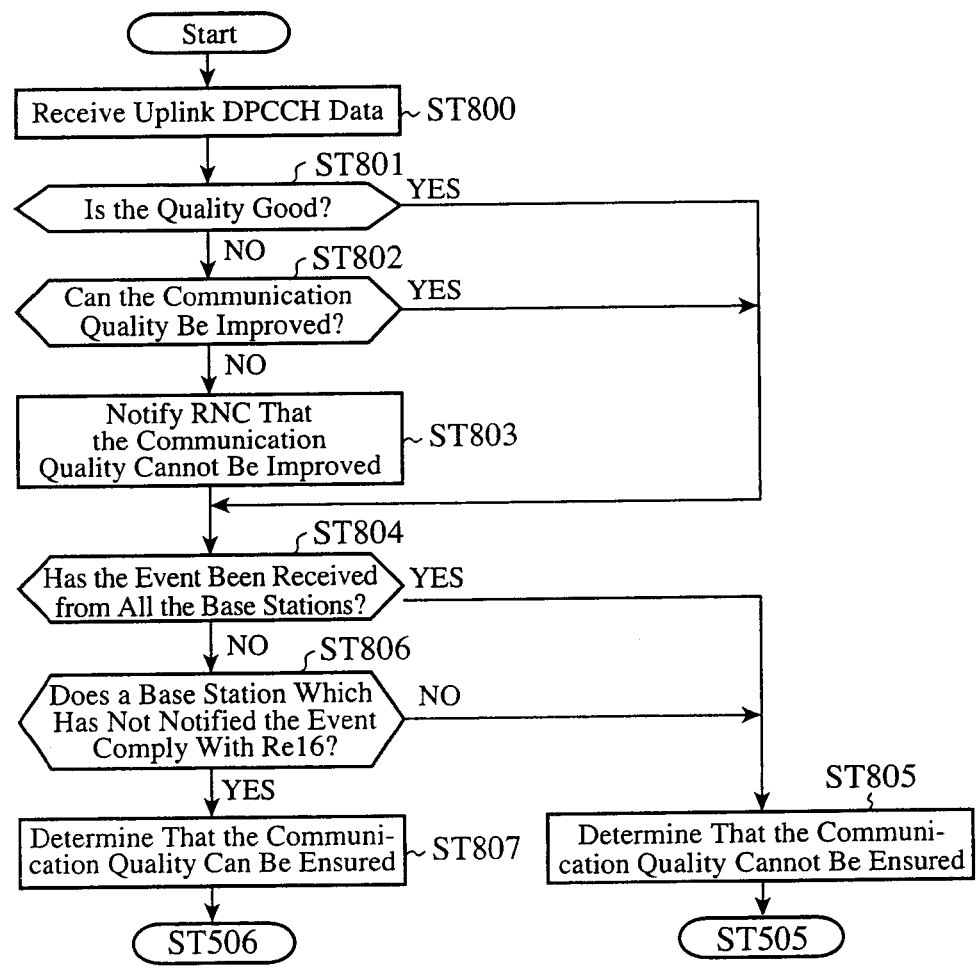
FIG. 38 is a flow chart in which details of the communication quality evaluation process.

FIG. 38 is a flow chart showing a second method for use in the communication quality evaluation process carried out in step ST504 of FIG. 35.

This second method for use in the communication quality evaluation process includes the steps of a base station evaluating the uplink communication quality, and notifying the evaluation result to the radio network controller, and the radio network controller judging whether or not the communication quality of DCH can be maintained in a state in which the base station which do not comply with Rel6 is excluded from the active set.

Among the steps shown in FIG. 38, the steps ST800 to ST803 are the processes carried out by the base station, and the steps ST804 to ST806 are the processes carried out by the radio network controller.

The base station receives uplink control channel (DPCCH) signals (data) transmitted from the mobile terminal (step ST800). The base station then judges whether the communication quality of the uplink control channel signals (data) received thereby has satisfied a certain condition, i.e., whether the communication quality exceeds a predetermined (given) level (step ST801). For example, the base station uses SIR (Signal to Interference ratio) as a reference for judging the communication quality and as a threshold. This threshold is referred to as a target SIR temporarily.

In step ST801, the base station calculates a reception SIR from the received uplink control channel signals (data), and, judges whether the quality of the uplink control channel signals (data) satisfies the predetermined (given) level by comparing this reception SIR with the target SIR.

When the base station determines that the communication quality of the uplink control channel signals (data) satisfies the predetermined (given) level (i.e., if Yes in step ST801), the radio network controller carries out a process of step ST804. In contrast, when determining that the communication quality of the uplink control channel does not satisfy the predetermined (given) level (i.e., if No in step ST801), the base station, in step ST802, judges whether or not there is scope for improvement in the communication quality of the uplink control relevant channel.

In order to judge whether the communication quality of the uplink control channel will be improved, whether transmission power control bits (TPC: Transmitter Power Control) for instructing increase in the transmission power have been transmitted continuously to the mobile terminal can be judged.

The base station transmits a TPC command to the mobile terminal in order to control the transmission power of the mobile terminal. Concretely, when the reception SIR has not reached the target SIR, the base station transmits a TPC command (referred to as an UP command from here on) for instructing the mobile terminal to "UP" the transmission power. In contrast, when the reception SIR is equal to or larger than the target SIR, the base station transmits a TPC command (referred to as a DOWN command from here on) for instructing the mobile terminal to "DOWN" the transmission power. The mobile terminal decodes the TPC command transmitted from the base station and changes the transmission power by 1 dB according to the command.

When receiving the UP command from the base station, the mobile terminal raises the transmission power unless the transmission power exceeds the maximum transmission power (Pmax). However, in a state in which the communication quality of a signal received by the base station is not good while the mobile terminal transmits with the maximum transmission power, it cannot be expected that an improvement in the communication quality is provided even if the mobile terminal raises the transmission power.

In step ST802, when the base station does not transmit the UP command to the mobile terminal continuously, or when the base station transmits the DOWN command to the mobile terminal, the base station determines that the communication quality of a signal received from the relevant mobile terminal can be improved (i.e., Yes in step ST802).

In contrast, when the communication quality of a signal received from the relevant mobile terminal is not good even though the base station has transmitted the UP command to the mobile terminal, the base station estimates that the communication quality of a signal received from the relevant mobile terminal cannot be improved (No in step ST802). In this case, the base station transmits an event (or a notification signal) to the radio network controller so as to notify the radio network controller that the quality of the uplink communications from the mobile terminal cannot be improved (step ST803).

The radio network controller judges whether the event indicating that the communication quality cannot be improved has been transmitted from all of base stations which are communicating with the predetermined (given) mobile terminal (step ST804).

When determining that all the base stations included in the active set of the predetermined (given) mobile terminal have transmitted the event (i.e., if Yes in step ST804), it may become impossible for the relevant mobile terminal to communicate any base station if the radio link with one of the base stations is disconnected. Therefore, the radio network controller determines that the communication quality cannot be ensured if it disconnects DCH with a base station which does not comply with E-DCH in order to add E-DCH (step ST805), and then carries out the process of step 505 shown in FIG. 35.

In contrast, when the event is not notified thereto from all of the plurality of base stations included in the active set associated with the relevant mobile terminal (i.e., if No in step ST804), the radio network controller judges whether a base station which has not notified the event thereto complies with Release 6 (step 806). When a base station which has not notified the event thereto complies with release 6 (i.e., if Yes in step ST806), the radio network controller determines that the communication quality can be ensured even if it releases DCH with a base station which does not comply with E-DCH (step ST807), and carries out the process of step ST506 shown in FIG. 35.

In contrast, when a base station which has notified the event thereto complies with release 6 (i.e., if No in step ST806), it is difficult for the radio network controller to set up E-DCH because the communication quality with the base station which complies with release 6 is not good, and the radio network controller notifies the core network that E-DCH cannot be used (step 507).

As previously explained, when the mobile terminal carries out transmission of E-DCH signals (data), the communications system in accordance with the present invention excludes a base station which does not comply with E-DCH, but comply with Rel5 or R99 from the active set, and makes the mobile terminal carry out transmission of E-DCH signals (data) on a priority basis. Thus, when the mobile terminal carries out transmission of E-DCH signals (data), the communications system excludes the base station which does not comply with E-DCH, but comply with Rel5 or R99 from the active set. Therefore, the present embodiment offers an advantage of being able to prevent available channels from being limited in the communication systems in which base station of different versions coexist.

In addition, as previously explained, in the communications system in accordance with the present invention, E-DCH assigned to mobile terminal through scheduling is used when it transmits a large volume of data to a base station. Therefore, the present embodiment offers an advantage of decreasing the interference level in the cell of the base station, thereby improving the throughput of the whole system. Furthermore, the present embodiment offers another advantage of being able to complete the transmission of data in a short time because the mobile terminal can transmit the large volume of data using E-DCH instead of DCH.

In addition, as previously explained, in the communications system in accordance with the present invention, the radio network controller carries out the active set judging process of judging whether to exclude a base station which complies with Rel5 or R99 from the active set. When releasing DCH with a base station which complies with Rel5, because the radio network controller carries out the active set judging process by taking into consideration whether the communications (for example, communications via DCH) with a base station which complies with Rel6 can be maintained (or whether the quality is ensured), the communications system can prevent E-DCH from being set up between a base station having not-good communication quality which complies with E-DCH and the mobile terminal. Therefore, the present embodiment offers an advantage of being able to prevent a problem that communications are stopped at the time of transmission of data via E-DCH from arising.

In the above-mentioned explanation, the radio network controller judges whether or not the communication quality of DCH with a base station which complies with E-DCH can be maintained in a state in which DCH with a base station which does not comply with E-DCH is released on the basis of the transmission power margin of the mobile terminal. As an alternative, the radio network controller can carry out the above-mentioned judgment using a "path loss." To be more specific, by paying attention to the fact that during a soft handover, the communication quality of DCH is adjusted to match that of a radio link with the lowest path loss, when the difference between the path loss (L1) of a radio link which is to be excluded from the active set and the smallest one (L2) of the path losses of other radio links is negative (i.e., L1−L2<0), the remaining transmissible power greater than the difference is set as a threshold, whereas when the difference is not negative (i.e., L1−L2>=0), it is determined that additional power is not needed and the threshold is not set up, and it is determined that excluding the target base station from the active set presents no problem. Instead of the path loss, the reception level of CPICH can be used.

Embodiment 9

In above-mentioned embodiment 8, the radio network controller carries out the active set judging process of judging whether to exclude a base station which does not comply with E-DCH, but complies with Rel5 or R99 from the active set. As an alternative, mobile terminal can carry out the process of judging whether to exclude a base station which does not comply with E-DCH from the active set.

Figure 39:
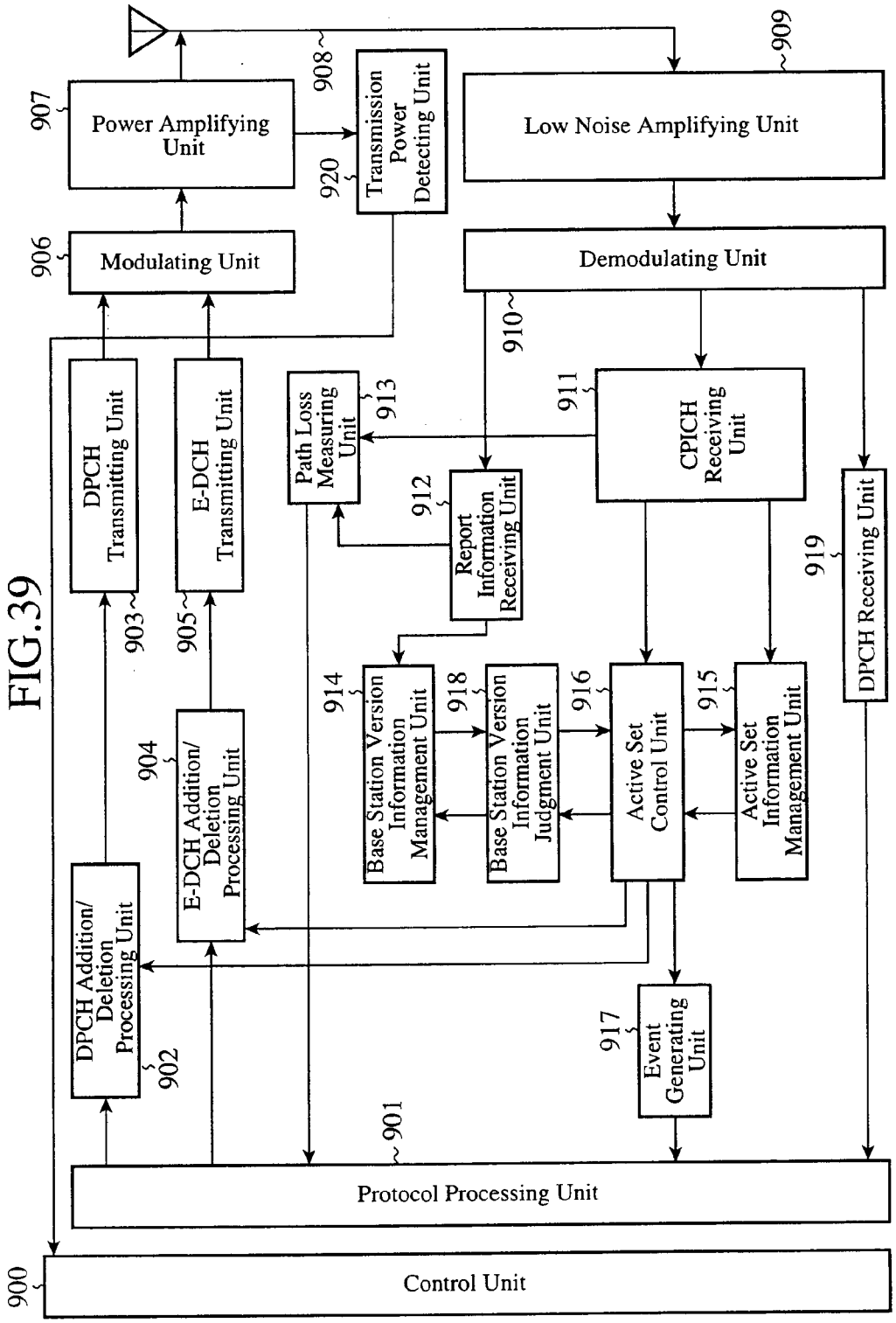
FIG. 39 is a block diagram of mobile terminal which constructs a communications system in accordance with embodiment 9 of the present invention.
Figure 40:
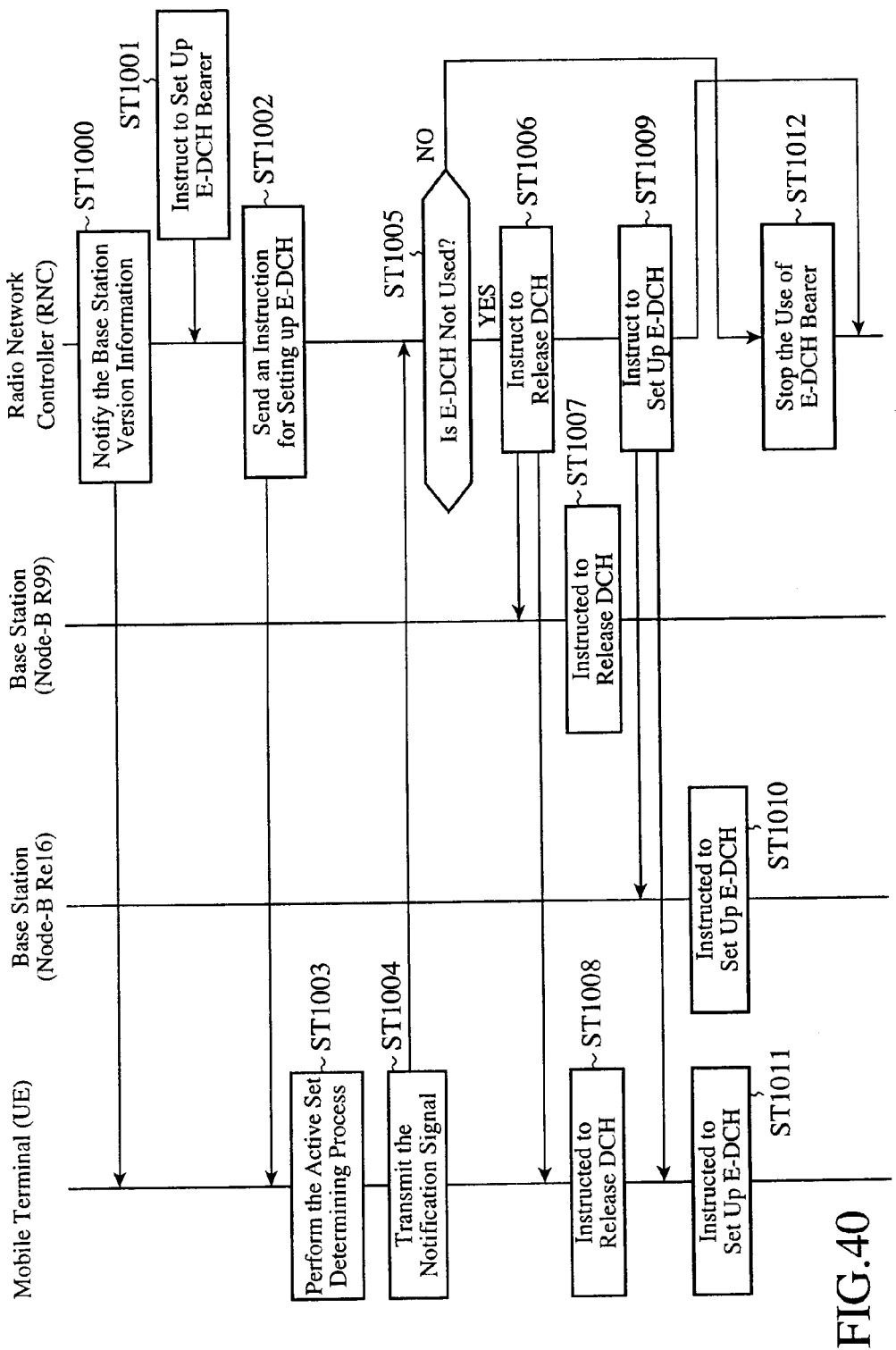
FIG. 40 is a flow chart explaining a soft handover control process in the communications system in accordance with embodiment 9 of the present invention.

FIG. 39 is a block diagram of the mobile terminal which constructs a communications system in accordance with embodiment 9 of the present invention. FIG. 40 is a flow chart explaining a soft handover control process in the communications system in accordance with embodiment 9 of the present invention.

In FIG. 39, a control unit 900 sets up a channel. A protocol processing unit 901 carries out a protocol process, such as a setup or release of a channel. A DPCH (Dedicated Physical Channel) addition/exclusion processing unit 902 controls a setup, addition, and exclusion of DPCH. DPCH is a physical channel onto which DCH which is a transport channel is mapped.

A DPCH transmitting unit 903 carries out a process for transmitting DPCH signals (data), such as channel coding. An E-DCH addition/exclusion unit 904 controls a setup, addition, and exclusion of E-DCH, like the DPCH addition/exclusion processing unit 902.

An E-DCH transmitting unit 905 carries out a process for transmitting E-DCH signals (data), like the DPCH transmitting unit 903. A modulating unit 906 modulates a signal, such as a DCH signal (data) or an E-DCH signal (data). A power amplifying unit 907 amplifies the signal so that it has desired power. An antenna 908 transmits or receives a signal. On a receive side of the mobile terminal, a low noise amplifying unit 909 amplifies a weak signal received by the antenna 908. A demodulating unit 910 demodulates the signal to generate DPCH signals (data), CPICH (Common Pilot Channel) signals (data), and so on. A CPICH receiving unit 911 receives a common pilot signal.

A report information receiving unit 912 receives scrambling codes required to identify base stations and version information with corresponds to each of the scrambling codes. A path loss measuring unit 913 acquires a propagation loss (or a path loss) from the reception level of CPICH.

A base station version information management unit 914 stores version information about each base station. An active set information management unit 915 stores which base station is included in the active set on the basis of the information about CPICH. An active set control unit 916 controls the active set judging process on the basis of the information on the active set and the version information about each base station.

An event generating unit 917 generates a control event for the active set, and sends it to the protocol processing unit. A base station version information judgment unit 918 judges the version of each base station on the basis of the information stored in the base station version information management unit 914. A DPCH receiving unit 919 processes the received DPCH signal (data). A detecting unit 920 detects received uplink transmission power. The base station version information management unit 914 and base station version information judgment unit 918 are newly provided in the terminal in accordance with the present invention.

In FIG. 40, the radio network controller notifies specifications with which each base station included in the active set complies to the mobile terminal (step ST1000). A scrambling code is used as identification information for identifying each base station. When then receiving an instruction for assigning E-DCH to a predetermined (given) mobile terminal from a core network (step ST1001), the radio network controller notifies the mobile terminal that an instruction for setting up E-DCH has been issued by the core network (step ST1002).

The mobile terminal which is instructed to set up E-DCH by the core network reads the active set which the mobile terminal itself manages. The mobile terminal then specifies a base station which does not comply with E-DCH (i.e., a base station which complies with Rel5 or R99) from among base stations currently recorded in the active set, and carries out the active set judging process of judging whether to exclude the base station from the active set (step ST1003). This active set judging process includes a process of evaluating the communication quality at the time of disconnecting DCH with the base station which does not comply with E-DCH.

As a result of carrying out the active set judging process in step ST1003, the mobile terminal transmits a notification signal to the radio network controller (step ST1004). When specifying abase station which is to be excluded from the active set, or when determining that E-DCH cannot be used, this notification signal includes information indicating that E-DCH is not used.

The radio network controller judges whether the mobile terminal uses E-DCH on the basis of the notification signal transmitted from the mobile terminal (step ST1005). When the mobile terminal does not use E-DCH (i.e., if No in step ST1005), the radio network controller stops the use of E-DCH bearer and notifies the core network that E-DCH cannot be set up (step ST1012).

In contrast, when the mobile terminal uses E-DCH (i.e., if Yes in step ST1005), the radio network controller instructs the base station specified by the mobile terminal to release DCH so as to exclude the base station from the active set (step ST1007). The radio network controller also instructs the mobile terminal to release DCH with the base station using the RRC (Radio Resource Control) protocol (step ST1006). The mobile terminal and base station release DCH in response to the instructions from the radio network controller, respectively (steps ST1007 and ST1008).

The radio network controller instructs each base station currently recorded in the active set to set up E-DCH with the mobile terminal using the NEAP protocol. Simultaneously, the radio network controller instructs the mobile terminal to set up E-DCH between the mobile terminal and the base station using the RRC protocol (step ST1009). A process of setting up E-DCH between the mobile terminal and the base station is then carried out in response to the instruction from the radio network controller (steps ST1010 and ST1011).

Figures 41, 42:
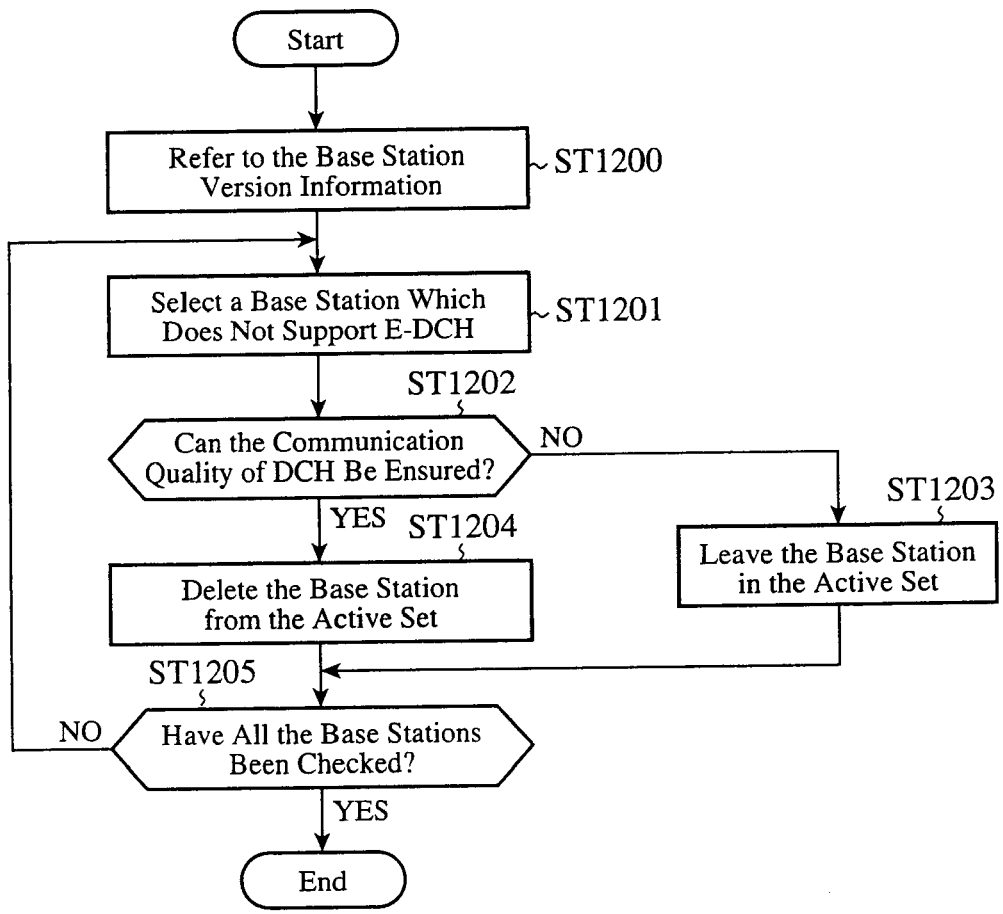
FIG. 41 is an explanatory diagram for explaining base station version information which a radio network controller notifies to mobile terminal.
FIG. 42 is a flow chart explaining an active set judging process which the mobile terminal carries out.

FIG. 41 is an explanatory diagram for explaining the base station version information which the radio network controller notifies to the mobile terminal. The base station version information shown in FIG. 41 includes scrambling codes each of which is information for identifying one of two or more base stations which exist in the vicinity of the cell in which the mobile terminal is located, and the versions of the standards with which these base station comply, respectively, which are associated with the scrambling codes, respectively. Because a scrambling code is always assigned to each base station, it is suitable to identify each base station.

Hereafter, how the radio network controller notifies the version information about each base station to the mobile terminal will be explained.

First, in order to notify the version information about each base station to the mobile terminal, a common channel or a dedicated channel can be provided as a channel which the radio network controller uses. When notifying the version information about each base station to the mobile terminal using a common channel, BCH (Broadcast Channel) is used. In contrast, when notifying the version information about each base station to the mobile terminal using a dedicated channel, DCH is used.

When notifying the version information about each base station to the mobile terminal using DCH, only cell information about a cell in which the target mobile terminal becomes the active set currently is notified. Instead of the scrambling code, CELL_ID can be used as the information which the mobile terminal uses to identify each base station. Furthermore, in order to notify the version information about each base station to the mobile terminal, the radio network controller can carry the base station version information onto "surrounding cell information" and then notifies it to the mobile terminal.

FIG. 42 is a flowchart explaining the active set judging process which the mobile terminal carries out. FIG. 42 shows the details of the active set judging process of step ST1003 shown in FIG. 40.

When receiving a notification indicating a setup of E-DCH from the radio network controller, the mobile terminal refers to the base station version information (step ST1200), and selects one base station which does not comply with E-DCH (step ST1201). The mobile terminal judges whether the communication quality of DCH with a base station which complies with E-DCH can be ensured if excluding the selected base station which does not comply with E-DCH from the active set (step ST1202).

Because the process in step 1202 is the same as the process of carrying out the judgment on the basis of the transmission power margin of the mobile terminal, which is explained in above-mentioned embodiment 8, the explanation of the process will be omitted hereafter.

When the communication quality of DCH with the base station which complies with E-DCH cannot be maintained if excluding the base station which does not comply with E-DCH from the active set (i.e., if No in step ST1202), the mobile terminal maintains DCH with the base station which does not comply with E-DCH without excluding the base station which does not comply with E-DCH from the active set (step ST1203). In contrast, when the communication quality of DCH with the base station which complies with E-DCH can be maintained even if the mobile terminal excludes the base station which does not comply with E-DCH from the active set (i.e., if Yes in step ST1202), the mobile terminal excludes the base station which does not comply with E-DCH from the active set (step ST1204).

After carrying out step ST1203 or ST1204, the mobile terminal judges whether it has checked all the base stations stored in the active set (step ST1205). If one or more yet-to-be-checked base stations remain in the active set (i.e., if No in step ST1205), the mobile terminal repeats the processes in step ST1201 and subsequent steps. In contrast, when no yet-to-be-checked base station remains in the active set (i.e., if Yes in step ST1205), the mobile terminal ends the active set judging process and carries out the notification signal transmission process of step ST1004 shown in FIG. 40.

When the communication quality of DCH with the base station which complies with E-DCH cannot be maintained if, in step ST1004, excluding the base station which does not comply with E-DCH from the active set (i.e., if No in step ST1202), the mobile terminal transmits a notification signal indicating that E-DCH is not used to the radio network controller. In contrast, when the communication quality of DCH with the base station which complies with E-DCH can be maintained even if the mobile terminal excludes the base station which does not comply with E-DCH from the active set (i.e., if Yes in step ST1202), the mobile terminal transmits a notification signal indicating the base station which is excluded from the active set to the radio network controller As previously explained, when the mobile terminal carries out transmission of E-DCH signals (data), the communications system in accordance with the present invention excludes a base station which does not comply with E-DCH, but complies with Rel5 or R99 from the active set, and makes the mobile terminal carry out transmission of E-DCH signals (data) on a priority basis. Thus, when the mobile terminal carries out transmission of E-DCH signals (data), the communications system excludes the base station which does not comply with E-DCH, but complies with Rel5 or R99 from the active set. Therefore, the present embodiment offers an advantage of being able to prevent available channels from being limited in the communications system in which base station of different versions coexist.

In addition, as previously explained, in the communication system in accordance with the present invention, E-DCH assigned to the mobile terminal through scheduling is used when it transmits a large volume of data to a base station. Therefore, the present embodiment offers an advantage of decreasing the interference level in the cell of the base station, thereby improving the throughput of the whole system. Furthermore, the present embodiment offers another advantage of being able to complete the transmission of data in a short time because the mobile terminal can transmit the large volume of data using E-DCH instead of DCH.

In addition, as previously explained, in the communications system in accordance with the present invention, when releasing DCH with a base station which complies with Rel5 (or R99), because the radio network controller carries out the active set judging process by taking into consideration whether the communications (for example, communications via DCH) with a base station which complies with Rel6 can be maintained (or whether the quality is ensured), the communications system can prevent E-DCH from being set up between a base station having not-good communication quality which complies with E-DCH and the mobile terminal. Therefore, the present embodiment offers an advantage of being able to prevent a problem that communications are stopped at the time of transmission of data via E-DCH from arising.

In addition, as previously explained, in the communications system in accordance with the present invention, because the mobile terminal carries out the active set judging process, the number of times that signaling to the radio network controller is carried out can be reduced. Furthermore, because the mobile terminal takes charge of the functions of the radio network controller, the overload of the radio network controller can be reduced, and a problem, such as a congestion, can be prevented from arising.

Embodiment 10

In above-mentioned embodiment 8, when instructed to set up E-DCH by the core network in a state in which mobile terminal is communicating with two or more base stations using DCH, the radio network controller carries out the active set judging process. As an alternative, the radio network controller can be triggered to carry out the active set judging process at the time when mobile terminal which is communicating using E-DCH moves to the cell of a base station which does not comply with Rel6.

Hereinafter, the active set judging process which the radio network controller carries out at the time when mobile terminal which is communicating using E-DCH moves to the cell of a base station which does not comply with Rel6 will be explained.

Figure 43:
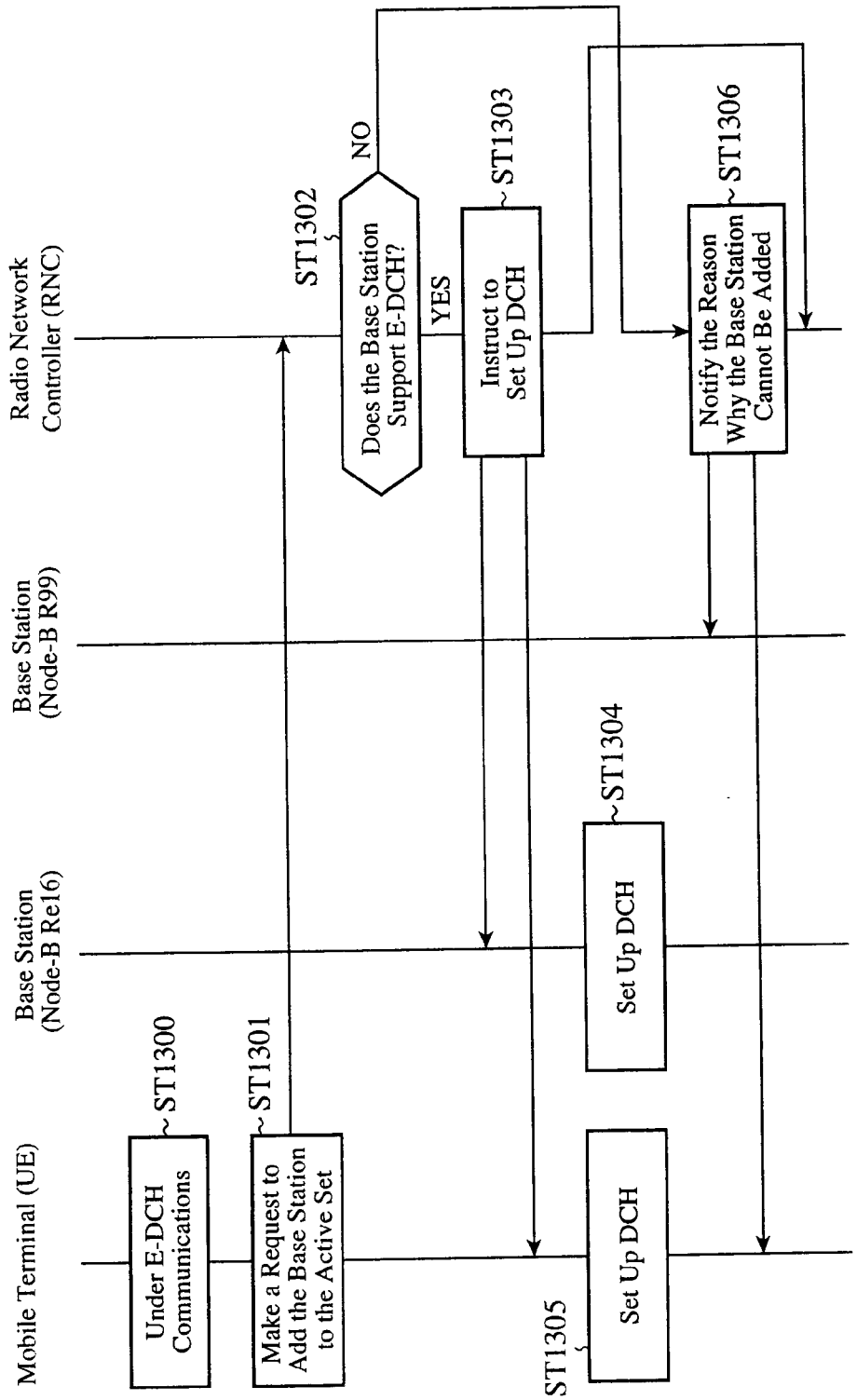
FIG. 43 is a flow chart explaining a soft handover control process in a communications system in accordance with embodiment 10 of the present invention.

FIG. 43 is a flowchart explaining a soft handover control process in a mobile communications system in accordance with embodiment 10 of the present invention.

In step ST1300, when mobile terminal which is carrying out data transmission with a base station which complies with Rel6 using E-DCH moves to a cell managed by another base station, the reception level of the mobile terminal reaches a reference level.

The mobile terminal transmits an event indicating a request to add the base station which corresponds to the cell to which it has moved to the active set to the radio network controller (step ST1301). The radio network controller judges whether the base station which it is requested to add to the active set can use E-DCH. More specifically, the radio network controller judges whether the base station complies with Rel6 (step ST1302).

When the base station which the radio network controller has been requested by the mobile terminal to add to the active set can use E-DCH, for example, when the base station complies with Rel6 (i.e. if Yes in step ST1302), the radio network controller changes the active set so as to add the base station to the active set, and instructs the terminal and base station to set up DCH (step ST1303).

Each of the base station and mobile terminal which have been instructed to set up DCH by the radio network controller sets up DCH (steps ST1304 and ST1305).

In contrast, when the base station which the radio network controller has been requested by the mobile terminal to add to the active set cannot use E-DCH, for example, when the base station complies with Rel5 or R99 (i.e., if No in step ST1302), the radio network controller determines that it cannot add the base station which the radio network controller has been requested by the mobile terminal to add to the active set to the active set. The radio network controller then transmits information about the reason why it cannot add the base station to the active set to the mobile terminal (step ST1306). The reason why the radio network controller transmits the information about the reason why it cannot add the base station to the active set to the base station and mobile terminal is because the terminal prevents itself from reducing the reference level required to judge whether a handover should be carried too much.

As previously explained, in the communications system in accordance with this embodiment 10, when, for example, mobile terminal which is transmitting data via E-DCH enters a cell managed by a base station which cannot use E-DCH, the radio network controller prevents the base station corresponding to the cell to which the mobile terminal has moved from being added to the active set. Therefore, by carrying out this process, the radio network controller can avoid a handover to any base station which does not support backward compatibility, and can enable the use of E-DCH on a priority basis and can prevent incorrect interpretation of the slot format.

Embodiment 11

In above-mentioned embodiment 9, when instructed to set up E-DCH by the core network in a state in which mobile terminal is communicating with two or more base stations using DCH, the radio network controller carries out the active set judging process. As an alternative, the mobile terminal itself can be triggered to carry out the active set judging process at the time when the mobile terminal which is communicating using E-DCH moves to the cell of a base station which does not comply with Rel6.

Hereinafter, the active set judging process which the mobile terminal carries out at the time when the mobile terminal which is communicating using E-DCH moves to the cell of a base station which does not comply with Rel6 will be explained.

Figure 44:
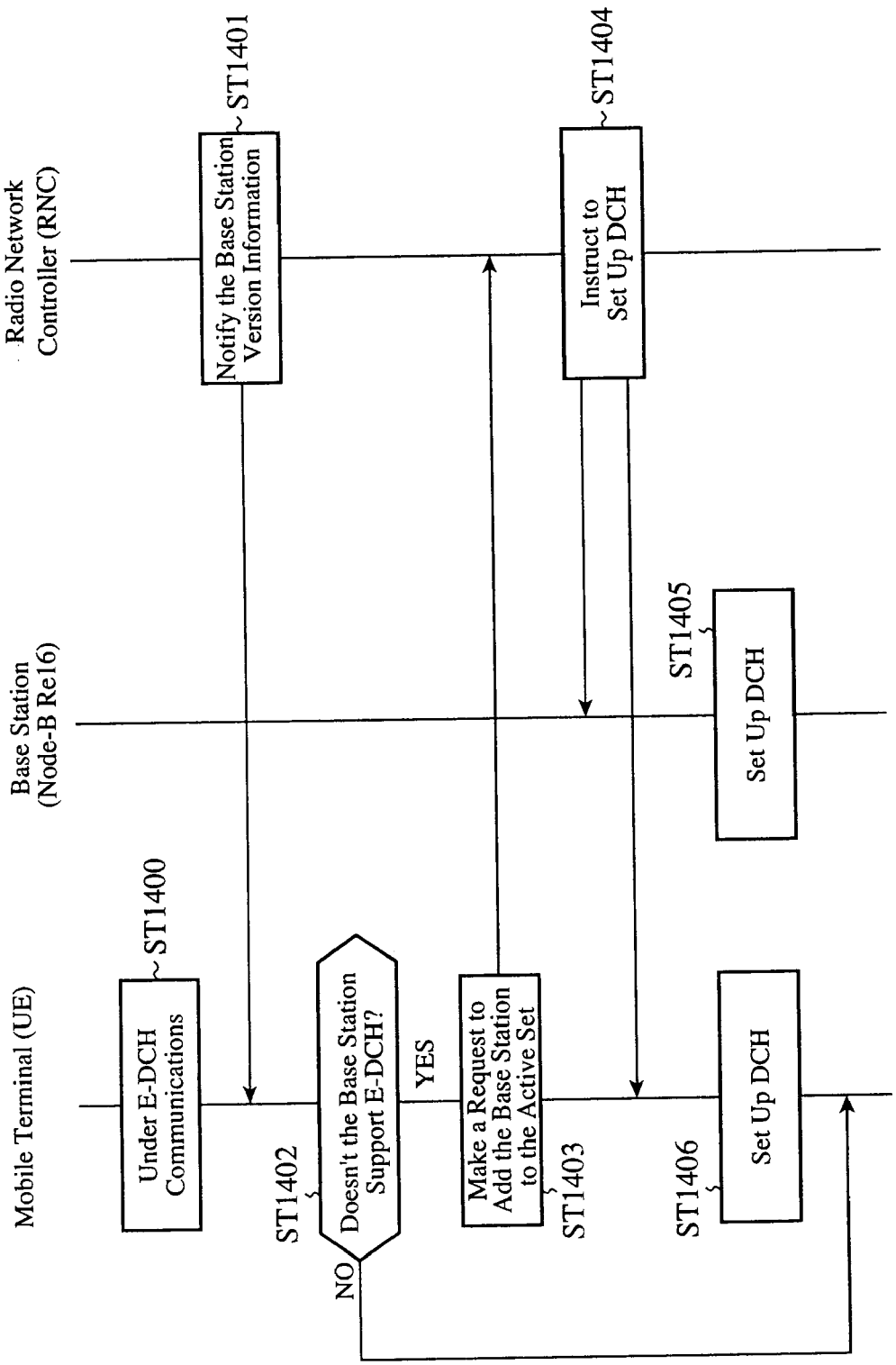
FIG. 44 is a flow chart explaining a soft handover control process in a communications system in accordance with embodiment 11 of the present invention.

FIG. 44 is a flow chart explaining a soft handover control process in a mobile communications system in accordance with embodiment 11 of the present invention. In FIG. 44, the mobile terminal is transmitting data to a base station which complies with Rel6 using E-DCH (step ST1400), and the radio network controller notifies base station version information as shown in FIG. 41 to the mobile terminal (step 1401).

When the mobile terminal which is transmitting data using E-DCH moves to a cell managed by another base station, the mobile terminal judges whether the base station corresponding to the cell to which it has moved can use E-DCH by referring to corresponding base station version information (step ST1402).

When the base station corresponding to the cell to which the mobile terminal has moved complies with Rel5 or R99 (i.e., if Yes in step ST1402), the mobile terminal ends the processing without transmitting a notification indicating a request to add the base station corresponding to the cell to which the mobile terminal has moved to the active set to the radio network controller.

In contrast, when the base station corresponding to the cell to which the mobile terminal has moved complies with Rel6 (i.e., if No in step ST1402), the mobile terminal transmits a notification indicating a request to add the base station corresponding to the cell to which the mobile terminal has moved to the active set to the radio network controller (step ST1403).

When receiving the notification from the mobile terminal, the radio network controller adds the specified base station to the active set and also instructs the base station and mobile terminal to set up DCH (step ST1404). Each of the mobile terminal and base station sets up DCH in response to the instruction from the radio network controller (steps ST1405 and ST1406).

The base station version information includes a scrambling code which is used for identifying a base station among two or more base stations, and the version of a standard with which the base station complies, which is associated with the scrambling code. The base station version information is notified from the radio network controller to the mobile terminal via BCH or DCH.

The mobile terminal refers to the base station version information using the scrambling codes of the base station corresponding to the cell to which the mobile terminal has moved and base stations corresponding to surrounding cells so as to judge whether the cell to which the mobile terminal has moved and surrounding cells comply with E-DCH.

As previously explained, in the communications system in accordance with this embodiment 11, when, for example, mobile terminal which is transmitting data via E-DCH enters a cell managed by a base station which cannot use E-DCH, the mobile terminal prevents the base station corresponding to the cell to which the mobile terminal has moved from being added to the active set. Therefore, by carrying out this process, the mobile terminal can avoid a handover to any base station which does not support backward compatibility, and can enable the use of E-DCH on a priority basis and can prevent incorrect interpretation of the slot format.

In addition, as previously explained, in the communications system in accordance with the present invention, because the mobile terminal carries out the active set judging process, the number of times that signaling to the radio network controller is carried out can be reduced. Furthermore, because the mobile terminal takes charge of the functions of the radio network controller, the overload of the radio network controller can be reduced, and a problem, such as a congestion, can be prevented from arising.

Embodiment 12

In above-mentioned embodiment 2, an explanation is given on the affirmative addition made by the radio network controller 3, of a base station having a small margin for the interference level to a group of non-serving base stations 2-2 (i.e., an E-DCH active set).

However, in a period of transition to a Release 6-compliant system, in which base stations which do not comply with Release6 (i.e., base stations which do not support E-DCH services), and base stations which comply with Release 6 (i.e., base stations which support E-DCH services) coexist, it is also important to select a base station to be included in the E-DCH active set according to base station version information, as previously explained in above-mentioned embodiment 10.

Therefore, in this embodiment 12, how the radio network controller 3 selects a base station to be included in the E-DCH active set from a prior art active set (i.e., an active set for soft handovers) on the basis of a margin for the interference level in each base station and the version information about each base station will be disclosed.

In accordance with this embodiment 12, a more-optimal base station can be selected as a base station to be added to the E-DCH active set for supporting E-DCH services.

As previously explained in above-mentioned embodiment 2, in case the radio network controller 3 is the unit which is responsible for judging whether to change a base station to a non-serving base station, there is an advantage of each base station 2 being able to measure the interference level.

When each base station 2 carries out signaling to mobile terminal 1, there is a high possibility that errors occur because it uses a wireless line. When each base station 2 notifies the radio network controller 3 the interference level information, it uses a cable line, and compared to using a wireless line, the frequency of occurrence of errors can be reduced greatly, thereby enabling each base station to notify higher quality information to the radio network controller 3.

Figure 47:
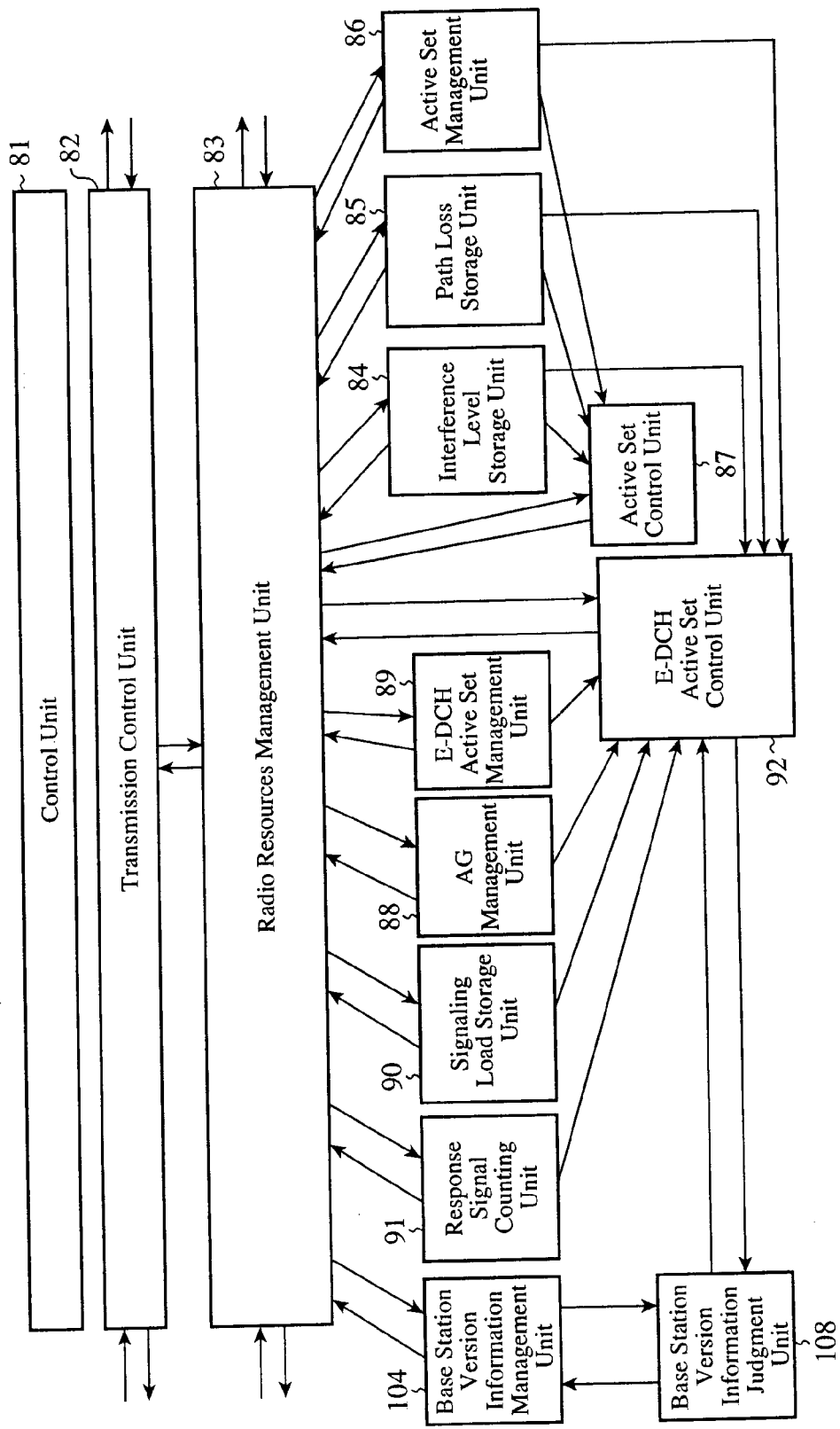
FIG. 47 is a block diagram showing a radio network controller of a mobile communications system in accordance with embodiment 12 of the present invention.

FIG. 47 is a block diagram showing the radio network controller 3 of the mobile communications system in accordance with embodiment 12 of the present invention, in which a base station version information management unit 104 and a base station version information judgment unit 108 shown in FIG. 31 are added to the radio network controller 3 as shown in FIG. 4.

Figure 48:
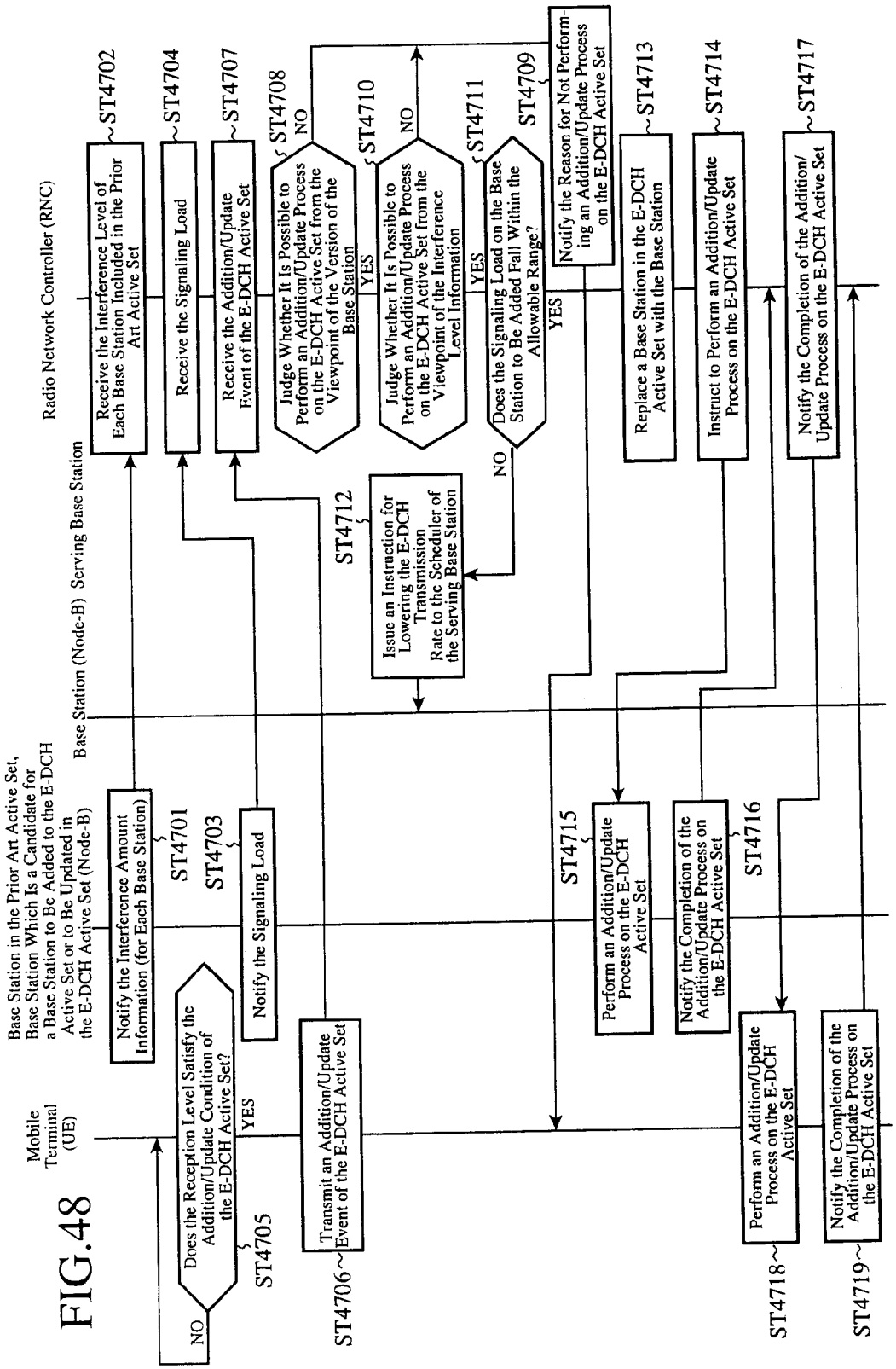
FIG. 48 is a sequence diagram showing a sequence of the mobile communications system at the time when the radio network controller judges whether to add a base station to the E-DCH active set.
Figure 49:
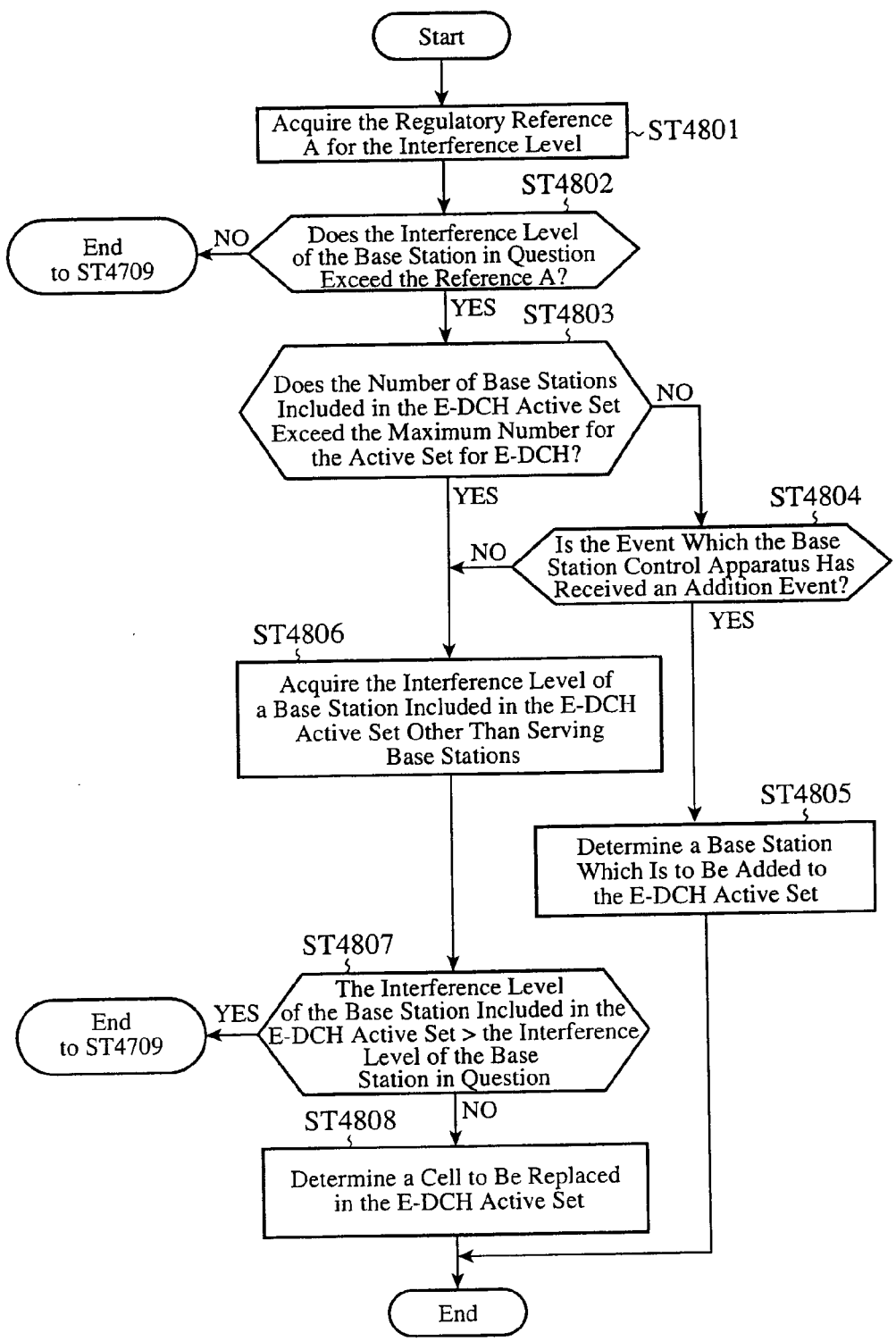
FIG. 49 is a flow chart showing in detail a process of judging whether to add a base station to the E-DCH active set on the basis of interference level information, which is carried out by the radio network controller.

FIG. 48 is a sequence diagram showing a sequence of the mobile communications system at the time when the radio network controller 3 judges whether to add a base station 2-3 to the E-DCH active set, and FIG. 49 is a flow chart showing in detail the process carried out by the radio network controller 3 in step ST4710 of FIG. 48, judging whether to add the base station 2-3 to the E-DCH active set on the basis of the interference level information.

First, the operation of the mobile communications system at the time when the radio network controller 3 judges whether to add the base station 2-3 to the E-DCH active set will be explained.

To begin with, the radio network controller 3 can acknowledge the version information on a base station 2-3 which is under the control thereof, by reading such a base station 2-3's version information which is stored in the base station version information management unit 104.

An interference level informing unit 68 of each of all base stations 2-1, 2-2, and 2-3 included in the prior art active set notifies the radio network controller 3 the interference level information measured by an interference level measuring unit 65 (step ST4701).

For example, the interference level information notified from each of the base stations 2-1, 2-2, and 2-3 can be one of the following information. However, the following information shown below is only an example, and any other information can be notified as long as it represents a similar description.

(1) An Absolute Value of the Interference Level in Each Base Station 2 Measured by the Interference Level Measuring Unit 65 of Each Base Station 2

The absolute value of the interference level in each base station 2 is an interference level calculated by removing, on the basis of a reception intensity outputted from a low noise amplifying unit 54 and a pilot in the received signal outputted from a demodulating unit 55, a signal component from a received signal.

(2) An Absolute Value of an Uplink SIR Calculated by an SIR Calculating Unit 66 of Each Base Station 2

The absolute value of the uplink SIR is an uplink SIR showing a ratio between the DPCCH signal (data) decoded by a DPCCH receiving unit 58 and the interference level measured by the interference level measuring unit 65.

In a soft handover state, if the SIR of either one of the base stations 2-1, 2-2, and 2-3 can be guaranteed, the signal intensity does not necessarily become the same level in each of the base stations 2-1, 2-2, and 2-3 since power is not increased any further.

Therefore, if whether to add the base station 2-3 to the E-DCH active set is judged on the basis of not only the interference level of the base station 2-3, but also the uplink SIR, the base station 2-3 which is judged in consideration of not only the interference level but also the reception quality can be included in the E-DCH active set.

As a result, there is an advantage of being able to actualize both the control of the interference level and the macro diversity effect.

(3) An Absolute Value of the Interference Margin in Each Base Station 2

The absolute value of the interference margin is, for example, power (or an interference margin) which is obtained by subtracting from the allowable reception power (or the maximum reception power) of the base station 2, the total reception power which is the sum of the power of interference from other base stations, thermal noises, and the power of reception from all mobile terminal(s) 1 within the self-base station.

In this example, the total reception power is used in order to calculate the interference margin. However, instead of the total reception power, the uplink interference power can be used alternatively. The uplink interference power is obtained by subtracting from the total reception power, the reception power from all mobile terminal(s) 1 within the self-base station.

(4) Instead of the Absolute Value of the Information Shown in Each of (1) to (3), a Relative Value or a Difference which is Obtained by Comparing a Current State with a Previous State which Occurred a Certain Time Before can be Considered In this case, the notification from each base station 2 to the radio network controller 3 can be carried out at predetermined (given) intervals or only when a change takes place.

The timing for this notification can be decided beforehand or can be calculated through signaling from each base station 2 or the radio network controller 3. As an alternative, an E-DCH active set control unit of the mobile terminal 1 or that of each base station 2 can calculate the timing for this notification.

The advantage of notifying the relative value or the difference is, that when the accuracy of the absolute value measured as the interference level information is coarse, errors can be canceled by calculating the relative value or the difference between the current state and the previous state, i.e., a ratio between the current state and the previous state, thereby enabling the notification of information of finer quality.

(5) The Information Shown in (1) to (3) is Classified into Classes (Ranks) in Advance, and these Classes are Used for the Notification of the Interference Level Information from Each Base Station 2 to the Radio Network Controller 3

As a result, the amount of information required for notifying the interference level information can be effectively reduced.

The radio network controller 3 receives the interference level information from each of all the base stations 2-1, 2-2, and 2-3 included in the prior art active set (step ST4702).

The interference level informing unit 68 of each of all the base stations 2-1, 2-2, and 2-3 included in the prior art active set notifies a signaling load measured by a signaling measuring unit 79 to the radio network controller 3 (step ST4703).

A transmission control unit 82 of the radio network controller 3 receives the signaling load from each of all the base stations 2-1, 2-2, and 2-3 included in the prior art active set (step ST4704).

As the signaling load notified from each of the base stations 2-1, 2-2, and 2-3, the following information can be considered, for example. However, the following information shown below is only an example, and any other information can be notified as long as it represents a similar description.

A. From the Viewpoint of the Number of Codes Available in Each Base Station (1) The Number of Codes which Each Base Station Uses As shown in above-mentioned embodiment 2, the signaling measuring unit 79 of each base station 2 measures the signaling load (i.e., the number of signalings which the E-AGCH transmitting unit 76, the E-RGCH transmitting unit 77, and the E-HICH transmitting unit 78 use), and notifies the number of signalings to the radio network controller 3.

(2) The Number of Codes which the Relevant Base Station can Further Use

A protocol processing unit 57 of the relevant base station 2 notifies the number of codes which the E-RGCH transmitting unit 77 and the E-HICH transmitting unit 78 can further use to the radio network controller 3 on the basis of the number of currently-used signalings which has been measured in above-mentioned (1).

(3) A Judgment Result, Concluded on the Basis of the Number of Codes which can be Used, Showing Whether it is Possible to Add The Relevant Base Station to the E-DCH Active Set On the basis of the measured result of (1), the protocol processing unit 57 of each of the base stations 2-1, 2-2, and 2-3 judges whether there is a margin for the number of codes, and notifies the judgment result to the radio network controller 3.

As a result, the amount of information, as compared with the notification of either one of above-mentioned (1) and (2), can be effectively reduced.

B. From the Viewpoint of the Allowable Downlink Transmission Power of Each Base Station As a capability of each base station 2, each base station 2 has allowable downlink total transmission power.

However, each base station 2 cannot carry out transmission with power greater than the allowable downlink total transmission power. Therefore, from the viewpoint of the number of codes which each base station 2 can use, as shown in above-mentioned (1), or (instead) from the viewpoint of the allowable downlink transmission power of each base station 2, each of the base stations 2-1, 2-2, and 2-3 can notify the signaling load to the radio network controller 3.

(1) The Downlink Total Transmission Power which Each Base Station Uses

Each base station 2 measures the downlink total transmission power which it uses, and notifies that downlink total transmission power to the radio network controller 3.

(2) Power which the Relevant Base Station can Further Use for Transmission

On the basis of the downlink total transmission power which has been measured in above-mentioned (1) and which the relevant base station is currently using, the base station notifies, as the power which the base station can further use for transmission, a downlink transmission power margin to the radio network controller 3.

(3) A Judgment Result, Concluded on the Basis of the Downlink Transmission Power which the Base Station can Use, Indicating Whether it is Possible to Add the Relevant Base Station to the E-DCH Active Set On the basis of the measured result of (1), the protocol processing unit 57 of each of the base stations 2-1, 2-2, and 2-3 judges whether there is a margin for the transmission power, and notifies the judgment result to the radio network controller 3.

As a result, the amount of information, as compared with the notifications of above-mentioned (1) and (2), can be effectively reduced.

The mobile terminal 1 judges whether the reception level satisfies an addition condition/update condition of the E-DCH active set (step ST4705).

As the addition condition of the E-DCH active set, a case in which the reception level of CPICH from the base station 2-3 included in the prior art active set (=the active set for soft handovers) exceeds a threshold can be considered.

A predetermined (given) value can be used as this threshold, or a value notified through signaling from the radio network controller 3 can be used.

Furthermore, as the update condition of the E-DCH active set, a case in which the reception level of CPICH from the base station 2-3 included in the prior art active set exceeds the reception level of CPICH from each of the base stations 2-1 and 2-2 included in the E-DCH active set can be considered.

The mobile terminal 1 transmits an addition event of adding the relevant base station to the E-DCH active set to the radio network controller 3 via the base stations 2-1, 2-2, and 2-3 when the addition condition is satisfied (step ST4706).

The mobile terminal 1 transmits an update event of updating the base station(s) included in the E-DCH active set to the radio network controller 3 via the base stations 2-1, 2-2, and 2-3 when the update condition is satisfied (step ST4706).

These addition events/update events for the E-DCH active set differ from the addition events/update events for the prior art active set. By making the addition events/update events for the E-DCH active set differ from the addition events/update events for the prior art active set, another judgment criterion can be provided.

Concretely, the interference margin or signaling load of each of the base stations 2-1, 2-2, and 2-3 on which a premium has not been placed as a judgment criterion when selecting a base station to be included in the active set in the case of a prior art technique (prior to support for E-DCH services), the version information of the base station 2-3 which is essentially unnecessary as a judgment criterion, or the like can be incorporated as a judgment criterion.

As a result, a more-optimal base station 2 can be selected as a base station to be added to the E-DCH active set for supporting E-DCH services.

As a method of notifying the event from the mobile terminal 1 to the radio network controller 3, the following methods can be provided.

(1) The mobile terminal 1 transmits the event to the radio network controller 3 using the RRC protocol.

(2) The mobile terminal 1 transmits the event to each of the base stations 2-1, 2-2, and 2-3 using MAC signaling, and each of the base stations 2-1, 2-2, and 2-3 transfers the event to the radio network controller 3 using the NEAP protocol.

The radio network controller 3 receives the addition event/update event for the E-DCH active set transmitted from the mobile terminal 1 (step ST4707).

The radio network controller 3, after receiving from the mobile terminal 1 the addition event/update event for the E-DCH active set, judges whether E-DCH can be used in the relevant base station 2-3 which is requested to be added to/updated in the E-DCH active set.

More specifically, the radio network controller 3's t-h-e base station version information judgment unit 108 refers to the base station 2-3's version information stored in the base station version information management unit 104, and judges whether the relevant base station 2-3 complies with Release6 (step ST4708).

If not Release 6-compliant, the relevant base station 2-3 does not support E-DCH services, and therefore the radio network controller 3 does not add to/update in the E-DCH active set the relevant base station 2-3.

When judging whether the relevant base station 2-3 complies with Release 6, the radio network controller 3's base station version information judgment unit 108 considers a case in which the base station 2-3's version information is not stored in the base station version information management unit 104 due to, for example, the relevant base station 2-3 not being a base station under the radio network controller 3's control.

In such a case, the radio network controller 3 requests the relevant base station 2-3 to report its version information.

The relevant base station 2-3, after receiving the request to report its version information from the radio network controller 3, notifies its version information to the radio network controller 3. In so doing, there can be cases in which communication is carried out directly between the radio network controller 3 and the relevant base station 2-3, and cases in which communication is carried out directly between them via another radio network controller responsible for managing the relevant base station 2-3.

The radio network controller 3, when not adding to/updating in the E-DCH active set the relevant base station 2-3, notifies the mobile terminal 1 the reason for not carrying out the addition to/update in the E-DCH active set. This is for the mobile terminal 1 not to excessively relax the conditions for the addition/update for the E-DCH active set (step ST4709).

As a result, for the same reason, the radio network controller 3 can be spared of situations of making judgments not to accept events. Therefore, the load in the radio network controller 3 can be reduced. In addition, in respect of the eliminability of event transmissions, the radio resources of the mobile communications system can be used effectively. This step ST4709 is optional.

In contrast, when the relevant base station 2-3 complies with Release6, the radio network controller 3 advances to the next step.

Next, on the basis of the interference level information, the radio network controller 3 judge whether to add to/update in the E-DCH active set the relevant base station 2-3 (step ST4710). The details of the judgment process for the addition to/update in the E-DCH active set will be explained with reference to FIG. 49.

As the advantage of making the addition/update judgment based not on the uplink communication quality but on the interference level information, or, as the advantage of making the addition/update judgment based on both the uplink communication quality and the interference level information, the following can be considered.

When compared with prior art uplink packet communications, E-DCH (uplink high-speed packet communications) operates at a higher speed, and therefore, the uplink transmission power from the mobile terminal 1 also increases. That is, the level of interference towards each base station 2 also increases.

As base stations 2 included in the E-DCH active set, the serving base station 2-1 and the non-serving base station 2-2 are disposed.

As mentioned above, the serving base station 2-1 carries out scheduling for the mobile terminal 1. More specifically, the serving base station 2-1 can issue instructions regarding the mobile terminal 1' transmission rate by using E-AGCH (E-DCH Absolute Grant Channel), E-RGCH (E-DCH Relative Grant Channel), or the like.

In contrast, the non-serving base station 2-2 does not carryout scheduling for the mobile terminal 1. The non-serving base station 2-2 can only transmit to the mobile terminal 1 a command (i.e., a Down command) which requests for the lowering of the transmission rate by using E-RGCH, and cannot carry out scheduling.

This fact shows that when there is a shortage of the interference margin of the serving base station 2-1, this serving base station 2-1 can adjust the scheduling of the mobile terminal 1 which is transmitting E-DCH signals (data), and can request this mobile terminal 1 to lower its transmission rate by using E-AGCH or E-RGCH. This fact also shows that when there is a shortage of the interference margin of the non-serving base station 2-2, this non-serving base station 2-2 can transmit a Down command by using E-RGCH to the mobile terminal 1 which is transmitting E-DCH signals (data), so as to request this mobile terminal 1 to lower its transmission rate.

In contrast, the base station 2-3 which is not included in the E-DCH active set but is included in the prior art active set does not have any means of requesting the mobile terminal 1 which is transmitting E-DCH signals (data) to lower its transmission rate.

Therefore, when there is a shortage of the interference margin of the base station 2-3 which is not included in the E-DCH active set but is included in the prior art active set, it is necessary to provide means of requesting the mobile terminal 1 which is transmitting E-DCH signals (data) to lower its transmission rate, by adding the relevant base station 2-3 to the E-DCH active set.

As a result, the mobile communications system's communication quality can be prevented from being degraded due to the shortage of the interference margin of the base station 2-3 which is not included in the E-DCH active set but is included in the prior art active set.

The radio network controller 3, when determining in step ST4710 not to add the relevant base station 2-3 to the E-DCH active set, notifies the mobile terminal 1 the reason for not carrying out the addition to/update in the E-DCH active set (step ST4709). This step ST4709 is optional.

When carrying out the addition process/update process, the radio network controller 3 judges whether the signaling load in the base station 2-3 to be added falls within an allowable range (step ST4711).

When the E-DCH active set control unit 92 judges that the signaling load in the base station 2-3 to be added does not fall within an allowable range, the radio network controller 3's transmission control unit 82 instructs the serving base station 2-1's uplink scheduler 75 to lower the E-DCH transmission rate (step ST4712).

The step ST4712 is of importance, to a case in which a base station 2-3 has been judged, in step ST4710, as preferable for addition to the E-DCH active set, with reference to the interference level information for judgment. However, the signaling required for adding this certain base station 2-3 to the E-DCH active set is insufficient. This is because there is a shortage of the interference margin of the base station 2-3, and therefore the base station 2-3 needs to request the mobile terminal 1 (which is) transmitting E-DCH signals (data) to lower the transmission rate. However, the base station 2-3 is unable to become a non-serving base station 2-2 due to the signaling load, and therefore the base station 2-3 cannot get means of requesting the mobile terminal 1 which is transmitting E-DCH signals (data) to lower the transmission rate. Therefore, in step ST4712, the radio network controller 3 transmits an instruction to the serving base station 2-1, to lower the E-DCH transmission rate of the mobile terminal 1 which is transmitting E-DCH signals (data).

This step ST4712 is optional, and the E-DCH active set control unit 92 does not need to add to/update in the E-DCH active set the base station 2-3. In this case, the radio network controller 3 notifies the mobile terminal 1 the reason for not carrying out the addition to/update in the E-DCH active set (step ST4709). This step ST4709 is optional.

When the signaling load in the base station 2-3 to be added falls within an allowable range, the radio network controller 3's E-DCH active set control unit 92 updates the base station (s) included in the current E-DCH active set which is managed by an E-DCH active set management unit 89 (step ST4713).

For example, when changing the base station 2-3 to a non-serving base station 2-2, the radio network controller 3 carries out a process of writing the base station 2-3 into the E-DCH active set which is managed by the E-DCH active set management unit 89.

Because step ST4714 and subsequent steps are the same as step ST111 and subsequent steps of FIG. 16 in above-mentioned embodiment 2, the explanation of these steps will be omitted.

This embodiment 12 explained how the radio network controller 3 judges whether to add to/update in the E-DCH active set the relevant base station 2-3, on the basis of the relevant base station 2-3's version and interference level information. As an alternative, the radio network controller 3 can judge whether to add to/update in the E-DCH active set the relevant base station 2-3, on the basis of only the relevant base station 2-3's version.

In this case, the relevant base station 2-3 can carry out the judgment of the signaling load in the relevant base station 2-3, as shown in steps ST44 to ST46 of FIG. 11 in above-mentioned embodiment 1.

In the sequence diagram of FIG. 48, the order of the processes of steps ST4708, ST4710, and ST4711 is not determined fixedly. As an alternative, they can be simultaneously carried out.

When judging whether to add to/update in the E-DCH active set the relevant base station 2-3, the radio network controller 3 can additionally include in the judgment process, the use of a space correlation as shown in above-mentioned embodiment 5.

As a result, because the radio network controller can select a base station 2-3 having a high macro diversity effect as a non-serving base station 2-2, it can select a more-optimal base station 2 as a base station to be added to the E-DCH active set.

Furthermore, in step ST4701, the interference level informing unit 68 of each of all base stations 2-3 included in the prior art active set can notify the interference level information measured by each base station 2-3 to the mobile terminal 1, instead of notifying the interference level information measured by the interference level measuring unit 65 to the radio network controller 3.

After that, instead of step ST4710 in which the radio network controller 3 judges whether to add to/update in the E-DCH active set the relevant base station 2-3 on the basis of the interference level information, the processes of steps ST1 to ST4 of FIG. 6 as shown in above-mentioned embodiment 1 can be carried out between step ST4705 and step ST4706 which are processes carried out by the mobile terminal 1.

Therefore, there can be provided an advantage of being able to reduce the number of times that addition events/update events are refused by the radio network controller 3 because, for example, the interference level information of the relevant base station 2-3 is smaller than the threshold.

As a result, for the same reason, a state in which the radio network controller 3 makes a judgment of not receiving events can be avoided. Therefore, the load in the radio network controller 3 can be reduced. In addition, from the viewpoint that the transmission of events can be eliminated, the radio resources of the mobile communications system can be used effectively.

Next, the process of step ST4710 of FIG. 48 will be explained in detail with reference to FIG. 49.

The E-DCH active set control unit 92 acquires a regulatory reference A (which corresponds to the threshold A used as the above-mentioned judgment criterion) at the time of adding the base station 2-3 to the E-DCH active set (step ST4801), and compares the interference level of the relevant base station 2-3 with the regulatory reference A (step ST4802).

When the interference level of the relevant base station 2-3 does not exceed the regulatory reference A, the E-DCH active set control unit 92 ends the judgment process because it does not need to add the relevant base station 2-3 to the E-DCH active set, and notifies the mobile terminal 1 the reason for not carrying out the addition to/update in the E-DCH active set (step ST4709).

When the interference level of the relevant base station 2-3 exceeds the regulatory reference A, the E-DCH active set control unit 92 judges whether the number of base stations 2 included in the E-DCH active set exceeds a maximum number (for example, three) (step ST4803).

When the number of base stations 2 included in the E-DCH active set does not exceed the maximum number, the E-DCH active set control unit 92 obeys the event which the radio network controller has received in step ST4707. For example, when the radio network controller, in step ST4707, has received the addition event (step ST4804), the E-DCH active set control unit determines to change the relevant base station 2-3 to a non-serving base station 2-2 (step ST4805).

When the number of base stations 2 included in the E-DCH active set exceeds the maximum number, or when the radio network controller, in step ST4707, has received the update event (step ST4804) even if the number of base stations 2 does not exceed the maximum number, the E-DCH active set control unit 92 acquires the interference level of the non-serving base station 2-2 included in the current E-DCH active set (step ST4806).

In the example of FIG. 1, the number of non-serving base stations 2-2 included in the E-DCH active set is one, though two or more non-serving base stations 2-2 can be included in the E-DCH active set. In this case, the E-DCH active set control unit acquires the interference level of each of the two or more non-serving base stations 2-2.

The E-DCH active set control unit 92 compares the interference level of the non-serving base station 2-2 with the interference level of the relevant base station 2-3 (step ST4807). When two or more non-serving base stations 2-2 are included, the E-DCH active set control unit compares a minimum interference level of the two or more non-serving base stations 2-2 with the interference level of the relevant base station 2-3.

When the interference level of the non-serving base station 2-2 is larger than the interference level of the relevant base station 2-3, the E-DCH active set control unit 92 maintains the current E-DCH active set. Therefore, the E-DCH active set control unit ends the processing and notifies the mobile terminal 1 the reason for not carrying out the addition to/update in the E-DCH active set (step ST4709).

In contrast, when the interference level of the non-serving base station 2-2 is smaller than the interference level of the base station 2-3, the E-DCH active set control unit excludes the non-serving base station 2-2 included in the current E-DCH active set (when two or more non-serving base stations 2-2 are included, a non-serving base station having a minimum interference level among the two or more non-serving base stations 2-2), and determines to add the relevant base station 2-3 to the E-DCH active set (step ST4808).

Embodiment 13

In above-mentioned embodiment 12, how the radio network controller 3 selects a base station to be included in the E-DCH active set from the prior art active set on the basis of a margin for the interference level in each base station 2 and version information of each base station 2 is shown. In contrast, in this embodiment 13, mobile terminal 1 takes charge of the judgment, and how the mobile terminal 1 selects a base station to be included in the E-DCH active set on the basis of the version information of each base station 2 will be explained.

This embodiment 13 can provide an advantage being able to exclude an addition event or an update event which is completely meaningless and which is transmitted from the mobile terminal 1 to a radio network controller 3 for a base station which cannot be included in the E-DCH active set for the reason that it does not comply with Release 6.

As a result, for the same reason, a state in which the radio network controller 3 makes a judgment of not receiving events can be avoided. Therefore, the load in the radio network controller 3 can be reduced. In addition, from the viewpoint that the transmission of events can be eliminated, the radio resources of the mobile communications system can be used effectively.

A mobile terminal 1 of a mobile communications system in accordance with embodiment 13 of the present invention is so constructed that a base station version information management unit 914 and a base station version information judgment unit 918 in the mobile terminal of FIG. 39 are added to the mobile terminal 1 of FIG. 2.

A sequence diagram of the mobile communications system of this embodiment 13 is almost the same as the sequence diagram (FIGS. 48 and 49) of the mobile communications system of above-mentioned embodiment 12. Therefore, a difference between this embodiment and above-mentioned embodiment 12 will be explained with reference to FIG. 50.

Figure 50:
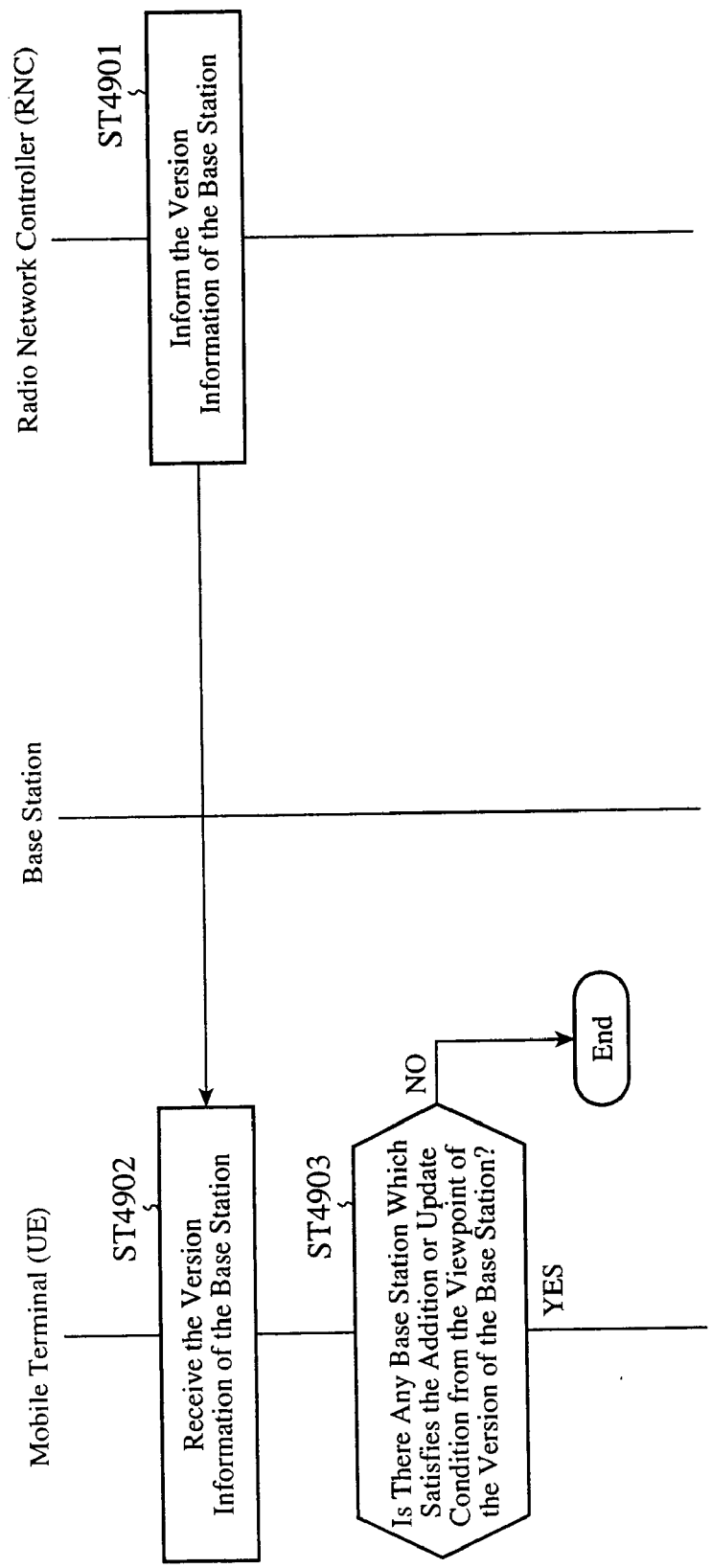
FIG. 50 is a sequence diagram showing the sequence of a mobile communications system at the time when mobile terminal judges the version of a base station.

In this embodiment 13, instead of step ST4708 of FIG. 48, the steps of FIG. 50 are added between step ST4705 and step ST4706.

The radio network controller 3 informs the version information of each of base stations 2-1, 2-2, and 2-3 included in the prior art active set to the mobile terminal 1 (step ST4901).

As an alternative, the radio network controller can inform the version information of each of base stations 2-1, 2-2, and 2-3 included in a surrounding cell or a cell which is a target for transmission of events. Because this version information that is informed and an information method are shown in above-mentioned embodiment 9, the explanation of them will be omitted hereafter. Each base station 2 can alternatively inform the version information of each base station 2 directly to the mobile terminal 1 without sending it via the radio network controller 3.

When the mobile terminal 1 receives the version information of each of the base stations 2-1, 2-2, and 2-3 transmitted from the radio network controller 3, abase station version information management unit 914 of the mobile terminal 1 manages the version information of each of the base stations 2-1, 2-2, and 2-3 (step ST4902).

A base station version information judgment unit 918 (or an active set control unit 34) of the mobile terminal 1 refers to the version information of the base station 2-3 managed by the base station version information management unit 914, and judges the version of the base station 2-3 which satisfies an addition condition/update condition. More specifically, the base station version information judgment unit judges whether the base station 2-3 which satisfies the addition condition/update condition complies with Release 6.

When the relevant base station 2-3 does not comply with Release6, because the base station 2-3 does not support E-DCH services (step ST4903), the base station version information judgment unit ends the processing without transmitting to the radio network controller 3 an addition event/update event for adding to/updating in the E-DCH active set the relevant base station 2-3.

In contrast, when the relevant base station 2-3 complies with Release 6, because the base station 2-3 supports E-DCH services (step ST4903), the base station version information judgment unit transmits to the radio network controller 3 an addition event/update event for adding to/updating in the E-DCH active set the relevant base station 2-3. (step ST4706).

The processes of steps ST4901 and ST4902 can be carried out before the process of step ST4705.

Embodiment 14

In accordance with above-mentioned embodiment 4, a base station 2 takes charge of the judgment of whether to exclude a non-serving base station 2-2 (or the relevant base station 2-2) from the E-DCH active set on the basis of (1) the interference level information of each base station, (2) the E-DCH code power (or the transmission rate), and (3) the signaling load in each base station, as previously explained. In contrast, in accordance with this embodiment 14, a radio network controller 3 takes charge of the judgment of whether to exclude the relevant non-serving base station 2-2 from the E-DCH active set.

However, in accordance with this embodiment 14, the radio network controller simply judges whether to exclude the relevant non-serving base station from the E-DCH active set, and, even if it has determines that it will exclude the non-serving base station from the E-DCH active set, it will not exclude it from the prior art active set.

Figure 51:
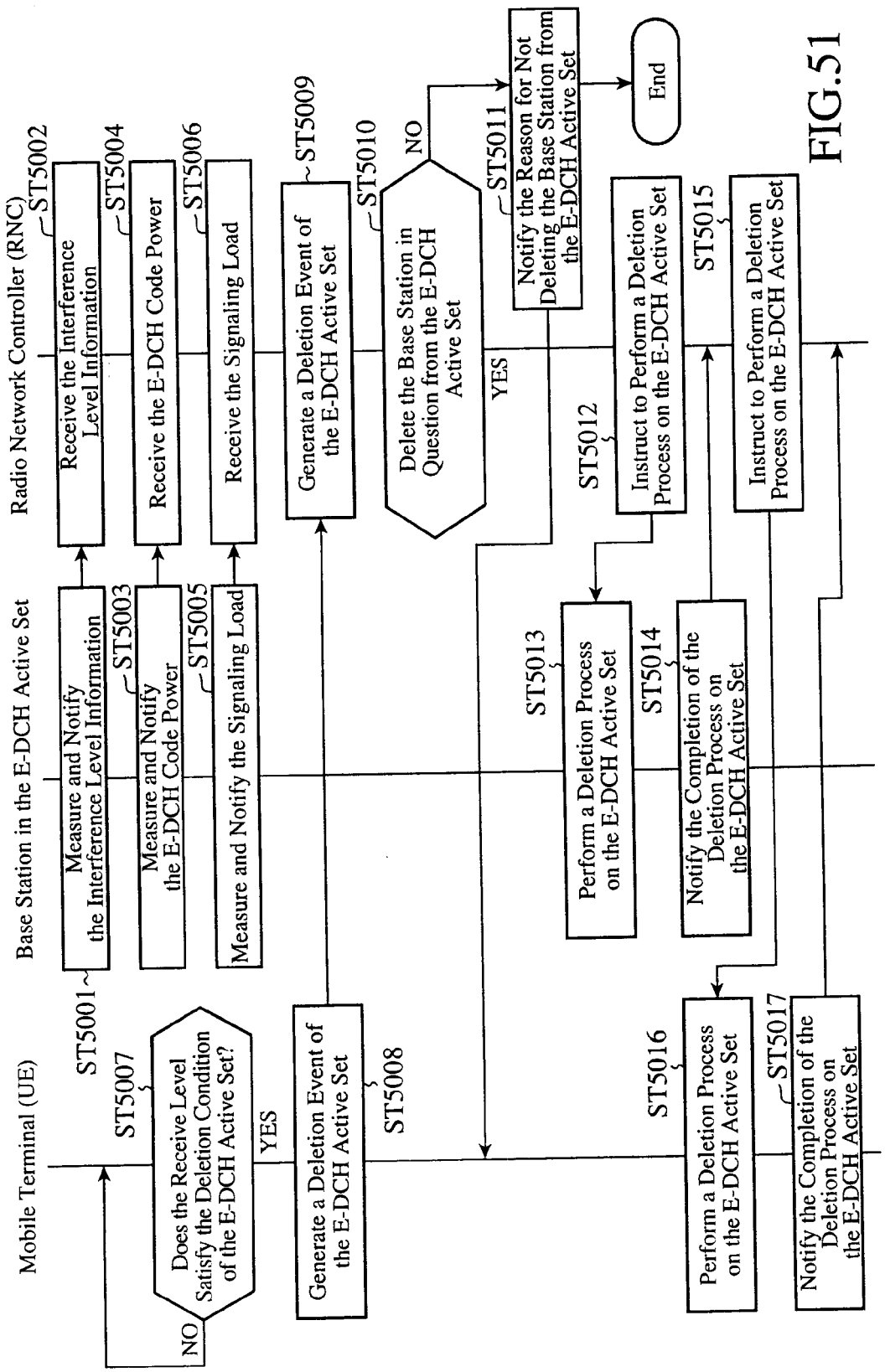
FIG. 51 is a sequence diagram showing the sequence of a mobile communications system at the time when a radio network controller judges whether to exclude the relevant base station from the E-DCH active set.
Figure 52:
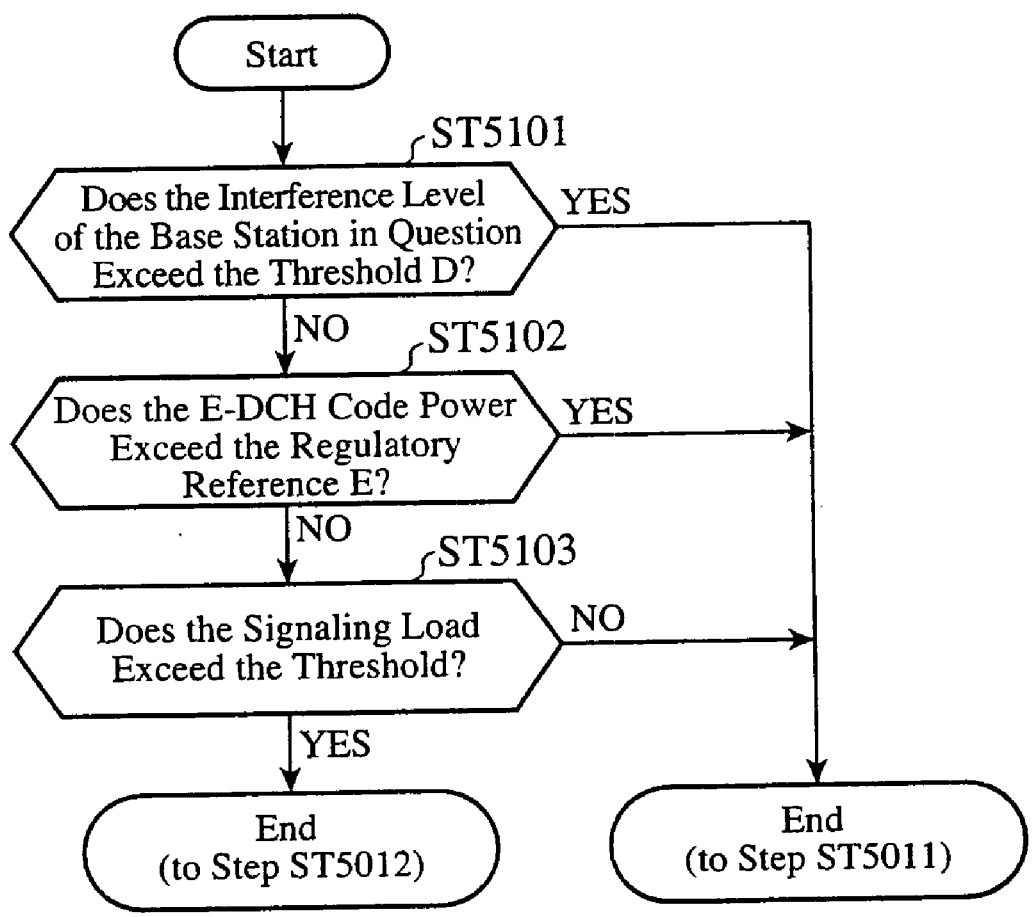
FIG. 52 is a flow chart showing the detail of a process of judging whether to exclude the relevant base station from the E-DCH active set, which is carried out by a radio network controller.

FIG. 51 is a sequence diagram showing a sequence of the mobile communications system at the time when the radio network controller 3 judges whether to exclude the relevant base station 2-2 from the E-DCH active set, and FIG. 52 is a flow chart showing the detail of a process, in step ST5010 of FIG. 51, of judging whether to exclude the relevant base station 2-2 from the E-DCH active set, which is carried out by the radio network controller 3.

First, the operation of the mobile communications system at the time when the radio network controller 3 judges whether to exclude the relevant base station 2-2 from the E-DCH active set will be explained with reference to FIG. 51.

An interference level informing unit 68 of each of base stations 2-1, 2-2, and 2-3 included in the prior art active set, or an interference level informing unit 68 of each of base stations 2-1 and 2-2 included in the E-DCH active set notifies interference level information measured by an interference level measuring unit 65 to the radio network controller 3 (step ST5001).

The radio network controller 3 receives the interference level information of each of all the base stations 2-1, 2-2, and 2-3 included in the prior art active set, or the interference level information of each of the base stations 2-1 and 2-2 included in the E-DCH active set (step ST5002).

Each of the base stations 2-1 and 2-2 included in the E-DCH active set notifies the code power or transmission rate to the radio network controller 3 (step ST5003).

The radio network controller 3 receives the code power or transmission rate of each base station 2 included in the E-DCH active set (step ST5004).

The interference level informing unit 68 of each of all the base stations 2-1, 2-2, and 2-3 included in the prior art active set, or interference level informing unit 68 of each of the base stations 2-1 and 2-2 included in the E-DCH active set notifies a signaling load measured by a signaling measuring unit 79 to the radio network controller 3 (step ST5005).

The radio network controller 3 receives the signaling load of each of all the base stations 2-1, 2-2, and 2-3 included in the prior art active set, or the signaling load of each of the base stations 2-1 and 2-2 included in the E-DCH active set (step ST5006).

The mobile terminal 1 judges whether the reception level satisfies an exclusion condition of the E-DCH active set (step ST5007).

As the exclusion condition of the E-DCH active set, there can be provided a case in which the reception level of CPICH from each of the base stations 2-1 and 2-2 included in the E-DCH active set exceeds a threshold (or becomes out of a predetermined (given) range). A predetermined (given) value can be used as this threshold, or a value notified through signaling from the radio network controller can be used.

When the reception level satisfies the exclusion condition, the mobile terminal 1 transmits an exclusion event of excluding the relevant base station from the E-DCH active set to the radio network controller 3 via the base stations 2-1, 2-2, and 2-3 (step ST5008).

The radio network controller 3 receives the exclusion event of excluding the relevant base station from the E-DCH active set transmitted from the mobile terminal 1 (step ST5009).

The radio network controller 3 judges whether to exclude the relevant base station 2-2 from the E-DCH active set on the basis of (1) the interference level information of each base station 2, (2) the E-DCH code power (or the transmission rate), and (3) the signaling load in each base station 2 (step ST5010). The details of the process of judging whether to exclude the relevant base station from the E-DCH active set will be explained later with reference to FIG. 52.

When determining not to exclude the base station 2-2 as a result of the judgment, the radio network controller 3 notifies the reason for not excluding the relevant base station 2-2 form the E-DCH active set to the mobile terminal 1 in order to prevent the mobile terminal 1 from making the exclusion condition of the E-DCH active set be harsh too much (step ST5011).

As a result, for the same reason, a state in which the radio network controller 3 makes a judgment of not receiving events can be avoided. Therefore, the load in the radio network controller 3 can be reduced.

In addition, from the viewpoint that the transmission of events can be eliminated, the radio resources of the mobile communications system can be used effectively.

After making a determination of excluding the relevant base station 2-2 from the E-DCH active set, the E-DCH active set control unit 92 shifts to a process of step ST5012.

Because processes in steps ST5012 and ST5017 of FIG. 51 are the same as those in steps ST186 to ST191 of FIG. 22 in above-mentioned embodiment 4, the explanation of the processes will be omitted hereafter.

Next, the process in step ST5010 of FIG. 51 will be explained in detail with reference to FIG. 52.

More specifically, the process of judging whether to exclude the relevant non-serving base station 2-2 from the E-DCH active set, which is carried out by the radio network controller 3, will be explained.

The radio network controller 3, in step ST5002, has finished receiving the interference level information from the non-serving base station 2-2 included in the E-DCH active set.

The radio network controller 3 then compares the interference level of the relevant non-serving base station 2-2 indicated by the interference level information with a threshold D which is used as a judgment criterion at the time of excluding the base station from the E-DCH active set (which is the same as the above-mentioned threshold D) (step ST5101).

A predetermined (given) value can used as the threshold D which is used as a judgment criterion, or the threshold D can be calculated by the E-DCH active set control unit of the mobile terminal 1 or the E-DCH active set control unit of the base station 2-1 or 2-2, and, after that, can be notified to the radio network controller 3 through signaling.

Because the radio network controller 3 needs to transmit a Down command when the interference level of the non-serving base station 2-2 exceeds the threshold D, the radio network controller maintains the current E-DCH active set without excluding the non-serving base station 2-2 from the E-DCH active set. In this case, the radio network controller shifts to the process of step ST5011.

When the level of the interference of the non-serving base station 2-2 is less than the threshold D, the radio network controller 3 determines that the interference level of the non-serving base station 2-2 is small, and the necessity for the non-serving base station 2-2 to transmit the Down command is low. The radio network controller 3 then shifts to a process in the next step ST5102 in order to succeedingly judge whether to exclude the non-serving base station 2-2 from the E-DCH active set.

The radio network controller 3 then compares the code power from the relevant mobile terminal 1 measured and notified thereto by the base station with a threshold E which is used as a judgment criterion at the time of excluding the base station from the E-DCH active set (step ST5102).

A predetermined (given) value can used as the threshold E which is used as a judgment criterion, or the threshold E can be calculated by the E-DCH active set control unit of the mobile terminal 1 or the E-DCH active set control unit of the base station 2-2, and, after that, can be notified to the radio network controller 3 through signaling.

Because there is a large influence of the relevant mobile terminal 1 on the relevant non-serving base station 2-2 and the radio network controller 3 needs to transmit the Down command when the code power is equal to or higher than the threshold E, the radio network controller maintains the current E-DCH active set without excluding the non-serving base station 2-2 from the E-DCH active set. In this case, the radio network controller shifts to the process of step ST5011.

When the code power is lower than the threshold E, the radio network controller 3 determines that the influence of the relevant mobile terminal 1 on the relevant non-serving base station 2-2 is small and the necessity to transmit the Down command is low. The radio network controller 3 shifts to a process in the next step ST5103 in order to succeedingly judge whether to exclude the non-serving base station 2-2 from the E-DCH active set.

When the signaling load does not exceed a maximum allowable value, the radio network controller 3 maintains the current active set (step ST5103). In this case, the radio network controller shifts to the process of step ST5011.

The radio network controller 3 shifts to the process of step ST5012 in order to exclude the relevant non-serving base station 2-2 from the E-DCH active set when the signaling load exceeds the maximum allowable value. This process of step ST5013 is optional.

The order of the processes of steps ST5101, ST5012, and ST5103 is not determined fixedly. As an alternative, they can be simultaneously carried out.

The interference level informing unit 68 of each of the base stations 2-1, 2-2, and 2-3 included in the prior art active set, or the interference level informing unit 68 of each of the base stations 2-1 and 2-2 included in the E-DCH active set, which carries out the process of step ST5001, can notify the interference level information measured by the interference level measuring unit 65 to the mobile terminal 1, instead of notifying it to the radio network controller 3.

After that, the mobile terminal 1 can carry out the judgment in place of the radio network controller 3 (i.e., the judgment of whether to exclude the base station 2-2 from the E-DCH active set on the basis of the interference level information of the base station (step ST5101)), and can carry out the judgment of whether to exclude the base station 2-2 from the E-DCH active set on the basis of the E-DCH code power (or the transmission rate) (step ST5102).

Therefore, there is provided an advantage of being able to reduce exclusion events which the radio network controller 3 refuses for, for example, the reason that the interference level information of the relevant base station 2-2 is larger than the threshold.

As a result, for the same reason, a state in which the radio network controller 3 makes a judgment of not receiving events can be avoided. Therefore, the load in the radio network controller 3 can be reduced. In addition, from the viewpoint that the transmission of events can be eliminated, the radio resources of the mobile communications system can be used effectively.

In addition, when the mobile terminal judges whether to exclude the base station 2-2 from the E-DCH active set on the basis of the transmission rate, instead of the E-DCH code power, the mobile terminal 1 can have the merit of acknowledging correctly the transmission rate.

When the mobile terminal 1 carries out the processes of steps ST5101 and ST5102, they should be carried out between step ST5007 and step ST5008 shown in FIG. 51. This is because meaningless exclusion events of excluding a base station from the E-DCH active set can be excluded.

Embodiment 15

The "active set" shown in above-mentioned embodiments 8 to 11 represents the prior art active set (for soft handovers for dedicated channels (DCH)) when no E-DCH service is carried out, and represents the E-DCH active set (serving base stations+non-serving base stations) and the prior art active set when an E-DCH service is carried out. That is, when an E-DCH service is carried out, the prior art active set and E-DCH active set become the same.

Hereinafter, assume that a base station 2 which is included in neither the E-DCH active set nor the prior art active set is a base station 2-4. That is, base stations in which serving base stations 2-1, non-serving base stations 2-2, and base stations 2-3 included in the active set for soft handovers (i.e., base stations included in the prior art active set) are excluded from all the base stations 2 are base stations 2-4.

In this embodiment 15, a technology for using this "active set" is disclosed.

Hereafter, the "active set" stands for the prior art active set (i.e., the active set for soft handovers) while no E-DCH service is carried out, and also stands for the E-DCH active set (serving base stations+non-serving base stations) and the prior art active set while an E-DCH service is provided.

In above-mentioned embodiment 10, the radio network controller 3 judges whether to add a base station 2 to the active set on the basis of the version information of the base station 2, as previously explained. In this example, when an E-DCH service is carried out, there is a larger influence on the interference margin of the base station 2 as compared with a case in which no E-DCH service is carried out. This is because the transmission rate of E-DCH is high in many cases as compared with that of DCH, and the transmission power also becomes high with the increase in the transmission rate.

Therefore, in accordance with this embodiment 15, a method of selecting a base station 2 to be added to the active set on the basis of the interference level information of the base station 2, the signaling load, etc. in addition to the version information of the base station 2 is disclosed.

In accordance with this embodiment 15, a more-optimal base station 2 can be selected as a base station to be added to the active set for supporting E-DCH services.

As explained in above-mentioned embodiment 2, when the radio network controller 3 takes charge of the judgment of whether to add a base station to the active set, there is provided an advantage of being able to make each base station 2 measure the interference level.

When a base station 2 carries out signaling to the mobile terminal 1, there is a high possibility that errors occur because it uses a wireless line. When each base station 2 notifies interference level information to the radio network controller 3, the frequency of occurrence of errors can be reduced greatly as compared with the case in which each base station uses a wireless line because each base station uses a cable line, and each base station can notify higher-quality information to the radio network controller.

The radio network controller 3 of the mobile communications system in accordance with embodiment 15 of the present invention has the same structure as the radio network controller 3 of FIG. 47 of above-mentioned embodiment 12.

Figure 53:
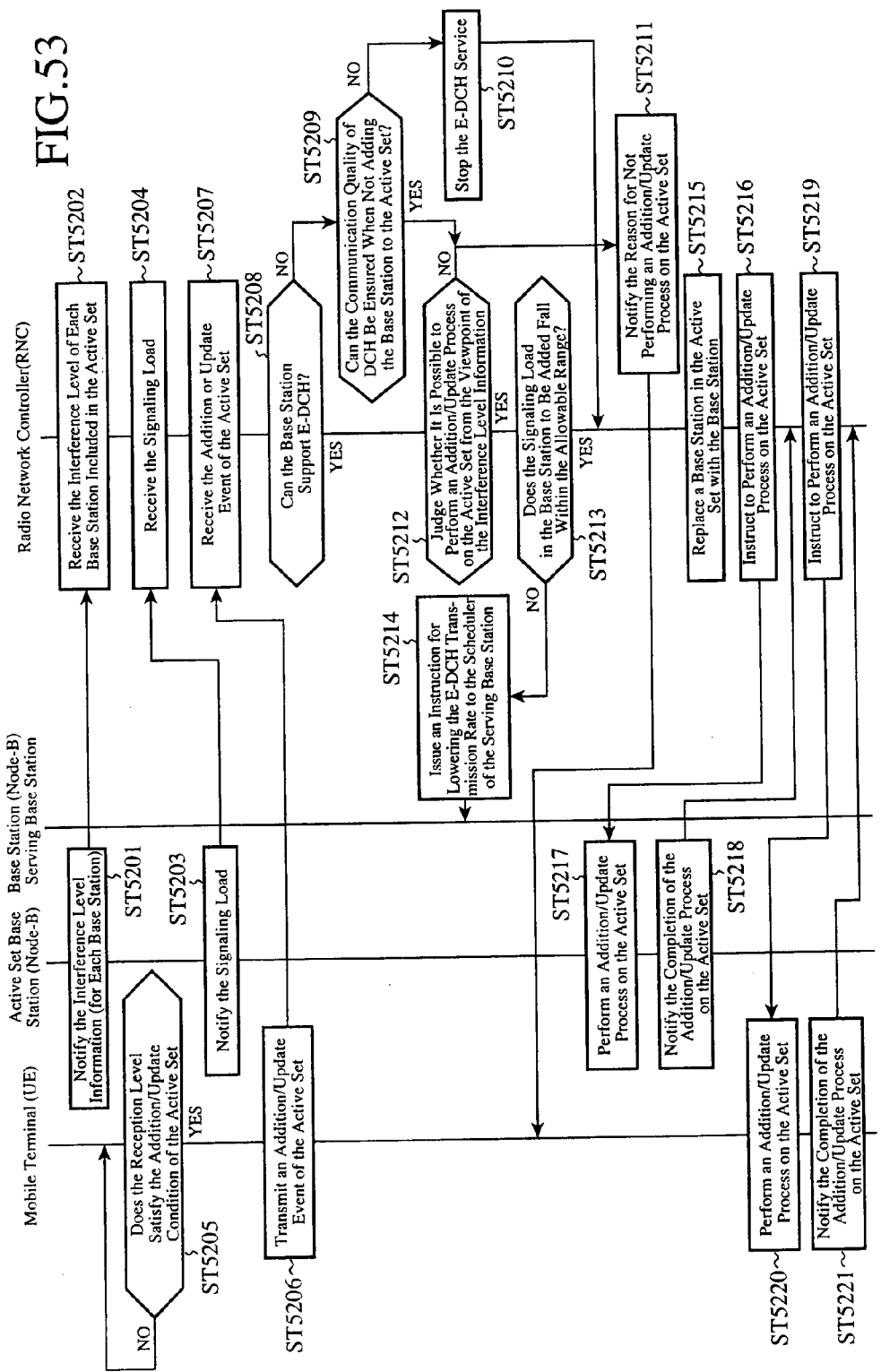
FIG. 53 is a sequence diagram showing a sequence of a mobile communications system at the time when a radio network controller judges whether to add base stations to the E-DCH active set.

FIG. 53 is a sequence diagram showing a sequence of the mobile communications system at the time when the radio network controller 3 judges whether to add relevant base stations 2-3 and 2-4 to the active set.

The operation of the mobile communications system at the time when the radio network controller 3 judges whether to add the relevant base stations 2-3 and 2-4 to the active set, will be explained with reference to FIG. 53.

First, the radio network controller 3 can acknowledge the version information of each base station 2 which is placed under the control thereof by reading the version information of each base station 2 stored in a base station version information management unit 104.

Because processes of steps ST5201 to ST5204 are the same as those of steps ST4701 to ST4704 of FIG. 48 in above-mentioned embodiment 12, the explanation of them will be omitted hereafter.

The mobile terminal 1 judges whether the reception level satisfies an addition condition/update condition for adding a base station to the active set or updating the base station(s) included in the active set (step ST5205).

As the addition condition of the active set, a case in which the reception level of CPICH exceeds a threshold can be considered. A predetermined (given) value can be used as this threshold, or a value notified through signaling from the radio network controller 3 can be used.

Furthermore, as the update condition of the active set, a case in which the reception level of CPICH exceeds the reception level of CPICH from each of base stations included in the active set can be considered.

The mobile terminal 1 transmits an addition event of adding a base station to the active set to the radio network controller 3 via the base stations 2-1, 2-2, and 2-3 when the addition condition is satisfied (step ST5206).

The mobile terminal 1 transmits an update event of updating the base station(s) included in the active set to the radio network controller 3 via the base stations 2-1, 2-2, and 2-3 when the update condition is satisfied (step ST5206).

The radio network controller 3 receives the addition event/update event of the active set transmitted from the mobile terminal 1 (step ST5207).

This addition event/update event of the active set is the same as an addition event/update event of the prior art active set which is provided conventionally. More specifically, while an E-DCH service is carried out, because the prior art active set and the E-DCH active set are the same, the event does not need to be divided.

As a result, it becomes unnecessary to newly provide an addition event/update event for E-DCH, and backward compatibility is ensured.

However, the fact that the number of addition events/update events of the active set is one means that an addition event/update event for prior art active set selection and an addition event/update event for E-DCH active set selection are not distinguished, and it is therefore impossible to provide a separate judgment criterion. In this case, there causes degradation in the communications quality when a base station which does not support E-DCH is inhibited from being added to/updated in the active set only for the reason that it does not comply with Release 6. This problem is solved by a process of step ST5209. The process of step ST5209 will be mentioned later.

When receiving the addition event/update event of the active set from the mobile terminal 1, the radio network controller 3 shifts to the process of step ST5208 if the relevant mobile terminal 1 is carrying out an E-DCH service, and carries out an addition process/update process of the active set as usual if the relevant mobile terminal 1 is not carrying out any E-DCH service.

The radio network controller 3, in step ST5208, judges whether each of the relevant base stations 2-3 and 2-4, which the mobile terminal 1 requests the radio network controller to add to/update in the active set, can use E-DCH. More specifically, the radio network controller refers to the version information stored in the base station version information management unit 104, and then judges whether each of the base stations complies with Release 6. When each of the relevant base stations 2-3 and 2-4 does not comply with Release 6, the radio network controller shifts to a process of step ST5209.

Step ST5209 is an important process in this embodiment 15.

In step ST5209, the radio network controller 3 judges whether to add the base stations 2-3 and 2-4 to the active set on the basis of the communication quality of DCH at the time of not using DCH with the base stations 2-3 and 2-4 without adding any base station which does not comply with E-DCH to the active set.

As a technique for determining the communication quality which the radio network controller 3 uses, the following methods can be considered.
(1) Judgment on the Basis of Reliability Information which is Used at the Time of Uplink Selective Combining As the reliability information, a CRC result of DPDCH, SIR of a pilot wave included in DPCCH, the power of a received signal, or the like can be considered.

For example, in a case in which the base stations 2-3 and 2-4 having a good CRC result of DPDCH (for example, the CRC result is better than a threshold during a fixed period of time) are not added to the active set for the reason that they do not support E-DCH, it can be assumed that the communication quality of DCH is insufficient.
(2) Judgment on the Basis of the Reception Level of CPICH Signals (Data) Received by the Mobile Terminal 1

For example, in a case in which the base stations 2-3 and 2-4 whose CPICH reception level received by the mobile terminal 1 is the highest or base stations 2 having a CPICH reception level higher than a certain threshold are not added to the active set for the reason that they do not support E-DCH, it can be assumed that the communication quality of DCH is insufficient.

Even if the radio network controller 3 does not add the relevant base station 2-3 and 2-4 to the active set for the reason that they do not comply with E-DCH, when determining that the communication quality of DCH is insufficient (step ST5209), the radio network controller 3 notifies the mobile terminal 1 the reason for not carrying out the addition to/update in the active set. (step ST5211).

In the case in which the radio network controller 3 do not add the relevant base stations 2-3 and 2-4 to the active set for the reason that they do not comply with E-DCH, the radio network controller 3 carries out a process of stopping the E-DCH service (step ST5210) when determining that the communication quality of DCH is insufficient (step ST5209). After that, the radio network controller shifts to a process of step ST5215.

When the radio network controller 3, in step ST5208, determines that the relevant base stations 2-3 and 2-4 comply with Release 6, it shifts to the process of step ST5212.

Steps ST5212 to ST5221 correspond to steps ST4709 to ST4719 of FIG. 48 and FIG. 49 in above-mentioned embodiment 12, and, in steps ST5212 to ST5221, "E-DCH active set" is substituted by "active set." Therefore, the detailed explanation of these steps will be omitted. However, a base station which notifies the interference level to the radio network controller 3 is not limited to a base station included in the active set, but can be a base station which is placed under the control of the Radio Network Controller 3.

In the sequence diagram of FIG. 53, when the radio network controller 3 judges whether to add to/update in the active set the relevant base stations 2-3 and 2-4, it can judge only on the basis of the versions of the relevant base stations 2-3 and 2-4 (step ST5208). In this case, as shown in steps ST44 to ST46 of FIG. 11 in above-mentioned embodiment 1, the relevant base stations 2-3 and 2-4 can carry out the judgment of the signaling loads on the relevant base stations 2-3 and 2-4, respectively.

In the sequence diagram of FIG. 53, the order of the processes of steps ST5208, ST5212, and ST5213 is not determined fixedly. As an alternative, they can be simultaneously carried out.

When judging whether to add to/update in the active set the relevant base stations 2-3 and 2-4, the radio network controller 3 can additionally include in the judgment process, the use of a space correlation as shown in above-mentioned embodiment 5.

As a result, because the radio network controller can select the base stations 2-3 and 2-4 having a high macro diversity effect as non-serving base stations 2-2, it can select more-optimal base stations 2 as base stations to be added to the E-DCH active set.

Furthermore, in step ST5201, an interference level informing unit 68 of each of all base stations 2 included in the active set can notify the interference level information measured by each base station 2 to the mobile terminal 1, instead of notifying the interference level information measured by an interference level measuring unit 65 to the radio network controller 3.

After that, instead of step ST5212 in which the radio network controller 3 judges whether to add to/update in the E-DCH active set the relevant base stations 2-3 and 2-4 on the basis of the interference level information, the processes of steps ST1 to ST4 of FIG. 6 as shown in above-mentioned embodiment 1 can be carried out between step ST5205 and step ST5206 which are processes carried out by the mobile terminal 1.

Therefore, there can be provided an advantage of being able to reduce the number of times that addition events/update events are refused by the radio network controller 3 because, for example, the interference level information of each of the relevant base stations 2-3 and 2-4 is smaller than the threshold.

As a result, for the same reason, a state in which the radio network controller 3 makes a judgment of not receiving events can be avoided. Therefore, the load in the radio network controller 3 can be reduced. In addition, from the viewpoint that the transmission of events can be eliminated, the radio resources of the mobile communications system can be used effectively.

Embodiment 16

In above-mentioned embodiment 15, the method of making the radio network controller 3 select a base station 2 from the active set on the basis of a margin for the interference level of the base station 2, and the version information of the base station 2 is shown. In this embodiment 16, mobile terminal 1 takes charge of the judgment of whether to add a base station 2 to the active set, and a method of making the mobile terminal 1 select a base station 2 from the active set on the basis of the version information of the base station 2 is disclosed.

This embodiment 16 can provide an advantage of being able to exclude an addition event or an update event which is completely meaningless and which is transmitted from the mobile terminal 1 to a radio network controller 3 for a base station which cannot be included in the active set for the reason that it does not comply with Release 6.

As a result, for the same reason, a state in which the radio network controller 3 makes a judgment of not receiving events can be avoided. Therefore, the load in the radio network controller 3 can be reduced. In addition, from the viewpoint that the transmission of events can be eliminated, the radio resources of the mobile communications system can be used effectively.

The mobile terminal 1 of a mobile communications system in accordance with embodiment 16 of the present invention is so constructed that a base station version information management unit 914 and a base station version information judgment unit 918 in the mobile terminal of FIG. 39 are added to the mobile terminal 1 of FIG. 2.

A sequence diagram of the mobile communications system of this embodiment 16 is much the same as the sequence diagram (FIG. 53) of the mobile communications system of above-mentioned embodiment 15. Therefore, a difference between this embodiment and above-mentioned embodiment 15 will be explained with reference to FIG. 54.

Figure 54:
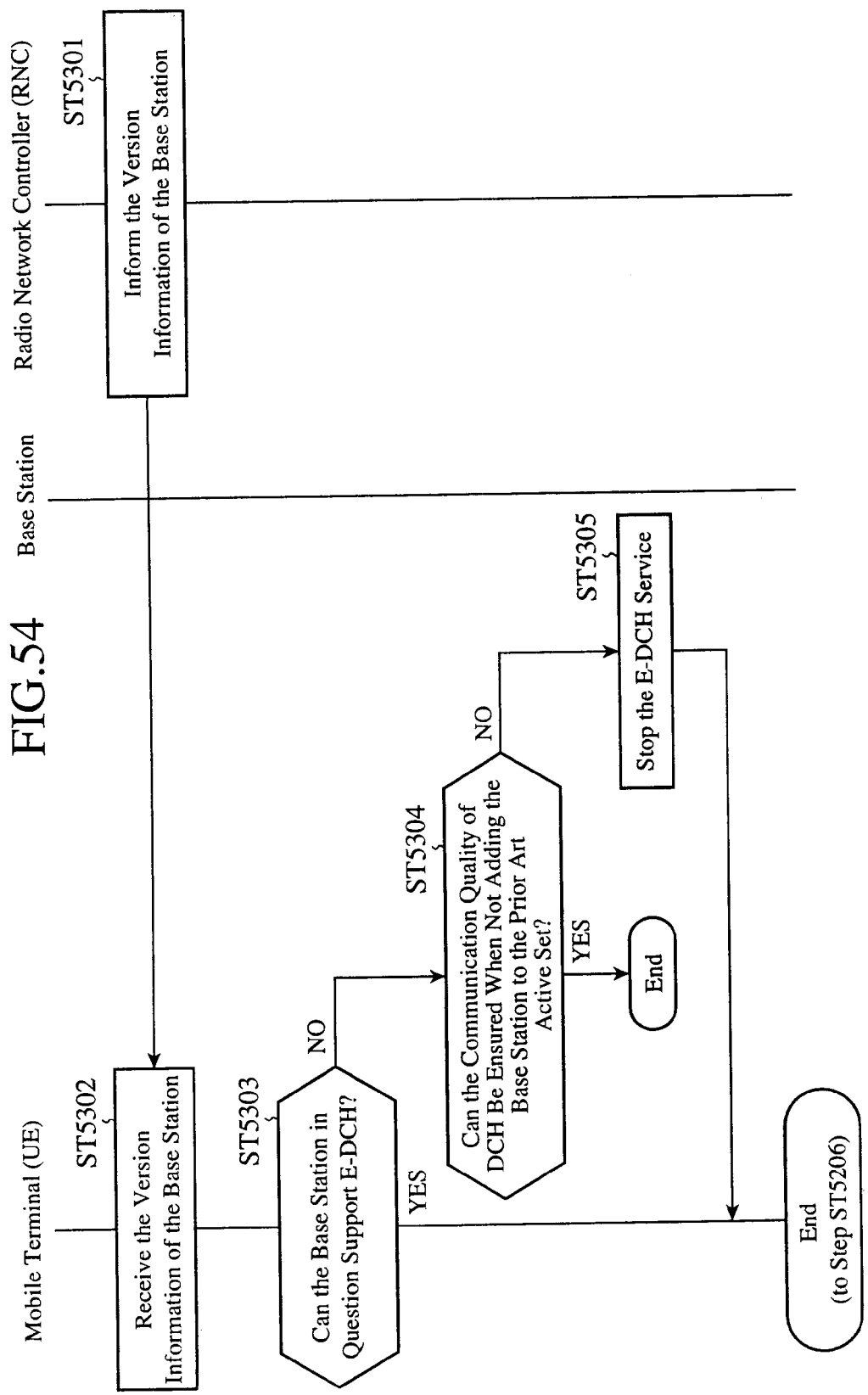
FIG. 54 is a sequence diagram showing a sequence of a mobile communications system at the time when mobile terminal judges the version of a base station.

In this embodiment 16, the steps of FIG. 54 are added between step ST5205 and step ST5206, instead of steps ST5208 to ST5210 of FIG. 53.

The radio network controller 3 informs the version information of each of base stations 2-1, 2-2, and 2-3 included in the prior art active set to the mobile terminal 1 (step ST5301).

As an alternative, the radio network controller can inform the version information of each of base stations 2-1, 2-2, and 2-3 included in a surrounding cell or a cell which is a target for transmission of events (step ST5301). Because this version information that is informed and an information method are shown in above-mentioned embodiment 9, the explanation of them will be omitted hereafter. Each base station 2 can alternatively inform the version information of each base station 2 directly to the mobile terminal 1 without sending it via the radio network controller 3.

When the mobile terminal 1 receives the version information of each base station 2 transmitted from the radio network controller 3 (step ST5302), the base station version information management unit 914 of the mobile terminal 1 manages the version information of each base station.

The base station version information judgment unit 918 (or an active set control unit 34) of the mobile terminal 1 refers to the version information of each of base stations 2-3 and 2-4 managed by the base station version information management unit 914, and judges the versions of the base station 2-3 and 2-4 each of which satisfies an addition condition/update condition. More specifically, the base station version information judgment unit judges whether each of the base stations 2-3 and 2-4 which satisfies the addition condition/update condition complies with Release 6.

When the relevant base stations 2-3 and 2-4 do not comply with Release 6, the base station version information judgment unit determines that they cannot support E-DCH services (step ST5303), and shifts to a process of step ST5304.

In contrast, when the relevant base stations 2-3 and 2-4 comply with Release 6, the base station version information judgment unit determines that they can support E-DCH services (step ST5303), and transmits an addition event/update event of the active set which is aimed at the relevant base stations 2-3 and 2-4 (step ST5206).

Step ST5304 is an important process in this embodiment 16.

In step ST5304, the mobile terminal 1 excludes the base stations 2-3 and 2-4 which do not comply with E-DCH from the active set, and then judges whether to add the base stations 2-3 and 2-4 to the active set on the basis of the communication quality of DCH at the time of not using DCH with the base stations 2-3 and 2-4.

As a technique for judging the communication quality which the mobile terminal 1 uses, the following method can be considered.

Judgment on the basis of the reception level of CPICH signals (data) received by the mobile terminal 1

For example, in a case in which base stations 2-3 and 2-4 whose reception level of CPICH signals (data) received by the mobile terminal 1 is the highest or base stations 2-3 and 2-4 having a CPICH reception level higher than a certain threshold (a predetermined (given) value can used as this threshold, or a value notified through signaling from the radio network controller 3 can be used) are not added to the active set for the reason that they do not support E-DCH, it can be assumed that the communication quality of DCH is insufficient.

In step ST5304, even if the mobile terminal 1 does not add the relevant base stations 2-3 and 2-4 to the active set for the reason that they do not support E-DCH, the mobile terminal 1 ends the processing when judging that the communication quality of DCH is sufficient, and then shifts to the process of step ST5211.

In contrast, when the mobile terminal 1, in step ST5304, does not add the relevant base stations 2-3 and 2-4 to the active set for the reason that they do not support E-DCH, the mobile terminal 1 carries out a process of stopping the E-DCH service when judging that the communication quality of DCH is insufficient (step ST5305). After that, the mobile terminal 1 shifts to the process of step ST5206.

Of course, the processes of steps ST5301 and ST5302 can be carried out before the process of step ST5205.

Embodiment 17

In this embodiment 17, a variant of above-mentioned embodiment 15 will be explained.

More specifically, this embodiment 17 discloses a technology about an exclusion event of excluding the relevant base station 2-2 from an "active set" representing a prior art active set when no E-DCH service is carried out, and representing an E-DCH active set (serving base stations+non-serving base stations) and a prior art active set when an E-DCH service is carried out.

The mobile terminal 1 which is carrying out an E-DCH service transmits an exclusion event of excluding a base station from the active set to the radio network controller 3 when the reception level of signals from the base station satisfies an exclusion condition for excluding the base station from the active set.

This exclusion event of the active set is the same as the exclusion event of the prior art active set which is provided conventionally.

In this example, while an E-DCH service is carried out, there is a larger influence on the interference margin of each base station 2 as compared with a case in which no E-DCH service is carried out. This is because the transmission rate of E-DCH is high in many cases as compared with that of DCH, and the transmission power also becomes high with the increase in the transmission rate.

For this reason, there arises a problem that the determination of excluding the relevant base station 2-2 from the active set during an E-DCH service results in that a more-optimal base station cannot be selected from the active set (or the prior art active set) unless there is going to be another judgment (for example, a judgment based on the interference level information of each base station or the like) other than the judgment of whether to exclude a base station from the active set at the time when no E-DCH service is carried out.

This problem can be solved using the following method.

The radio network controller 3 acknowledges whether the mobile terminal 1 which has transmitted the exclusion event of excluding the relevant base station from the active set is currently carrying out an E-DCH service.

When the mobile terminal 1 is currently carrying out an E-DCH service, the radio network controller carries out processes of step ST5010 and subsequent steps (including FIG. 52) shown in above-mentioned embodiment 14.

In contrast, when the mobile terminal 1 which has transmitted the exclusion event of excluding the relevant base station from the active set is not currently carrying out any E-DCH service, the radio network controller carries out the exclusion process as usual.

As a result, for the mobile terminal 1 which is carrying out an E-DCH service, an optimal base station can be selected from the E-DCH active set services by taking into consideration the interference level information of each base station 2 and so on.

Embodiment 18

Even if mobile terminal 1 transmits an addition event or the like to a radio network controller 3 because an addition condition of an E-DCH active set (also in the case of a prior art active set) is satisfied (also in the case of an update or exclusion condition), the radio network controller 3 may refuse the event transmitted from the mobile terminal 1 for a certain reason.

The reason why the radio network controller refuses the event is based on, for example, the version information of the relevant base station 2, or the interference level information of the relevant base station 2.

A problem is, however, that when the mobile terminal 1 does not know the refusal reason why the radio network controller 3 refuses the event, the mobile terminal 1 transmits again the addition event of adding the same base station 2 to the active set or the like to the radio network controller 3 because the relevant base station 2 satisfies the addition condition or the like.

As a result, for the same reason, there occurs a state in which the radio network controller 3 makes a judgment of not receiving the event, and the load in the radio network controller 3 is therefore increased. Furthermore, the continuous transmission of the event which the radio network controller 3 must refuse from the mobile terminal 1 is an important issue in the effective use of radio resources. That is, there is a task of preventing the transmission of events from the mobile terminal 1.

For example, in above-mentioned embodiment 12, the above-mentioned problem is solved by notifying the mobile terminal 1 the reason for not carrying out the addition to/update in the E-DCH active set (step ST4709 of FIG. 48) on the basis of the judgment by the radio network controller 3.

In this embodiment 18, another solution is disclosed as follows.

In accordance with a conventional technology, the following parameter which can be used for control of transmission of events from the mobile terminal 1 to the radio network controller 3 is provided.

When an offset value (a Cell individual offset) which has already been standardized by 3GPP (TS25.331) and which is set to the mobile terminal 1 by the radio network controller 3, i.e., an offset value CIO which is added to the reception level measured by the mobile terminal 1 (i.e., the reception level of CPICH transmitted from the base station 2) is used, the occurrence of events can be prevented because the measurement result of CPICH measured by the mobile terminal 1 can be changed. The radio network controller 3 can set up this offset value CIO for each base station 2.

In this embodiment 18, a method of preventing the occurrence of events using an offset value CIO will be explained.

The mobile terminal 1 transmits an addition event of adding the base station to the active set to the radio network controller 3 when the reception level of the relevant base station 2-3 satisfies the addition condition of the E-DCH active set (step ST4706 of FIG. 48), while the radio network controller 3 specifies a negative offset value CIO for the relevant base station 2-3 and then transmits the offset value CIO to the mobile terminal 1 when determining that it does not add the relevant base station 2-3 to the E-DCH active set on the basis of, for example, the version information of the base station (step ST4708 of FIG. 48).

As a result, a DPCH receiving unit 31 (or a P-CCPCH receiving unit 32) of the mobile terminal 1 which constructs an offset value receiving means receives the negative offset value CIO transmitted from the radio network controller 3.

When the mobile terminal 1 judges whether to issue an addition event of adding a base station 2 to the active set for the next time, a CPICH receiving unit 28 of the mobile terminal 1 which constructs a reception level measuring means, in step ST4705 of FIG. 48, measures the reception level of CPICH signals (data) transmitted from the base station 2.

A protocol processing unit 41 of the mobile terminal 1 which constructs an offset value adding means adds the offset value CIO received by the DPCH receiving unit 31 (or the P-CCPCH receiving unit 32) to the reception level of CPICH measured by the CPICH receiving unit 28.

The resultant reception level=the measured reception level of CPICH+the negative offset value The protocol processing unit 41 of the mobile terminal 1 which constructs an event transmitting means then compares the resultant reception level with the addition level (or the addition condition) of the active set (step ST4705 of FIG. 48), and, when the resultant reception level exceeds the addition level of the active set, transmits an addition event of adding the relevant base station to the active set to the radio network controller 3 (step ST4706 of FIG. 48).

Because the reception level to which the negative offset value is added becomes smaller than the original reception level to which the negative offset value is not yet added, the possibility that the resultant reception level exceeds the addition level of the active set decreases, and the occurrence of the event is suppressed.

The mobile terminal 1 transmits the exclusion event of excluding the relevant base station from the active set to the radio network controller 3 when the reception level satisfies the exclusion condition of the E-DCH active set (step ST4706 of FIG. 48), while when the radio network controller 3 determines that it does not exclude the relevant base station 2-2 from the E-DCH active set (step ST4708 of FIG. 48) for the reason that, for example, the interference margin of the relevant base station 2-2 is small, the radio network controller 3 specifies a positive offset value CIO and transmits the offset value CIO to the mobile terminal 1.

As a result, the DPCH receiving unit 31 (or the P-CCPCH receiving unit 32) of the mobile terminal 1 receives the positive offset value CIO transmitted from the radio network controller 3.

When the mobile terminal 1 judges whether to issue an addition event of adding a base station 2 to the active set for the next time, the CPICH receiving unit 28 of the mobile terminal 1, in step ST4705 of FIG. 48, measures the reception level of CPICH signals (data) transmitted from the base station 2.

The protocol processing unit 41 of the mobile terminal 1 adds the offset value CIO received by the DPCH receiving unit 31 (or the P-CCPCH receiving unit 32) to the reception level of CPICH measured by the CPICH receiving unit 28.

The resultant reception level=the measured reception level of CPICH+the positive offset value The protocol processing unit 41 of the mobile terminal 1 compares the resultant reception level with the exclusion level (or the exclusion condition) of the active set (step ST4705 of FIG. 48), and, when the resultant reception level is lower than the exclusion level of the active set, transmits an exclusion event of excluding the relevant base station from the active set to the radio network controller 3 (step ST4706 of FIG. 48).

Because the reception level to which the positive offset value is added becomes higher than the original reception level to which the positive offset value is not yet added, the possibility that the resultant reception level becomes lower than the exclusion level of the active set decreases, and the occurrence of the event is suppressed.

In this embodiment 18, the radio network controller 3 notifies the mobile terminal 1 the reason for not carrying out the addition to/update in the E-DCH active set (step ST4709 of FIG. 48). Instead of notifying the reason to the mobile terminal 1, the radio network controller 3 can set up an offset value CIO of the relevant base station 2, and can alternatively set up a parameter to prevent events from being transmitted from the mobile terminal 1 to the radio network controller 3.

Embodiment 19

In embodiment 18, suppression of occurrence of events using the offset value CIO which is based on a conventional technology is shown, though a further problem arises.

In the case of using an offset value CIO which is based on a conventional technology, the same value is set to all pieces of mobile terminal 1 which are placed under the control of a base station 2 for which the offset value CIO is set up. This causes the following problem.

As a typical inconvenient example, there is a case in which mobile terminal 1 which is carrying out an E-DCH service approaches an area which is under the control of a base station which does not comply with Release 6 (i.e., which can not carry out any E-DCH service), and notifies an addition event of adding the base station to an E-DCH active set to a radio network controller 3.

In this case, the radio network controller 3 determines that it does not add the relevant base station 2-3 to the E-DCH active set on the basis of the version information of the base station 2-3, and sets up a negative offset value CIO for the relevant base station 2-3.

As a result, the addition event of adding the relevant base station to the E-DCH active set transmitted from the relevant mobile terminal 1 can be suppressed.

However, also for other mobile terminal 1 which is placed under the control of the relevant base station 2-3 and which is not carrying out any E-DCH service, the same offset value CIO is set to the relevant base station 2-3.

As a result, even if the reception level of CPICH from the relevant base station 2-3 originally has a value which allows the base station 2-3 to be added to the prior art active set for other mobile terminal 1, there arises a problem that no addition event of adding the base station to the prior art active set is transmitted. This results in degradation in the communication quality of the other mobile terminal 1 (i.e., a terminal which is not carrying out any E-DCH service).

This problem can be solved by newly establishing a parameter which mobile terminal 1 which is carrying out an E-DCH service reflects, other than a parameter which mobile terminal 1 which is not carrying out any E-DCH service reflects.

More specifically, when the radio network controller 3 transmits a negative offset value or a positive offset value to mobile terminal 1, if the mobile terminal 1 is the one which is carrying out an E-DCH service the radio network controller 3 transmits an offset value which is a parameter different from that which mobile terminal which is not carrying out any E-DCH service reflects to the mobile terminal 1.

As a result, when the reception level of CPICH from the relevant base station 2-3 originally has a value which allows the base station 2-3 to be added to the prior art active set for other mobile terminal 1, the addition event of adding the base station to the prior art active set can be transmitted.

Embodiment 20

A non-serving base station 2-2 for E-DCH, i.e., a base station included in an E-DCH active set (a base station included in an active set can be considered the same way) has a heavier load as compared with base stations included in a prior art active set (i.e., base stations in the prior art active set which are not carrying out any E-DCH service) for the following reasons.

One of the reasons why a non-serving base station 2-2 for E-DCH has a heavier load as compared with base stations included in the prior art active set is a signaling load. This is because a non-serving base station 2-2 for E-DCH needs to newly transmit E-RGCH signals (data) to mobile terminal 1 in order to transmit a Down command, and E-HICH signals (data) to the mobile terminal 1 in order to transmit ACK/NACK for E-DCH.

Furthermore, when new E-RGCH signals (data) and new E-HICH signals (data) are transmitted, the load becomes heavy also from the viewpoint of radio resources.

Another reason is a load of carrying out E-DCH decoding processing.

Because E-DCH services are carried out at a high speed in many cases as compared with DCH services, the amount of data increases during E-DCH services and the load of carrying out E-DCH decoding processing makes up a large proportion of the load in each base station 2.

As mentioned above, from the viewpoint of the load in each base station and the effective use of radio resources, it can be said that the number of non-serving base stations 2-2 should not be increased more than necessary.

Hereafter, assume a case in which good-quality base stations 2-1 and 2-2 are already included in the E-DCH active set.

In such a case, any diversity effect with further uplink macro diversity is not needed. This is because if E-DCH signals (data) are correctly decoded by either one of base stations included in the E-DCH active set, the radio network controller 3 can receive correct E-DCH signals (data) with uplink macro diversity.

Because it is difficult for the mobile terminal 1 to measure the uplink quality, the following method can be considered.

Judgment on the basis of the reception level of CPICH signals (data) received by the mobile terminal 1

For example, when there exist base stations 2-1 and 2-2 whose reception level of CPICH received by the mobile terminal is higher than a threshold (this threshold can be a predetermined (given) value or can be a value provided through signaling from the radio network controller 3), it can be considered that each of the base stations 2-1 and 2-2 has good reception quality of E-DCH and therefore it is not necessary to further add a base station 2-3 to the E-DCH active set. By expressing the above-mentioned threshold as a threshold F, the following explanation will be made.

Figure 55:
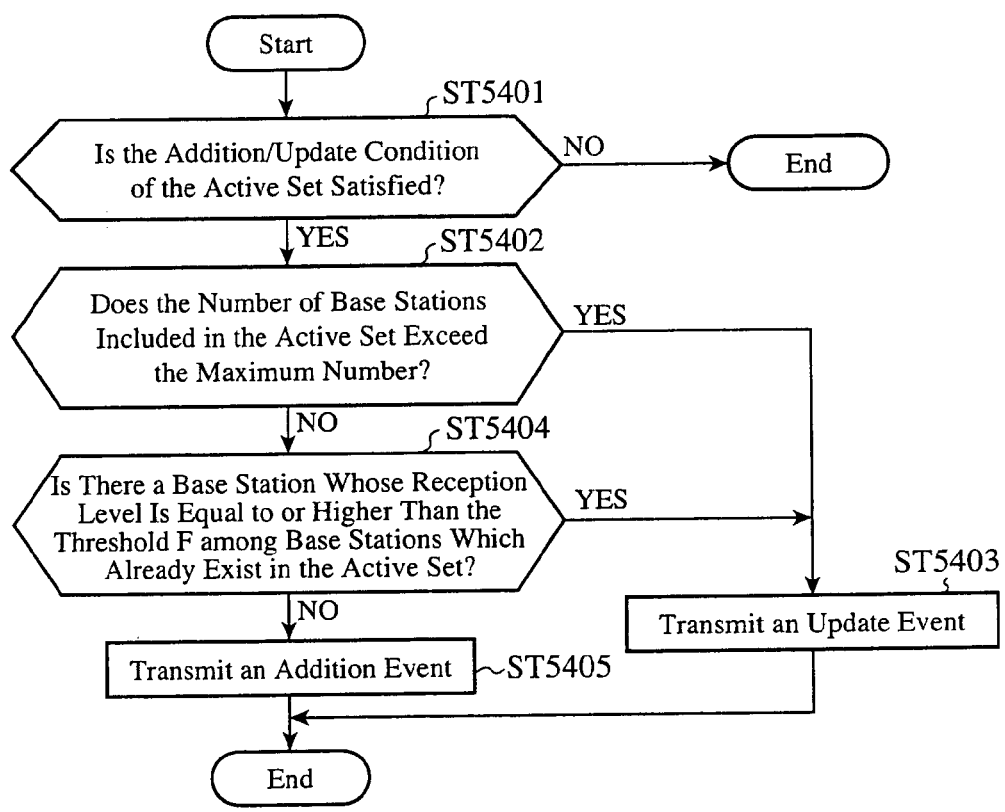
FIG. 55 is a flow chart showing a process carried out by mobile terminal when transmitting an addition event/update event.

FIG. 55 is a flowchart showing a process of transmitting an addition event/update event which is carried out by the mobile terminal 1.

Step ST5404 of FIG. 55 is a step characteristic of this embodiment.

A protocol processing unit 41 of the mobile terminal 1 judges whether or not an addition condition/update condition of the active set is satisfied (step ST5401).

As the addition condition of the active set, a case in which the reception level of CPICH from the base station 2-3 included in the prior art active set exceeds a threshold can be considered. A predetermined (given) value can be used as this threshold, or a value notified through signaling from the radio network controller 3 can be used.

Furthermore, as the update condition of the E-DCH active set, a case in which the reception level of CPICH from the base station 2-3 included in the prior art active set exceeds the reception level of CPICH from each of the base stations 2-1 and 2-2 which are included in the E-DCH active set can be considered.

When the addition condition/update condition of the active set is satisfied, the protocol processing unit 41 of the mobile terminal 1 judges whether the number of base stations 2 included in the E-DCH active set exceeds a maximum number (for example, three) (step ST5402).

When the number of base stations 2 included in the E-DCH active set exceeds the maximum number, the protocol processing unit 41 of the mobile terminal 1 transmits an update event to the radio network controller 3 (step ST5403).

The protocol processing unit 41 of the mobile terminal 1 which constructs a threshold holding means and a level comparing means holds the threshold F indicating a reception level of CPICH at the time when it is a good one, and judges whether there exist base stations 2-1 and 2-2 whose reception level of CPICH measured by the CPICH receiving unit 28 is equal or higher than the threshold F in base stations 2-1 and 2-2 included in the E-DCH active set (step ST5404).

A predetermined (given) value can be used as this threshold F, or a value notified through signaling from the radio network controller 3 can be used.

When there exist base stations 2-1 and 2-2 whose reception level of CPICH measured by the CPICH receiving unit 28 is equal or higher than the threshold F in the E-DCH active set, the protocol processing unit 41 of the mobile terminal 1 which constructs an event transmitting means does not further add any non-serving base station 2-2, but updates a non-serving base station 2-2 in the E-DCH active set because the diversity effect with uplink macro diversity is not needed anymore.

For this reason, the protocol processing unit 41 transmits an update event of the E-DCH active set to the radio network controller 3 (step ST5403).

Because it can be assumed that the good-quality base stations 2-1 and 2-2 become serving base stations 2-1 in many cases, the protocol processing unit can judge only the reception levels of serving base stations 2-1 instead of judging the reception levels of all the base stations 2 included in the E-DCH active set in step ST5404.

When there exist no base stations 2-1 and 2-2 whose reception level of CPICH measured by the CPICH receiving unit 28 is equal or higher than the threshold F in the E-DCH active set, the protocol processing unit 41 of the mobile terminal 1 transmits the addition event of the E-DCH active set to the radio network controller 3 (step ST5405).

As a result, when good-quality base stations 2-1 and 2-2 are already included in the E-DCH active set, the load in each base station can be reduced and the effective use of radio resources can be made because any further addition of a non-serving base station 2-2 is not carried out.

INDUSTRIAL APPLICABILITY

As mentioned above, the mobile communications system in accordance with the present invention is suitable for a case in which a base station whose interference level exceeds a maximum allowable interference level can be made to control the transmission power of data transmitted from mobile terminal, and the necessity to suppress the degradation in the transmission quality is great.

The invention claimed is:

1. A mobile terminal for communicating data with a mobile communications network, the mobile terminal comprising:
    a comparison unit configured to compare a measurement quantity of communication quality with respect to a base station not included in an Enhanced Dedicated Channel (E-DCH) active set but included in a Dedicated Channel (DCH) active set, with a measurement quantity of communication quality with respect to a base station included in the E-DCH active set, and to compare a number of base stations included in the E-DCH active set with a predetermined threshold; and
    a transmitter configured to notify a network controller, after (i) said comparison of the communication quality confirms that the communication quality with respect to the base station not included in the E-DCH active set but included in the DCH active set is better than the communication quality with respect to the base station included in the E-DCH active set, and (ii) said comparison of the number of base stations confirms that the number of base stations included in the E-DCH active set exceeds the predetermined threshold, of an occurrence of an event to delete the base station included in the E-DCH active set from the E-DCH active set and to add the base station not included in the E-DCH active set but included in the DCH active set to the E-DCH active set to preserve the number of base stations included in the E-DCH active set.

2. The mobile terminal as claimed in claim 1, wherein the measurement quantity of communication quality is determined by the mobile terminal from a path loss of signals transmitted between the mobile terminal and the base station included in the E-DCH active set and the base station not included in the E-DCH respectively.

3. The mobile terminal as claimed in claim 2, wherein the path loss is determined from the signals transmitted from the base station included in the E-DCH active set and the base station not included in the E-DCH respectively to the mobile terminal.

4. The mobile terminal as claimed in claim 1, the mobile terminal comprising:
an interference level acquiring unit configured to acquire an interference level of radio signals received at the base station included in the E-DCH, the measurement quantity of communication quality with respect to the base station included in the E-DCH being based on the acquired interference level, and
to acquire an interference level of radio signals received at the base station not included in the E-DCH, the measurement quantity of communication quality with respect to the base station not included in the E-DCH being based on the acquired interference level.

5. The mobile terminal according to claim 1, wherein the preserved number of base stations included in the E-DCH active set is a maximal number, the maximal number being a number of base stations that are part of the E-DCH active set required to be able to meet a given transmission rate of the mobile terminal.

6. A mobile communication system comprising:
a plurality of base stations including a base station not included in an Enhanced Dedicated Channel (E-DCH) active set but included in a Dedicated Channel (DCH) active set and a base station included in the E-DCH active set;
a network controller; and
a mobile terminal that includes
a comparison unit configured to compare a measurement quantity of communication quality with respect to the base station not included in an Enhanced Dedicated Channel (E-DCH) active set but included in a Dedicated Channel (DCH) active set, with a measurement quantity of communication quality with respect to the base station included in the E-DCH active set, and to compare a number of base stations included in the E-DCH active set with a predetermined threshold; and
a transmitter configured to notify the network controller, after (i) said comparison of the communication quality confirms that the communication quality with respect to the base station not included in the E-DCH active set but included in the DCH active set is better than the communication quality with respect to the base station included in the E-DCH active set, and (ii) said comparison of the number of base stations confirms that the number of base stations included in the E-DCH active set exceeds the predetermined threshold, of an occurrence of an event to delete the base station included in the E-DCH active set from the E-DCH active set and to add the base station not included in the E-DCH active set but included in the DCH active set to the E-DCH active set to preserve the number of base stations included in the E-DCH active set.

7. A mobile terminal for communicating data with a mobile communications network, the mobile communications network including base stations and a radio network controller, the radio network controller using an active set of base stations for controlling communication from the mobile terminal to the base stations, the active set of base stations including a first type of base stations for up-link high speed packet communications and a second type of base stations for up-link communications, the mobile terminal configured
to generate a measure of communications quality with respect to a first base station included in the first type of base stations of the active set and a measure of communications quality with respect to a second base station included in the second type of base stations of the active set of base stations,
to compare the measure of communications quality with respect to the first base station with the communications quality with respect to the second base station, and after the comparison, to generate a notification of an event to delete the first base station included in the first type of base stations of the active set and to add the second base station to the first type of base stations of the active set, when the comparison indicates that the measure of communications quality with respect to the second base station is better than the communications quality with respect to the first base station, and
to transmit the notification to the radio network controller of the mobile communications network for applying the event to the active set,
wherein the measure of the communications quality with respect to the first base station and with respect to the second base station is determined by the mobile terminal from a path loss of signals transmitted between the mobile terminal and the first and second base stations respectively,
the path loss is determined from the signals transmitted from the first and the second base stations respectively to the mobile terminal, and
the signal transmitted from the first and the second base stations is a CPICH signal and the mobile terminal includes a CPICH reception unit which is arranged to generate path loss information from the CPICH signal received from the first base station to form the first quality measure with respect to the first base station and to generate path loss information from the CPICH signal received from the second base station to form the second quality measure with respect to the second base station.

8. A method for communicating data between a mobile terminal and a mobile communications network, the mobile communications network including base stations and a radio network controller, the radio network controller using an active set of base stations for controlling communication from the mobile terminal to the base stations, the active set of base stations including a first type of base stations for up-link high-speed packet communications and a second type of base stations for uplink communications, the method comprising:
generating a measure of communications quality with respect to a first base station included in the first type of base stations of the active set and a measure of communications quality with respect to a second base station included in the second type of base stations of the active set of base stations;

comparing the measure of communications quality with respect to the first base station with the communications quality with respect to the second base station, and after said step of comparing, generating a notification of an event to delete the first base station included in the first type of base stations of the active set, and to add the second base station to the first type of base stations of the active set, when the comparison indicates that the measure of communications quality with respect to the second base station is better than the communications quality with respect to the first base station;

transmitting the notification to the radio network controller of the mobile communications network for applying the event to the active set;

measuring a path loss of signals transmitted between the mobile terminal and the first and second base stations respectively, the measure of the communications quality with respect to the first base station and with respect to the second base station being determined from the measured path loss, wherein the measuring the path loss includes determining the path loss from a signal transmitted from the first and the second base stations respectively and received by the mobile terminal, and the signal transmitted from the first and the second base stations is a CPICH signal and determining the path loss includes receiving from each of the first and the second base stations the CPICH signal, generating the path loss information from the CPICH signal received from the first base station to form the first quality measure with respect to the first base station of the first type, and generating the path loss information from the CPICH signal received from the second base station to form the second quality measure with respect to the second base station of the second type.

* * * * *